(12) United States Patent
Nakahori et al.

(10) Patent No.: US 7,313,003 B2
(45) Date of Patent: Dec. 25, 2007

(54) SWITCHING POWER SUPPLY UNIT

(75) Inventors: Wataru Nakahori, Tokyo (JP);
Yasuhiro Murai, Tokyo (JP)

(73) Assignee: TDK Corporation, Tokyo (JP)

( * ) Notice: Subject to any disclaimer, the term of this patent is extended or adjusted under 35 U.S.C. 154(b) by 9 days.

(21) Appl. No.: 11/495,621

(22) Filed: Jul. 31, 2006

(65) Prior Publication Data
US 2007/0025125 A1    Feb. 1, 2007

(30) Foreign Application Priority Data

| Jul. 29, 2005 | (JP) | ............................. 2005-222118 |
| Oct. 31, 2005 | (JP) | ............................. 2005-317419 |
| Jan. 31, 2006 | (JP) | ............................. 2006-022826 |
| Apr. 24, 2006 | (JP) | ............................. 2006-119154 |

(51) Int. Cl.
*H02M 3/335* (2006.01)
*H02H 7/122* (2006.01)

(52) U.S. Cl. ...................... 363/17; 363/56.02

(58) Field of Classification Search .................. 363/15, 363/16, 17, 55, 56.01, 56.02, 131, 132
See application file for complete search history.

(56) References Cited

U.S. PATENT DOCUMENTS

| 4,445,167 | A | * | 4/1984 | Okado ..................... 363/56.02 |
| 5,198,969 | A | | 3/1993 | Redl et al. |
| 6,028,779 | A | * | 2/2000 | Sakamoto et al. ............ 363/55 |
| 6,310,785 | B1 | | 10/2001 | Ayyanar et al. |
| 6,356,462 | B1 | | 3/2002 | Jang et al. |
| 6,373,731 | B1 | * | 4/2002 | Iwamura et al. ......... 363/56.05 |
| 6,392,908 | B2 | * | 5/2002 | Miyazaki et al. ............. 363/98 |
| 6,452,815 | B1 | * | 9/2002 | Zhu et al. ..................... 363/17 |
| 6,466,459 | B1 | | 10/2002 | Guerrera |
| 6,496,396 | B2 | | 12/2002 | Davila et al. |
| 6,507,500 | B2 | | 1/2003 | Liang |
| 6,611,444 | B2 | | 8/2003 | Ayyanar et al. |
| 6,650,551 | B1 | | 11/2003 | Melgarejo |

FOREIGN PATENT DOCUMENTS

| JP | A 2001-37221 | 2/2001 |
| JP | A-3400443 | 4/2003 |
| WO | WO00079674 A1 | 12/2000 |

OTHER PUBLICATIONS

Lee et al., "A Novel DC-DC Full-Bridge Converter using Energy-Recovery Circuit with Regenerative Transformer," 2005 IEEE 99. 1543-1548.

* cited by examiner

*Primary Examiner*—Adolf Berhane
(74) *Attorney, Agent, or Firm*—Oliff & Berridge, PLC

(57) ABSTRACT

The present invention provides a switching power supply unit capable of suppressing a surge voltage generated in a rectifier element more effectively. A first resonance circuit is constructed by capacitors in a surge voltage suppressing circuit and an inductor, and resonance time of the first resonance circuit is set to be longer than recovery time of a diode in a rectifier circuit. According to at least one of a DC input voltage and an output current, either a first bridge circuit or a second bridge circuit is selectively allowed to perform switching operation. At the time of forward-direction operation, the first resonance circuit is formed by the capacitors in the surge voltage circuit and the inductor on the high voltage side. At the time of reverse-direction operation, a second resonance circuit is formed by the capacitors and an inductor on the low voltage side.

36 Claims, 94 Drawing Sheets

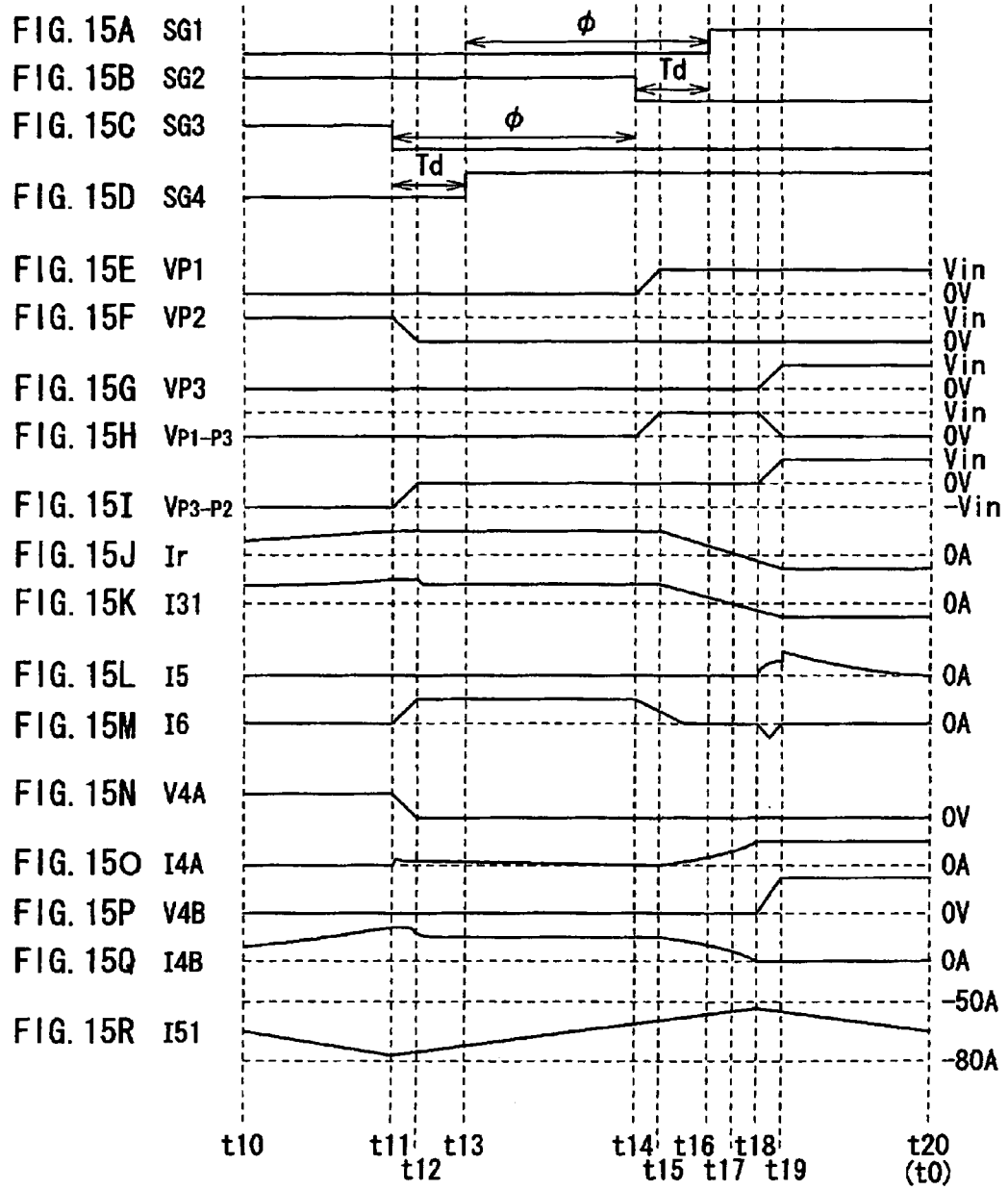

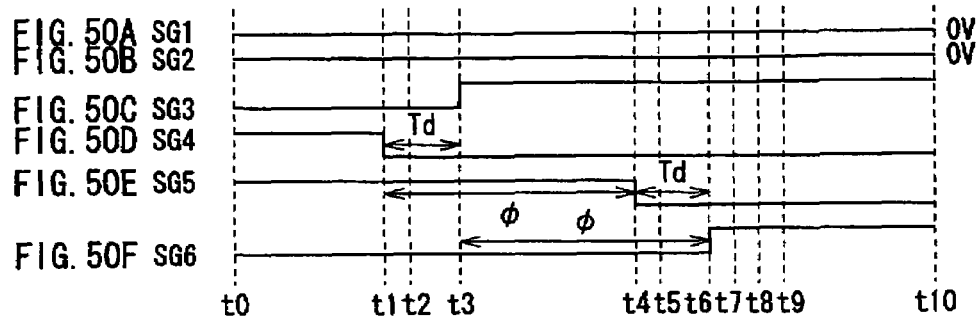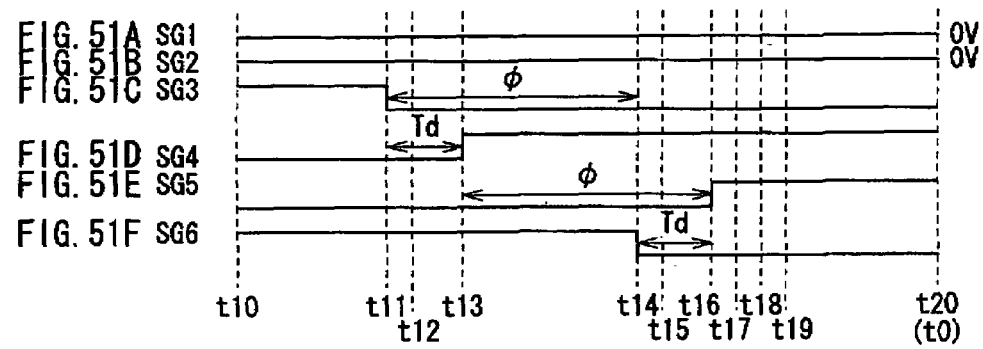

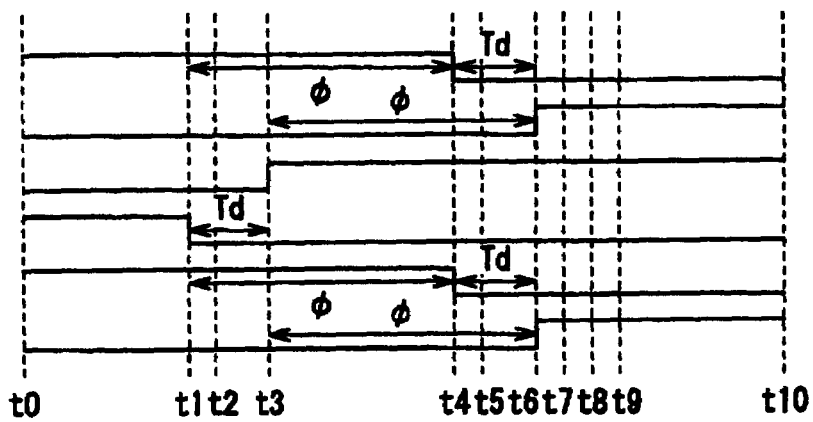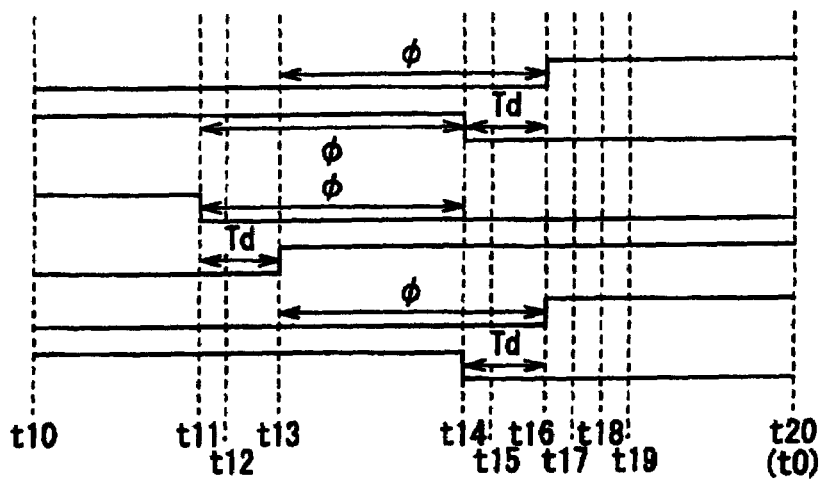

| INCREASE /DECREASE IN VOLTAGE | | S1~S4 | S10, S20 | SWITCHING CIRCUIT 1 | SWITCHING CIRCUIT 4 | INDUCTOR LR | INDUCTOR Lch | SURGE VOLTAGE SUPPRESSING CIRCUIT 2 |
|---|---|---|---|---|---|---|---|---|
| FORWARD- DIRECTION OPERATION | DECREASE (VH→VL) | ON/OFF OPERATION | OFF STATE | FUNCTION AS INVERTER CIRCUIT | FUNCTION AS RECTIFIER CIRCUIT | FUNCTION AS INDUCTOR FOR RESONANCE (C1~C4, C5~C6) | FUNCTION AS CHOKE COIL | VALID |
| REVERSE- DIRECTION OPERATION | INCREASE (VL→VH) | OFF STATE | ON/OFF OPERATION | FUNCTION AS RECTIFIER CIRCUIT | FUNCTION AS INVERTER CIRCUIT | FUNCTION AS INDUCTOR FOR RESONANCE (C1~C4) | FUNCTION AS INDUCTOR FOR BOOSTING + FUNCTION AS INDUCTOR FOR RESONANCE (C5~C6) | VALID |

FIG. 61

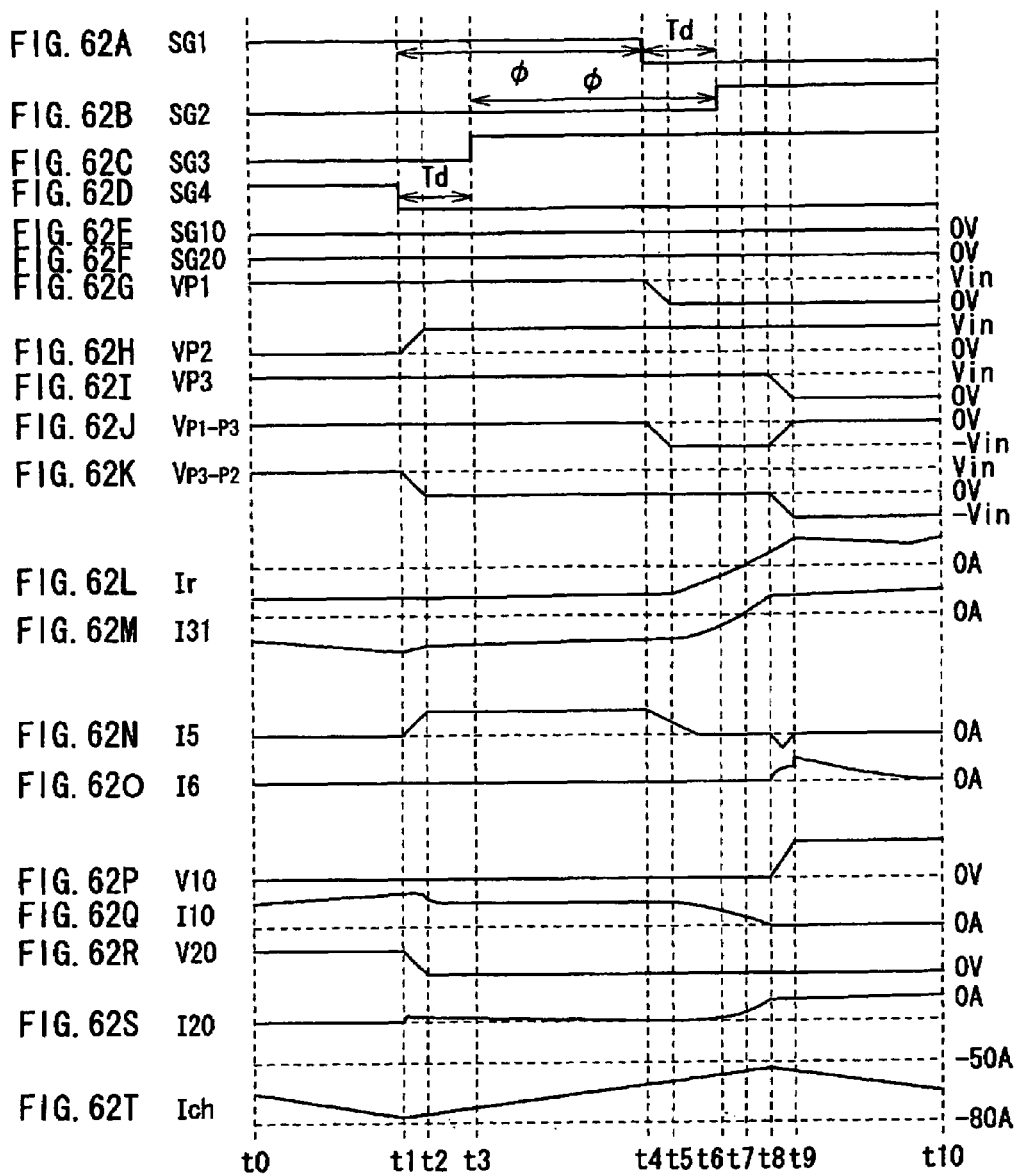

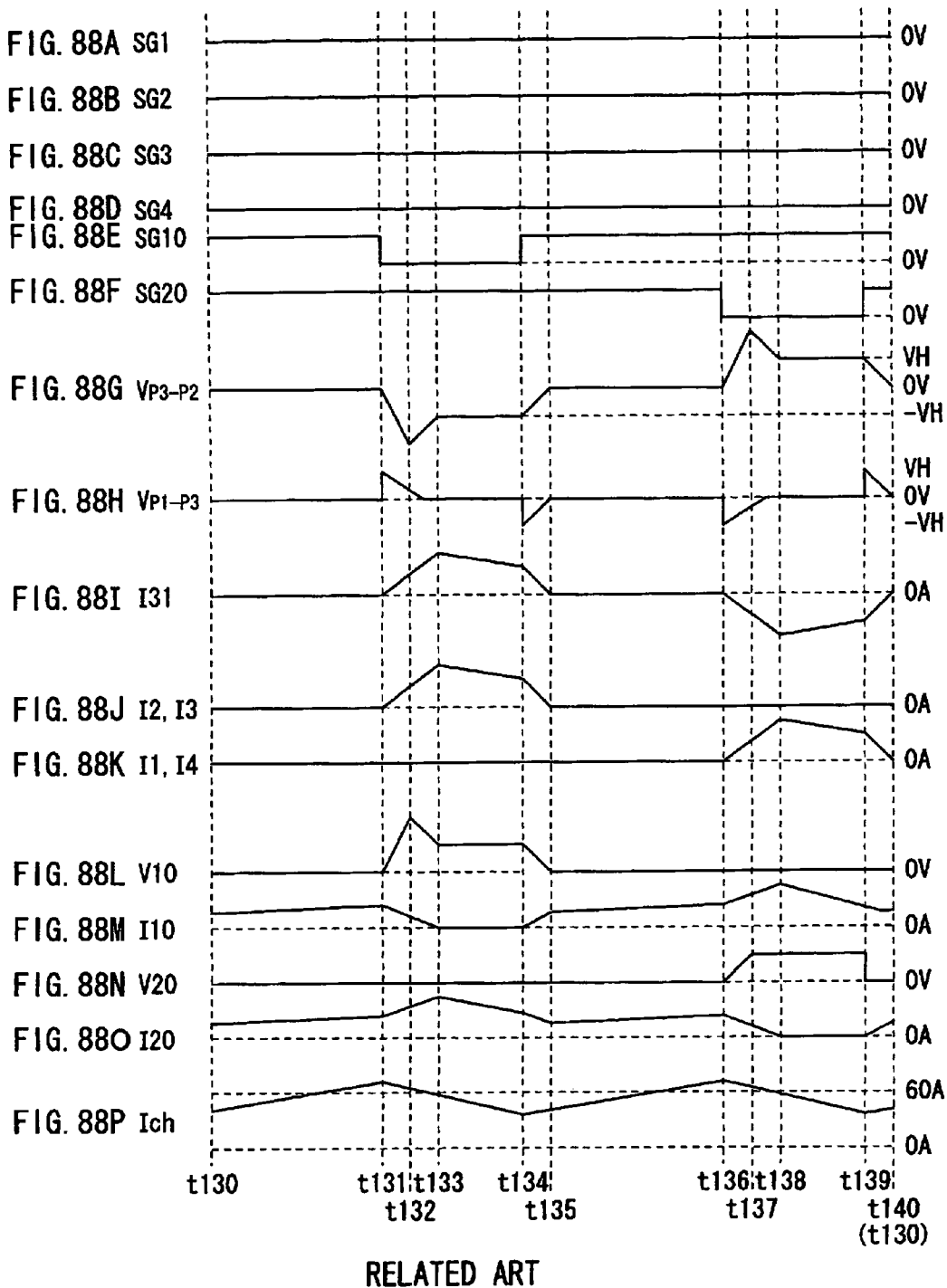
RELATED ART

SWITCHING POWER SUPPLY UNIT

BACKGROUND OF THE INVENTION

1. Field of the Invention

The present invention relates to a switching power supply unit for connecting an output obtained by switching a direct current input voltage to an output winding of a power converting transformer.

2. Description of the Related Art

Hitherto, various types of switching power supply units have been proposed and provided for practical use. Many of them are of a type in which a direct current input voltage is switched by switching operation of a switch circuit connected to an input winding of a power converting transformer, and the switched output is connected to an output winding of the power converting transformer. A voltage appearing in the output winding in association with such switching operation of the switch circuit is rectified by a rectifier circuit, the rectified voltage is converted to a direct current voltage by a smoothing circuit, and the smoothed voltage is output.

In a switching power supply unit of this kind, an output rectifier device such as an output diode is connected in series with a power transmission line in the rectifier circuit. Therefore, to improve efficiency of the switching power supply unit, it is extremely effective to reduce a loss in the output diode.

To reduce a loss in the output diode, it is sufficient to use a diode having a small forward voltage drop. However, the diode having a small forward voltage drop has also a low reverse withstand voltage. Consequently, in the case of using a diode having a small forward voltage drop as the output diode, it is particularly necessary to suppress the reverse voltage.

In a switching power supply unit of this kind, a reverse voltage which has to be considered the most is a surge (spike) voltage caused by a parasitic element accompanying on/off operation of the switch circuit. The surge voltage is applied as a reverse voltage to the output diode. Hitherto, to suppress such a surge voltage, various attempts have been made.

For example, the applicant of the present invention has proposed a snubber circuit utilizing LC resonance in Japanese Patent Publication No. 3,400,443 (patent document 1). The snubber circuit can suppress the surge voltage to a predetermined voltage or less by utilizing LC resonance.

Each of U.S. Pat. No. 5,198,969 (patent document 2), U.S. Pat. No. 6,466,459 (patent document 3), and U.S. Pat. No. 6,650,551 (patent document 4) discloses a switching power supply unit having a circuit for suppressing the surge voltage.

SUMMARY OF THE INVENTION

The predetermined voltage in the patent document 1, that is, the maximum value (peak value) of the surge voltage to be suppressed is 4×Vin/n (where Vin denotes direct current input voltage, and n denotes the ratio between the primary winding and the secondary winding of the power converting transformer) as described in the paragraphs [0062] to [0065] of the publication. The value is used in the case where the rectifier circuit is of a center tap type. In the case where the rectifier circuit is of a full bridge type, based on the circuit configuration, the predetermined voltage is the half of this value, that is, 2×Vin/n. Although the snubber circuit of the patent document 1 can suppress the surge voltage to a certain degree, there is still room for improving the maximum value.

Also in the circuits disclosed in the patent documents 2 to 4, there is still room for improvement in effective suppression of the surge voltage.

In view of the drawbacks of the invention, it is desirable to provide a switching power supply unit capable of suppressing a surge voltage generated in a rectifier device more effectively.

According to an embodiment of the present invention, there is provided a first switching power supply unit including: a full-bridge-type bridge circuit including four switching elements and generating an input AC voltage on the basis of a DC input voltage; a transformer having a primary winding and a secondary winding, and transforming the input AC voltage into an output AC voltage; a rectifier circuit provided on the secondary side of the transformer, including a plurality of first rectifier elements, and rectifying the output AC voltage by the plurality of first rectifier elements, thereby generating a DC output voltage; a surge voltage suppressing circuit connected in parallel with the bridge circuit, and including two device sets each configured of a second rectifier element connected in a manner of reversed polarity and a first capacitative element, the second rectifier element and the first capacitive element being connected in parallel with each other; a resonance inductor configuring a first resonance circuit in cooperation with the first capacitative elements; and a driving circuit for driving the bridge circuit. Resonance time of the first resonance circuit and recovery time of the first rectifier elements are set so as to satisfy the following conditional expression (1).

$$¼ \times \{2\pi \times (L \times C)^{1/2}\} > \text{Trr1} \tag{1}$$

where $\{2\pi \times (L \times C)^{1/2}\}$ is resonance time of one cycle in the first resonance circuit;

L is inductance of the resonance inductor;

C is capacitance value of the first capacitative element; and

Trr1 is recovery time of the first rectifier elements.

In the first switching power supply unit of an embodiment of the invention, an input AC voltage is generated from a DC input voltage supplied to the bridge circuit. By transforming the input AC voltage by the transformer, an output AC voltage is generated. The output AC voltage is rectified by the first rectifier elements in the rectifier circuit, and the resultant is output as a DC output voltage. The first capacitative element and the resonance inductor cooperate each other to function as an LC series resonance circuit (first resonance circuit), thereby performing resonance operation between them. Since the resonance time of the first resonance circuit and the recovery time of the first rectifier element are set so as to satisfy the conditional expression (1), reverse voltage applied to the first rectifier element rises gentler than that in the conventional unit irrespective of the unit configuration.

In the first switching power supply unit of an embodiment of the invention, resonance time of the first resonance circuit and recovery time of the second rectifier element are preferably set so as to satisfy the following conditional expression (2).

$$¼ \times \{2\pi \times (L \times C)^{1/2}\} > \text{Trr2} \tag{2}$$

where Trr2 is recovery time of the second rectifier element.

In the case of the configuration, rise of the reverse voltage applied to the second rectifier element becomes gentler and rise in the surge voltage in the second rectifier element is suppressed.

In the first switching power supply unit of an embodiment of the invention, the two device sets in the surge voltage suppressing circuit may be connected in series to each other. In this case, the resonance inductor may be disposed on the primary side of the transformer. Further, the primary winding of the transformer may be connected, so as to configure an H bridge, to one bridge circuit configured of two switching elements and the two device sets, the two switching element being selected from the four switching elements and connected in series to each other, and the resonance inductor may be connected, so as to configure an H bridge, to the other bridge circuit configured of the other two switching elements and the two device sets, the other two switching elements being the remainder of the four switching elements and connected in series to each other. The resonance inductor may be disposed on the secondary side of the transformer.

In the first switching power supply unit of an embodiment of the invention, the transformer and the resonance inductor may be magnetically independent of each other. Alternatively, an auxiliary winding may be provided on the primary side of the transformer, and the auxiliary winding and the resonance inductor may be magnetically coupled to each other.

The first switching power supply unit of an embodiment of the invention may further include second capacitative elements each of which is connected in parallel with each of the four switching elements, and the resonance inductor and the second capacitative elements may configure a second resonance circuit. In the case of the configuration, a short-circuit loss in the switching elements is suppressed by the resonance operation of the second resonance circuit. The switching element may be a field effect transistor, and the second capacitative element may be configured of parasitic capacitance of the field effect transistor. In the case of the configuration, the number of elements used is reduced and the circuit configuration is simplified. The first rectifier element may be configured of a parasitic diode of a field effect transistor.

In the first switching power supply unit of an embodiment of the invention, the rectifier circuit may be a center-tap-type rectifier circuit including the two first rectifier elements or a full-bridge-type rectifier circuit including the four first rectifier elements. In the case of the configuration, the maximum value (peak value) of the surge voltage is about 2×Vin/n in the case of the center tap type and about 1×Vin/n in the case of the full bridge type and can be made smaller than that in the related art.

In the first switching power supply unit of an embodiment of the invention, the first resonance circuit is constructed by the first capacitative element and the resonance inductor and resonance time of the first resonance circuit and the recovery time of the first rectifier element are set so as to satisfy the configuration expression (1). Thus, rise of the reverse voltage applied to the first rectifier element can be made gentler than that in the conventional unit. Without depending on the unit configuration, rise of the surge voltage can be suppressed more effectively.

According to an embodiment of the present invention, there is provided a second switching power supply unit generating a DC output voltage on the basis of a DC input voltage, and including: a first group of two device sets disposed between a pair of terminals to which the DC input voltage is applied, the two device sets connected in series, each device set including a switching element and a capacitative element connected in parallel with each other; a second group of two device sets disposed in parallel with the first group of device sets, the two device sets connected in series, each device set including a switching element and a capacitative element connected in parallel with each other; a third group of two device sets disposed in parallel with the first group and the second group, the two device sets connected in series, each device set including a switching element, a capacitative element, and a rectifier element which are connected in parallel with each other; a transformer including a primary winding and a secondary winding, the primary winding connected between a connection point of the two device sets in the second group and a connection point of the two device sets in the third group, the transformer transforming an input AC voltage generated from the DC input voltage into an output AC voltage; an output circuit provided on the secondary side of the transformer, including a plurality of rectifier elements, and generating the DC output voltage by rectifying the output AC voltage by the plurality of rectifier elements; and an inductor connected between a connection point of the two device sets in the first group and a connection point of the two device sets in the third group, configuring a first resonance circuit in cooperation with capacitative elements included in the first group and the second group, and configuring a second resonance circuit in cooperation with a capacitative element included in the third group.

In the second switching power supply unit of an embodiment of the invention, an input AC voltage is generated from an input DV voltage applied across a pair of terminals. By transforming the input AC voltage by the transformer, an output AC voltage is generated. The output AC voltage is rectified by the rectifier elements in the output circuit, and the resultant voltage is output as a DC output voltage. Since three groups each including two switching elements connected in series are disposed in parallel with each other between the pair of terminals, a plurality of kinds of bridge circuits can be formed by the three groups. By the bridge circuits, an input AC voltage is generated from the DC input voltage.

Preferably, the second switching power supply unit of an embodiment of the invention is further provided with a controller for performing a control so that either a first bridge circuit configured of the first group and the second group or a second bridge circuit configured of the second group and the third group selectively performs switching operation based on at least one of the DC input voltage and output current from the output circuit. In the case of the configuration, when the first bridge circuit is selectively allowed to operate, an input AC voltage is generated from the DC input voltage by the switching operation of the first bridge circuit. The capacitative elements in the first and second groups and the resonance inductor cooperate one another to function as an LC series resonance circuit (first resonance circuit), thereby suppressing a short-circuit loss in the switching elements included in the first and second groups and improving the efficiency of the unit. Further, when the capacitative element in the second group and the resonance inductor cooperate each other to function as an LC series resonance circuit (second resonance circuit) and the third group functions as a circuit for suppressing the surge voltage, rise in the reverse voltage applied to the rectifier elements in the output circuit becomes gentler than that in the conventional unit. On the other hand, when the second bridge circuit is selectively allowed to operate, an input AC voltage is generated from a DC input voltage by the switching operation of the second bridge circuit. Consequently, the resonance inductor is bypassed and the inductance component does not appear in the current path, so that the input voltage range in which predetermined output voltage can be maintained becomes wider than that in the conventional unit.

In the second switching power supply unit of an embodiment of the invention, it is possible to configure as follows. When the DC input voltage is higher than a threshold voltage, the controller turns off each of the switching elements in the third group and makes the switching elements included in the first and second groups perform on/off operations, thereby selectively allowing the first bridge circuit to perform switching operation. On the other hand, when the DC input voltage is equal to or lower than the threshold voltage, the controller makes the switching elements included in the second and third groups perform on/off operation, thereby enabling the second bridge circuit to perform the switching operation.

In the second switching power supply unit of an embodiment of the invention, preferably, when the DC input voltage is higher than a threshold voltage, the controller turns off each of the switching elements in the third group and makes the switching elements included in the first and second groups perform on/off operations, thereby selectively allowing the first bridge circuit to perform switching operation, while when the DC input voltage is equal to or lower than the threshold voltage, the controller selects either the first or second bridge circuit in consideration of magnitude of the output current. In this case, when the DC input voltage is equal to or lower than the threshold voltage, and the output current is smaller than a threshold current, the controller turns off each of the switching elements in the third group and makes the switching elements included in the first and second groups perform on/off operations, thereby allowing the first bridge circuit to be selected to perform switching operation. On the other hand, when the output current is equal to or larger than the threshold current, the controller selectively makes the switching elements included in the second and third groups perform on/off operation, thereby allowing the second bridge circuit to be selected to perform the switching operation.

In the second switching power supply unit of an embodiment of the invention, in the case of selecting the second bridge circuit to perform switching operation, the controller may perform control so that two switching elements in the first group turns on/off in synchronization with on/off operation of two switching elements in the third group, or the controller may turn off two switching elements in the first group.

In the second switching power supply unit of an embodiment of the invention, preferably, resonance time of the second resonance circuit and recovery time of rectifier elements in the output circuit are set so as to satisfy the following conditional expression (3).

$$\tfrac{1}{4} \times \{2\pi \times (L \times C)^{1/2}\} > Trr3 \quad (3)$$

where $\{2\pi \times (L \times C)^{1/2}\}$ is resonance time of one cycle in the second resonance circuit;

L is inductance of the resonance inductor;

C is capacitance value of the capacitative element in the third group; and

Trr3 is recovery time of the rectifier elements in the output circuit.

In the case of the configuration, rise of the reverse voltage applied to the rectifier elements in the output circuit becomes gentle irrespective of the unit configuration.

In this case, more preferably, resonance time of the second resonance circuit and recovery time of the rectifier elements in the third group are set so as to satisfy the following conditional expression (4).

$$\tfrac{1}{4} \times \{2\pi \times (L \times C)^{1/2}\} > Trr4 \quad (4)$$

where Trr4 is recovery time of the rectifier elements in the third group.

In the case of the configuration, rise of the reverse voltage applied to the rectifier elements in the output circuit and, the rectifier elements in the third group becomes gentle. Rise of surge voltage in the rectifier elements in the third group is also suppressed.

In the second switching power supply unit of an embodiment of the invention, the transformer and the resonance inductor may be magnetically independent of each other or magnetically coupled to each other.

In the second switching power supply unit of an embodiment of the invention, at least one of the switching elements may be a field effect transistor, and at least one of the capacitative elements may be configured of parasitic capacitance of the field effect transistor. The switching element in the third group may be a field effect transistor, and a rectifier element in the third group may be configured of parasitic diode of the field effect transistor. In the case of the configurations, the number of elements used is reduced and the circuit configuration is simplified. A rectifier element in the output circuit may be configured of a parasitic diode of a field effect transistor.

In the second switching power supply unit of an embodiment of the invention, three groups are disposed in parallel between a pair of terminals to which a DC input voltage is applied. Consequently, a plurality of kinds of bridge circuits for generating an input AC voltage from a DC input voltage can be formed, and various methods of converting a voltage from the input side to the output side can be realized.

In particular, in the case of selectively allowing the first or second bridge circuit to perform switching operation in accordance with at least one of a DC input voltage and output current, when the first bridge circuit is selectively allowed to operate, a short-circuit loss in the switching elements in the first and second groups is suppressed by the resonance operation of the first resonance circuit, the efficiency of the unit is improved, and rise of the reverse voltage applied to the rectifier elements in the output circuit can be made gentle by the second resonance circuit and the third group. When the second bridge circuit is selectively allowed to operate, by bypassing the resonance inductor, the input voltage rage can be widened. That is, even under situations that the input voltage and a load fluctuate, the overall unit performance can be improved. Particularly, in the case of performing the control also in consideration of the magnitude of the output current, the invention can address not only fluctuations in the input voltage but also fluctuations in the load. Thus, high-accuracy control can be performed.

According to an embodiment of the present invention, there is provided a third switching power supply unit receiving a DC input voltage from one of first and second input/output terminal pairs and outputting a DC output voltage from the other input/output terminal pair, including: a transformer including a first winding disposed on the first input/output terminal pair side and a second winding disposed on the second input/output terminal pair side; a first circuit disposed between the first input/output terminal pair and the transformer, and including a plurality of first switching elements and first rectifier elements each of which is connected in parallel with each of the plurality of first switching elements; a second circuit disposed between the second input/output terminal pair and the transformer, and including a plurality of second switching elements and second rectifier elements each of which is connected in parallel with each of the plurality of second switching elements; a surge voltage suppressing circuit connected in parallel with the first circuit, and including two device sets each having a third rectifier element connected in a manner of reversed polarity and a first capacitative element, the third rectifier element and the first capacitative elements being connected in parallel with each other; a first inductor disposed between the first input/output terminal pair and the transformer; a second inductor disposed between the second input/output terminal pair and the transformer; and a driving circuit for driving each of the first and second circuits.

In the third switching power supply unit of an embodiment of the invention, in the time of the forward-direction operation, a DC input voltage is supplied from the first input/output terminal pair, and an input AC voltage is generated by the first switching element in the first circuit functioning as an inverter circuit. When the input AC voltage is supplied to the first winding of the transformer, it is transformed, and an output AC voltage is output from the second winding. The output AC voltage is rectified by the second rectifier element in the second circuit functioning as a rectifier circuit and is smoothed by the second inductor functioning as a choke coil. The resultant is output as an output AC voltage from the second input/output terminal. On the other hand, in the time of the reverse-direction operation, a DC input voltage is supplied from the second input/output terminal pair, and an input AC voltage is generated by the second switching element in the second circuit functioning as an inverter circuit. The input AC voltage is supplied to the first winding of the transformer and transformed, and an output AC voltage is output from the second winding. The output AC voltage is rectified by the first rectifier element in the first circuit functioning as a rectifier circuit, and the resultant is output as a DC output voltage from the first input/output terminal. In the time of the forward-direction operation, the first capacitive element in the surge voltage suppressing circuit and the first inductor function as an LC series resonance circuit (first resonance circuit) and the resonance operation is performed. Consequently, rise of the reverse voltage applied to the second rectifier element becomes gentle. Since the DC input voltage is clamped by the third rectifier element in the surge voltage suppressing circuit, the maximum value of the reverse voltage is decreased. On the other hand, in the time of the reverse-direction operation, the first capacitive element and the second inductor function as an LC series resonance circuit (second resonance circuit) and the resonance operation is performed. Therefore, in a manner similar to the case of the forward-direction operation, rise in the reverse voltage applied to the second rectifier element becomes gentle. The DC input voltage is clamped by the third rectifier element, so that the maximum value of the reverse voltage is decreased.

In the third switching power supply unit of an embodiment of the invention, the two device sets in the surge voltage suppressing circuit may be connected in series with each other.

In the third switching power supply unit of an embodiment of the invention, the transformer and the first inductor may be magnetically independent of each other or magnetically coupled to each other.

In the third switching power supply unit of an embodiment of the invention, the first circuit may be a full-bridge-type circuit performing as a switching circuit or rectifier circuit including four first switching elements and four first rectifier elements. In this case, for example, the first or second winding of the transformer is connected, so as to configure one H bridge, to a bridge circuit configured of two first switching elements and the two device sets, the two first switching element being selected from the four first switching elements and connected in series to each other. The first inductor is connected, so as to configure an H bridge, to the other bridge circuit configured of the other two first switching elements and the two device sets, the other two first switching elements being the remainder of the four switching elements and connected in series to each other.

In the third switching power supply unit of an embodiment of the invention, the first circuit may be a half-bridge type circuit performing as a switching circuit or rectifier circuit including the two first switching elements, the two first rectifier elements, and the two second capacitative elements. In this case, for example, the first or second winding of the transformer may be connected, so as to configure an H bridge, to one bridge circuit configured of the two second capacitative elements and the two device sets. The first inductor may be connected, so as to configure an H bridge, to the other bridge circuit configured of the two first switching elements and the two device sets.

In the third switching power supply unit of an embodiment of the invention, the second circuit may be a push-pull-type circuit performing as a switching circuit or rectifier circuit including the two second switching elements and the two second rectifier elements, or a full-bridge-type circuit performing as a switching circuit or rectifier circuit including the four second switching elements and the four second rectifier elements. In the case of the configuration, when the DC input voltage is expressed as Vin, the maximum value of the reverse voltage is about 2×Vin/n in the case of the push pull type and is about 1×Vin/n in the case of the full bridge type.

In the third switching power supply unit of an embodiment of the invention, in the time of the forward-direction operation, the first resonance circuit is constructed by the first capacitative element and the first inductor. In the time of the reverse-direction operation, the second resonance circuit is constructed by the first capacitative element and the second inductor. Consequently, in both of the operations, rise of the reverse voltage applied to the second rectifier element can be made gentle and the maximum value of the reverse voltage can be reduced. Therefore, irrespective of the operation directions, the surge voltage generated in the rectifier elements can be suppressed.

Other and further objects, features and advantages of the invention will appear more fully from the following description.

BRIEF DESCRIPTION OF THE DRAWINGS

FIG. 15 is a timing waveform chart illustrating operations of the switching power supply unit subsequent to FIG. 14.

FIG. 50 is a timing waveform chart illustrating operations of the switching power supply unit in the case of selectively operating a second bridge circuit.

FIG. 51 is a timing waveform chart illustrating the operations of the switching power supply unit subsequent to FIG. 50.

FIG. 53 is a timing waveform chart illustrating operations of a switching power supply unit according to a modification of the second embodiment.

FIG. 54 is a timing waveform chart illustrating the operations of the switching power supply unit subsequent to FIG. 53.

FIG. 61 is a diagram illustrating the difference between forward-direction operation and reverse-direction operation.

FIG. 62 is a timing waveform chart illustrating the forward-direction operation in the switching power supply unit of FIG. 60.

FIG. 88 is a timing waveform chart illustrating the reverse-direction operation in the switching power supply unit according to the comparative example 5.

DETAILED DESCRIPTION OF THE PREFERRED EMBODIMENTS

Best modes for carrying out of the present invention (hereinbelow, simply called embodiments) will be described in detail hereinbelow with reference to the drawings.

First Embodiment

A first embodiment of the invention will be described. The first embodiment corresponds to a concrete example of a second switching power supply unit according to the invention.

Figure 1:
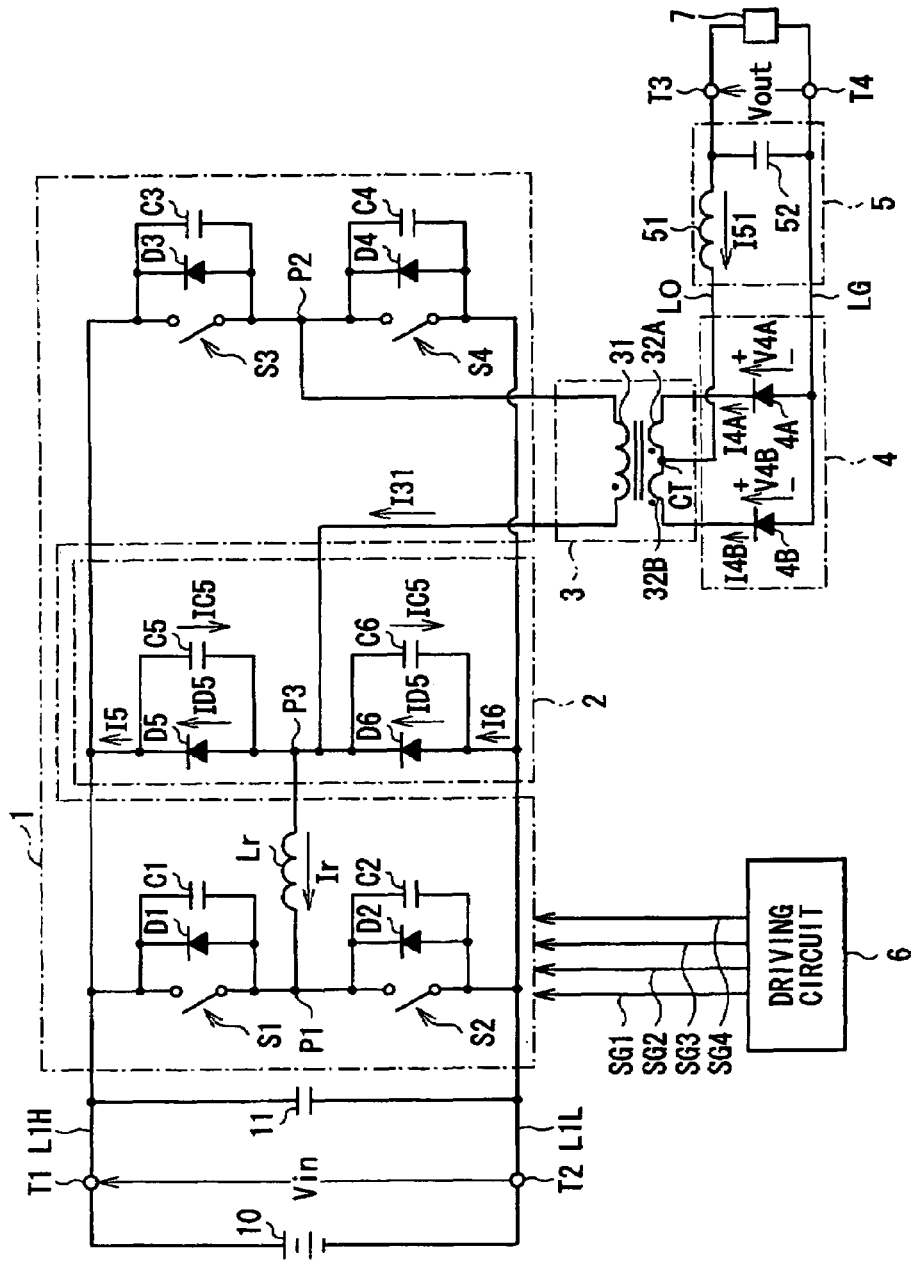
FIG. 1 is a circuit diagram showing the configuration of a switching power supply unit according to a first embodiment of the invention.

FIG. 1 shows a configuration of a switching power supply unit according to the first embodiment. The switching power supply unit functions as a DC-DC converter for converting a high DC input voltage Vin supplied from a high-voltage battery 10 to a lower DC output voltage Vout, and supplying the DC output voltage Vout to a not-shown low-voltage battery to drive a load 7.

The switching power supply unit has an input smoothing capacitor 11, a bridge circuit 1, a surge voltage suppressing circuit 2 which are provided between a primary high-voltage line L1H and a primary low-voltage line L1L, an inductor Lr for resonance, and a transformer 3 having a primary winding 31 and secondary windings 32A and 32B. Across an input terminal T1 of the primary high-voltage line L1H and an input terminal T2 of the primary low-voltage line L1L, the DC input voltage Vin output from the high-voltage battery 10 is applied. The switching power supply unit also has a rectifier circuit 4 provided on the secondary side of the transformer 3, a smoothing circuit 5 connected to the rectifier circuit 4, and a driving circuit 6 for driving the bridge circuit 1.

The input smoothing capacitor 11 is provided to smooth the DC input voltage Vin input from the input terminals T1 and T2.

The bridge circuit 1 has four switching elements S1 to S4, and capacitors C1 to C4 and diodes D1 to D4 connected in parallel with the switching elements S1 to S4, respectively, and has a full-bridge circuit configuration. Concretely, one end of the switching element S1 and one end of the switching element S2 are connected to each other, and one end of the switching element S3 and one end of the switching element S4 are connected to each other. The other ends of the switching elements S1 and S3 are connected to each other and connected to the input terminal T1, and the other ends of the switching elements S2 and S4 are connected to each other and connected to the input terminal T2. With such a configuration, the bridge circuit 1 converts the DC input voltage Vin applied across the input terminals T1 and T2 to an input AC voltage in accordance with drive signals SG1 to SG4 supplied from the driving circuit 6.

As the switching elements S1 to S4, for example, MOS-FETs (Metal Oxide Semiconductor-Field Effect Transistors), IGBTs (Insulated Gate Bipolar Transistors), or the like are used. In the case of using MOS-FETs as the switching elements, as the capacitors C1 to C4 and the diodes D1 to D4, parasitic capacitors or parasitic diodes of the MOS-FETs can be used. As the capacitors C1 to C4, junction capacitance of the diodes D1 to D4 may be used. In the case of using such a configuration, it becomes unnecessary to provide the capacitors C1 to C4 and the diodes D1 to D4 separately from the switching elements, so that the circuit configuration can be simplified.

The surge voltage suppressing circuit 2 has a pair of diodes D5 and D6 connected in opposite directions, and capacitors C5 and C6 connected in parallel with the diodes D5 and D6, respectively. The anode of the diode D5 is connected to a connection point P3, and the cathode is connected to the primary high-voltage line L1H. The anode of the diode D6 is connected to the primary low-voltage line L1L and the cathode is connected to the connection point P3. With such a configuration, in the surge voltage suppressing circuit 2, the capacitors C5 and C6 and the inductor Lr which will be described later construct an LC series resonance circuit (first resonance circuit). By utilizing the resonance characteristic of the LC series resonance circuit, a surge voltage applied to diodes 4A and 4B in the rectifier circuit 4 which will be described later is suppressed. Concretely, in the switching power supply unit of the embodiment, resonance time of the first resonance circuit and recovery time of the diodes 4A and 4B are set so as to satisfy the following conditional expression (1). The reverse voltages of the diodes 4A and 4B are subjected to resonance in a quarter of the resonance time and gently reach a voltage according to the turn ratio of the input voltage. During the period, recovery gently finishes. As a result, as will be described later, the surge voltage applied to the diodes 4A and 4B is suppressed.

$$\tfrac{1}{4} \times \{2\pi \times (L \times C)^{1/2}\} > Trr1 \qquad (1)$$

where $\{2\pi \times (L \times C)^{1/2}\}$ denotes resonance time of one cycle in the first resonance circuit, L indicates inductance of the inductor Lr, C indicates a combined capacitance value in parallel connection of the capacitors C5 and C6 (C=(C5+C6)), and Trr1 indicates recovery time of the diodes 4A and 4B. In the embodiment, the recover time denotes as follows. In the case where the diodes 4A and 4B are PN junction diodes, the diodes are in a conductive state because of holes injected from a P layer to an N layer. However, in a process that the forward current decreases and the reverse voltage is applied, the holes accumulated in the N layer return to the P layer or recombine and disappear. As a result, current flows in the opposite direction in the diodes 4A and 4B until a depletion layer extends. The current is called recovery current. The time in which the recovery current flows is called recover time. In the case where the diodes 4A and 4B are metal-semiconductor-junction schottky-barrier diodes, the recovery current is not generated in principle. However, the junction capacitance exists also in this case. In the process in which the reverse voltage is applied, while charging the junction capacitance, the current flows in the opposite direction. Therefore, in the case of the schottky-barrier diodes, it can be considered that the time in which the current in the opposite direction flows corresponds to the recovery time.

One end of the inductor Lr is connected to a connection point P1, and the other end is connected to the connection point P3. That is, the inductor Lr is connected so as to form an H bridge to the bridge circuit constructed by the switching elements S1 and S2, the diodes D5 and D6, and the capacitors C5 and C6. With such a configuration, the inductor Lr and the capacitors C1 to C4 in the bridge circuit 1 construct an LC series resonance circuit (second resonance circuit). By utilizing the resonance characteristic of the LC series resonance circuit, as will be described later, a short-circuit loss in the switching elements S1 to S4 is suppressed. In addition, as described above, the inductor Lr and the capacitors C5 and C6 in the surge voltage suppressing circuit 2 construct the LC series resonance circuit (first resonance circuit), and a surge voltage applied to the diodes 4A and 4B in the rectifier circuit 4 is suppressed. The inductance of the inductor Lr is set so as to be much smaller than that of the primary winding 31 of the transformer 3 which will be described later.

The transformer 3 has the primary winding 31 and the pair of secondary windings 32A and 32B. One end of the primary winding 31 is connected to the connection point P3, and the other end is connected to a connection point P2. The primary winding 31 is connected so as to form an H bridge to the bridge circuit constructed by the switching elements S3 and S4, the diodes D5 and D6, and the capacitors C5 and C6. On the other hand, one ends of the secondary windings 32A and 32B are connected to each other at a center tap CT. The center tap CT is led along an output line LO to an output terminal T3 via the smoothing circuit 5. That is, the rectifier circuit 4 which will be described later is of a center tap type. With such a configuration, the transformer 3 drops the input AC voltage generated by the bridge circuit 1 and outputs output AC voltages whose phases are different from each other by 180 degrees from the ends of the secondary windings 32A and 32B. The degree of voltage drop in this case is determined by the turn ratio between the primary winding 31 and the secondary windings 32A and 32B.

The rectifier circuit 4 is a single-phase full-wave rectifier constructed by the pair of diodes 4A and 4B. The cathode of the diode 4A is connected to the other end of the secondary winding 32A of the transformer 3, and the cathode of the diode 4B is connected to the other end of the secondary winding 32B of the transformer 3. The anodes of the diodes 4A and 4B are connected to each other and connected to a ground line LG. That is, the rectifier circuit 4 has a center-tap-type anode-common-connection configuration. The rectifier circuit 4 rectifies a half wave period of the output AC voltage from the transformer 3 by the diode 4A and rectifies the other half wave period by the diode 4B to obtain DC voltage.

Each of the diodes 4A and 4B may be constructed by a parasitic diode of a MOS-FET. In the case where each of the diodes 4A and 4B is constructed by a parasitic diode of a MOS-FET, preferably, the MOS-FETs are turned on synchronously with periods in which the parasitic diodes of the MOS-FETs are made conductive for the reason that the voltages can be rectified with a smaller voltage drop.

The smoothing circuit 5 includes a choke coil 51 and an output smoothing capacitor 52. The choke coil 51 is inserted in the output line LO. One end of the choke coil 51 is connected to the center tap CT and the other end of the choke coil 51 is connected to the output terminal T3 of the output line LO. The smoothing capacitor 52 is connected between the output line LO (concretely, the other end of the choke coil 51) and the ground line LG. An output terminal T4 is provided at an end of the ground line LG. With such a configuration, the smoothing circuit 5 smoothes the DC voltage rectified by the rectifier circuit 4, thereby generating the DC output voltage Vout. The DC output voltage Vout is supplied from the output terminals T3 and T4 to a low-voltage battery (not shown).

The driving circuit 6 is provided to drive the switching elements S1 to S4 in the bridge circuit 1. Concretely, the driving circuit 6 supplies the drive signals SG1 to SG4 to the switching elements S1 to S4 to turn on/off the switching elements S1 to S4. The driving circuit 6 performs phase control on the switching elements S1 to S4 as will be described later to properly set the phase differences, thereby stabilizing the DC output voltage Vout.

The capacitors C1 to C4 correspond to a concrete example of "second capacitative elements" in the invention. The inductor Lr corresponds to a concrete example of "resonance inductor" in the invention. The diodes 4A and 4B correspond to a concrete example of "first rectifier elements". The capacitors C5 and C6 correspond to a concrete example of "first capacitative elements" in the invention. The diodes D5 and D6 correspond to a concrete example of "second rectifier elements" in the invention. Each of the set of the capacitor C5 and the diode D5 and the set of the capacitor C6 and the diode D6 corresponds to a concrete example of "device set" in the invention. The switching elements S3 and S4 correspond to a concrete example of "two switching elements" in the invention, and the switching elements S1 and S2 correspond to a concrete example of "the other two switching elements" in the invention.

Next, the operation of the switching power supply unit having such a configuration will be described. First, the basic operation of the switching power supply unit will be described.

The bridge circuit 1 switches the DC input voltage Vin supplied from the high-voltage battery 10 via the input terminals T1 and T2, thereby generating an input AC voltage, and supplies the input AC voltage to the primary winding 31 of the transformer 3. From the secondary windings 32A and 32B of the transformer 3, an output AC voltage transformed (in this case, dropped) is obtained.

The rectifier circuit 4 rectifies the output AC voltage by the diodes 4A and 4B. As a result, a rectified output is generated between the center tap CT (output line LO) and the connection point (ground line LG) of the diodes 4A and 4B.

The smoothing circuit 5 smoothes the rectified output generated between the center tap CT and the diodes 4A and 4B, and outputs the DC output voltage Vout from the output terminals T3 and T4. The DC output voltage Vout is supplied to a not-shown low-voltage battery and the load 7 is driven.

Referring now to FIGS. 2 to 15, the operation of suppressing the surge voltage applied to the diodes 4A and 4B in the rectifier circuit 4 as main characteristics of the invention will be described in detail.

Figure 2:
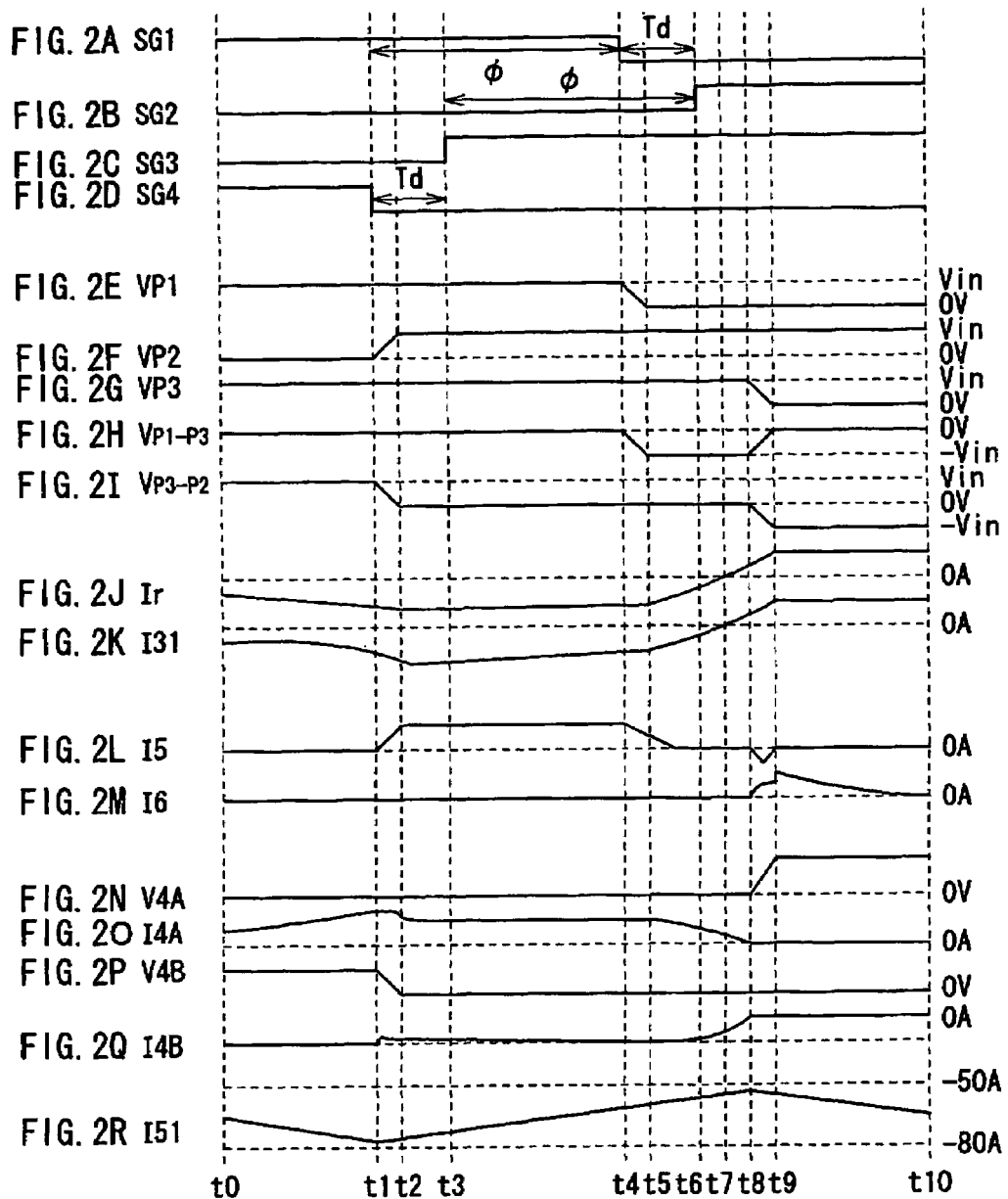
FIG. 2 is a timing waveform chart illustrating operations of the switching power supply unit of FIG. 1.

FIG. 2 is a timing waveform chart (times t0 to t10) of voltage waveforms and current waveforms of parts in the switching power supply unit of FIG. 1. (A) to (D) in the diagram show voltage waveforms of the drive signals SG1 to SG4. (E) to (G) show potentials VP1 to VP3 at the connection points P1 to P3. (H) shows the potential difference $V_{P1-P3}$ between the connection points P1 and P3 when the potential VP3 at the connection point P3 is used as a reference. (I) shows the potential difference $V_{P3-P2}$ between the connection points P3 and P2 when the potential VP2 at the connection point P2 is used as a reference. (J) indicates current Ir flowing in the inductor Lr. (K) indicates current I31 flowing in the primary winding 31 of the transformer 3. (L) and (M) indicate currents I5 and I6 flowing in parallel connection parts between the diodes D5 and D6 and the capacitors C5 and C6, respectively, in the surge voltage suppressing circuit 2. (N) and (P) indicate reverse voltages V4A and V4B applied across the anodes and cathodes of the diodes 4A and 4B, respectively. (O) and (Q) denote currents I4A and I4B flowing in the diodes 4A and 4B, respectively. (R) denotes current I51 flowing in the choke coil 51. The directions of the voltages are as shown by the arrows in FIG. 1. The direction from "−" to "+" is a positive direction. The positive directions of the currents are also as shown by the arrows in FIG. 1.

FIGS. 3 to 14 show operation states of the switching power supply unit at the timings (times t0 to t10) in FIG. 2. FIG. 15 shows voltage waveforms and current waveforms in parts after the timings illustrated in FIG. 2 (times t10 to t20 (t0)). The timings shown in FIGS. 2 and 15 correspond to half cycles of the operation in the switching power supply unit. Combination of the operations corresponds to operations in one cycle.

First, referring to FIGS. 2 to 14, the operations in the first half cycle will be described.

With respect to the drive signals SG1 to SG4 ((A) to (D) in FIG. 2) of the switching elements S1 to S4, it is understood that the switching elements S1 to S4 are paired. Concretely, the switching elements S1 and S2 are controlled to be turned on at fixed timings on the time base and are therefore called "fixed-side switching elements". The switching elements S3 and S4 are controlled to be turned on at variable timings on the time base and are therefore called "shift-side switching elements".

The switching elements S1 to S4 are driven at timings and in combinations that the input terminals T1 and T2 to which the DC input voltage Vin is applied are not electrically short-circuited in any state of the switching operation. Concretely, the switching elements S3 and S4 (fixed-side switching elements) are not turned on simultaneously, and the switching elements S1 and S2 (shift-side switching elements) are not also turned on simultaneously. A time interval required to avoid simultaneous turn-on of the switching elements is called dead time "Td" ((A) and (D) in FIG. 2).

The switching elements S1 and S4 have a period in which they are on simultaneously. In the period in which the switching elements S1 and S4 are simultaneously on, the primary winding 31 of the transformer 3 is excited. The switching elements S1 and S4 operate so as to have a switching phase difference φ by using the switching element S1 (fixed-side switching element) as a reference ((A) and (D) in FIG. 2). Similarly, the switching elements S2 and S3 have a period in which they are simultaneously on. In the period in which they are simultaneously on, the primary winding 31 of the transformer 3 is excited in the direction opposite to that in the above case. The switching elements S2 and S3 operate so as to have a switching phase difference φ by using the switching element S2 (fixed-side switching element) as a reference ((B) and (C) in FIG. 2). Further, when the switching phase difference φ between the switching elements S1 and S4 and the switching phase difference φ between the switching elements S2 and S3 are controlled, the time in which the switching elements S1 and S4 are simultaneously on and the time in which the switching elements S2 and S3 are simultaneously on change, respectively. Accordingly, the duty ratio of the input AC voltage applied to the primary winding 31 of the transformer 3 changes, and the DC output voltage Vout is stabilized.

Figure 3:
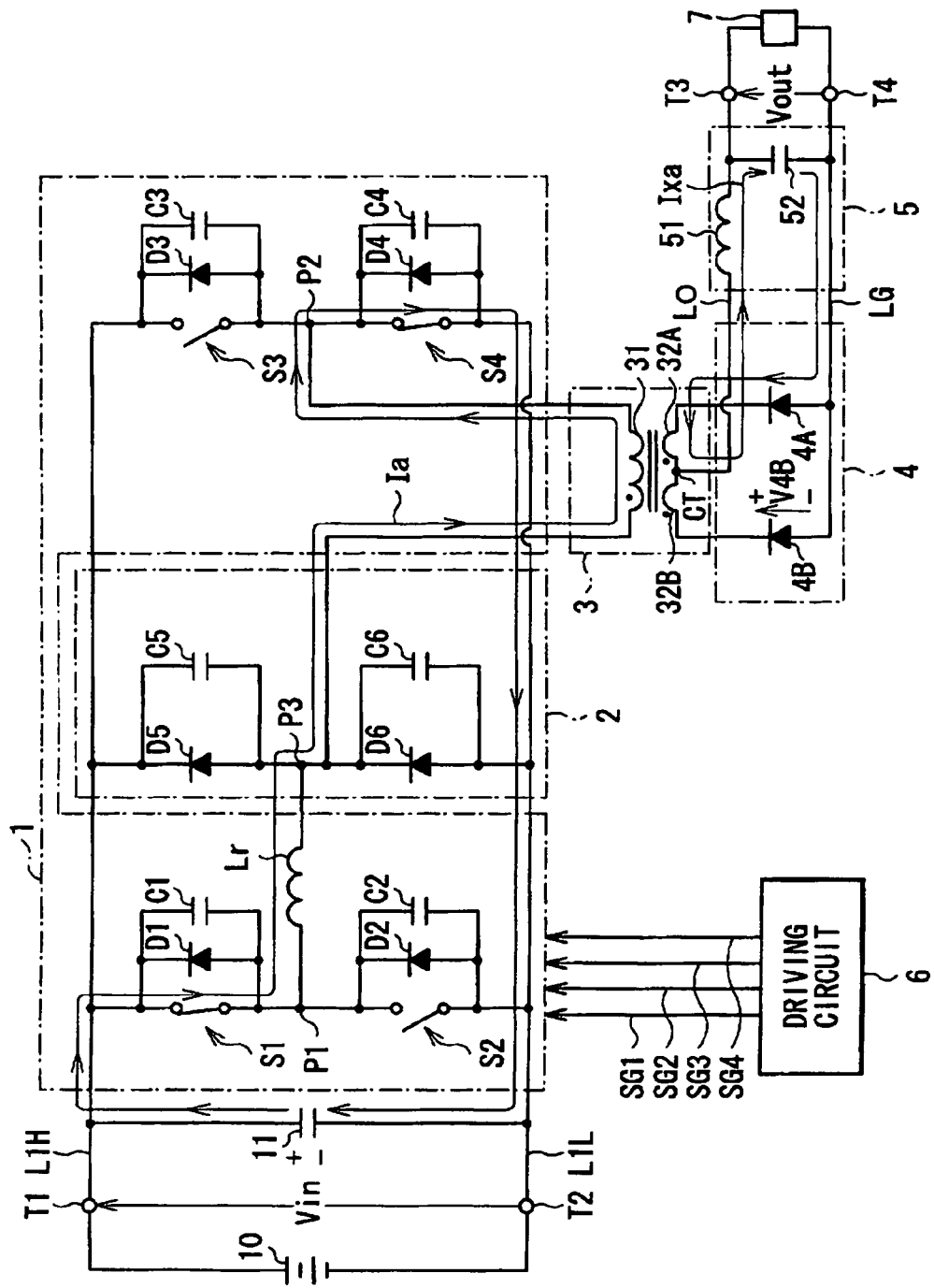
FIG. 3 is a circuit diagram illustrating operations of the switching power supply unit of FIG. 1.

First, in the period from time t0 to time t1 shown in FIG. 3, the switching elements S1 and S4 are in the on state ((A) and (D) in FIG. 2), and the switching elements S2 and S3 are in the off state ((B) and (C) in FIG. 2). The potential VP1 at the connection point P1 is equal to Vin (VP1=Vin) ((E) in FIG. 2), and the potential VP2 at the connection point P2 is equal to 0V (VP2=0V) ((F) in FIG. 2). As described above, the inductance of the inductor Lr is much smaller than that of the primary winding 31 of the transformer 3, so that the potential VP3 at the connection point P3 is almost equal to Vin ((G) in FIG. 2), and the potential difference $V_{P3-P2}$ between the connection points P3 and P2 using VP2 as a reference is also almost equal to Vin ((I) in FIG. 2). Therefore, a loop current Ia as shown in FIG. 3 flows in the bridge circuit 1, so that the inductor Lr is exited and power is transmitted from the primary side to the secondary side of the transformer 3. A loop current Ixa flows to the secondary side of the transformer 3 via the diode 4A and the choke coil 51, and the load 7 is driven. In the period, forward voltage is applied to the diode 4A and the reverse voltage V4A becomes 0V ((N) in FIG. 2). To the other diode 4B, the reverse voltage V4B is applied ((P) in FIG. 2).

Figure 4:
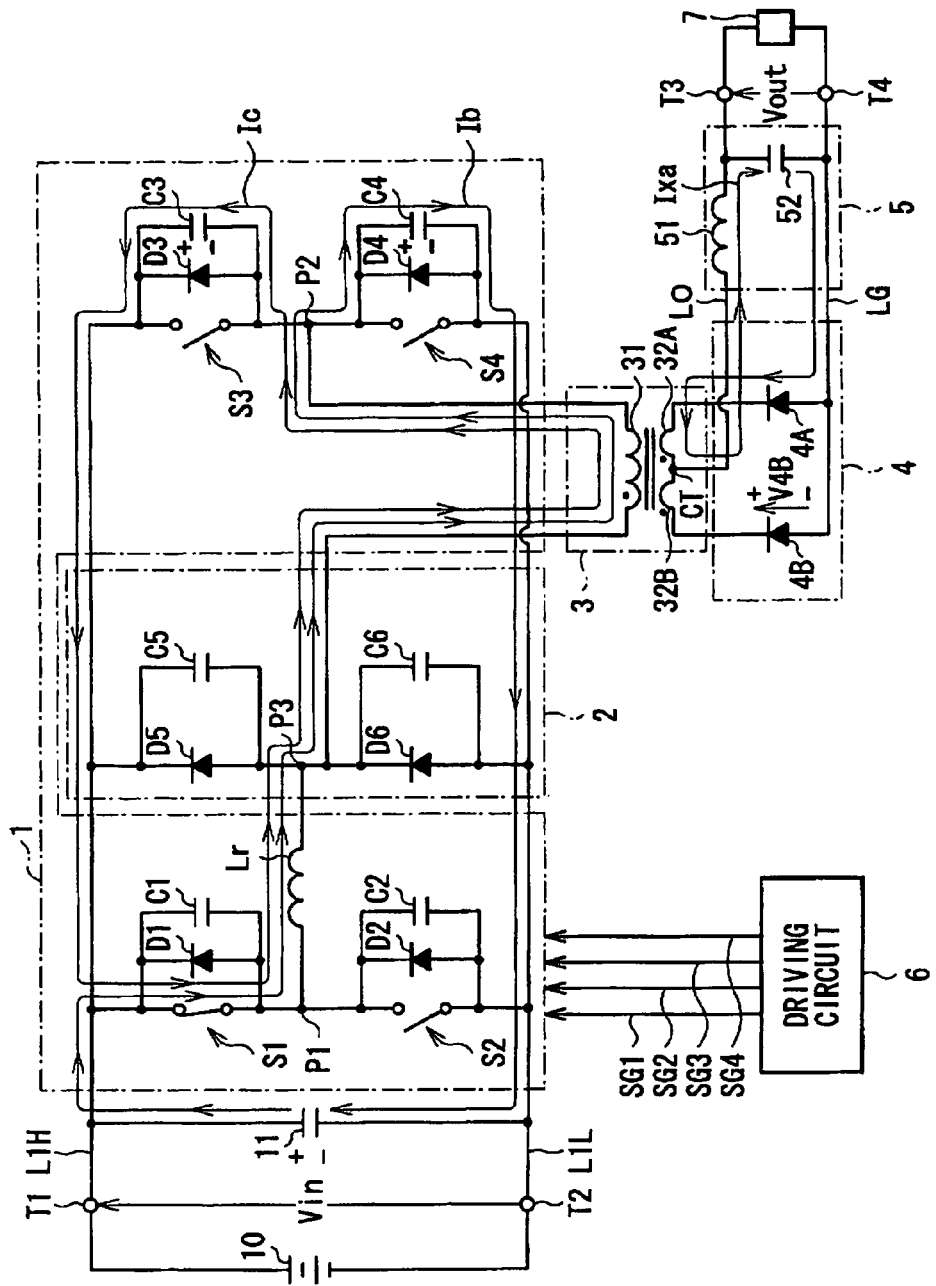
FIG. 4 is a circuit diagram illustrating operations of the switching power supply unit subsequent to FIG. 3.

Next, in the period from time t1 to time t2 shown in FIG. 4, the switching element S4 is turned off at the time t1 ((D) in FIG. 2). The LC series resonance circuit (second resonance circuit) is constructed by cooperation of the capacitors C3 and C4 and the inductor Lr, and second resonance operation is performed. Therefore, the loop currents Ib and Ic as shown in FIG. 4 flow, the capacitor C3 is discharged and, on the other hand, the capacitor C4 is charged. Consequently, the potential VP2 at the connection point P2 gradually increases and becomes equal to Vin at the time t2 ((F) in FIG. 2). At this time, the reverse voltage V4B of the diode 4B drops gradually and becomes 0V at the time t2 ((P) in FIG. 2).

Figure 5:
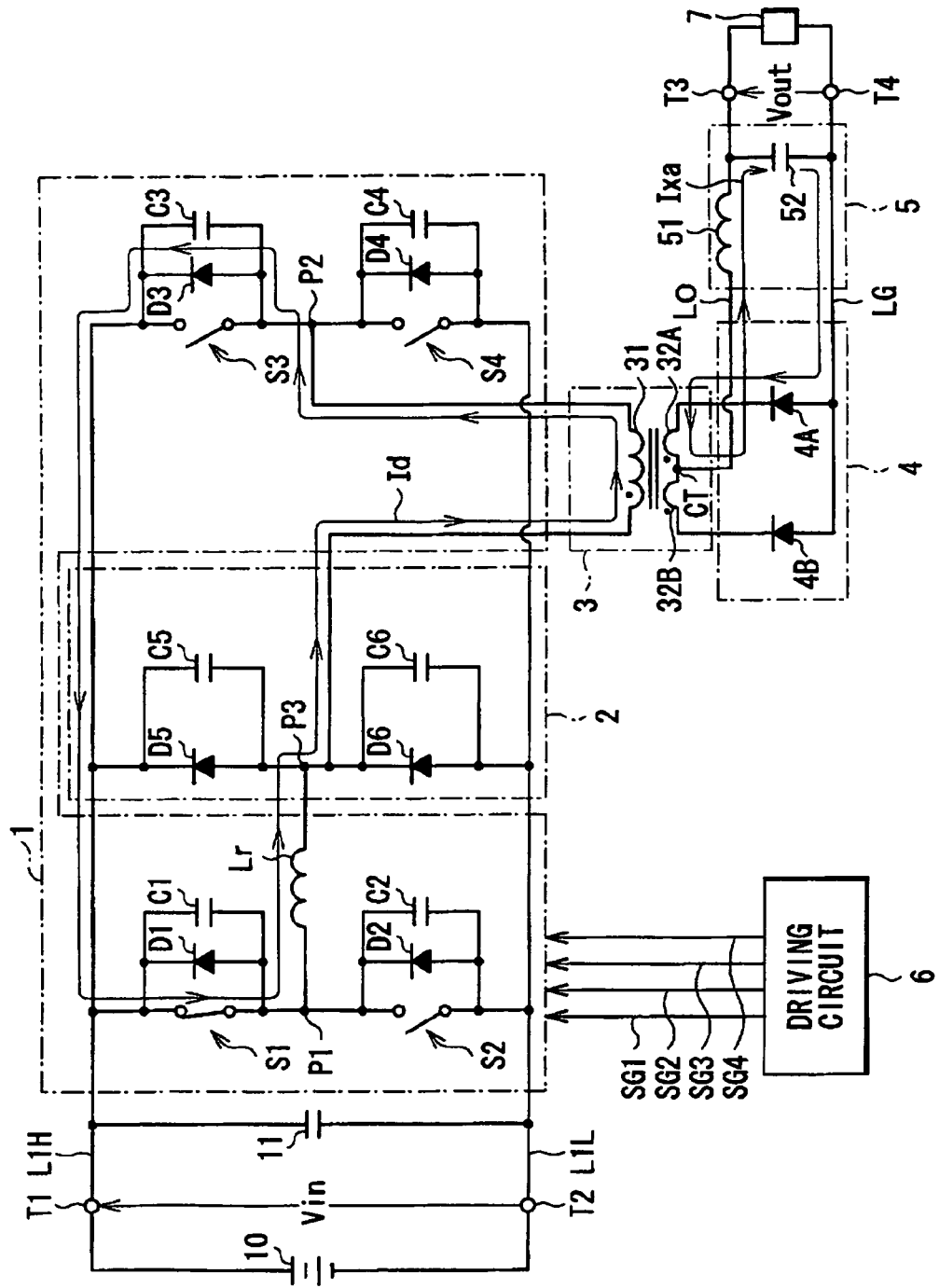
FIG. 5 is a circuit diagram illustrating operations of the switching power supply unit subsequent to FIG. 4.
Figure 6:
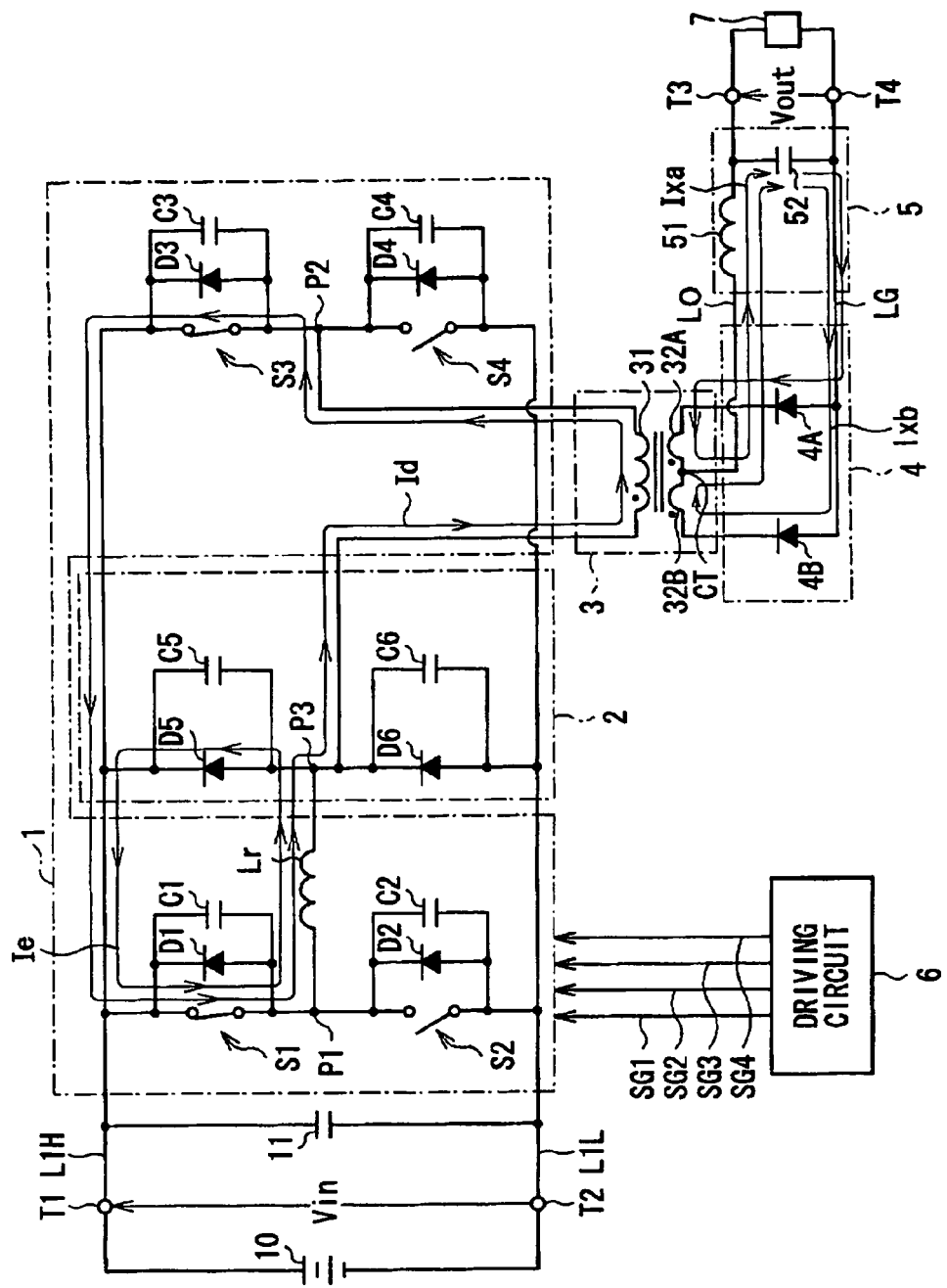
FIG. 6 is a circuit diagram illustrating operations of the switching power supply unit subsequent to FIG. 5.

When VP2 becomes Vin at the time t2 as shown in FIG. 5 ((F) in FIG. 2), the diode D3 becomes conductive. After VP2 becomes Vin and the diode D3 becomes conductive, as shown in FIG. 6, the switching element S3 is turned on at the time t3 ((C) in FIG. 2), thereby performing zero volt switching (ZVS) operation. As a result, a short-circuit loss in the switching element S3 is suppressed.

In the period from time t2 to time t4, energy accumulated in the inductor Lr by being excited in the period from time t0 to time t1 circulates as currents in circuits connected to both ends of the inductor Lr. Concretely, as shown in FIG. 6, loop currents Id and Ie flow so that the potential differences between one end (the connection point P3) of the inductor Lr and the other end (the primary high-voltage line L1H side) of the switching element S1 become equal to each other. In the path of the loop current Id, the potential difference is the sum of a voltage V31 across the primary winding 31 of the transformer 3 and a voltage VS3 across the switching element S3. When the turn ratio between the primary winding and the secondary winding of the transformer 3 is "n", V31 is equal to a value obtained by dividing a forward voltage drop in the diode 4A by the turn ratio "n". V31 is a forward voltage drop in the diode D3 when the switching element S3 is off (the period from time t2 to time t3). V31 is the product between the on resistance of the switching element S3 and flowing current when the switching element S3 is on (the period from time t3 to time t4). On the other hand, in the path of the loop current Ie, the potential difference is a forward voltage drop in the diode D5.

Although the values of the forward voltage drops in the diodes 4A, D3, and D5 change according to the value of the flowing forward current and the ambient temperature, the loop currents Id and Ie flow so that the potential differences become equal to each other. By the branch of the current to the two loop currents Id and Ie, the absolute value of the current I31 flowing in the primary winding 31 of the transformer 3 decreases ((K) in FIG. 2). The current I51 is branched to the loop current Ixa flowing in the diode 4A and the loop current Ixb flowing in the diode 4B so that the sum of the currents flowing in the secondary windings 32A and 32B of the transformer 3 becomes equal to the current I51 flowing in the chock coil 51.

Figure 7:
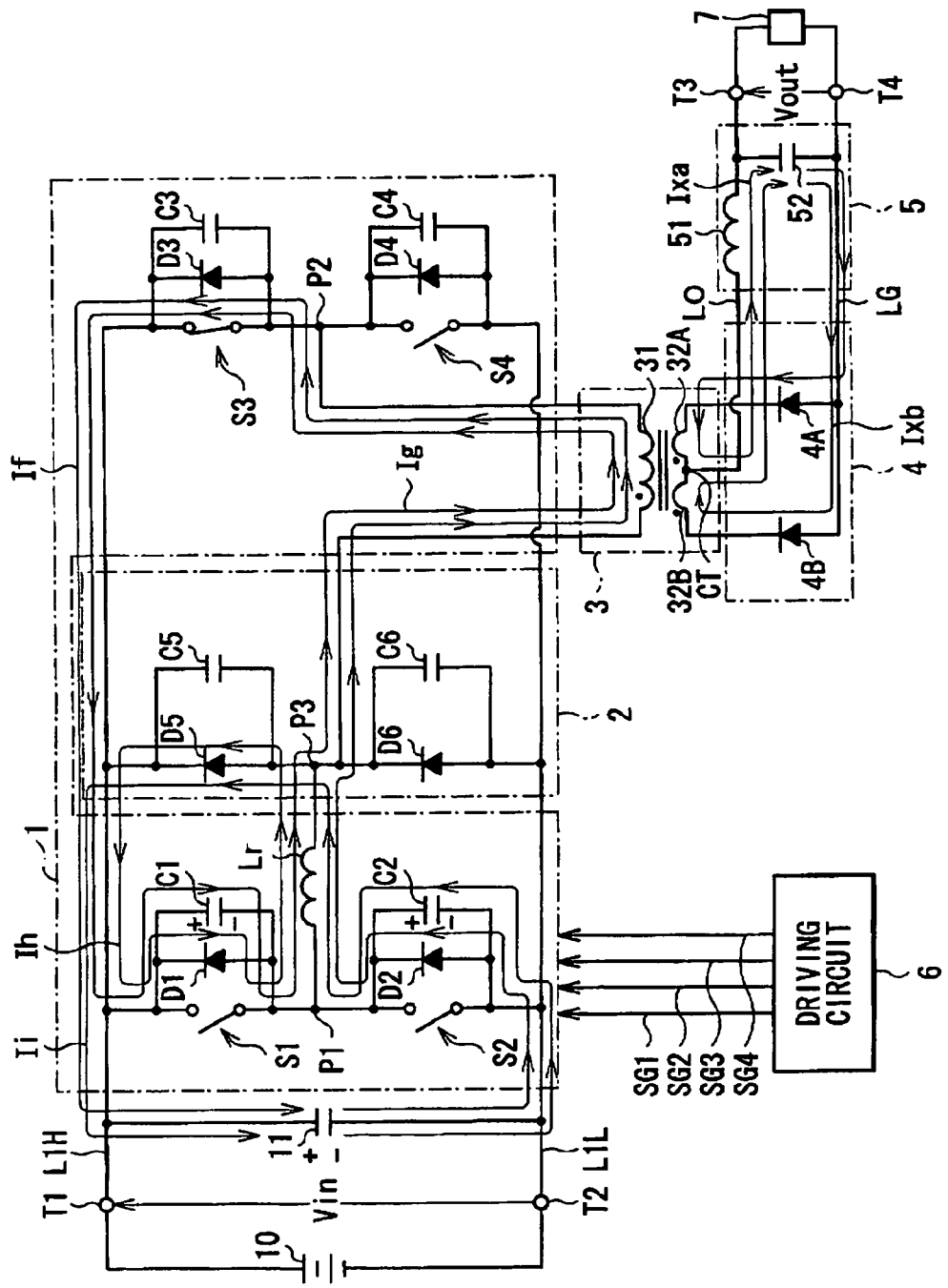
FIG. 7 is a circuit diagram illustrating operations of the switching power supply unit subsequent to FIG. 6.

Next, as shown in FIG. 7, at time t4, the switching element S1 is turned off ((A) in FIG. 2). It makes the capacitors C1 and C2 and the inductor Lr cooperate with one another to construct the LC series resonance circuit (second resonance circuit) and the second resonance operation is performed. Therefore, the loop currents If, Ig, Ih, and Ii as shown in FIG. 7 flow. The capacitor C2 is discharged and, on the other hand, the capacitor C1 is charged. Consequently, the potential VP1 at the connection point P1 gradually descends and becomes 0V (VP1=0V) at time t5 ((E) in FIG. 2).

Figure 8:
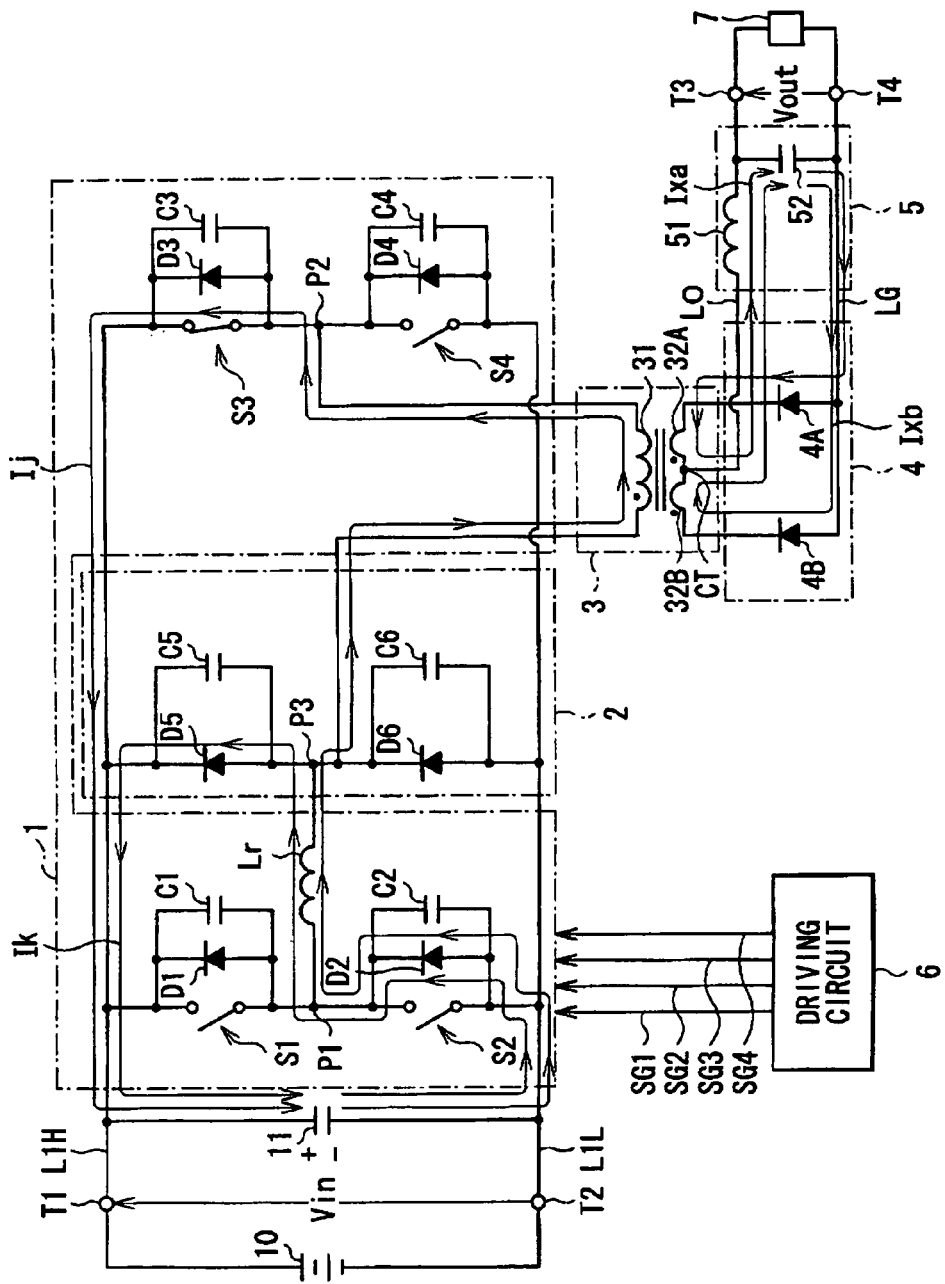
FIG. 8 is a circuit diagram illustrating operations of the switching power supply unit subsequent to FIG. 7.
Figure 9:
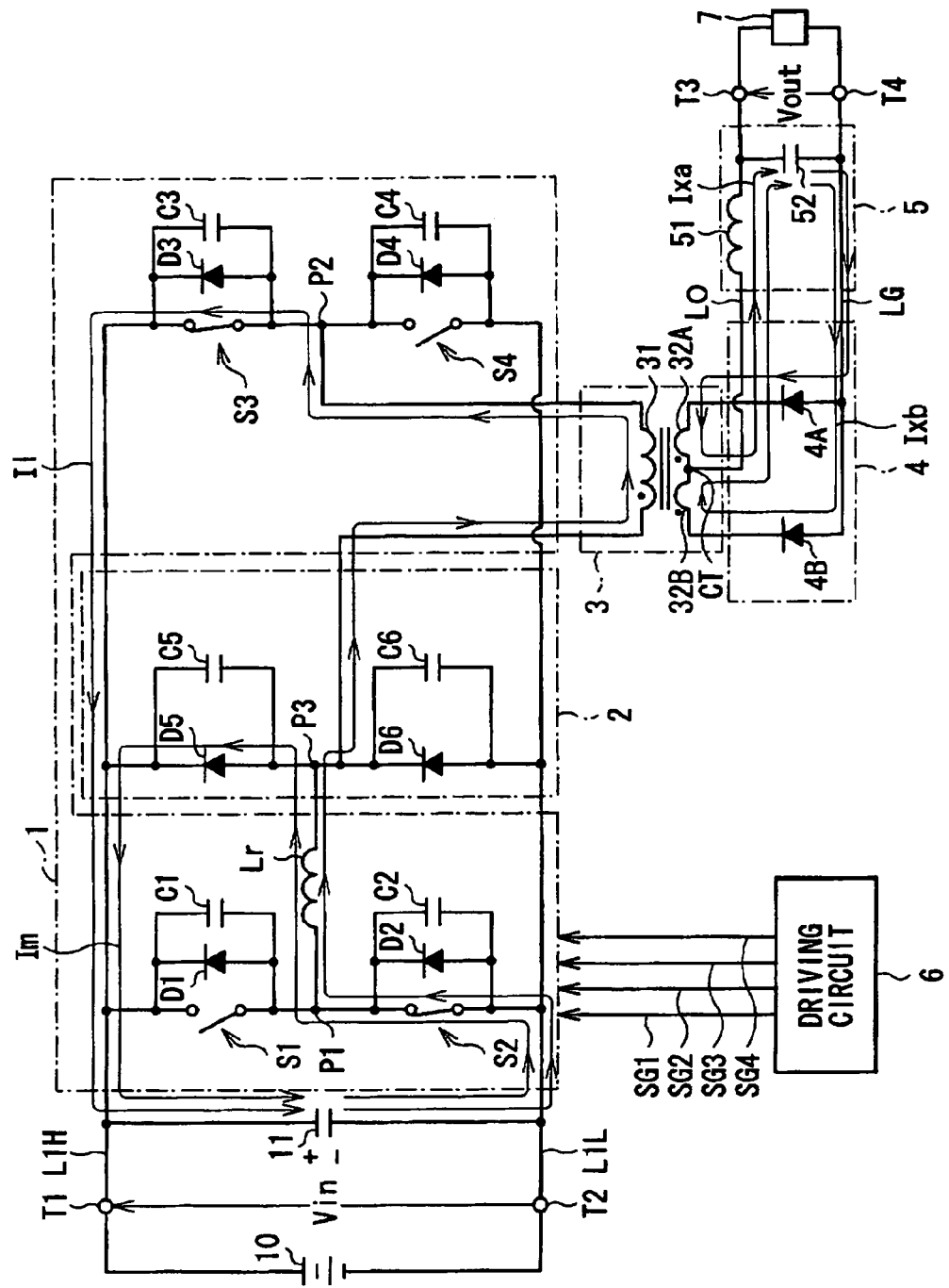
FIG. 9 is a circuit diagram illustrating operations of the switching power supply unit subsequent to FIG. 8.

As shown in FIG. 8, when VP1 becomes 0V at time t5 ((E) in FIG. 2), since VP3=Vin ((G) in FIG. 2) and $V_{P1-P3}$=−Vin ((H) in FIG. 2) at this time, the diode D2 becomes conductive. After VP1 becomes 0V and the diode D2 becomes conductive, as shown in FIG. 9, the switching element S2 is turned on at time t6 ((B) in FIG. 2) and the ZVS operation is performed. As a result, a short-circuit loss in the switching element S2 is suppressed.

In the period from time t6 to time t7 shown in FIG. 9, the energy accumulated in the inductor Lr is regenerated in the input smoothing capacitor 11 by the loop currents Im and I1 as shown in FIG. 9 after charging/discharging in the capacitors C1 and C2 is completed. As the energy is regenerated to the input smoothing capacitor 11, the energy accumulated in the inductor Lr decreases. In association with the decrease, the absolute value of the current Ir flowing in the inductor Lr and the absolute value of the current I31 flowing in the primary winding 31 of the transformer 3 also decrease ((J) and (K) in FIG. 2). Therefore, the current I51 is branched to the loop current Ixa flowing in the diode 4A and the loop current Ixb flowing in the diode 4B so that the ampere turns in the transformer 3 become equal to each other and the sum of currents flowing in the secondary windings 32A and 32B in the transformer 3 becomes equal to the current I51 flowing in the choke coil 51.

In the period, the loop currents Im and I1 flow so that the potential differences from one end (the connection point P3) of the inductor Lr to the cathode of the diode D5 become equal to each other. However, the potential difference in the path of the loop current Im becomes larger than that in the path of the loop current I1, and the diode D5 becomes nonconductive. It makes the absolute value of the current Ir flowing in the inductor Lr and that of the current I31 flowing in the primary winding 31 of the transformer 3 equal to each other ((J) and (K) in FIG. 2). As described above, the potential difference in the path of the loop current I1 is equal to the sum of the voltage V31 across the primary winding 31 of the transformer 3 and the voltage VS3 across the switching element S3. The voltage V31 is a voltage value obtained by dividing the forward voltage drop in the diode 4A by the turn ratio "n" between the primary winding and the secondary winding of the transformer 3. The voltage VS3 is equal to the product between the on resistance of the switching element S3 and the flowing current since the switching element S3 is in the on state in this period. The potential difference in the path of the loop current Im is the forward voltage drop in the diode D5.

Figure 10:
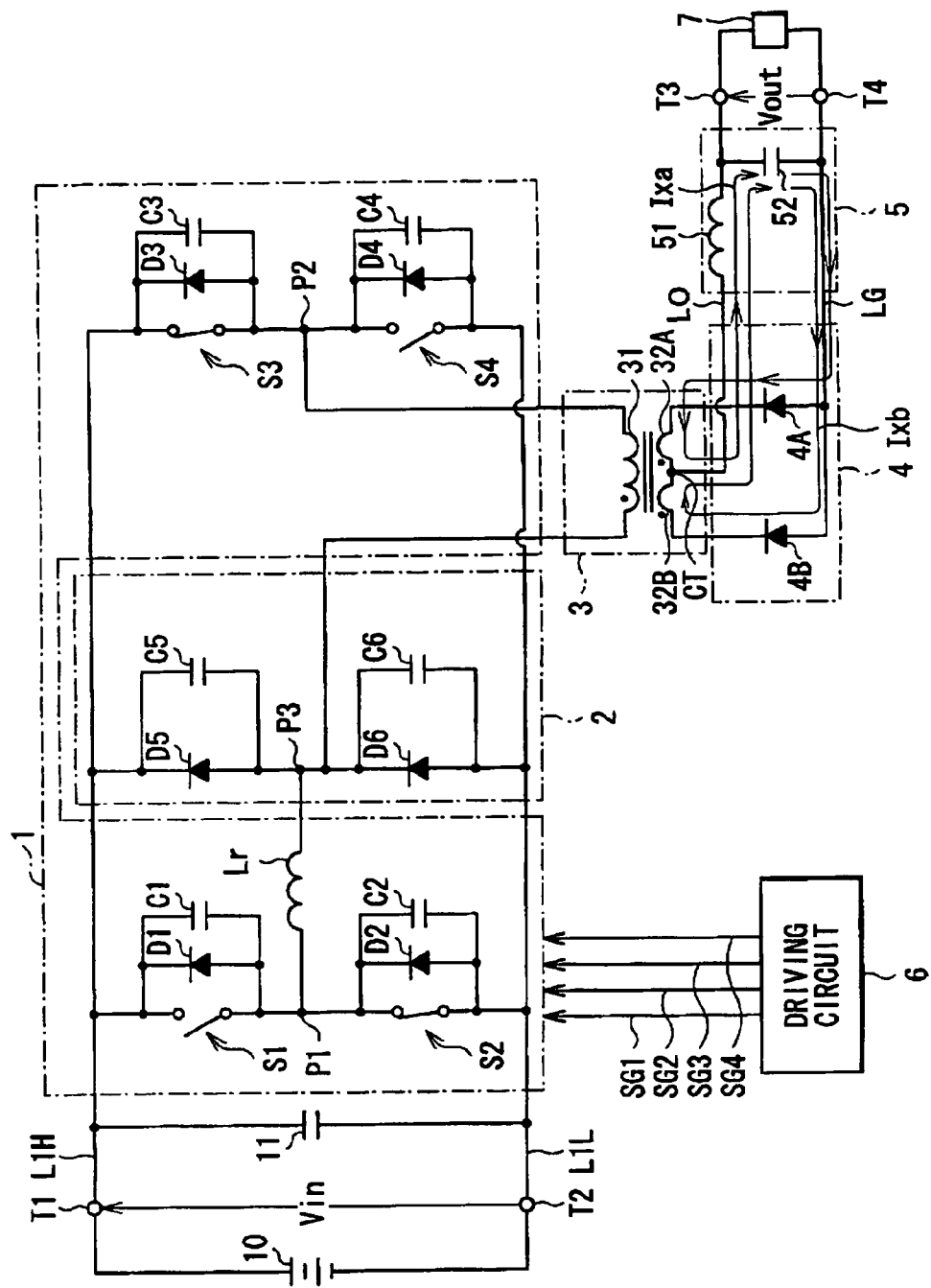
FIG. 10 is a circuit diagram illustrating operations of the switching power supply unit subsequent to FIG. 9.
Figure 11:
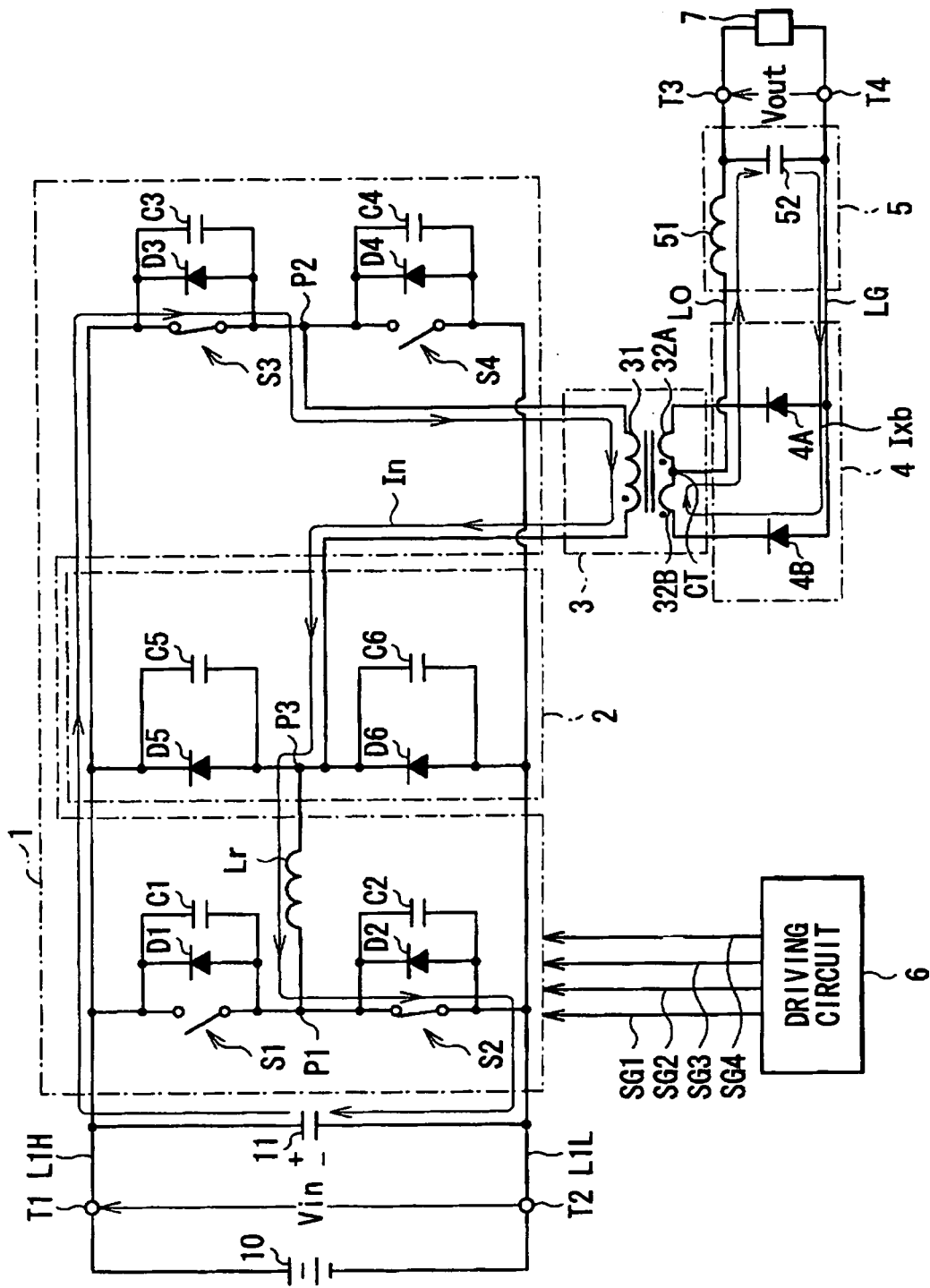
FIG. 11 is a circuit diagram illustrating operations of the switching power supply unit subsequent to FIG. 10.

As shown in FIG. 10, at time t7, all of the energy accumulated in the inductor Lr is regenerated. Each of the current Ir flowing in the inductor Lr and the current I31 flowing in the primary winding 31 of the transformer 3 is equal to 0 A ((J) and (K) in FIG. 2). The current I4A flowing in the diode 4A is equal to the current I4B flowing in the diode 4B ((O) and (Q) in FIG. 2). From the time t7, the inductor Lr accumulates energy in the direction opposite to the accumulation direction until then. The loop current In in the opposite direction flows in the inductor Lr and the primary winding 31 of the transformer 3 as shown in FIG. 11, and the current Ir increases at the rate of Vin/L (L: inductance of the inductor Lr) ((J) and (K) in FIG. 2). Consequently, the current I51 is branched to the loop current Ixa flowing in the diode 4A and the loop current Ixb flowing in the diode 4B so that the ampere turns in the transformer 3 become equal to each other and the sum of currents flowing in the secondary windings 32A and 32B in the transformer 3 becomes equal to the current I51 flowing in the choke coil 51. The current I4A flowing in the diode 4A gradually decreases and, on the other hand, the current I4B flowing in the diode 4B gradually increases ((O) and (Q) in FIG. 2). When the current I4A becomes equal to 0 A and the current flowing in the secondary winding 32B in the transformer 3 becomes equal to the current I51 flowing in the chock coil 51, since the ampere turns in the transformer 3 do not increase any more, increase in the current I31 is disturbed. However, the capacitors C5 and C6 in the surge voltage suppressing circuit 2 and the inductor Lr cooperate one another to construct the LC series resonance circuit (first resonance circuit), and first resonance operation starts. This timing corresponds to time t8.

Figure 12:
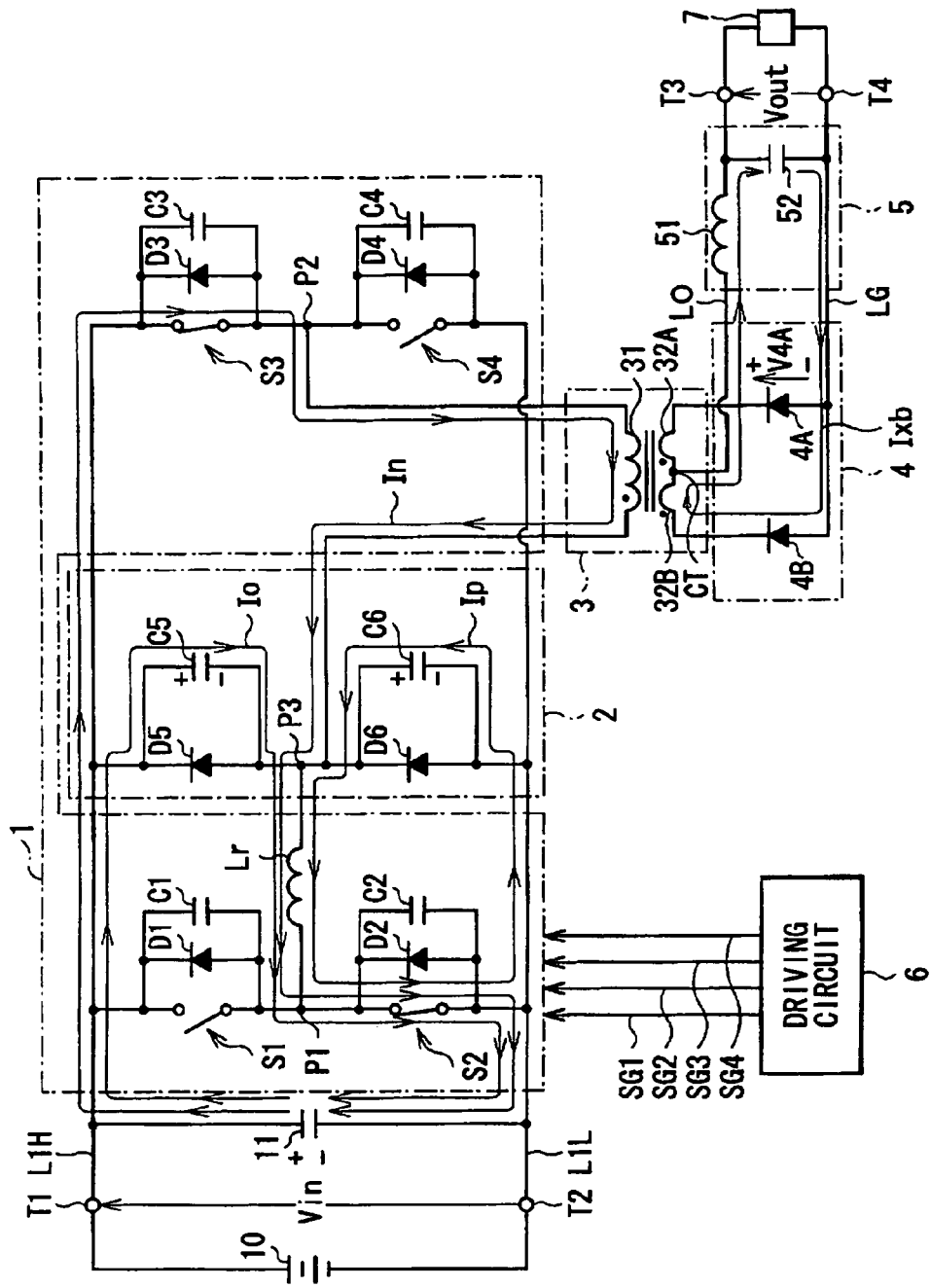
FIG. 12 is a circuit diagram illustrating operations of the switching power supply unit subsequent to FIG. 11.

In the period from time t8 to time t9 shown in FIG. 12, the loop currents Io and Ip flow by the first resonance operation. Therefore, the capacitor C6 is discharged and, on the other had, the capacitor C5 is charged. In association with the first resonance operation, the potential VP3 at the connection point P3 decreases gently ((G) in FIG. 2). Accordingly, the absolute value of the voltage V31 across the primary winding 31 of the transformer 3 increases, and the voltages V32A and V32B are generated in the secondary windings 32A and 32B, respectively. The relations are satisfied such that V32A=V32B=V31/n (n: turn ratio between the primary winding and the secondary winding of the transformer 3), "the potential of the cathode in the diode 4B"<"the potential at the center tap CT"<"the potential of the cathode in the diode 4A", "the current Ir flowing in the inductor Lr"="the current I31 flowing in the primary winding 31 in the transformer 3"+"the current I5 flowing in the parallel connection part between the diode D5 and the capacitor C5"+"the current I6 flowing in the parallel connection part between the diode D6 and the capacitor C6". The timing when VP3 decreases gently and becomes 0V and $V_{P3\_P2}$=−Vin ((G) and (I) in FIG. 2) corresponds to time t9.

In the switching power supply unit of the embodiment, in the period from time t8 to time t9, resonance time of the first resonance circuit and the recovery time of the diodes 4A and 4B are set so as to satisfy the conditional expression (1), so that generation of the recovery current in the diodes 4A and 4B is suppressed. Therefore, the first resonance operation performed by the capacitors C5 and C6 and the inductor Lr is to be continued. However, since VP3 is equal to 0V ((G) in FIG. 2), the voltage across the capacitor C6 and the diode D6 becomes 0V. The current IC6 flowing in the capacitor C6 becomes 0V and the diode D6 is made conductive.

Figure 13:
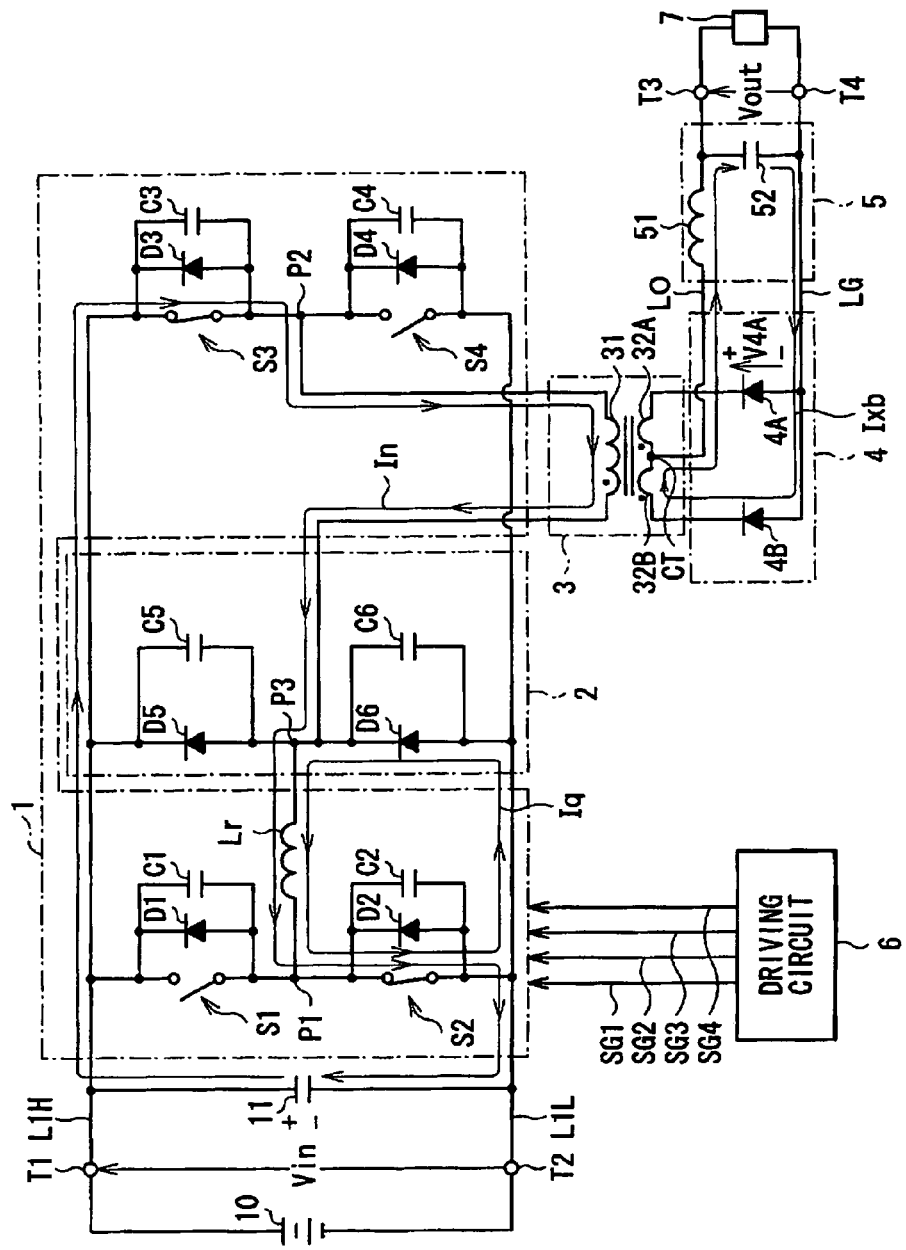
FIG. 13 is a circuit diagram illustrating operations of the switching power supply unit subsequent to FIG. 12.
Figure 14:
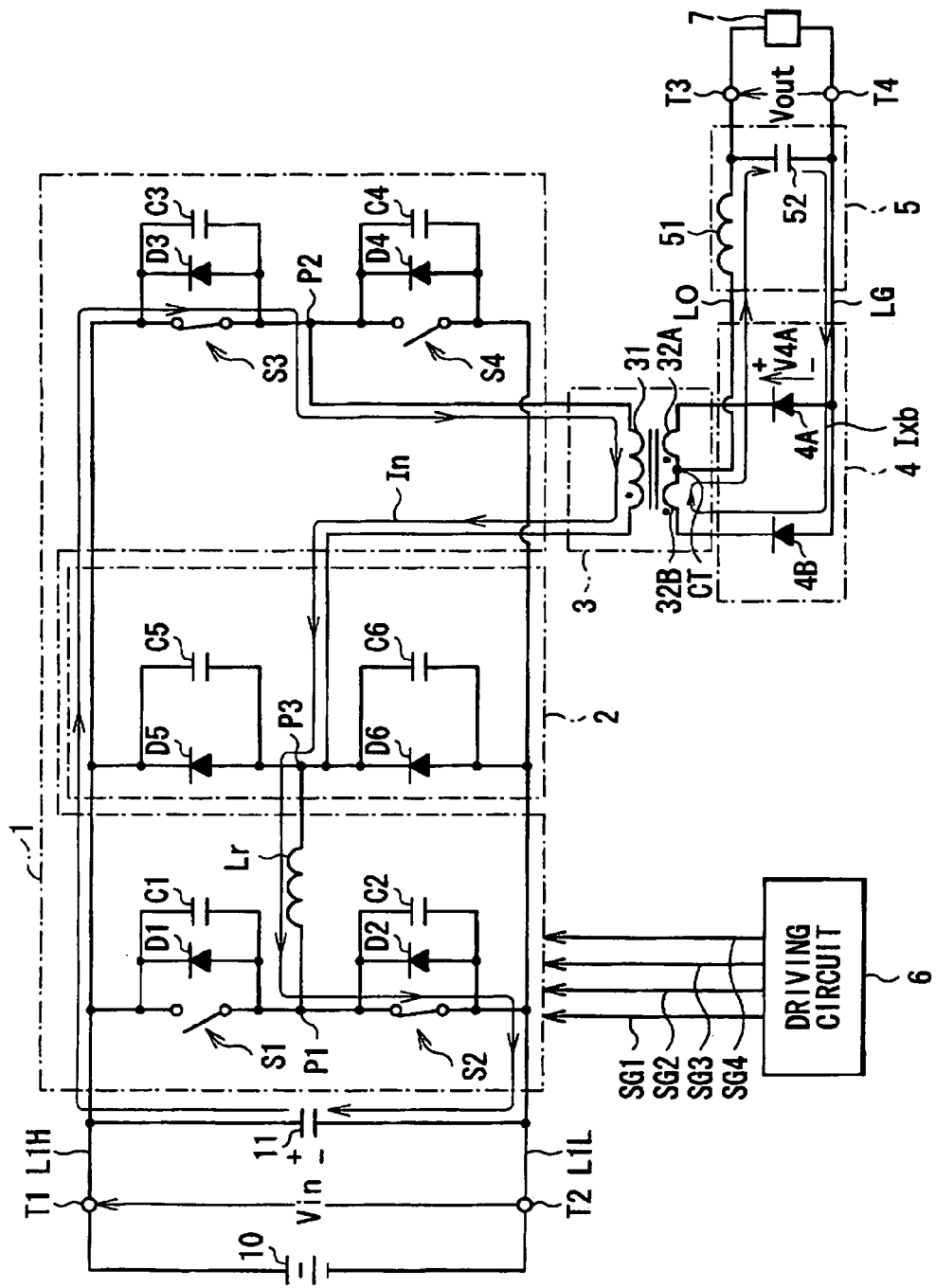
FIG. 14 is a circuit diagram illustrating operations of the switching power supply unit subsequent to FIG. 13.

In the period from time t9 to time t10 shown in FIG. 13, the diode D6 is conductive and the switching element S3 is in the on state ((C) in FIG. 2). Consequently, the voltage V31 across the primary winding 31 of the transformer 3 (and the absolute value of $VP_{3\_P2}$ ((I) in FIG. 2) is clamped at Vin so that the voltage V32B across the secondary winding 32B of the transformer 3 is clamped at Vin/n (n: the turn ratio between the primary winding and the secondary winding of the transformer 3). Since the rectifier circuit 4 is of the center tap type, the reverse voltage V4A applied to the diode 4A does not exceed 2×Vin/n ((N) in FIG. 2). In other words, the reverse voltage V4A applied to the diode 4A is 2×Vin/n at the maximum, so that rise in the surge voltage is suppressed.

In the period from time t9 to time t10, the diode D6 is conductive as described above, so that "the current Ir flowing in the inductor"="the current I31 flowing in the primary winding 31 of the transformer 3"+"the current ID6 flowing in the diode D6". The resonance current generated by the first resonance operation is expressed by the loop current Iq as shown in FIG. 13 while Ir becomes constant ((J) in FIG. 2). As the choke coil 51 is excited by the voltage V32B across the secondary winding 32B of the transformer 3, the current I51 flowing in the chock coil 51 increases. Since I31="the current I32A flowing in the secondary winding 32A"+"the current I32B flowing in the secondary winding 32B"=I32B=I51, I31 also increases ((K) in FIG. 2). Further, since "Ir=I31+ID6" and Ir is constant, as I31 increases, ID6 decreases. The timing when the relation of ID6=I6=0V is satisfied ((M) in FIG. 2) corresponds to time t10 shown in FIG. 14. The operations in the first half cycle have been described above.

Referring now to FIG. 15, operations in a half cycle (times t10 to t20 (t0)) after the times t0 to t10 shown in FIG. 2 will be described.

The operations in the half cycle are basically similar to those in the half cycle described with reference to FIGS. 2 to 14. Specifically, in the period from time t10 to time t11, the switching elements S2 and S3 are in the on state ((B) and (C) in FIG. 15), and the switching elements S1 and S4 are in the off state ((A) and (D) in FIG. 15). The potential VP1 at the connection point P1 is equal to 0V ((E) in FIG. 15), the potential VP2 at the connection point P2 is equal to Vin ((F) in FIG. 15), and the inductance of the inductor Lr is much smaller than that of the primary winding 31 of the transformer 3. Thus, the potential VP3 at the connection point P3 becomes almost 0V ((G) in FIG. 15), and the potential difference $V_{P3\_P2}$ between the connection points P3 and P2 when VP2 is used as a reference is almost equal to 0V ((I) in FIG. 15). Therefore, the loop current flows in the bridge circuit 1, the inductor Lr is excited, and power is transmitted from the primary side to the secondary side in the transformer 3. Thus, the loop current flows to the secondary side of the transformer 3 via the diode 4B and the choke coil 51, and the load 7 is driven. In the period, the forward voltage is applied to the diode 4B, and the reverse voltage V4B is equal to 0V ((P) in FIG. 15). On the other hand, the reverse voltage V4A is applied to the diode 4A ((N) in FIG. 15).

In the period from time t11 to time t12, the switching element S3 is turned off at the time t11 ((C) in FIG. 15). The capacitors C3 and C4 and the inductor Lr cooperate one another to construct the LC series resonance circuit (second resonance circuit), and the second resonance operation is performed. Therefore, by the two loop currents, the capacitor C3 is charged and, on the other hand, the capacitor C4 is discharged. Thus, the potential VP2 at the connection point P2 gradually decreases and becomes equal to 0V (VP2=0V) at the time t12 ((F) in FIG. 15). At this time, the reverse voltage V4A of the diodes 4A decreases gradually and becomes 0V at the time t12 ((N) in FIG. 15).

When VP2 becomes 0V at the time t12 ((F) in FIG. 15), the diode D4 is made conductive. When VP2 becomes 0V, the diode D4 is made conductive and, after that, the switching element S4 is turned on at the time t13 ((D) in FIG. 15), the ZVS operation is performed. As a result, a short-circuit loss in the switching element S4 is suppressed.

In the period from time t12 to time t14, as described above, energy accumulated in the inductor Lr by being excited in the period from time t10 to time t11 circulates as currents in the circuits connected to both ends of the inductor Lr, and the current is branched to two loop currents. Consequently, the absolute value of the current I31 flowing in the primary winding 31 in the transformer 3 decreases ((K) in FIG. 15). The current I51 flowing in the choke coil 51 is branched to the loop current Ixa flowing in the diode 4A and the loop current Ixb flowing in the diode 4B so that the ampere turns in the transformer 3 become equal to each other and the sum of the currents flowing in the secondary windings 32A and 32B in the transformer 3 becomes equal to the current I51.

At the time t14, the switching element S2 is turned off ((B) in FIG. 15). The LC series resonance circuit (second resonance circuit) is constructed by cooperation of the capacitors C1 and C2 and the inductor Lr, and second resonance operation is performed. Therefore, four loop currents flow, the capacitor C2 is charged and, on the other hand, the capacitor C1 is discharged. Consequently, the potential VP1 at the connection point P1 gradually increases and becomes equal to Vin at the time t15 ((E) in FIG. 15).

When VP1 becomes equal to Vin at the time t15 ((E) in FIG. 15), since VP3=0V ((G) in FIG. 15) and $V_{P1-P3}$=Vin ((H) in FIG. 15), the diode D1 is made conductive. When VP1 becomes equal to Vin, the diode D1 is made conductive and, after that, the switching element S1 is turned on at the time t16 ((A) in FIG. 15), the ZVS operation is performed. As a result, a short-circuit loss in the switching element S1 is suppressed.

In the period from time t16 to time t17, the energy accumulated in the inductor Lr is regenerated in the input smoothing capacitor 11 by the two loop currents also after charging/discharging in the capacitors C1 and C2 is completed. As the energy is regenerated to the input smoothing capacitor 11, the energy accumulated in the inductor Lr decreases. In association with the decrease, the absolute value of the current Ir flowing in the inductor Lr and the absolute value of the current I31 flowing in the primary winding 31 of the transformer 3 also decrease ((J) and (K) in FIG. 15). Therefore, the current I51 is branched to the loop current Ixa flowing in the diode 4A and the loop current Ixb flowing in the diode 4B so that the ampere turns in the transformer 3 become equal to each other and the sum of currents flowing in the secondary windings 32A and 32B in the transformer 3 becomes equal to the current I51 flowing in the choke coil 51. In this period, since the diode D6 is nonconductive, the absolute value of the current Ir flowing in the inductor Lr and that of the current I31 flowing in the primary winding 31 in the transformer 3 become equal to each other ((J) and (K) in FIG. 15).

At time t17, all of the energy accumulated in the inductor Lr is regenerated. Each of the current Ir flowing in the inductor Lr and the current I31 flowing in the primary winding 31 of the transformer 3 is equal to 0 A ((J) and (K) in FIG. 15). The current I4A flowing in the diode 4A is equal to the current I4B flowing in the diode 4B ((O) and (Q) in FIG. 15). From the time t17, the inductor Lr accumulates energy in the direction opposite to the accumulation direction until then. The loop current In in the opposite direction flows in the inductor Lr and the primary winding 31 of the transformer 3, and the current Ir increases at the rate of Vin/L (L: inductance of the inductor Lr) ((J) and (K) in FIG. 15). Consequently, the current I51 flowing in the choke coil 51 is branched to the loop current Ixa flowing in the diode 4A and the loop current Ixb flowing in the diode 4B so that the ampere turns in the transformer 3 become equal to each other and the sum of currents flowing in the secondary windings 32A and 32B in the transformer 3 becomes equal to the current I51 flowing in the choke coil 51. The current I4B flowing in the diode 4B gradually decreases and, on the other hand, the current I4A flowing in the diode 4A gradually increases ((O) and (Q) in FIG. 15). When the current I4B becomes equal to 0 A and the current flowing in the secondary winding 32A in the transformer 3 becomes equal to the current I51 flowing in the chock coil 51, since the ampere turns in the transformer 3 do not increase any more, increase in the current I31 is disturbed. However, the capacitors C5 and C6 in the surge voltage suppressing circuit 2 and the inductor Lr cooperate one another to construct the LC series resonance circuit (first resonance circuit), and first resonance operation starts. This timing corresponds to time t18.

In the period from time t18 to time t19, the two loop currents flow by the first resonance operation, the capacitor C6 is charged and, on the other had, the capacitor C5 is discharged. In association with the first resonance operation, the potential VP3 at the connection point P3 increases gently ((G) in FIG. 15). Accordingly, the voltage V31 across the primary winding 31 of the transformer 3 increases, and the voltages V32A and V32B are generated in the secondary windings 32A and 32B, respectively. The timing when VP3 increasing gently becomes Vin and $V_{P3-P2}$ becomes equal to Vin ((G) and (I) in FIG. 15) corresponds to time t19.

In the switching power supply unit of the embodiment, in the period from time t18 to time t19, resonance time of the first resonance circuit and the recovery time of the diodes 4A and 4B are set so as to satisfy the conditional expression (1), so that generation of the recovery current in the diodes 4A and 4B is suppressed. Therefore, the first resonance operation performed by the capacitors C5 and C6 and the inductor Lr is to be continued. However, since VP3 is equal to Vin ((G) in FIG. 15), the voltage across the capacitor C5 and the diode D5 becomes 0V. The current IC5 flowing in the capacitor C5 becomes 0 A and the diode D5 is made conductive.

In the period from time t19 to time t20, therefore, the diode D5 is conductive and the switching element S4 is in the on state ((D) in FIG. 15). Consequently, the voltage V31 across the primary winding 31 of the transformer 3 (and the absolute value of $V_{P3-P2}$ ((I) in FIG. 15)) is clamped at Vin so that the voltage V32A across the secondary winding 32A of the transformer 3 is clamped at Vin/n (n: the turn ratio between the primary winding and the secondary winding of the transformer 3). Since the rectifier circuit 4 is of the center tap type, the reverse voltage V4B applied to the diode 4B does not exceed 2×Vin/n ((P) in FIG. 15). In other words, the reverse voltage V4B applied to the diode 4B is 2×Vin/n at the maximum, so that rise in the surge voltage is suppressed.

In the period from time t19 to time t20, the diode D5 is conductive as described above, so that Ir is constant ((J) in FIG. 15). As the choke coil 51 is excited by the voltage V32A across the secondary winding 32A of the transformer 3, the current I51 flowing in the chock coil 51 increases and I31 also increases ((K) in FIG. 15). Since Ir is equal to I31+ID5 and Ir is constant, as I31 increases, ID5 decreases. The timing when the relation of ID5=I5=0V is satisfied ((L) in FIG. 15) corresponds to time t20. The operations in the latter half cycle have been described above and a state equivalent to that at the time t0 in FIG. 2 is obtained.

Next, by referring to FIGS. 16A to 16C to FIG. 18, the waveform of a surge voltage applied to the diodes in the switching power supply unit of the embodiment and the waveform of a surge voltage applied to diodes in conventional switching power supply units (comparative examples 1 and 2) will be described while comparing them.

Figure 16A:
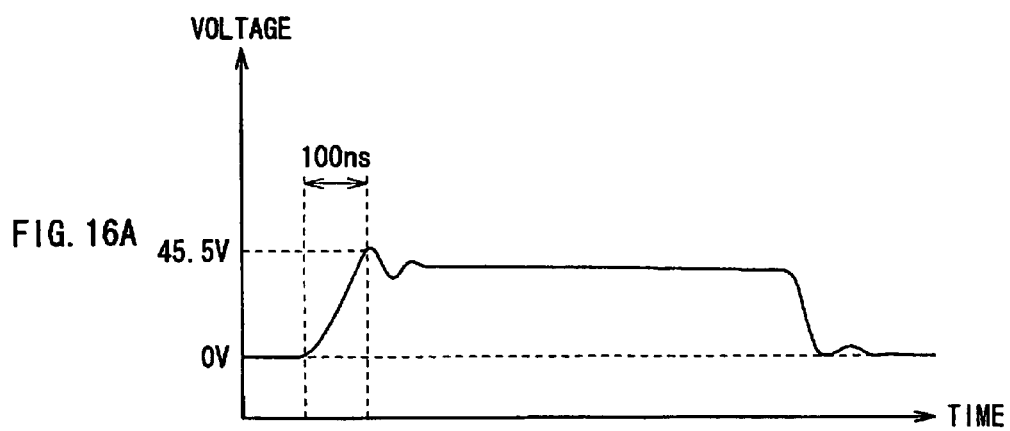
FIGS. 16A, 16B, and 16C are timing waveform charts for comparing operations of switching power supply units of FIG. 1 and comparative examples 1 and 2.
Figure 16B:
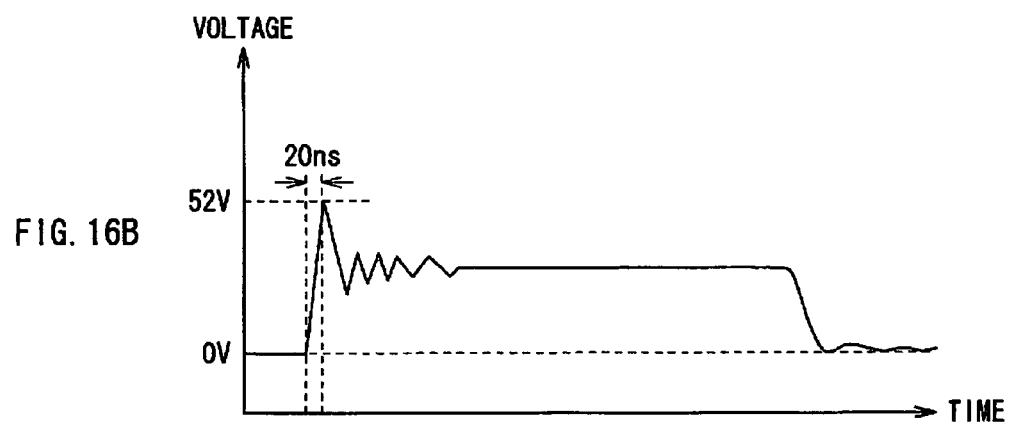
Figure 16C:
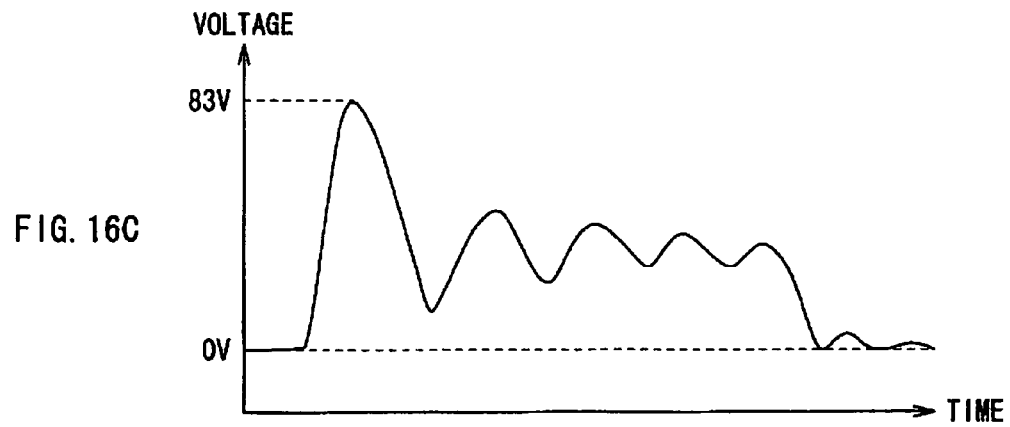
Figure 17:
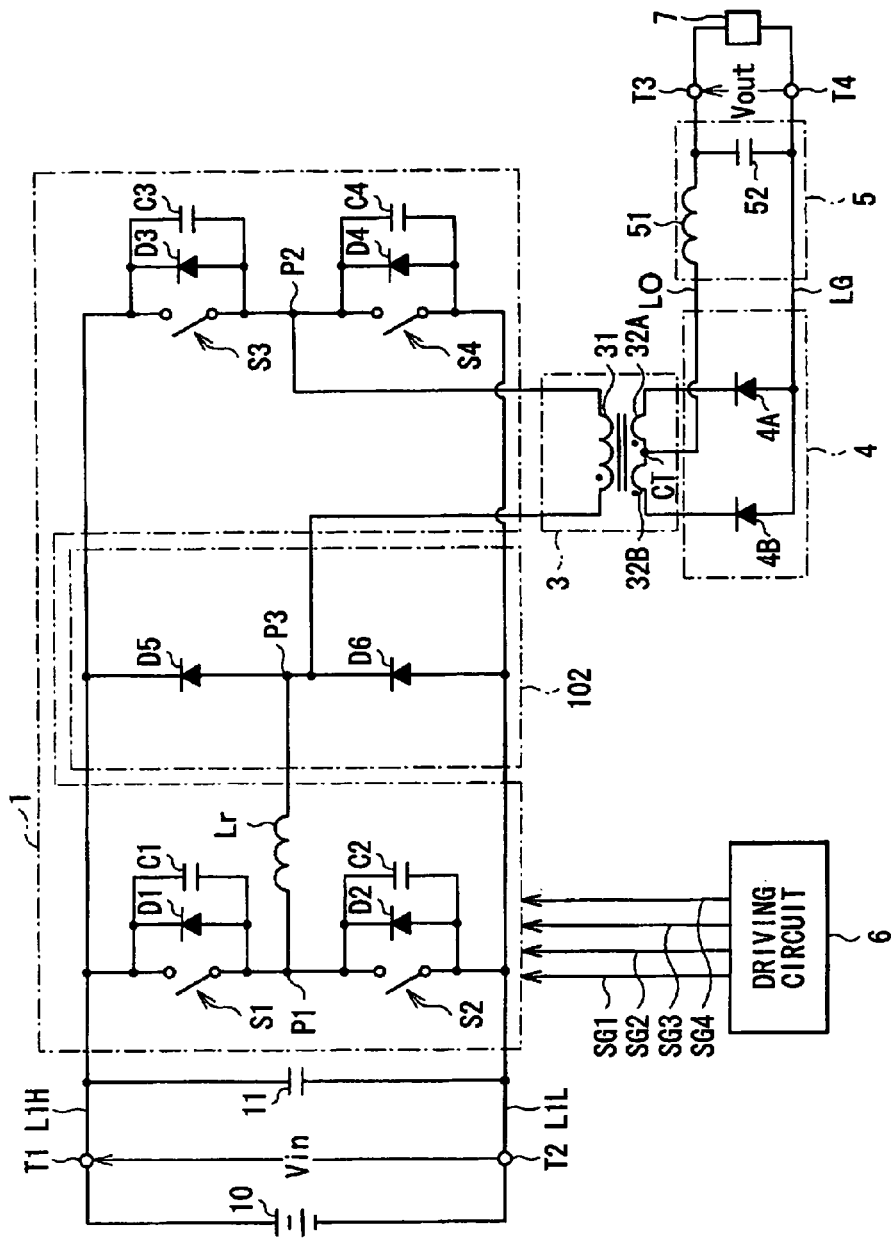
FIG. 17 is a circuit diagram showing the configuration of a switching power supply unit according to comparative example 1.
Figure 18:
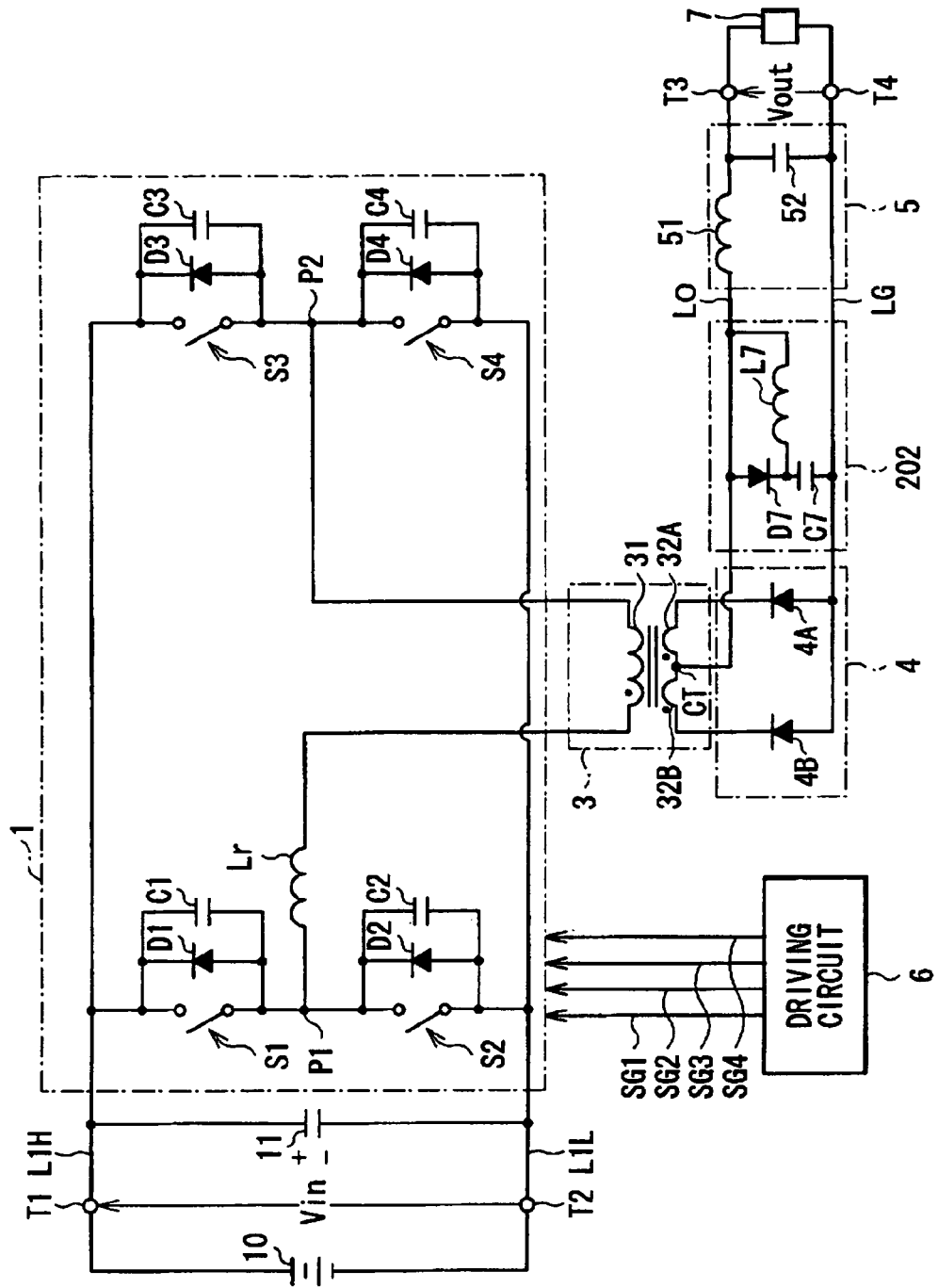
FIG. 18 is a circuit diagram showing the configuration of a switching power supply unit according to comparative example 2.

FIGS. 16A to 16C show timing waveforms of reverse voltages applied to the diodes in the switching power supply units of the embodiment and the comparative examples 1 and 2. FIGS. 17 and 18 show the configurations of the switching power supply units of the comparative examples 1 and 2, respectively. Concretely, in the comparative example 1, in place of the surge voltage suppressing circuit 2 of the embodiment, a surge voltage suppressing circuit 102 obtained by eliminating the capacitors C5 and C6 from the surge voltage suppressing circuit 2 is provided. In the comparative example 2, a snubber circuit 202 for suppressing surge voltage constructed by an inductor L7, a capacitor C7, and a diode D7 is provided on the secondary side of the transformer 3 in place of the surge voltage suppressing circuit 2. In the snubber circuit 202, concretely, one end of the inductor L7 is connected between the choke coil 51 and the center tap CT on the output line LO, and the other end is connected to the cathode of the diode D7 and one end of the capacitor C7. The anode of the diode D7 is connected between the choke coil 51 and the center tap CT on the output line LO, and the other end of the capacitor C5 is connected to the ground line LG. The reverse voltage waveforms shown in FIGS. 16A to 16C are voltage waveforms at the center tap CT on the secondary side of the transformer 3, and a reverse voltage actually applied to the diodes 4A and 4B is a value twice as large as that shown in FIGS. 16A to 16C.

In the reverse voltage waveform in the comparative example 2 shown in FIG. 16C, the maximum value (peak value) of the surge voltage is 83V. This is a result of suppressing the surge voltage to some extent by the snubber circuit 202 and corresponds to about twice (2.02 times) as large as the DC input voltage Vin/n (n: the turn ratio between the primary winding and the secondary winding of the transformer 3). On the other hand, in the reverse voltage waveform in the comparative example 1 shown in FIG. 16B, the maximum value of the surge voltage is 52V and corresponds to 1.26 times as large as Vin/n. In the reverse voltage waveform of the comparative example 1, the rise time to the maximum value is about 20 ns. It is understood that the reverse voltage rises abruptly due to the configuration that no capacitor is included in the surge voltage suppressing circuit 102.

In contrast, in the reverse voltage waveform of the embodiment shown in FIG. 16A, since the capacitors C5 and C6 are included in the surge voltage suppressing circuit 2 and the resonance time of the first resonance circuit constructed by the capacitors C5 and C6 and the inductor Lr and the recovery time of the diodes 4A and 4B are set so as to satisfy the conditional expression (1), as described above, it is understood that generation of the recovery currents in the diodes 4A and 4B is suppressed and the reverse voltage rises gently by the resonance operation of the first resonance circuit. Concretely, the maximum value of the surge voltage is 45.5V and corresponds to about the same (1.08 times) as Vin/n, and the rise time to the maximum value is about 100 ns. It is understood that the rise of the reverse voltage is gentler than that in the comparative examples 1 and 2 shown in FIGS. 16B and 16C and, as a result, rise of the surge voltage is suppressed more effectively.

As described above, in the embodiment, the first resonance circuit is constructed by the capacitors C5 and C6 in the surge voltage suppressing circuit 2 and the inductor Lr and the resonance time of the first resonance circuit and the recovery time of the diodes 4A and 4B in the rectifier circuit 4 are set so as to satisfy the conditional expression (1). Consequently, rise of the reverse voltage applied to the diodes 4A and 4B can be made gentler than that in the conventional technique. Without depending on the configuration, the rise of the surge voltage can be suppressed more effectively. Concretely, for example, in the case where the rectifier circuit 4 has the center tap configuration as in the embodiment, the maximum value (peak value) of the surge voltage can be suppressed to 2×Vin/n (n: turn ratio between the primary winding and the secondary winding of the transformer 3). As compared with the conventional case where the maximum value is about 4×Vin/n, the maximum value can be suppressed more.

By enabling the surge voltage to be suppressed, a loss in the rectifier element is reduced and the efficiency of the unit can be improved. In addition, by reducing a loss in the rectifier element, heat generation in the element can be also suppressed.

By suppressing rise in the surge voltage, a low-withstand-voltage rectifier element (diode) can be used, and the parts cost can be reduced.

Further, since the surge voltage can be suppressed without depending on the unit configuration, the flexibility in the unit designing can be improved.

It is preferable to set the resonance time of the first resonance circuit and the recovery time Trr2 of the diodes D5 and D6 in the surge voltage suppressing circuit 2 so as to satisfy not only the conditional expression (1) described in the embodiment but also the following conditional expression (2). With the configuration, the reverse voltage applied to the diodes D5 and D6 in addition to the diodes 4A and 4B reaches the input voltage gently in accordance with resonance in a quarter of the resonance time. During the period, recover is finished gently, so that rise in the surge voltage in the diodes D5 and D6 is also suppressed. Therefore, occurrence of ringing by the reverse voltage applied to the diodes D5 and D6 can be suppressed so that occurrence of noise can be also suppressed.

$$\tfrac{1}{4} \times \{2\pi \times (L \times C)^{1/2}\} > \mathrm{Trr2} \quad (2)$$

Figure 19:
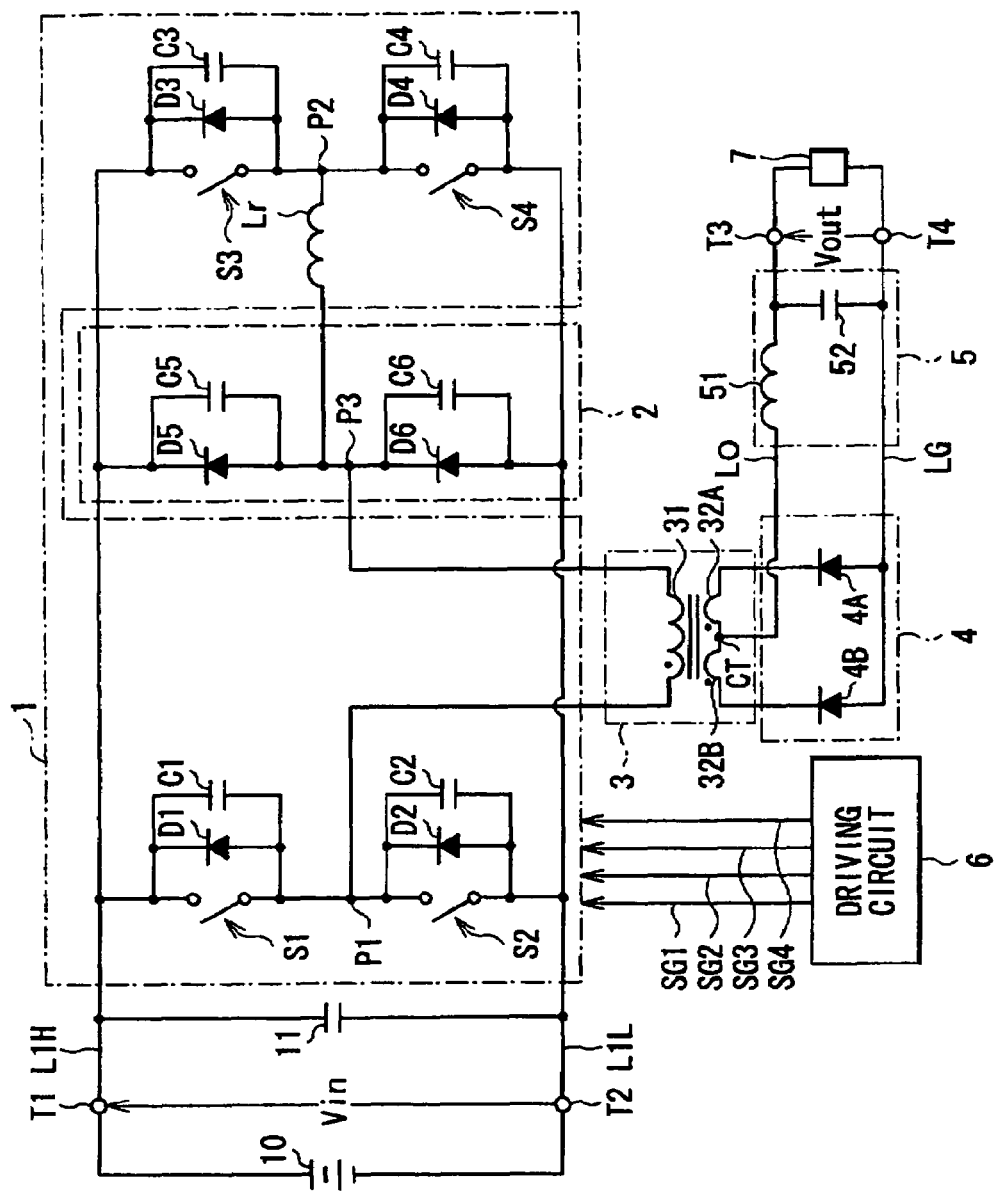
FIG. 19 is a circuit diagram showing the configuration of a switching power supply unit according to a modification of the embodiment.

For example, as shown in FIG. 19, the inductor Lr, the transformer 3, and the circuits (the rectifier circuit 4 and the smoothing circuit 5) on the secondary side of the transformer 3 in the switching power supply unit (FIG. 2) of the embodiment can change their sides with respect to the surge voltage suppressing circuit 2 as a center. To be concrete, the inductor Lr may be disposed between the connection points P2 and P3, and the transformer 3 may be disposed between the connection points P1 and P3. Also in the case of the configuration, effects similar to those of the embodiment can be obtained.

Figure 20:
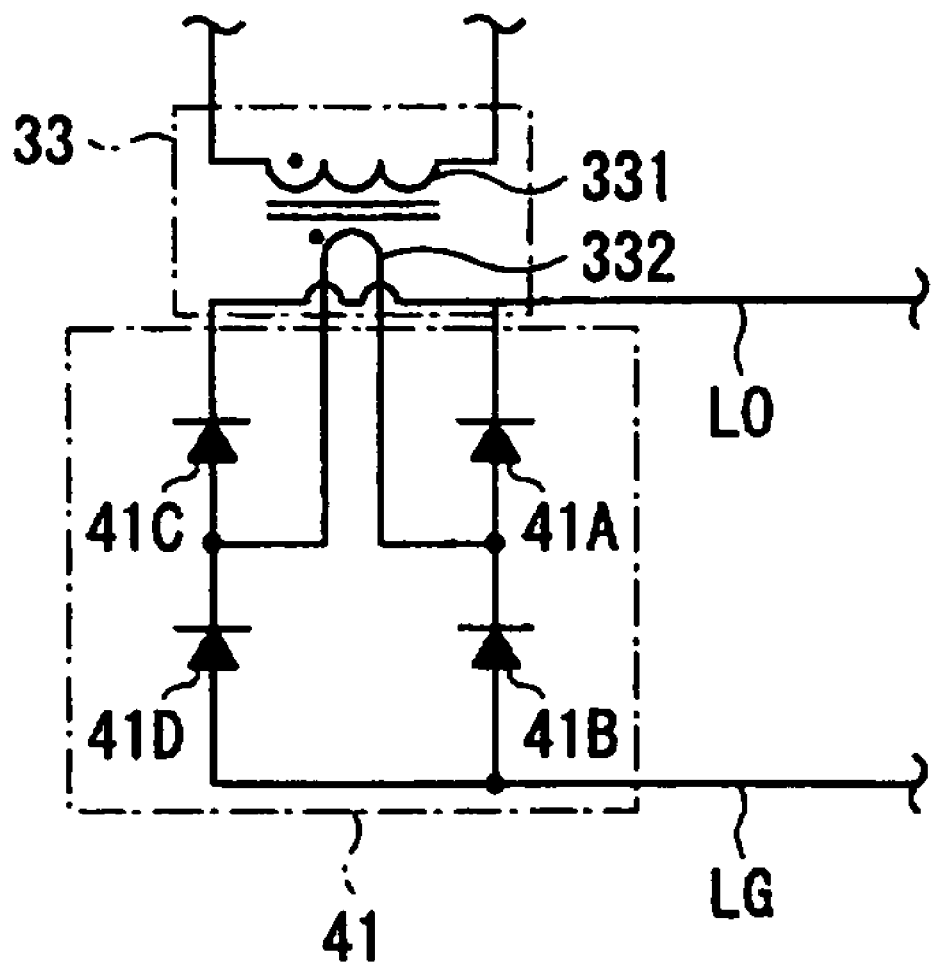
FIG. 20 is a circuit diagram showing the configuration of a rectifier circuit according to the modification of the first embodiment.

For example, as shown in FIG. 20, the rectifier circuit 4 of the center tap type may be replaced with a rectifier circuit 41 of the full bridge type. To be concrete, a transformer 33 having a primary winding 331 and a secondary winding 332 is provided in placed of the transformer 3 in FIG. 1, and the rectifier circuit 41 of the full bridge type including four diodes 41A to 41D is provided on the secondary side of the transformer 33. With the configuration, by the action similar to that of the embodiment, the maximum value (peak value) of the surge voltage applied to the diodes 41A to 41D can be suppressed to 1×Vin/n (n: turn ratio between the primary winding and the secondary winding of the transformer 3), which is lower than that in the conventional full-bridge type in which the maximum value is about 2×Vin/n. Like the diodes 4A and 4B, the diodes 41A to 41D can be also constructed by parasitic diodes of MOS-FETs.

Figure 21:
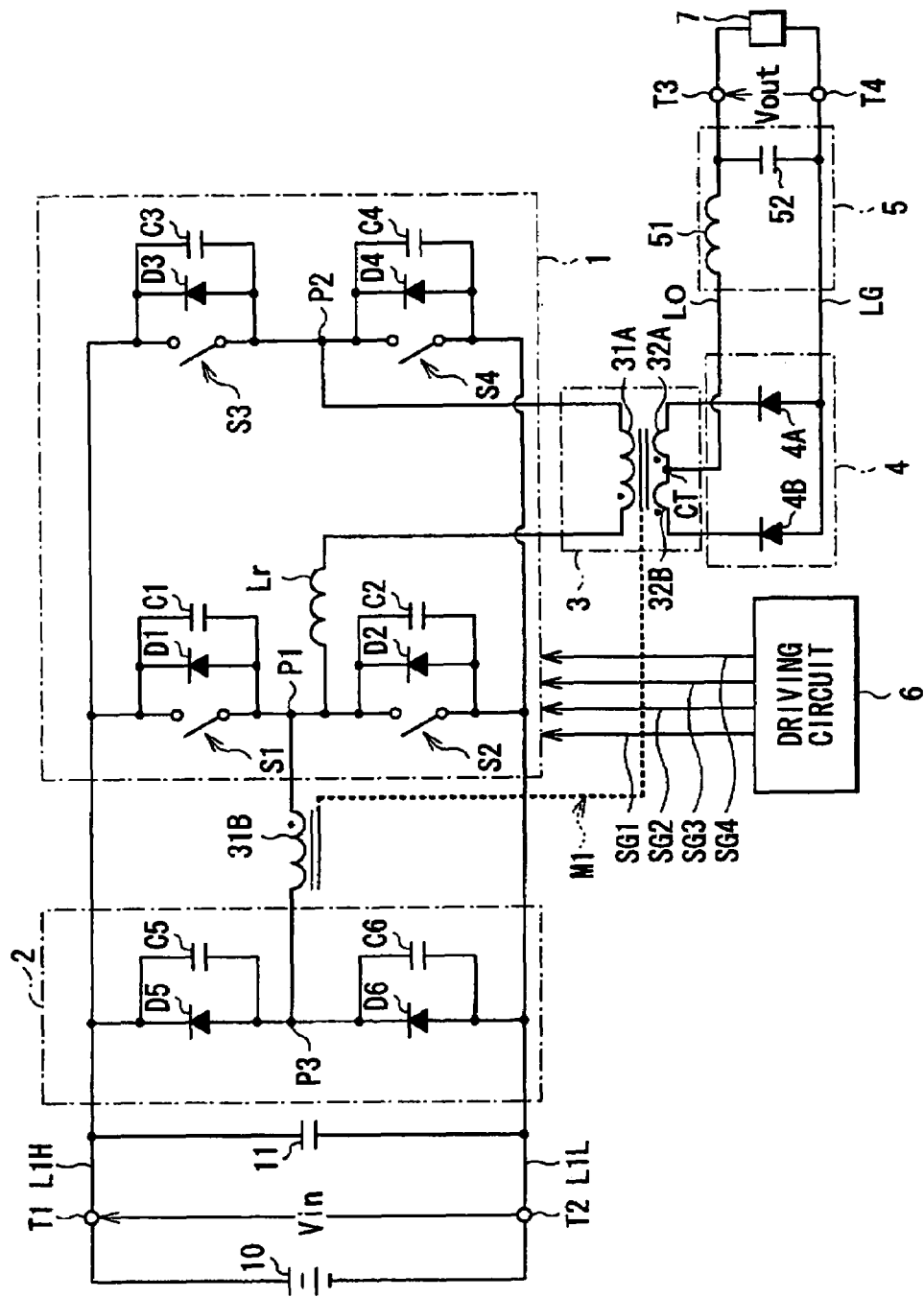
FIG. 21 is a circuit diagram showing the configuration of a switching power supply unit according to another modification of the first embodiment.
Figure 22:
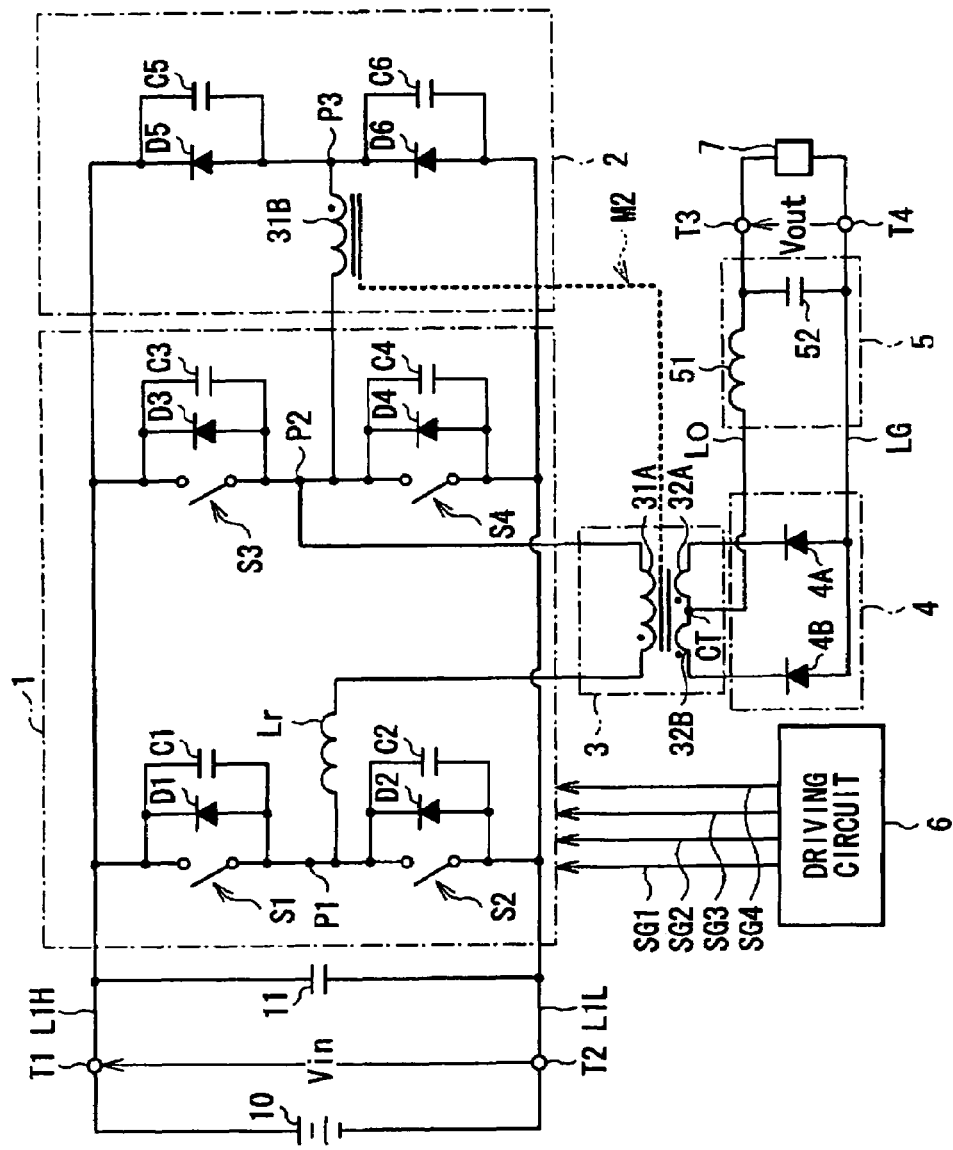
FIG. 22 is a circuit diagram showing the configuration of a switching power supply unit according to another modification of the first embodiment.

In the embodiment, the case where the transformer 3 and the inductor Lr are provided magnetically independently of each other has been described. It is also possible to provide, for example, as shown in FIGS. 21 and 22, an auxiliary winding 31B of the transformer 3 on the primary side of the transformer 3. The auxiliary winding 31B and the transformer 3 are magnetically coupled to each other (they share a magnetic flux (magnetic path)) as shown by reference numerals M1 and M2 in the diagram. To be concrete, the inductor Lr is disposed between the connection points P1 and P2, and the auxiliary winding 31B of the transformer 3 is connected between the connection points P1 and P3 or between the connection points P1 and P2. Since each of the above-described configurations shown in FIGS. 21 and 22 is equivalent to the configuration shown in FIG. 1 or 19, effects similar to those of the embodiment can be obtained.

Figure 23:
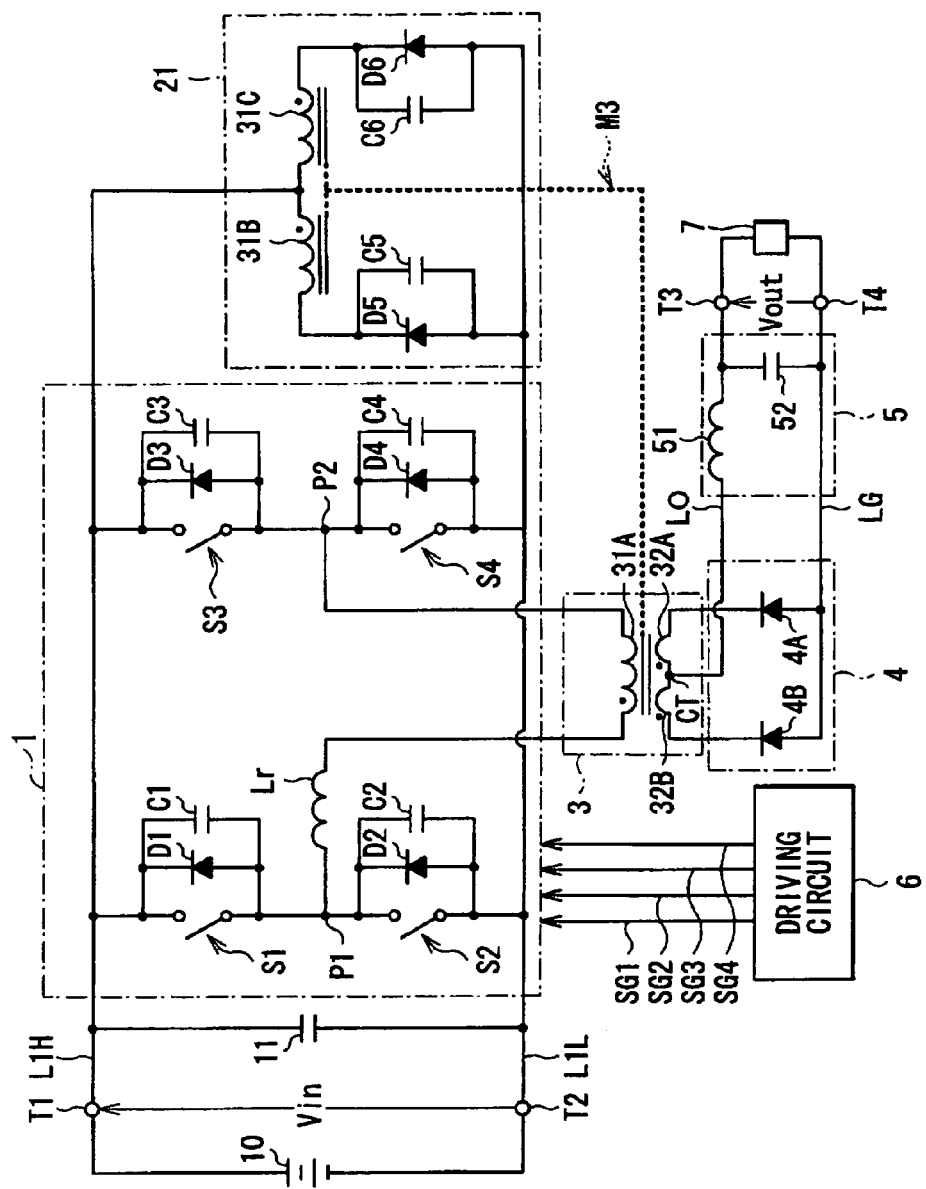
FIG. 23 is a circuit diagram showing the configuration of a switching power supply unit according to another modification of the first embodiment.
Figure 24:
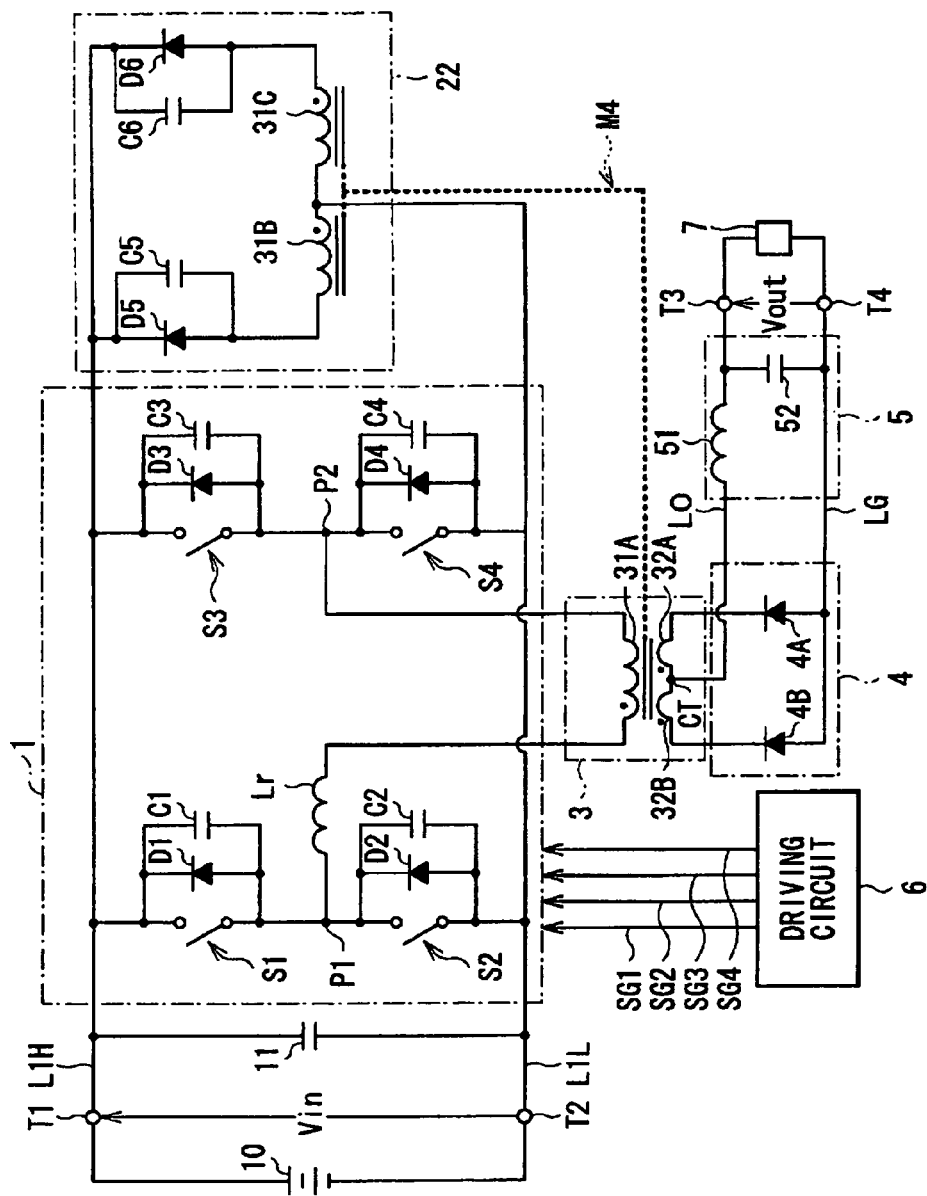
FIG. 24 is a circuit diagram showing the configuration of a switching power supply unit according to another modification of the first embodiment.

In the case where the transformer 3 and the auxiliary winding 31B are magnetically coupled to each other, for example, as shown in FIGS. 23 and 24, surge voltage suppressing circuits 21 and 22 may be provided in place of the surge voltage suppressing circuit 2. To be concrete, a device set of the diode D5 and the capacitor C5 and a device set of the diode D6 and the capacitor C6 may be connected in parallel with each other between the primary high-voltage line L1H and the primary low-voltage line L1L, and the auxiliary winding 31B and an auxiliary winding 31C of the transformer 3 may have a configuration of the center tap type (the auxiliary windings 31B and 31C are magnetically coupled to the transformer 3 as shown by the reference numerals M3 and M4 in the diagrams). Also in the case of the configuration, effects similar to those of the embodiment can be obtained. Although the examples where the auxiliary windings 31B and 31C are magnetically coupled to the transformer 3 are shown in FIGS. 21 to 24, in addition, the auxiliary windings 31B and 31C may be magnetically coupled to the inductor Lr for resonance. This case is similarly effective.

Figure 25:
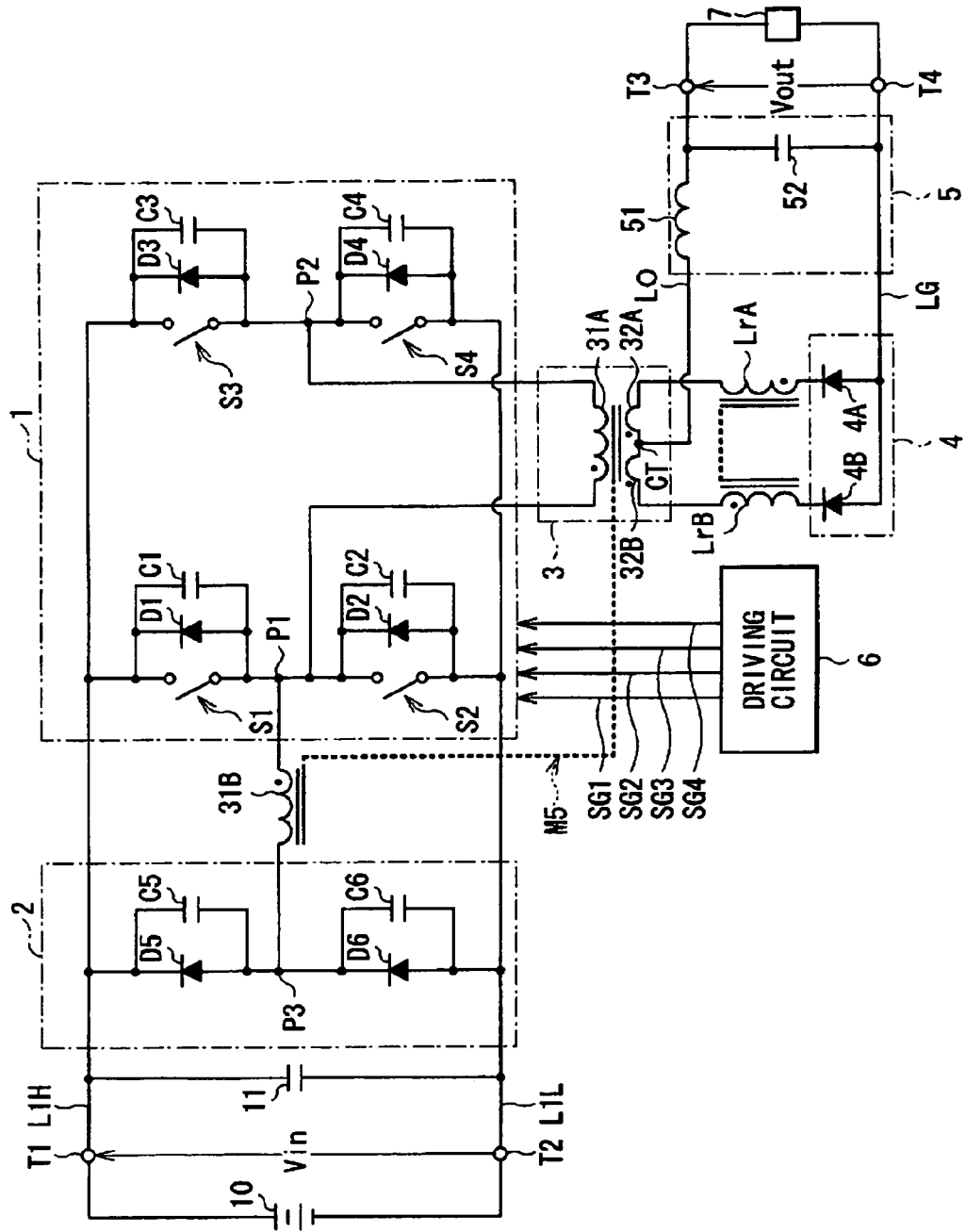
FIG. 25 is a circuit diagram showing the configuration of a switching power supply unit according to another modification of the first embodiment.
Figure 26:
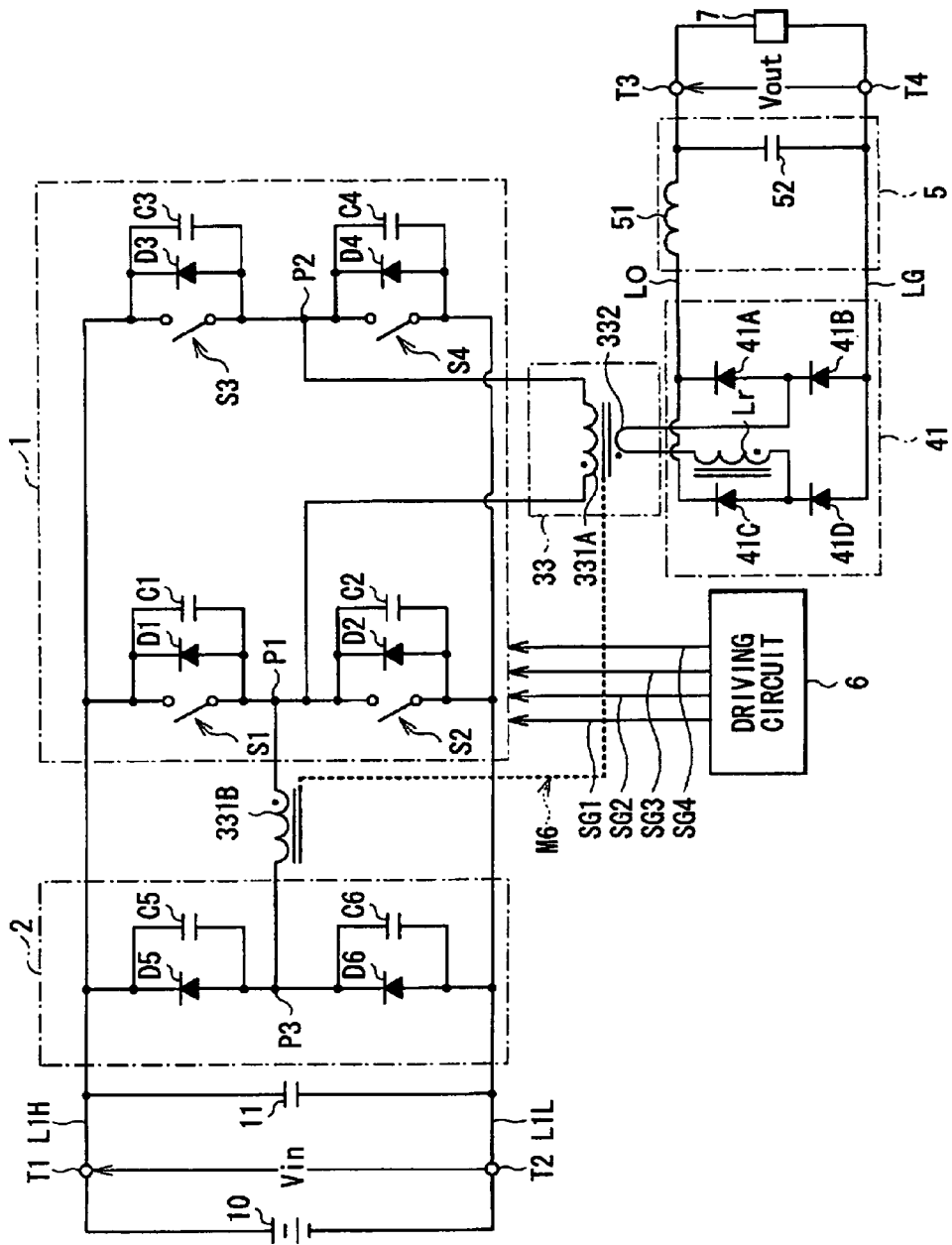
FIG. 26 is a circuit diagram showing the configuration of a switching power supply unit according to another modification of the first embodiment.
Figure 27:
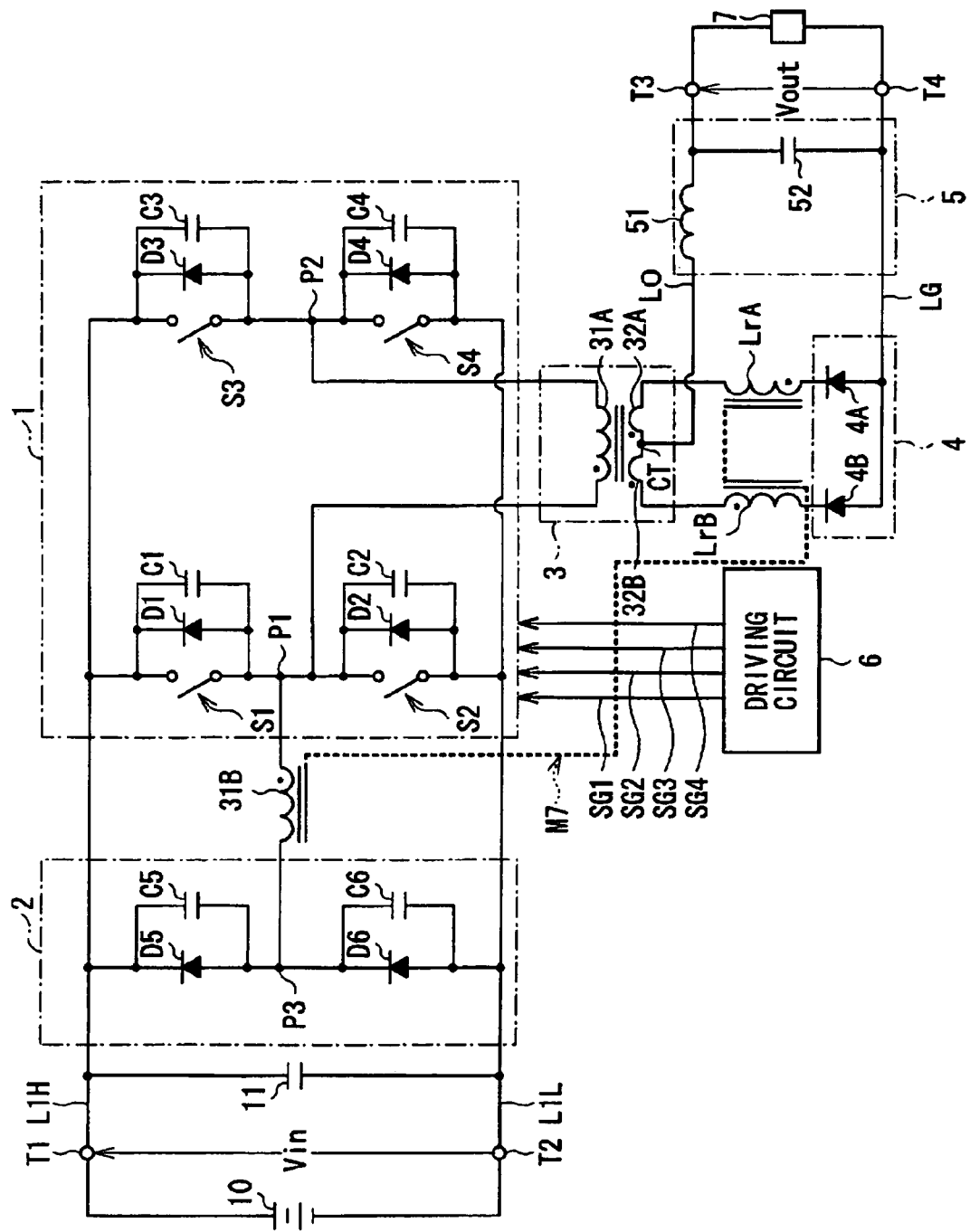
FIG. 27 is a circuit diagram showing the configuration of a switching power supply unit according to another modification of the first embodiment.
Figure 28:
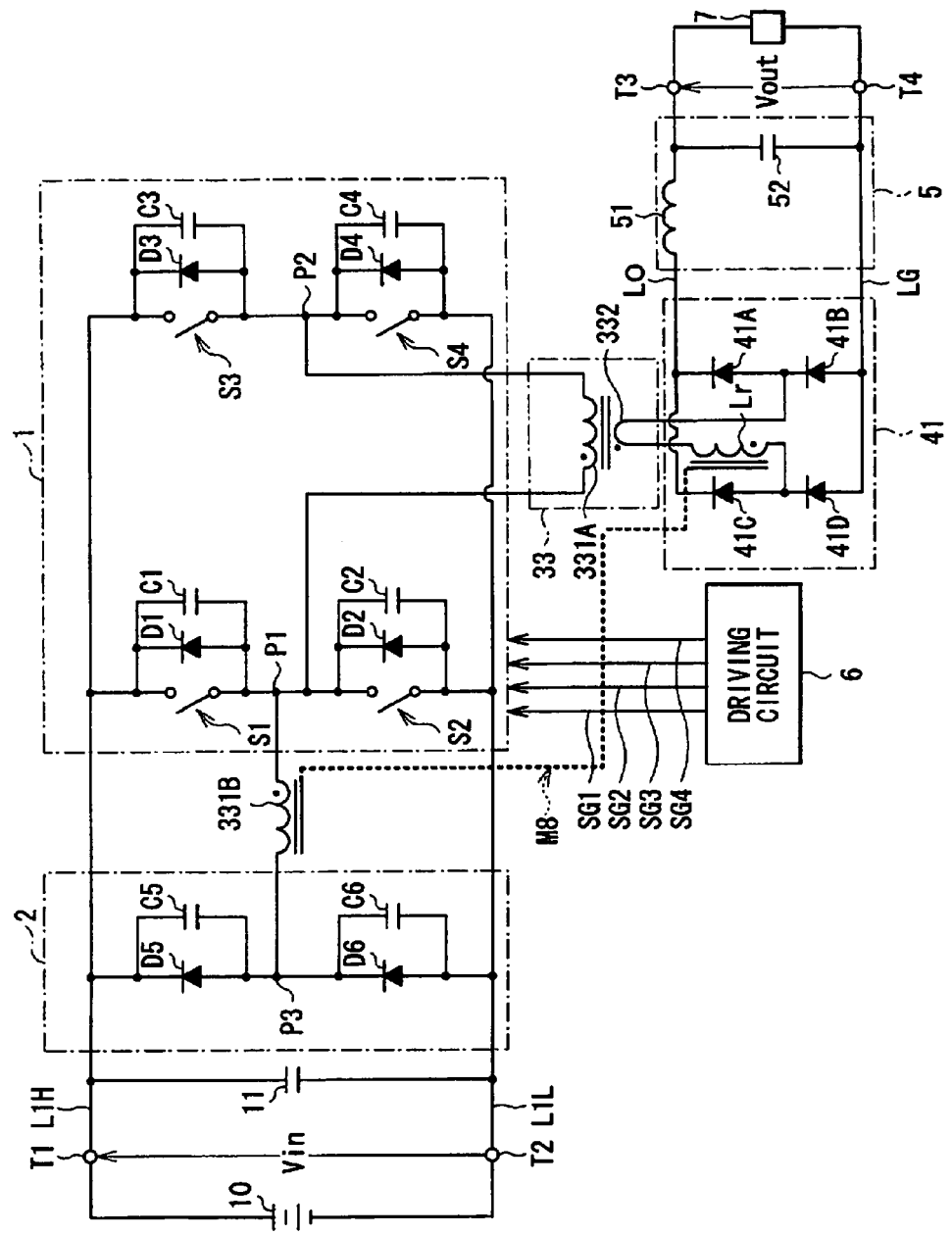
FIG. 28 is a circuit diagram showing the configuration of a switching power supply unit according to another modification of the first embodiment.

In the embodiment, the case where the inductor Lr for resonance is disposed on the primary side of the transformer 3 has been described. For example, as shown in FIGS. 25 to 28, the inductor Lr for resonance may be provided on the secondary side of the transformer 3. Concretely, as shown in FIGS. 25 and 27, a pair of inductors LrA and LrB magnetically coupled to each other may be provided between the cathodes of the diodes 4A and 4B in the rectifier circuit 4 of the center tap type and the secondary windings 32A and 32B of the transformer 3. As shown in FIGS. 26 and 28, in the full-bridge type rectifier circuit 41, the inductor Lr may be disposed between the connection point of the anode of the diode 41A and the cathode of the diode 41B and the connection point of the anode of the diode 41C and the cathode of the diode 41D. As shown by reference numerals M5 and M6 in FIGS. 25 and 26, respectively, the transformer 3 may be magnetically coupled to the auxiliary windings 31B and 331B. As shown by reference numerals M7 and M8 in FIGS. 27 and 28, respectively, the inductor Lr for resonance or the inductors LrA and LrB for resonance may be magnetically coupled to the auxiliary windings 31B and 331B. With configurations, effects similar to those of the embodiment can be obtained.

Second Embodiment

A second embodiment of the invention will now be described. The second embodiment corresponds to a concrete example of a second switching power supply unit according to the present invention.

Figure 29:
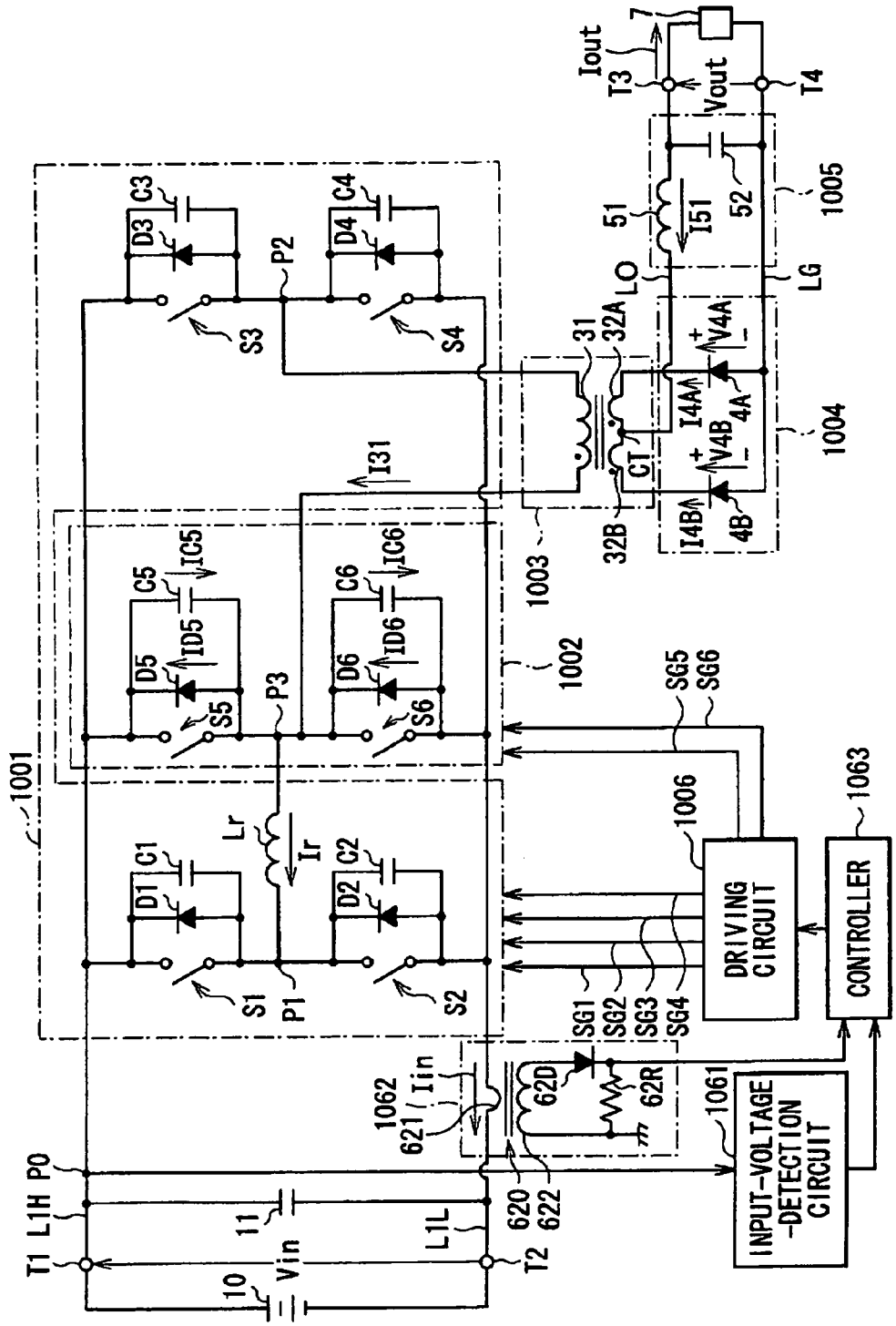
FIG. 29 is a circuit diagram showing the configuration of a switching power supply unit according to a second embodiment of the invention.

FIG. 29 shows a configuration of a switching power supply unit according to the second embodiment. The switching power supply unit functions as a DC-DC converter for converting a high DC input voltage Vin supplied from the high-voltage battery 10 to a lower DC output voltage Vout, and supplying the DC output voltage Vout to a not-shown low-voltage battery to drive the load 7.

The switching power supply unit has the input smoothing capacitor 11, a bridge circuit 1001, and a surge voltage suppressing circuit 1002 which are provided between the primary-side high-voltage line L1H and the primary-side low-voltage line L1L, the inductor Lr for resonance, a transformer 1003 having the primary winding 31 and the secondary windings 32A and 32B, a rectifier circuit 1004 provided on the secondary side of the transformer 1003, the smoothing circuit 5 connected to the rectifier circuit 1004, and a driving circuit 1006 for driving the bridge circuit 1001 and the surge voltage suppressing circuit 1002. The DC input voltage Vin output from the high-voltage battery 10 is applied across the input terminal T1 of the primary-side high-voltage line L1H and the input terminal T2 of the primary-side low-voltage line L1L.

The switching power supply unit also has: an input voltage detection circuit 1061 and an input current detection circuit 1062 disposed on the primary side of the transformer 1003 and detecting the DC input voltage Vin and the input current Iin, respectively; and a controller 1063 for controlling switching operation in the bridge circuit 1001 and the surge voltage suppressing circuit 1002 via the driving circuit 1006.

The input smoothing capacitor 11 is provided to smooth the DC input voltage Vin input from the input terminals T1 and T2.

The bridge circuit 1001 has the four switching elements S1 to S4, and device sets of the capacitors C1 to C4 connected in parallel with the switching elements S1 to S4, respectively, and diodes D1 to D4 connected to the switching elements S1 to S4 in the opposite direction, respectively, and has a full-bridge circuit configuration. Concretely, one end of the switching element S1 and one end of the switching element S2 are connected to each other, and one end of the switching element S3 and one end of the switching element S4 are connected to each other. The other ends of the switching elements S1 and S3 are connected to each other and connected to the input terminal T1, and the other ends of the switching elements S2 and S4 are connected to each other and connected to the input terminal T2. With such a configuration, when switching elements S5 and S6 in the surge voltage suppressing circuit 1002 are in an off state as will be described later, the bridge circuit 1001 converts the DC input voltage Vin applied across the input terminals T1 and T2 to an input AC voltage in accordance with drive signals SG1 to SG4 supplied from the driving circuit 1006.

The bridge circuit 1001 corresponds to a concrete example of "first bridge circuit" in the invention. A device set of the switching element S1, the diode D1, and the capacitor C1, and a device set of the switching element S2, the diode D2, and the capacitor C2 correspond to a concrete example of "a first group" in the invention. A device set of the switching element S3, the diode D3, and the capacitor C3 and a device set of the switching element S4, the diode D4, and the capacitor C4 correspond to a concrete example of "a second group" in the invention.

The switching elements S1 to S4 are switching elements such as, for example, MOS-FETs (Metal Oxide Semiconductor-Field Effect Transistors), IGBTs (Insulated Gate Bipolar Transistors), or the like. In the case of using MOS-FETs as the switching elements, as the capacitors C1 to C4 and the diodes D1 to D4, parasitic capacitors or parasitic diodes of the MOS-FETs can be used. As the capacitors C1 to C4, junction capacitance of the diodes D1 to D4 may be used. In the case of using such a configuration, it becomes unnecessary to provide the capacitors C1 to C4 and the diodes D1 to D4 separately from the switching elements, so that the circuit configuration can be simplified.

The surge voltage suppressing circuit 1002 has two device sets; a device set of the switching element S5, the capacitor C5 connected in parallel with the switching element S5, and the diode D5 connected to the switching element S5 in the opposite direction, and a device set of the switching element S6, the capacitor C6 connected in parallel with the switching element S6, and the diode D6 connected to the switching element S6 in the opposite direction. The device sets are connected to each other in series. Concretely, the anode of the diode D5 is connected to the connection point P3, and the cathode is connected to the primary-side high-voltage line L1H. The anode of the diode D6 is connected to the primary-side low-voltage line L1L and the cathode is connected to the connection point P3. With such a configuration, in the surge voltage suppressing circuit 1002, when the switching elements S5 and S6 are in the off state as will be described later, the capacitors C5 and C6 and the inductor Lr which will be described later construct an LC series resonance circuit (second resonance circuit). By utilizing the resonance characteristic of the LC series resonance circuit, a surge voltage applied to the diodes 4A and 4B in the rectifier circuit 1004 which will be described later is suppressed.

Concretely, in the switching power supply unit of the second embodiment, resonance time of the second resonance circuit and recovery time of the diodes 4A and 4B are set so as to satisfy the following conditional expression (3). The reverse voltages of the diodes 4A and 4B are subjected to resonance in a quarter of the resonance time and gently reach a voltage according to the turn ratio of the input voltage. During the period, recovery gently finishes. As a result, as will be described later, the surge voltage applied to the diodes 4A and 4B is suppressed.

$$\tfrac{1}{4} \times \{2\pi \times (L \times C)^{1/2}\} > \text{Trr3} \qquad (3)$$

where $\{2\pi \times (L \times C)^{1/2}\}$ denotes resonance time of one cycle in the second resonance circuit, L indicates inductance of the inductor Lr, C indicates a combined capacitance value in parallel connection of the capacitors C5 and C6 (C=(C5+C6)), and Trr3 indicates recovery time of the diodes 4A and 4B. In the embodiment, the recover time denotes time as described below. In the case where the diodes 4A and 4B are PN junction diodes, the diodes are in a conductive state because of holes injected from a P layer to an N layer. However, in a process that the forward current decreases and the reverse voltage is applied, the holes accumulated in the N layer return to the P layer or recombine and disappear. As a result, current flows in the opposite direction in the diodes 4A and 4B until a depletion layer extends. The current is called recovery current. The time in which the recovery current flows is called recover time. In the case where the diodes 4A and 4B are metal-semiconductor-junction schottky-barrier diodes, the recovery current is not generated in principle. However, the junction capacitance exists also in this case. In the process in which the reverse voltage is applied, while charging the junction capacitance, the current flows in the opposite direction. Therefore, in the case of the schottky-barrier diodes, it can be considered that the time in which the current in the opposite direction flows corresponds to the recovery time.

The surge voltage suppressing circuit 1002 corresponds to a concrete example of a "third group" in the invention.

As the switching elements S5 and S6, for example, MOS-FETs, IGBTs, or the like are used. In the case of using MOS-FETs as the switching elements, as the capacitors C5 and C6 and the diodes D5 and D6, parasitic capacitors or parasitic diodes of the MOS-FETs can be used. As the capacitors C5 and C6, junction capacitance of the diodes D5 and D6 may be used. In the case of using such a configuration, it becomes unnecessary to provide the capacitors C5 and C6 and the diodes D5 and D6 separately from the switching elements, so that the circuit configuration can be simplified.

One end of the inductor Lr is connected to the connection point P1 of the device sets in the first group, and the other end is connected to the connection point P3 of the device sets in the third group. With such a configuration, the inductor Lr and the capacitors C1 to C4 in the bridge circuit 1001 construct an LC series resonance circuit (first resonance circuit). By utilizing the resonance characteristic of the LC series resonance circuit, as will be described later, in the case where the switching elements S5 and S6 are in the off state, a short-circuit loss in the switching elements S1 to S4 is suppressed. In the case where the switching elements S5 and S6 are in the off state, similarly, the inductor Lr and the capacitors C5 and C6 in the surge voltage suppressing circuit 1002 construct an LC series resonance circuit (second resonance circuit), and a surge voltage applied to the diodes 4A and 4B in the rectifier circuit 1004 is suppressed. The inductance of the inductor Lr is set so as to be much smaller than that of the primary winding 31 of the transformer 1003 which will be described later.

The transformer 1003 has the primary winding 31 and the pair of secondary windings 32A and 32B. One end of the primary winding 31 is connected to the connection point P3 of the device set in the third group, and the other end is connected to a connection point P2 of the device set in the second group. On the other hand, one ends of the secondary windings 32A and 32B are connected to each other at the center tap CT. The center tap CT is led along the output line LO to the output terminal T3 via the smoothing circuit 5. That is, the rectifier circuit 1004 which will be described later is of a center tap type. With such a configuration, the transformer 1003 drops the input AC voltage generated by the bridge circuit 1001 or the bridge circuit 1001 and the surge voltage suppressing circuit 1002, and outputs output AC voltages whose phases are different from each other by 180 degrees from the ends of the secondary windings 32A and 32B. The degree of voltage drop in this case is determined by the turn ratio between the primary winding 31 and the secondary windings 32A and 32B.

The rectifier circuit 1004 is a single-phase full-wave rectifier constructed by the pair of diodes 4A and 4B. The cathode of the diode 4A is connected to the other end of the secondary winding 32A of the transformer 1003. The cathode of the diode 4B is connected to the other end of the secondary winding 32B of the transformer 1003. The anodes of the diodes 4A and 4B are connected to each other and connected to the ground line LG. That is, the rectifier circuit 1004 has a center-tap-type anode-common-connection configuration. The rectifier circuit 1004 rectifies half wave periods of the output AC voltage from the transformer 1003 by the diodes 41A and 41B to obtain DC voltage.

Each of the diodes 4A and 4B may be constructed by a parasitic diode of a MOS-FET. In the case where each of the diodes 4A and 4B is constructed by a parasitic diode of a MOS-FET, preferably, the MOS-FETs are turned on synchronously with periods in which the parasitic diodes of the MOS-FETs are made conductive for the reason that the voltages can be rectified with a smaller voltage drop.

The smoothing circuit 5 includes the choke coil 51 and the output smoothing capacitor 52. The choke coil 51 is inserted in the output line LO. One end of the choke coil 51 is connected to the center tap CT and the other end of the choke coil 51 is connected to the output terminal T3 of the output line LO. The output smoothing capacitor 52 is connected between the output line LO (concretely, the other end of the choke coil 51) and the ground line LG. The output terminal T4 is provided at an end of the ground line LG. With such a configuration, the smoothing circuit smoothes the DC voltage rectified by the rectifier circuit 1004, thereby generating the DC output voltage Vout. The DC output voltage Vout is supplied from the output terminals T3 and T4 to a low-voltage battery (not shown).

The input voltage detection circuit 1061 is inserted between a connection point P0 on the primary-side high-voltage line L1H and the controller 1063 which will be described later. With such a configuration, the input voltage detection circuit 1061 detects the DC input voltage (input voltage) Vin supplied to the switching power supply unit and outputs a voltage according to the magnitude of the DC input voltage Vin to the controller 1063. Examples of a concrete circuit configuration of the input voltage detection circuit 1061 are as follows. The input voltage detection circuit 1061 may detect the DC input voltage Vin by a voltage-dividing resistor (not shown) disposed between the contact point P0 and a connection point (not shown) on the primary-side low-voltage line L1L and generate a voltage according to the detected DC input voltage Vin. The input voltage detection circuit 1061 may detect a voltage on the secondary side of the transformer 1003 (a voltage at the center tap CT, a reverse voltage in the diodes 4A and 4B, or the like) and calculate a voltage corresponding to the DC input voltage Vin by using the turn ratio between the primary winding 31 and the secondary windings 32A and 32B of the transformer 1003 on the basis of the detected voltage.

The input current detection circuit 1062 is constructed by a current transformer 620, a diode 62D, and a resistor 62R. A primary winding 621 of the current transformer 620 is inserted in the primary-side low-voltage line L1L (concretely, disposed between the input terminal T2 and the other ends of the switching elements S2 and S4). One end of a secondary winding 622 is grounded and the other end is connected to the anode of the diode 62D. The cathode of the diode 62D is connected to one end of the resistor 62R. The cathode of the diode 62D and one end of the resistor 62R are connected to the controller 1063 which will be described later. The other end of the resistor 62R is grounded together with one end of the secondary winding 622. The input current detection circuit 1062 having such a configuration (configuration of a half-wave rectifier circuit) detects the input current Iin flowing in the primary winding 621 of the current transformer 620, and outputs a voltage corresponding to the magnitude of the input current Iin to the controller 1063. The disposition of the input current detection circuit 1062 is not limited to that shown in FIG. 29. For example, the input current detection circuit 1062 may be inserted in the primary-side high-voltage line L1H (concretely, disposed between the input terminal T1 and the other ends of the switching elements S1 and S3), or inserted in a path extending from one ends of the switching elements S1 and S2 to one ends of the switching elements S3 and S4 via the primary winding 31. In the case of the latter configuration, it is sufficient to construct the input current detection circuit 1062 by a so-called full-wave rectifier circuit.

The controller 1063 controls the switching operation in the bridge circuit 1001 and the surge voltage suppressing circuit 1002 in accordance with the DC input voltage Vin detected by the input voltage detection circuit 1061 (concretely, a voltage corresponding to the magnitude of the DC input voltage Vin) and the input current Iin detected by the input current detection circuit 1062 (concretely, a voltage corresponding to the magnitude of the input current Iin). To be concrete, the controller 1063 controls so that the bridge circuit 1001 (first bridge circuit) or another bridge circuit (second bridge circuit) selectively performs the switching operation in accordance with the detected DC input voltage Vin and input current Iin. The second bridge circuit includes: a third group constructed by a device set of the switching element S5, the diode D5, and the capacitor C5 and a device set of the switching element S6, the diode D6, and the capacitor C6; and the second group constructed by the device set of the switching element S3, the diode D3, and the capacitor C3, and the device set of the switching element S4, the diode D4, and the capacitor C4. In reality, on the basis of the input current Iin, by using the following equation (5), the output current Iout is calculated.

$$Vin/Vout = Iout/Iin = n \qquad (5)$$

(n: turn ratio between the primary winding 31 and the secondary windings 32A and 32B of the transformer 1003)

Figures 30, 31:
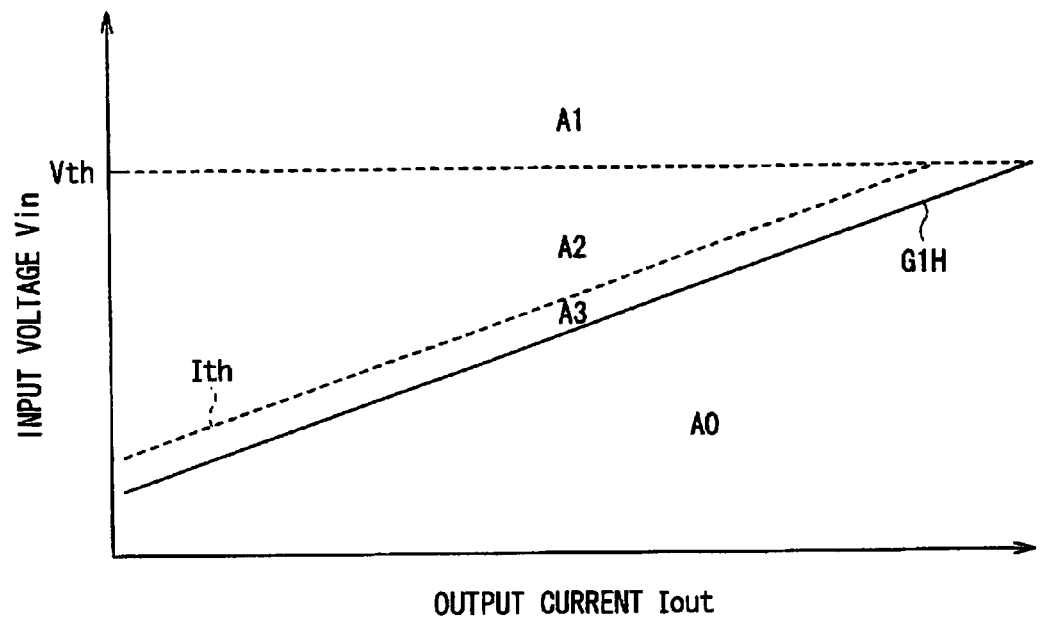
FIG. 30 is a characteristic diagram illustrating a switching operation control by a controller.
FIG. 31 is a diagram illustrating the switching operation control by the controller.

More concretely, for example, in the case where the lower limit value of an input voltage range in which a predetermined output voltage Vout can be maintained by the switching power supply unit is shown by a linear line having a positive tilt like a graph G1H in a characteristic diagram showing the relation between the DC input voltage (input voltage) Vin and the output current Iout as shown in FIG. 30, the controller 1063 determines the present area in which the switching power supply unit exists at present from areas A0 to A3. According to the present area, the controller 1063 controls the switching operation in the bridge circuit 1001 and the surge voltage suppressing circuit 1002. The area A0 is an area in which the input voltage Vin is lower than values on the graph G1H indicative of the lower limit values of the input voltage range, and the output current Iout is large. In the area A0, the predetermined output voltage Vout cannot be maintained. The area A1 is an area in which the input voltage Vin is higher than a predetermined threshold voltage Vth. The area A2 is an area in which the input voltage Vin is equal to or lower than the predetermined threshold voltage Vth, and the output current Iout is smaller than a predetermined threshold current Ith. The area A3 is an area in which the threshold current Vin is equal to or smaller than the threshold voltage Vth, and the output current Iout is equal to or larger than the threshold current Ith and is equal to or smaller than the values on the graph G1H. All of the areas A1 to A3 are (valid) areas in which the predetermined output voltage Vout can be maintained.

FIG. 31 shows the relations between the areas A0 to A3 and the operation controls of the switching elements S1 to S6 (since the switching elements S3 and S4 are always performing on/off operations, they are not shown). Concretely, when it is determined that the switching power supply unit is in the areas A1 and A2, the controller 1063 sets the switching elements S5 and S6 to the off state and allows the switching elements S1 and S2 to perform on/off operations, thereby selectively making the bridge circuit 1001 (first bridge circuit) perform the switching operation. On the other hand, when it is determined that the switching power supply unit is in the area A3 (A0), the controller 1063 allows the switching elements S5 and S6 to perform on/off operations and sets the switching elements S1 and S2 to the off state, thereby selectively making the second bridge circuit perform the switching operation. In such a manner, the operation control on the switching elements S1 to S6 is performed as shown by the arrow X1 in the diagram. When it is determined that the switching power supply unit is in the area A3 (A0), the controller 1063 can perform the control as shown by the arrow X2 in the diagram so that all of the switching elements S1 to S6 perform the on/off operations. This setting will be described later. In the case where the switching elements S1 and S2 and the switching elements S5 and S6 are set to the off state, a full-bridge operation by the bridge circuits cannot be performed, so that "−" is shown in the diagram.

The driving circuit 1006 is provided to drive the switching elements S1 to S4 in the bridge circuit 1001 and the switching elements S5 and S6 in the surge voltage suppressing circuit 1002 under control of the controller 1063. Concretely, the driving circuit 1006 supplies drive signals SG1 to SG6 to the switching elements S1 to S6 to turn on/off the switching elements S1 to S6. The driving circuit 1006 performs phase control on the switching elements S1 to S6 as will be described later to properly set the phase differences. By the operation, the DC output voltage Vout is maintained constant and stabilized when the DC input voltage Vin lies in the valid input voltage range shown in FIG. 30.

The inductor Lr corresponds to a concrete example of "resonance inductor" in the invention. The rectifier circuit 1004 and the smoothing circuit 5 correspond to a concrete example of "output circuit" in the invention. The diodes 4A and 4B correspond to a concrete example of "rectifier elements included in the output circuit" in the invention.

Next, the operation of the switching power supply unit having such a configuration will be described. First, the basic operation of the switching power supply unit will be described.

The DC input voltage Vin supplied from the high-voltage battery 10 via the input terminals T1 and T2 becomes an input AC voltage by the switching operation of the bridge circuit 1001 or the bridge circuit 1001 and the surge voltage suppressing circuit 1002 as will be described later. The input AC voltage is supplied to the primary winding 31 of the transformer 1003. From the secondary windings 32A and 32B of the transformer 1003, an output AC voltage transformed (in this case, dropped) is obtained.

The rectifier circuit 1004 rectifies the output AC voltage by the diodes 4A and 4B. As a result, a rectified output is generated between the center tap CT (output line LO) and the connection point (ground line LG) of the diodes 4A and 4B.

The smoothing circuit 5 smoothes the rectified output generated between the center tap CT and the diodes 4A and 4B, and outputs the DC output voltage Vout from the output terminals T3 and T4. The DC output voltage Vout is supplied to a not-shown low-voltage battery and the load 7 is driven.

In the switching power supply unit of the second embodiment, the DC input voltage Vin and the input current Iin are detected by the input voltage detection circuit 1061 and the input current detection circuit 1062, respectively and outputs based on the detected voltage and current are output to the controller 1063. On the basis of the voltages, the controller 1063 controls the operations of the switching elements S1 to S6.

Figure 32:
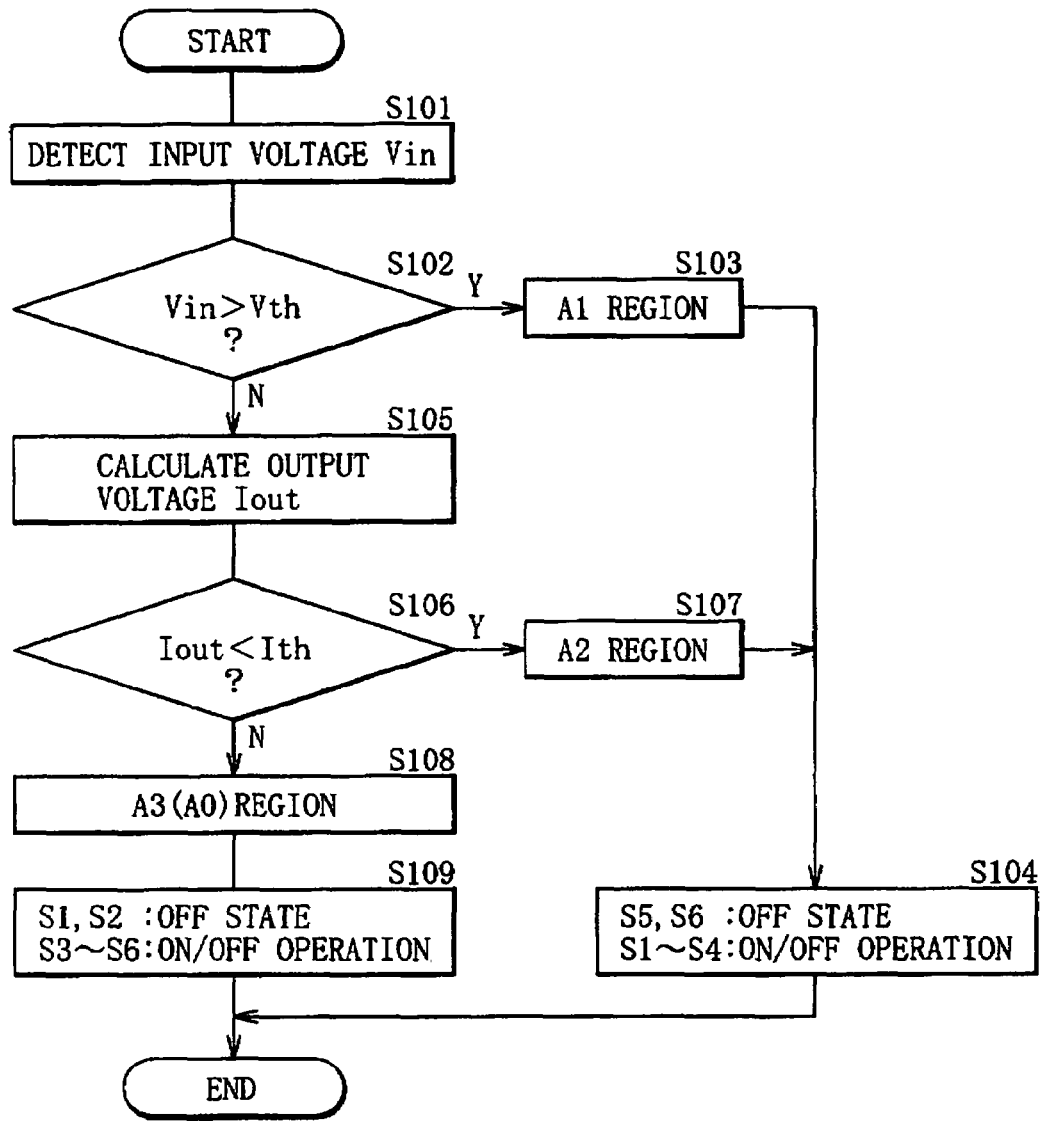
FIG. 32 is a flowchart of the switching operation control performed by the controller.

FIG. 32 is a flowchart showing the operation control on the switching elements S1 to S6 by the controller 1063.

First, when the DC input voltage Vin is detected by the input voltage detection circuit 1061 and a voltage based on the detected voltage is supplied to the controller 1063 (step S101), the controller 1063 determines whether the DC input voltage Vin is larger than the threshold voltage Vth or not (step S102).

When it is determined that the DC input voltage Vin is larger than the threshold voltage Vth (Y in step S102), the controller 1063 determines that, for example, the switching power supply unit is in the area A1 shown in FIG. 30 (step S103), sets the switching elements S5 and S6 to the off state, and makes the switching elements S1 to S4 perform on/off operations (step S104). Consequently, the bridge circuit 1001 (first bridge circuit) selectively performs switching operation and, by the bridge circuit 1001, an input AC voltage is generated from the DC input voltage Vin. Although the details will be described later, the capacitors C1 to C4 in the bridge circuit 1001 and the inductor Lr cooperate and function as the LC series resonance circuit (first resonance circuit), thereby suppressing a short-circuit loss in the switching elements S1 to S4 and improving the efficiency of the unit. Further, although the details will be described later, the capacitors C5 and C6 in the surge voltage suppressing circuit 1002 and the inductor Ir cooperate and function as an LC series resonance circuit (second resonance circuit). By this function and, in addition, the action of the surge voltage suppressing circuit 1002, rise of a reverse voltage applied to the diodes 4A and 4B in the rectifier circuit 1004 becomes gentle.

On the other hand, when it is determined that the DC input voltage Vin is equal to or less than the threshold voltage Vth (N in step S102), the controller 1063 calculates the output current Iout by using the equation (2) on the basis of the input current Iin detected by the input current detection circuit 1062 (step S105). The controller 1063 determines whether the output current Iout is smaller than the threshold current Ith or not (step S106).

When it is determined that the output current Iout is smaller than the threshold current Ith (Y in step S106), the controller 1063 determines that, for example, the switching power supply unit is in the area A2 shown in FIG. 30 (step S107) and advances to step S104. By the determination, the bridge circuit 1001 (first bridge circuit) selectively performs the switching operation and, by the bridge circuit 1001, an input AC voltage is generated from the DC input voltage Vin. A short-circuit loss in the switching elements S1 to S4 is suppressed and the efficiency of the unit improves. The rise in the reverse voltage applied to the diodes 4A and 4B in the rectifier circuit 1004 becomes gentle.

On the other hand, when it is determined that the output current Iout is equal to or larger than the threshold current Ith (N in step S106), the controller 1063 determines that, for example, the switching power supply unit is in the area A3 (A0) shown in FIG. 30 (step S108), sets the switching elements S1 and S2 to the off state, and makes the switching elements S3 to S6 perform on/off operations (step S109). Consequently, the second bridge circuit selectively performs the switching operation and, by the second bridge circuit, an input AC voltage is generated from the DC input voltage Vin. As the details will be described later, by bypassing the inductor Lr, an input voltage range in which the predetermined output voltage Vout can be maintained is widened. The operation control on the switching elements S1 to S6 by the controller 1063 is finished.

Next, referring to FIGS. 33 to 52, circuit operations of the switching power supply unit which are characteristic in the present invention will be described with respect to the case where the bridge circuit 1001 (first bridge circuit) selectively performs the switching operation and with respect to the case where the second bridge circuit selectively performs the switching operation.

Operations by First Bridge Circuit

First, referring to FIGS. 33 to 49, the circuit operation in the case where the first bridge circuit selectively performs the switching operation will be described in detail.

Figure 33:
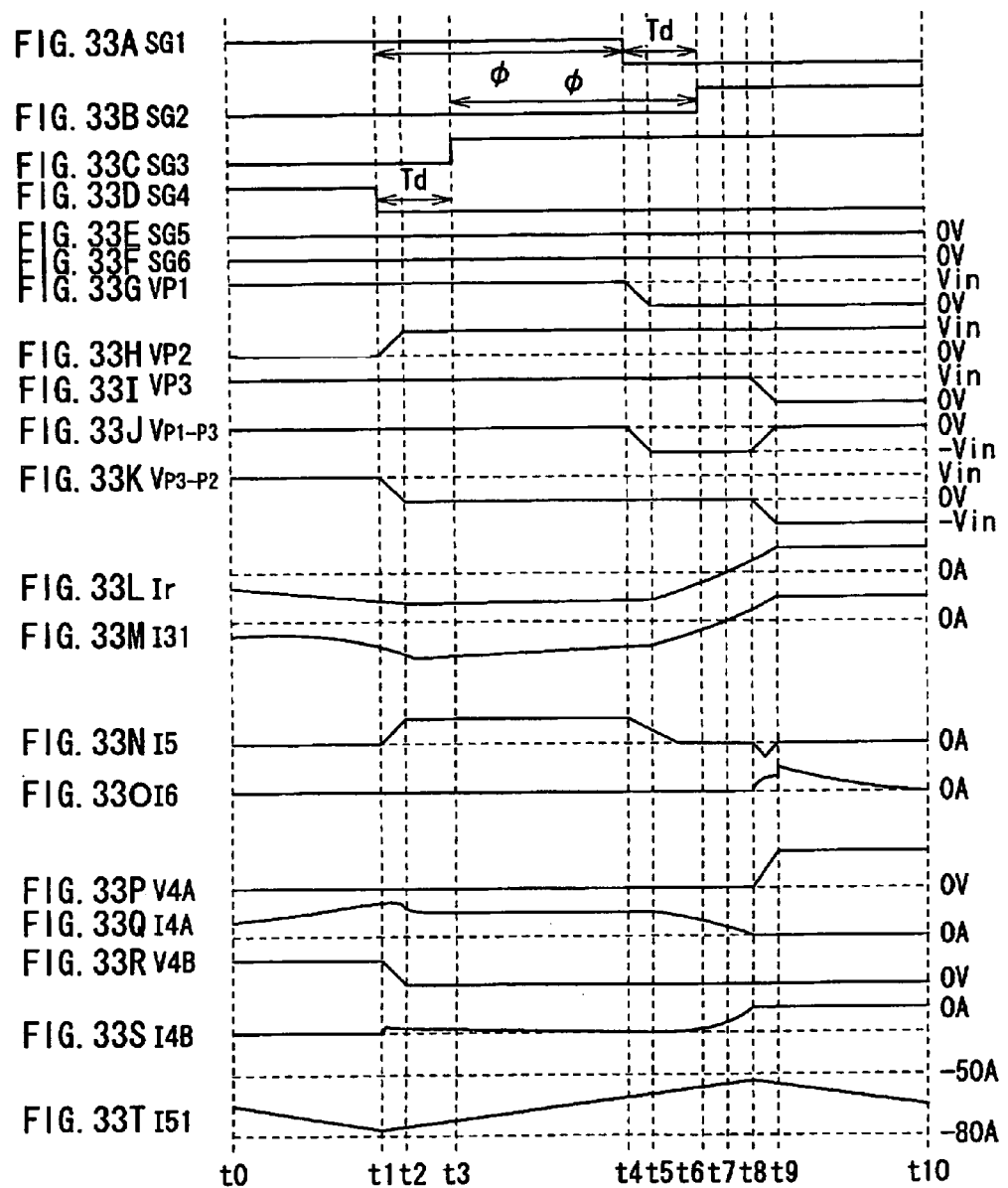
FIG. 33 is a timing waveform chart illustrating operations of the switching power supply unit in the case of selectively operating a first bridge circuit.

FIG. 33 is a timing waveform chart (times t0 to t10) of voltage waveforms and current waveforms of parts in the switching power supply unit of FIG. 29. (A) to (F) in the diagram show voltage waveforms of the drive signals SG1 to SG6. (G) to (I) show potentials VP1 to VP3 at the connection points P1 to P3. (J) shows the potential difference $V_{P1-P3}$ between the connection points P1 and P3 when the potential VP3 at the connection point P3 is used as a reference. (K) shows the potential difference $V_{P3-P2}$ between the connection points P3 and P2 when the potential VP2 at the connection point P2 is used as a reference. (L) indicates current Ir flowing in the inductor Lr. (M) indicates current I31 flowing in the primary winding 31 of the transformer 1003. (N) and (O) indicate currents I5 and I6 flowing in parallel connection parts between the diodes D5 and D6 and the capacitors C5 and C6, respectively, in the surge voltage suppressing circuit 1002. (P) and (Q) indicate reverse voltages V4A and V4B applied across the anodes and cathodes of the diodes 4A and 4B, respectively. (R) and (S) denote currents I4A and I4B flowing in the diodes 4A and 4B, respectively. (T) denotes current I51 flowing in the choke coil 51. The directions of the voltages are as shown by the arrows in FIG. 29. The direction from "−" to "+" is a positive direction. The positive directions of the currents are also as shown by the arrows in FIG. 29.

Figure 46:
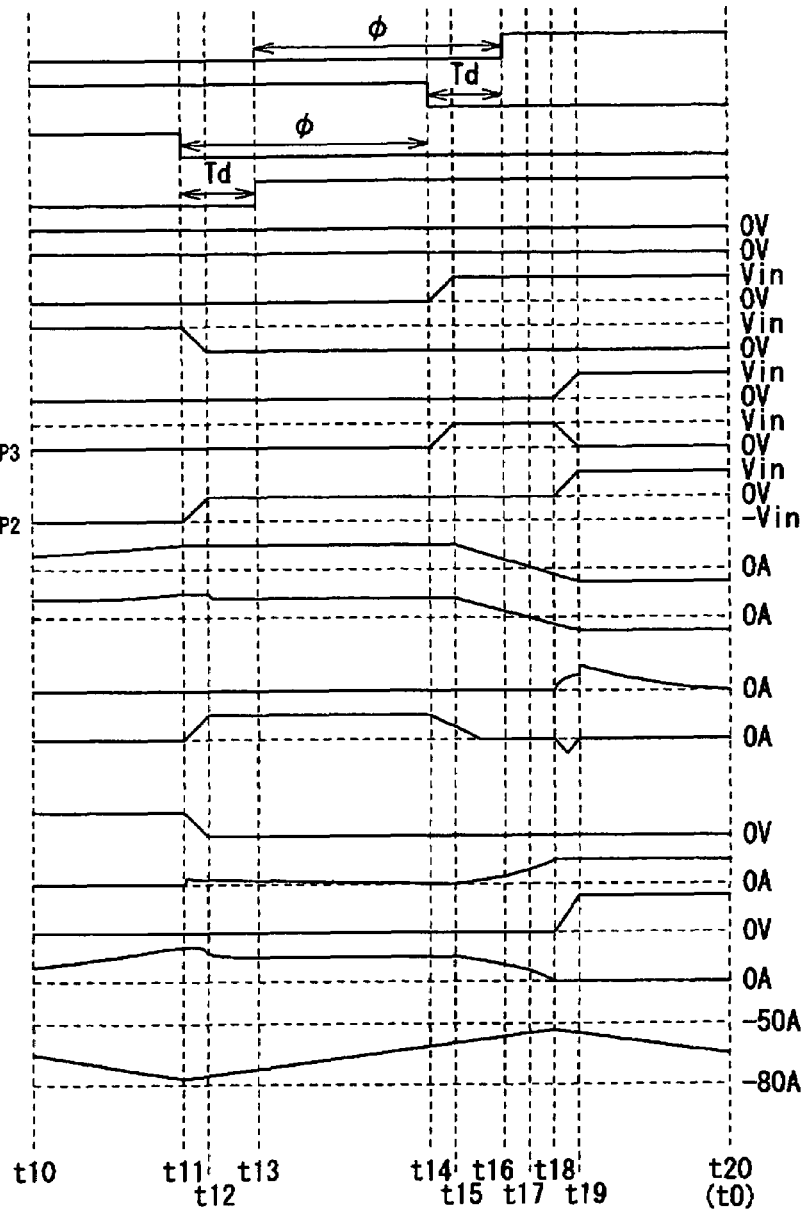
FIG. 46 is a timing waveform chart illustrating operations of the switching power supply unit subsequent to FIG. 45.

FIGS. 34 to 45 show operation states of the switching power supply unit at the times t0 to t10 in FIG. 33. FIG. 46 shows voltage waveforms and current waveforms in parts after the timings illustrated in FIG. 33 (times t10 to t20 (t0)). The timings shown in FIGS. 33 and 46 correspond to first and latter half cycles, respectively, of the operation in the switching power supply unit. Combination of the operations corresponds to operations in one cycle.

First, referring to FIGS. 33 to 45, the operations in the first half cycle will be described.

With respect to the drive signals SG1 to SG4 ((A) to (D) in FIG. 33) of the switching elements S1 to S4, it is understood that the switching elements S1 to S4 are paired. Concretely, the switching elements S1 and S2 are controlled to be turned on at fixed timings on the time base and are therefore called "fixed-side switching elements". The switching elements S3 and S4 are controlled to be turned on at variable timings on the time base and are therefore called "shift-side switching elements".

The switching elements S1 to S4 are driven at timings and in combinations that the input terminals T1 and T2 to which the DC input voltage Vin is applied are not electrically short-circuited in any state of the switching operation. Concretely, the switching elements S3 and S4 (fixed-side switching elements) are not turned on simultaneously, and the switching elements S1 and S2 (shift-side switching elements) are not also turned on simultaneously. A time interval required to avoid simultaneous turn-on of the switching elements is called dead time "Td" ((A) and (D) in FIG. 33).

The switching elements S1 and S4 have a period in which they are simultaneously on. In the period in which the switching elements S1 and S4 are simultaneously on, the primary winding 31 of the transformer 1003 is excited. The switching elements S1 and S4 operate so as to have a switching phase difference ϕ by using the switching element S1 (fixed-side switching element) as a reference ((A) and (D) in FIG. 33). Similarly, the switching elements S2 and S3 have a period in which they are simultaneously on. In the period in which they are simultaneously on, the primary winding 31 of the transformer 1003 is excited in the direction opposite to that in the above case. The switching elements S2 and S3 operate so as to have a switching phase difference ϕ by using the switching element S2 (fixed-side switching element) as a reference ((B) and (C) in FIG. 33). Further, when the switching phase difference ϕ between the switching elements S1 and S4 and the switching phase difference ϕ between the switching elements S2 and S3 are controlled, the time in which the switching elements S1 and S4 are simultaneously on and the time in which the switching elements S2 and S3 are simultaneously on change, respectively. Accordingly, the duty ratio of the input AC voltage applied to the primary winding 31 of the transformer 1003 changes, and the DC output voltage Vout is stabilized.

Figure 34:
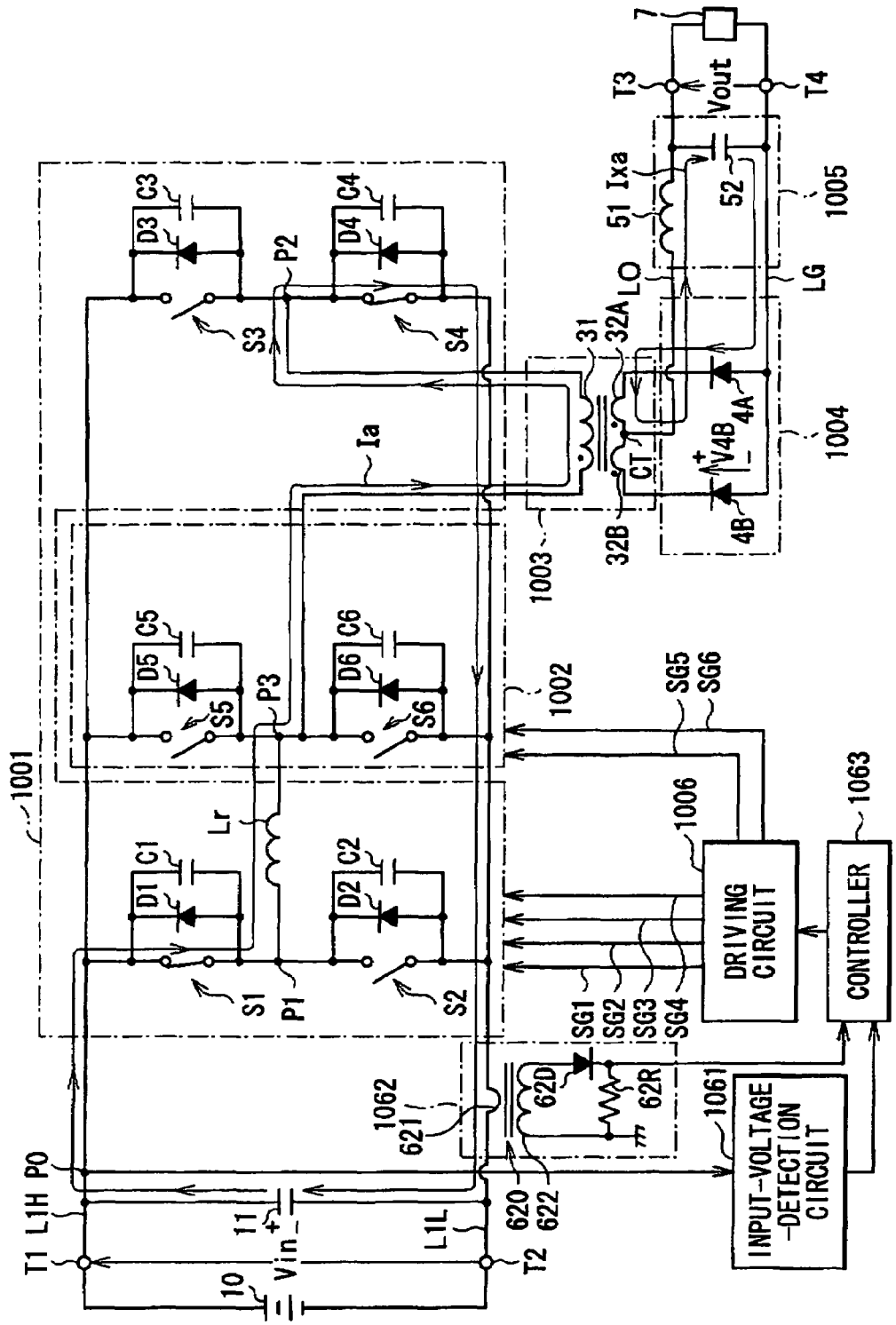
FIG. 34 is a circuit diagram illustrating operations of the switching power supply unit in the case of selectively operating the first bridge circuit.

First, in the period between times t0 and t1 shown in FIG. 34, the switching elements S1 and S4 are in the on state ((A) and (D) in FIG. 33), and the switching elements S2 and S3 are in the off state ((B) and (C) in FIG. 33). On the other hand, the switching elements S5 and S6 are in the off state in the whole period from time t0 to time t10 as described above ((E) and (F) in FIG. 33). The potential VP1 at the connection point P1 is equal to Vin (VP1=Vin) ((G) in FIG. 33), and the potential VP2 at the connection point P2 is equal to 0V (VP2=0V) ((H) in FIG. 33). As described above, the inductance of the inductor Lr is much smaller than that of the primary winding 31 of the transformer 1003, so that the potential VP3 at the connection point P3 is almost equal to Vin ((I) in FIG. 33), and the potential difference $V_{P3-P2}$ between the connection points P3 and P2 using VP2 as a reference is also almost equal to Vin ((I) in FIG. 33). Therefore, a loop current Ia as shown in FIG. 34 flows in the bridge circuit 1001, so that the inductor Lr is exited and power is transmitted from the primary side to the secondary side of the transformer 1003. A loop current Ixa flows to the secondary side of the transformer 1003 via the diode 4A and the choke coil 51, and the load 7 is driven. In the period, forward voltage is applied to the diode 4A and the reverse voltage V4A becomes 0V ((P) in FIG. 33). To the other diode 41B, the reverse voltage V4B is applied ((R) in FIG. 33).

Figure 35:
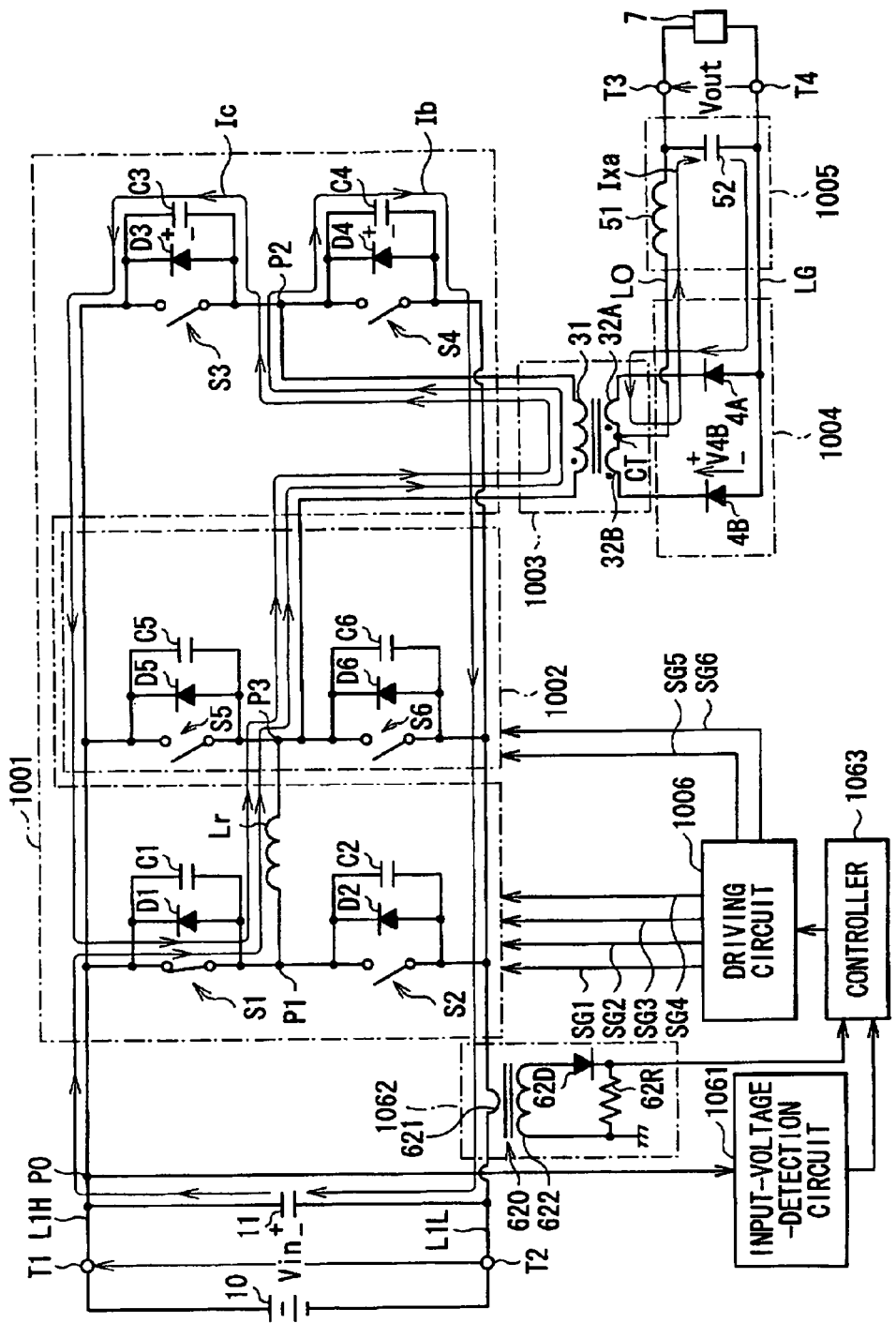
FIG. 35 is a circuit diagram illustrating operations of the switching power supply unit subsequent to FIG. 34.

Next, in the period from time t1 to time t2 shown in FIG. 35, the switching element S4 is turned off at the time t1 ((D) in FIG. 33). The LC series resonance circuit (first resonance circuit) is constructed by cooperation of the capacitors C3 and C4 and the inductor Lr, and first resonance operation is performed. Therefore, the loop currents Ib and Ic as shown in FIG. 35 flow, the capacitor C3 is discharged and, on the other hand, the capacitor C4 is charged. Consequently, the potential VP2 at the connection point P2 gradually increases and becomes equal to Vin at the time t2 ((H) in FIG. 33). At this time, the reverse voltage V4B of the diode 4B drops gradually and becomes 0V at the time t2 ((R) in FIG. 33).

Figure 36:
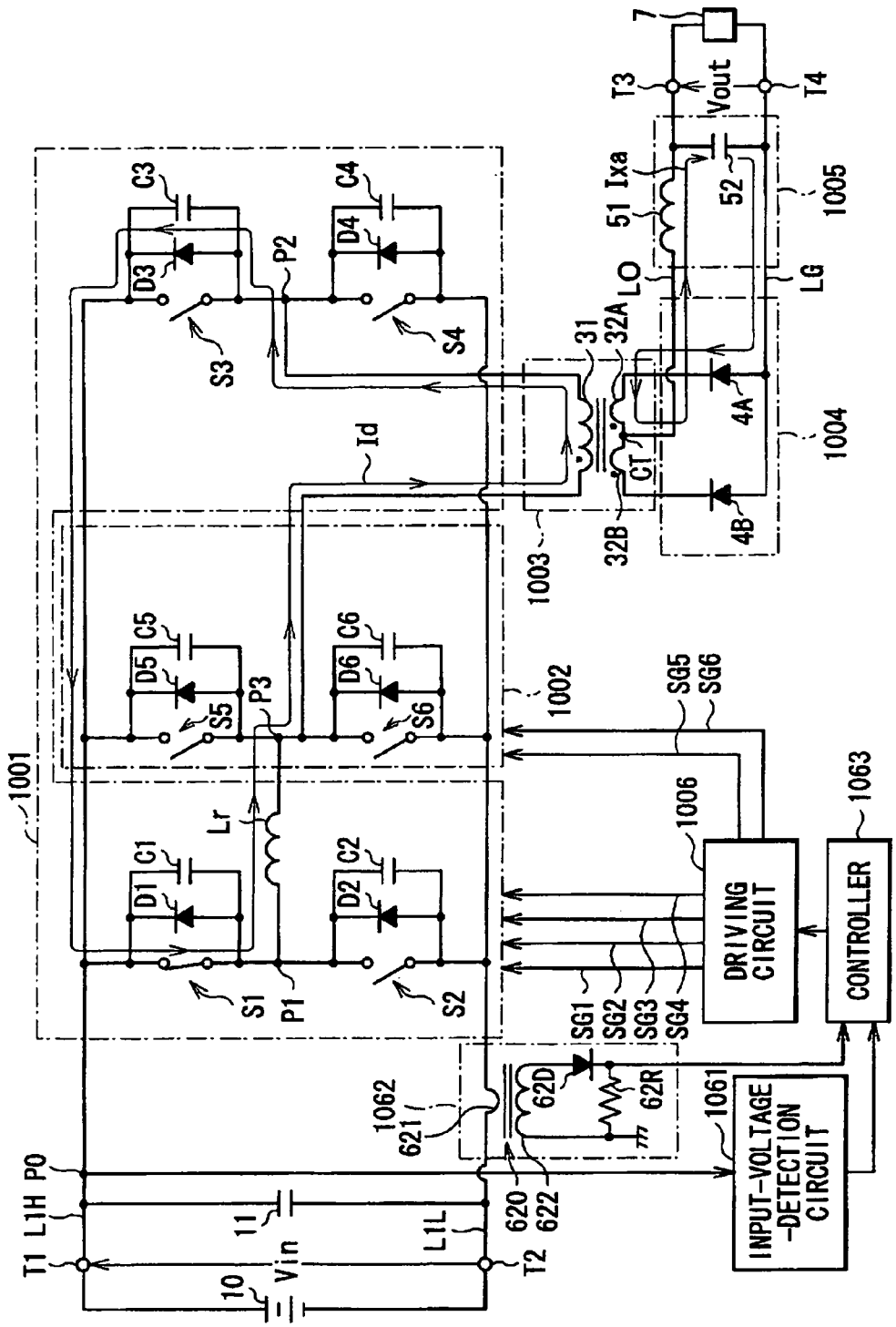
FIG. 36 is a circuit diagram illustrating operations of the switching power supply unit subsequent to FIG. 35.
Figure 37:
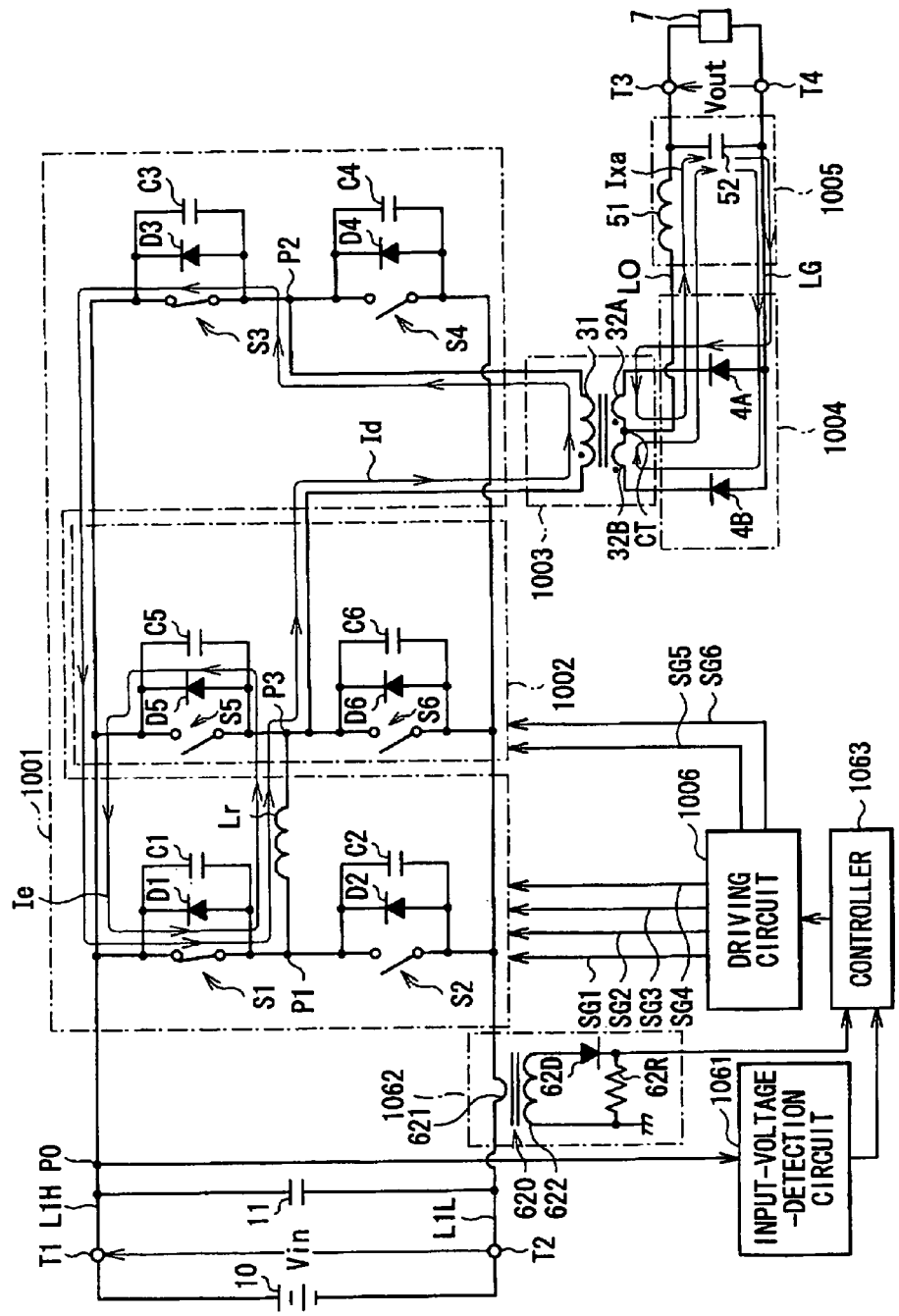
FIG. 37 is a circuit diagram illustrating operations of the switching power supply unit subsequent to FIG. 36.

When VP2 becomes Vin at the time t2 as shown in FIG. 36 ((H) in FIG. 33), the diode D3 becomes conductive. After VP2 becomes Vin and the diode D3 becomes conductive, as shown in FIG. 37, the switching element S3 is turned on at the time t3 ((C) in FIG. 33), thereby performing zero volt switching (ZVS) operation. As a result, a short-circuit loss in the switching element S3 is suppressed, and the efficiency of the unit improves.

In the period from time t2 to time t4, energy accumulated in the inductor Lr by being excited in the period from time t0 to time t1 circulates as currents in circuits connected to both ends of the inductor Lr. Concretely, as shown in FIG. 37, loop currents Id and Ie flow so that the potential differences between one end (the connection point P3) of the inductor Lr and the other end (the primary-side high-voltage line L1H side) of the switching element S1 become equal to each other. In the path of the loop current Id, the potential difference is the sum of the voltage V31 across the primary winding 31 of the transformer 1003 and the voltage VS3 across the switching element S3. When the turn ratio between the primary winding and the secondary winding of the transformer 1003 is "n", V31 is equal to a value obtained by dividing a forward voltage drop in the diode 4A by the turn ratio "n". V31 is a forward voltage drop in the diode D3 when the switching element S3 is off (the period from time t2 to time t3). V31 is the product between the on resistance of the switching element S3 and flowing current when the switching element S3 is on (the period from time t3 to time t4). On the other hand, in the path of the loop current Ie, the potential difference is a forward voltage drop in the diode D5.

Although the values of the forward voltage drops in the diodes 4A, D3, and D5 change according to the value of the flowing forward current and the ambient temperature, the loop currents Id and Ie flow so that the potential differences become equal to each other. By the branch of the current to the two loop currents Id and Ie, the absolute value of the current I31 flowing in the primary winding 31 of the transformer 1003 decreases ((M) in FIG. 33). The current I51 is branched to the loop current Ixa flowing in the diode 4A and the loop current Ixb flowing in the diode 4B so that ampere turns in the transformer 1003 become equal to each other and the sum of the currents flowing in the secondary windings 32A and 32B of the transformer 1003 becomes equal to the current I51 flowing in the chock coil 51.

Figure 38:
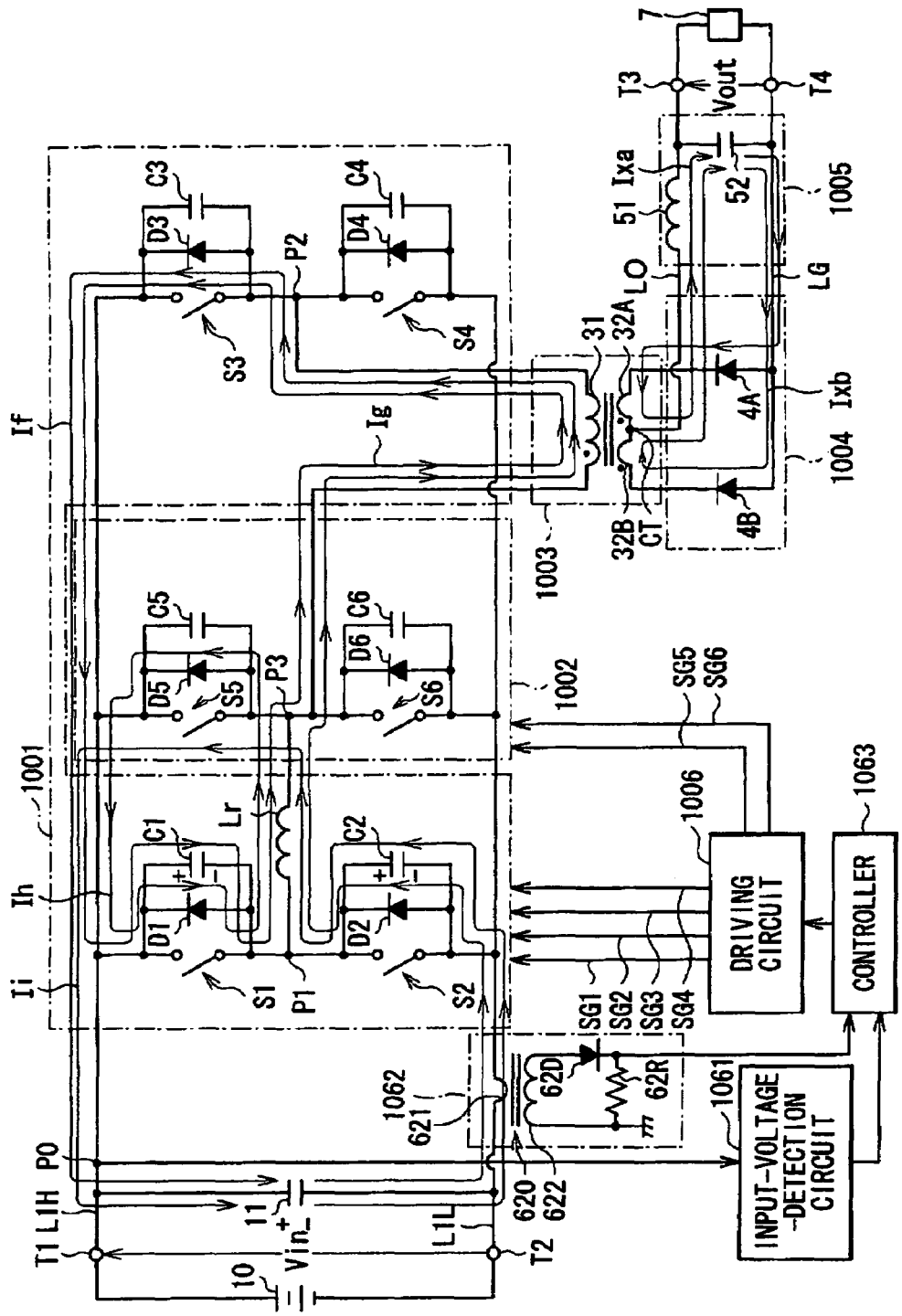
FIG. 38 is a circuit diagram illustrating operations of the switching power supply unit subsequent to FIG. 37.

Next, as shown in FIG. 38, at time t4, the switching element S1 is turned off ((A) in FIG. 33). It makes the capacitors C1 and C2 and the inductor Lr cooperate with one another to construct the LC series resonance circuit (first resonance circuit), and the first resonance operation is performed. Therefore, the loop currents If, Ig, Ih, and Ii as shown in FIG. 38 flow. The capacitor C2 is discharged and, on the other hand, the capacitor C1 is charged. Consequently, the potential VP1 at the connection point P1 gradually descends and becomes 0V (VP1=0V) at time t5 ((G) in FIG. 33).

Figure 39:
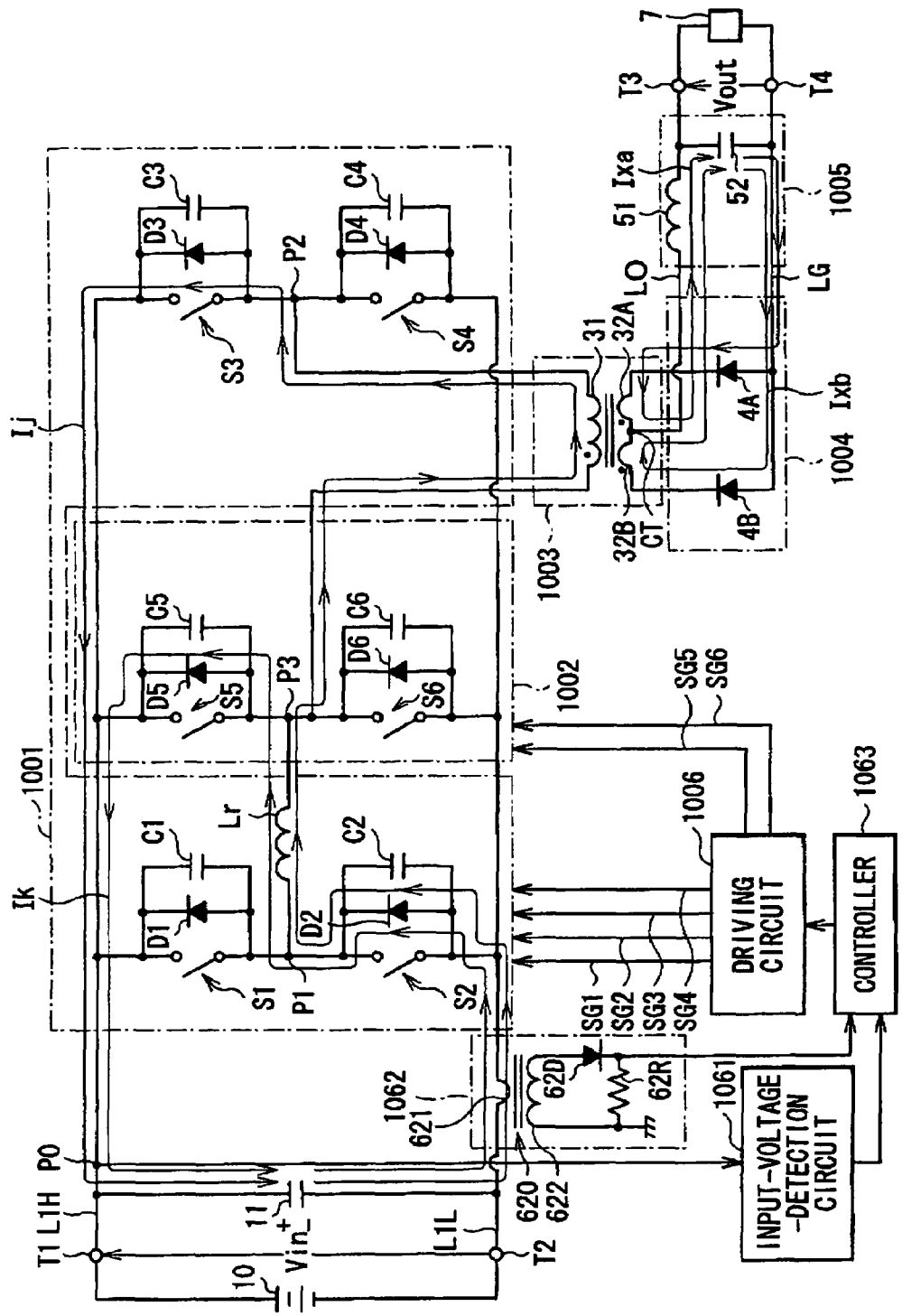
FIG. 39 is a circuit diagram illustrating operations of the switching power supply unit subsequent to FIG. 38.
Figure 40:
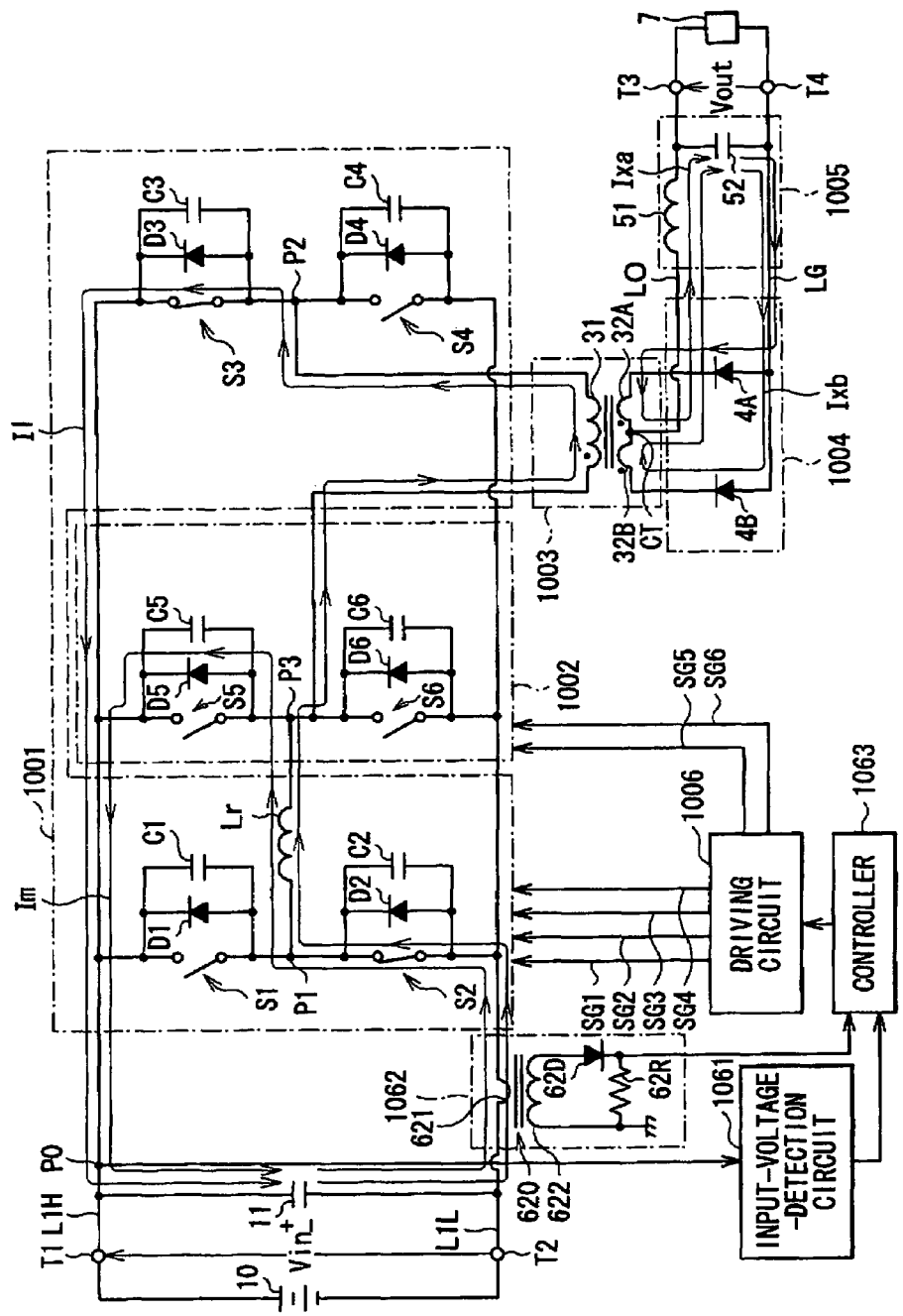
FIG. 40 is a circuit diagram illustrating operations of the switching power supply unit subsequent to FIG. 39.

As shown in FIG. 39, when VP1 becomes 0V at time t5 ((G) in FIG. 33), since VP3=Vin ((I) in FIG. 33) and $V_{P1-P3}$=−Vin ((J) in FIG. 33) at this time, the diode D2 becomes conductive. After VP1 becomes 0V and the diode D2 becomes conductive, as shown in FIG. 40, the switching element S2 is turned on at time t6 ((B) in FIG. 33) and the ZVS operation is performed. As a result, a short-circuit loss in the switching element S2 is suppressed, and the efficiency of the unit improves.

In the period from time t6 to time t7 shown in FIG. 40, the energy accumulated in the inductor Lr is regenerated in the input smoothing capacitor 11 by the loop currents Im and I1 as shown in FIG. 40 also after charging/discharging in the capacitors C1 and C2 is completed. As the energy is regenerated to the input smoothing capacitor 11, the energy accumulated in the inductor Lr decreases. In association with the decrease, the absolute value of the current Ir flowing in the inductor Lr and the absolute value of the current I31 flowing in the primary winding 31 of the transformer 1003 also decrease ((L) and (M) in FIG. 33). Therefore, the current I51 is branched to the loop current Ixa flowing in the diode 4A and the loop current Ixb flowing in the diode 4B so that the ampere turns in the transformer 1003 become equal to each other and the sum of currents flowing in the secondary windings 32A and 32B in the transformer 1003 becomes equal to the current I51 flowing in the choke coil 51.

In the period, the loop currents Im and I1 flow so that the potential differences from one end (the connection point P3) of the inductor Lr to the cathode of the diode D5 become equal to each other. However, the potential difference in the path of the loop current Im gradually becomes larger than that in the path of the loop current I1, and the diode D5 becomes nonconductive. It makes the absolute value of the current Ir flowing in the inductor Lr and that of the current I31 flowing in the primary winding 31 of the transformer 1003 equal to each other ((L) and (M) in FIG. 33). As described above, the potential difference in the path of the loop current I1 is equal to the sum of the voltage V31 across the primary winding 31 of the transformer 1003 and the voltage VS3 across the switching element S3. The voltage V31 is a voltage obtained by dividing the forward voltage drop in the diode 4A by the turn ratio "n" between the primary winding and the secondary winding of the transformer 1003. The voltage VS3 is a voltage which is equal to the product between the on resistance of the switching element S3 and the flowing current since the switching element S3 is in the on state in this period. The potential difference in the path of the loop current Im is the forward voltage drop in the diode D5.

Figure 41:
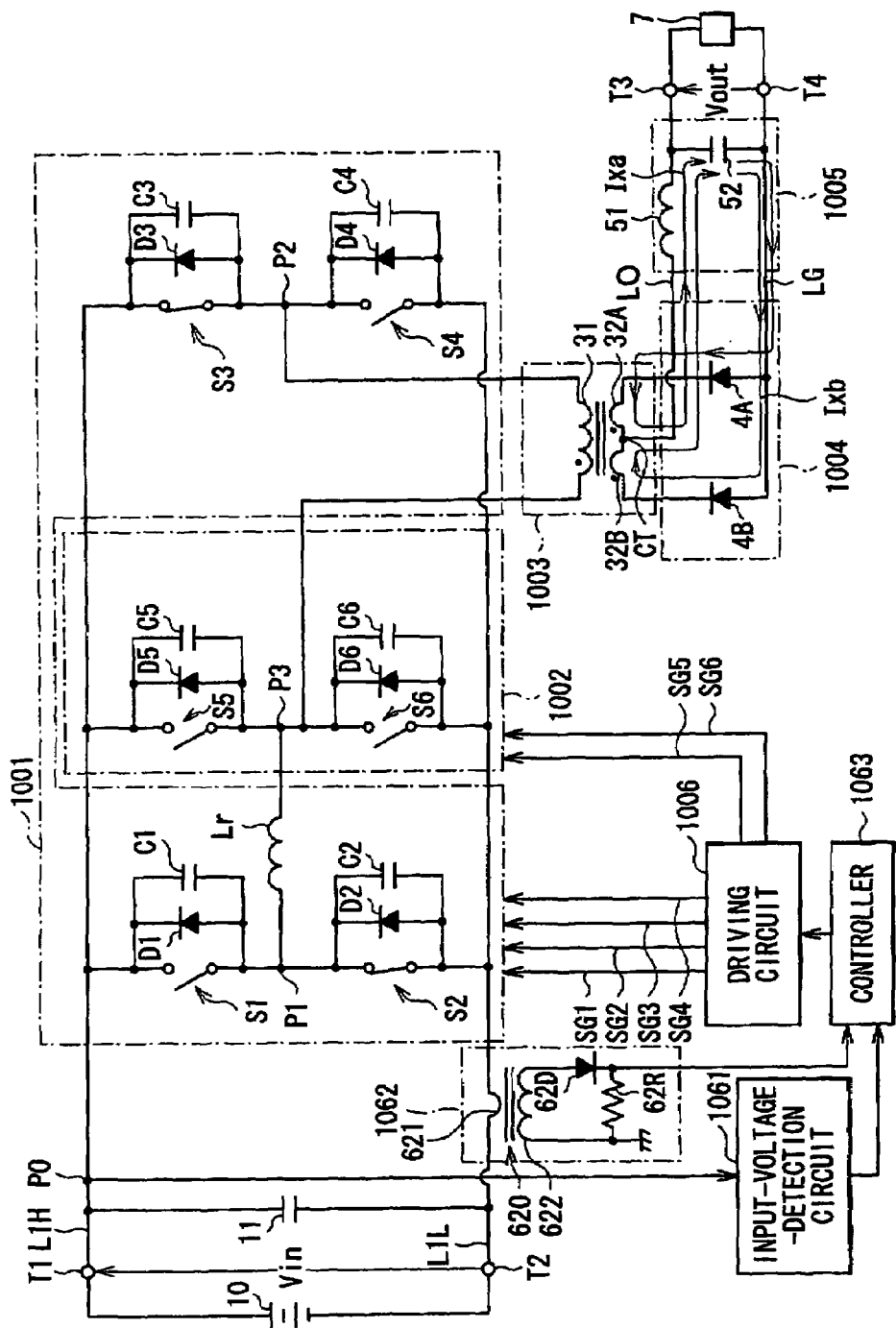
FIG. 41 is a circuit diagram illustrating operations of the switching power supply unit subsequent to FIG. 40.
Figure 42:
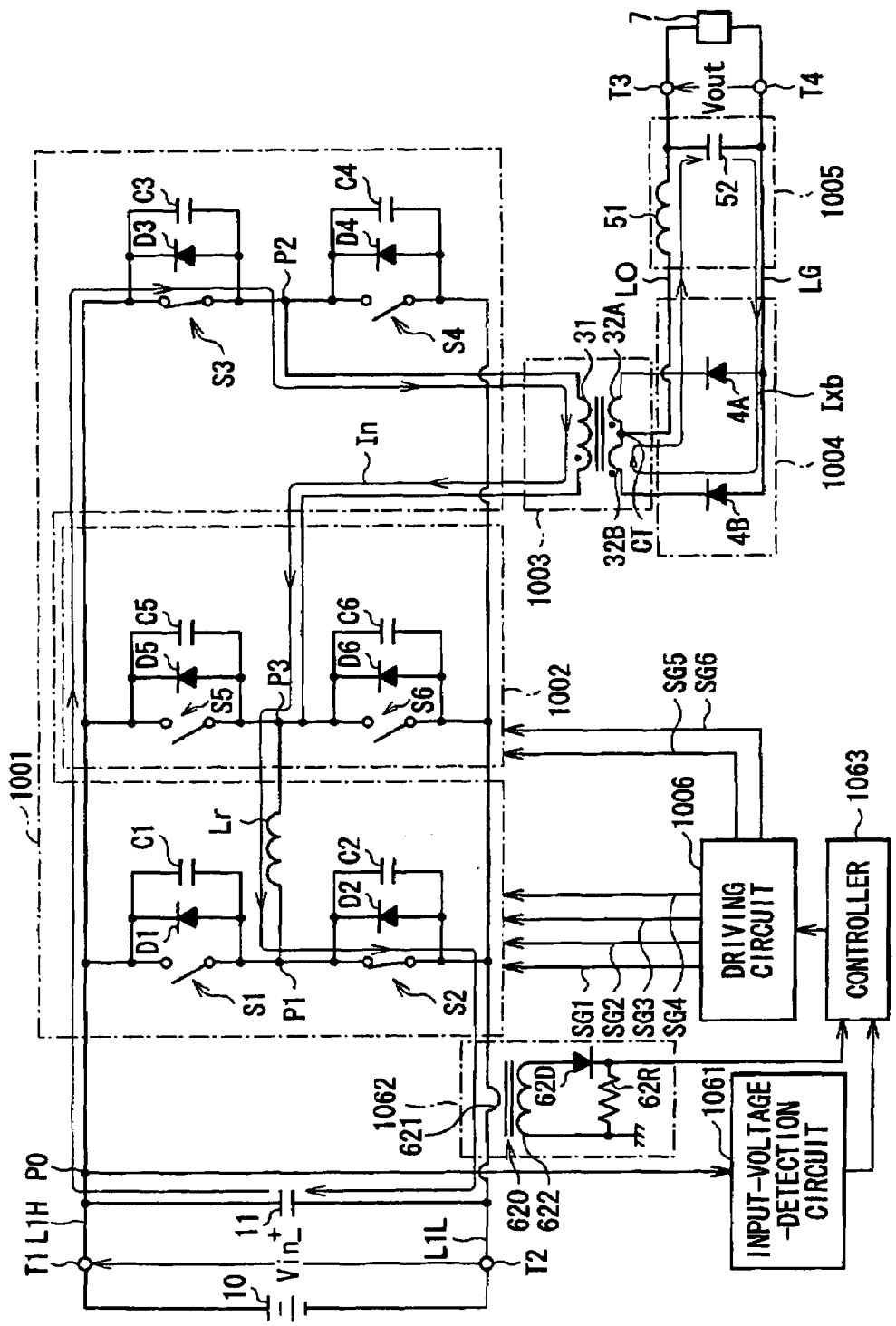
FIG. 42 is a circuit diagram illustrating operations of the switching power supply unit subsequent to FIG. 41.

As shown in FIG. 41, at time t7, all of the energy accumulated in the inductor Lr is regenerated. Each of the current Ir flowing in the inductor Lr and the current I31 flowing in the primary winding 31 of the transformer 1003 becomes equal to 0 A ((L) and (M) in FIG. 33). The current I4A flowing in the diode 4A becomes equal to the current I4B flowing in the diode 4B ((Q) and (S) in FIG. 33). From the time t7, the inductor Lr accumulates energy in the direction opposite to the accumulation direction until then. The loop current In in the opposite direction flows in the inductor Lr and the primary winding 31 of the transformer 1003 as shown in FIG. 42, and the current Ir increases at the rate of Vin/L (L: inductance of the inductor Lr) ((L) and (M) in FIG. 33). Consequently, the current I51 is branched to the loop current Ixa flowing in the diode 4A and the loop current Ixb flowing in the diode 4B so that the ampere turns in the transformer 1003 become equal to each other and the sum of currents flowing in the secondary windings 32A and 32B in the transformer 1003 becomes equal to the current I51 flowing in the choke coil 51. The current I4A flowing in the diode 4A gradually decreases and, on the other hand, the current I4B flowing in the diode 4B gradually increases ((Q) and (S) in FIG. 33). When the current I4A becomes equal to 0 A and the current flowing in the secondary winding 32B in the transformer 1003 becomes equal to the current I51 flowing in the chock coil 51, since the ampere turns in the transformer 1003 do not increase any more, increase in the current I31 is disturbed. However, the capacitors C5 and C6 in the surge voltage suppressing circuit 1002 and the inductor Lr cooperate with one another to construct the LC series resonance circuit (second resonance circuit), and second resonance operation starts. This timing corresponds to time t8.

Figure 43:
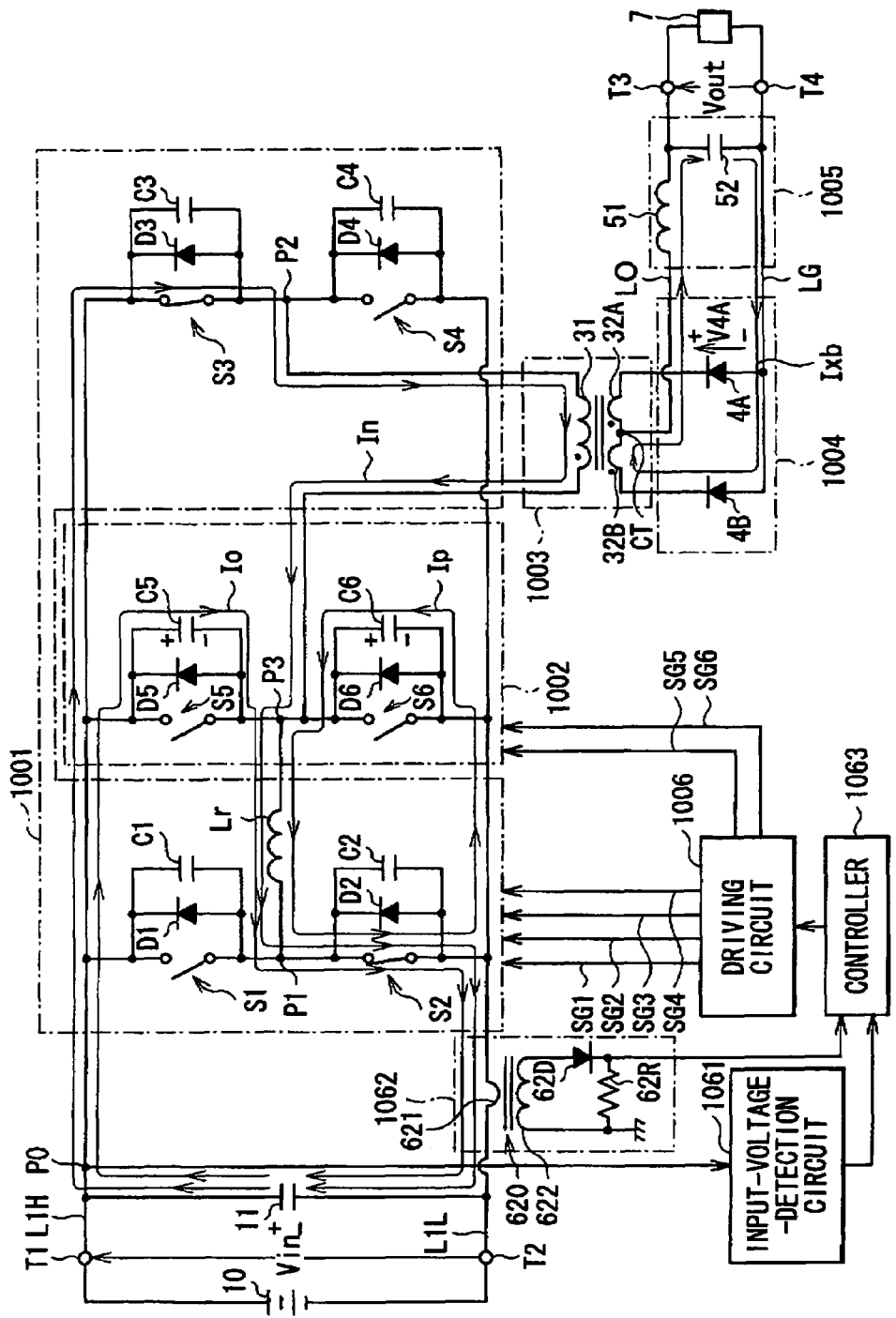
FIG. 43 is a circuit diagram illustrating operations of the switching power supply unit subsequent to FIG. 42.

In the period from time t8 to time t9 shown in FIG. 43, the loop currents Io and Ip flow by the second resonance operation. Therefore, the capacitor C6 is discharged and, on the other had, the capacitor C5 is charged. In association with the second resonance operation, the potential VP3 at the connection point P3 decreases gently ((I) in FIG. 33). Accordingly, the absolute value of the voltage V31 across the primary winding 31 of the transformer 1003 increases, and the voltages V32A and V32B are generated in the secondary windings 32A and 32B, respectively. The relations are satisfied such that V32A=V32B=V31/n (n: turn ratio between the primary winding and the secondary winding of the transformer 1003), "the potential of the cathode in the diode 4B"<"the potential at the center tap CT"<"the potential of the cathode in the diode 4A", "the current Ir flowing in the inductor Lr"="the current I31 flowing in the primary winding 31 in the transformer 1003"+"the current I5 flowing in the parallel connection part between the diode D5 and the capacitor C5"+"the current I6 flowing in the parallel connection part between the diode D6 and the capacitor C6". The timing when VP3 decreases gently and becomes 0V and $V_{P3-P2}$=−Vin ((I) and (K) in FIG. 33) corresponds to time t9.

In the switching power supply unit of the second embodiment, in the period from time t8 to time t9, resonance time of the second resonance circuit and the recovery time of the diodes 4A and 4B are set so as to satisfy the conditional expression (3), so that generation of the recovery current in the diodes 4A and 4B is suppressed. Therefore, the first resonance operation performed by the capacitors C5 and C6 and the inductor Lr is to be continued. However, since VP3 is equal to 0V ((G) in FIG. 33), the voltage across the capacitor C6 and the diode D6 becomes 0V. The current IC6 flowing in the capacitor C6 becomes 0 A and the diode D6 is made conductive.

Figure 44:
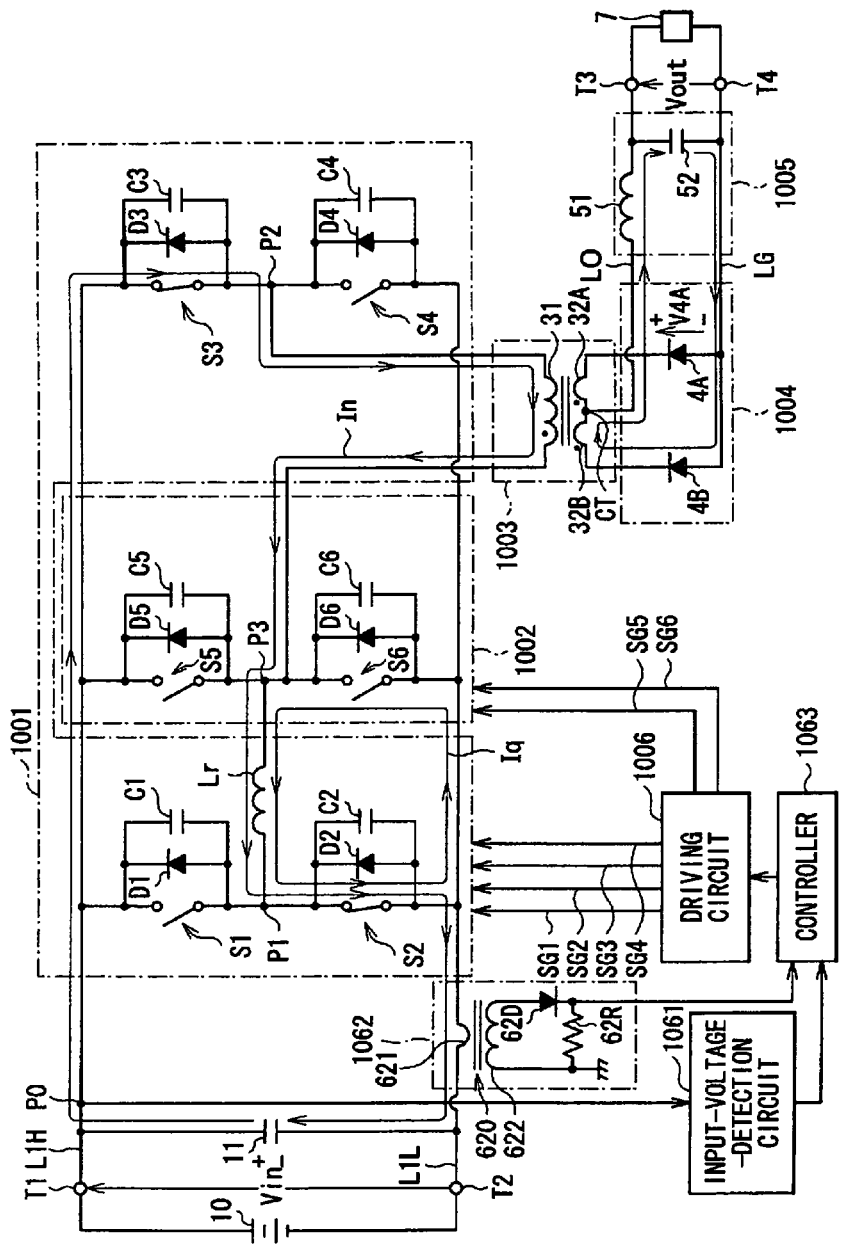
FIG. 44 is a circuit diagram illustrating operations of the switching power supply unit subsequent to FIG. 43.
Figure 45:
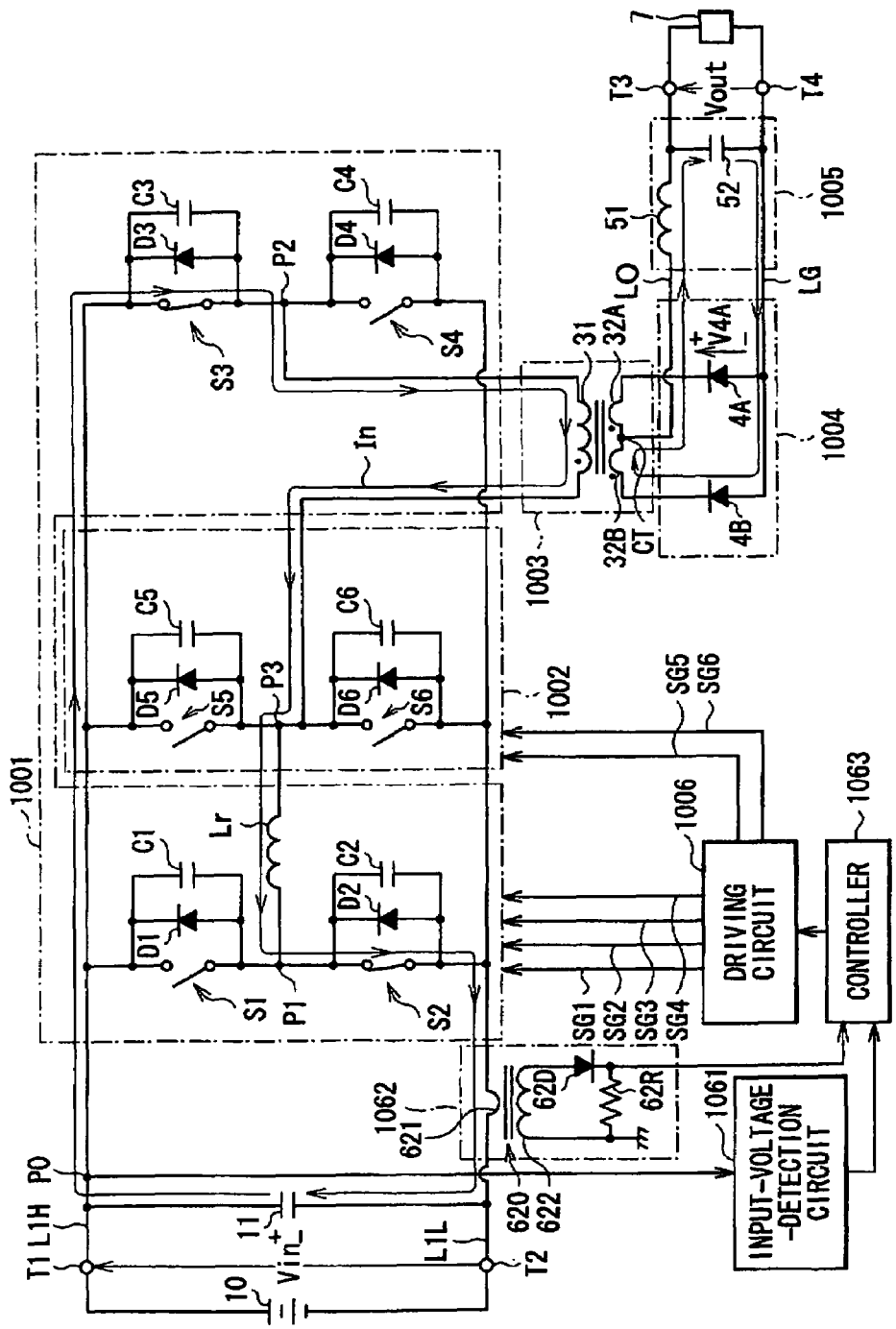
FIG. 45 is a circuit diagram illustrating operations of the switching power supply unit subsequent to FIG. 44.

In the period from time t9 to time t10 shown in FIG. 44, the diode D6 is conductive and the switching element S3 is in the on state ((C) in FIG. 33). Consequently, the voltage in the on state ((C) in FIG. 33). Consequently, the voltage V31 across the primary winding 31 of the transformer 1003 (and the absolute value of $V_{P3-P2}$ ((K) in FIG. 33) is clamped at Vin so that the voltage V32B across the secondary winding 32B of the transformer 1003 is clamped at Vin/n (n: the turn ratio between the primary winding and the secondary winding of the transformer 1003). Since the rectifier circuit 1004 is of the center tap type, the reverse voltage V4A applied to the diode 4A does not exceed 2×Vin/n ((P) in FIG. 33). In other words, the reverse voltage V4A applied to the diode 4A is 2×Vin/n at the maximum, so that rise in the surge voltage is suppressed.

In the period from time t9 to time t10, the diode D6 is conductive as described above, so that "the current Ir flowing in the inductor Lr"="the current I31 flowing in the primary winding 31 of the transformer 1003"+"the current ID6 flowing in the diode D6". The resonance current generated by the second resonance operation is expressed by the loop current Iq as shown in FIG. 44 and, on the other hand, Ir becomes constant ((L) in FIG. 33). As the choke coil 51 is excited by the voltage V32B across the secondary winding 32B of the transformer 1003, the current I51 flowing in the chock coil 51 increases. Since I31="the current I32A flowing in the secondary winding 32A"+"the current I32B flowing in the secondary winding 32B"=I32B=I51, I31 also increases ((M) in FIG. 33). Further, since "Ir=I31+ID6" and Ir is constant, as I31 increases, ID6 decreases. The timing when the relation of ID6=I6=0V is satisfied ((P) in FIG. 33) corresponds to time t10 shown in FIG. 45. The operations in the first half cycle have been described above.

Referring now to FIG. 46, operations in a half cycle (times t10 to t20 (t0)) after the times t0 to t10 shown in FIG. 33 will be described.

The operations in the half cycle are basically similar to those in the half cycle described with reference to FIGS. 33 to 45. Specifically, in the period from time t10 to time t11, the switching elements S2 and S3 are in the on state ((B) and (C) in FIG. 46), and the switching elements S1 and S4 are in the off state ((A) and (D) in FIG. 46). On the other hand, the switching elements S5 and S6 are in the off state in the whole period from time t10 to time t20 (t0) ((E) and (F) in FIG. 46). The potential VP1 at the connection point P1 is equal to 0V ((G) in FIG. 46), the potential VP2 at the connection point P2 is equal to Vin ((H) in FIG. 46), and the inductance of the inductor Lr is much smaller than that of the primary winding 31 of the transformer 1003. Thus, the potential VP3 at the connection point P3 becomes almost 0V ((I) in FIG. 46), and the potential difference $V_{P3-P2}$ between the connection points P3 and P2 when VP2 is used as reference is almost equal to 0V ((K) in FIG. 46). Therefore, the loop current flows in the bridge circuit 1001, the inductor Lr is excited, and power is transmitted from the primary side to the secondary side in the transformer 1003. Thus, the loop current flows to the secondary side of the transformer 1003 via the diode 4B and the choke coil 51, and the load 7 is driven. In the period, the forward voltage is applied to the diode 4B, and the reverse voltage V4B is equal to 0V ((R) in FIG. 46). On the other hand, the reverse voltage V4A is applied to the diode 4A ((P) in FIG. 46).

In the period from time t11 to time t12, the switching element S3 is turned off at the time t11 ((C) in FIG. 46). The capacitors C3 and C4 and the inductor Lr cooperate with one another to construct the LC series resonance circuit (first resonance circuit), and the first resonance operation is performed. Therefore, by the two loop currents, the capacitor C3 is charged and, on the other hand, the capacitor C4 is discharged. Thus, the potential VP2 at the connection point P2 gradually decreases and becomes equal to 0V (VP2=0V) at the time t12 ((H) in FIG. 46). At this time, the reverse voltage V4A of the diodes 4A decreases gradually and becomes 0V at the time t12 ((P) in FIG. 46).

When VP2 becomes 0V at the time t12 ((H) in FIG. 46), the diode D4 is made conductive. When VP2 becomes 0V, the diode D4 is made conductive and, after that, the switching element S4 is turned on at the time t13 ((D) in FIG. 46), the ZVS operation is performed. As a result, a short-circuit loss in the switching element S4 is suppressed, and the efficiency of the unit improves.

In the period from time t12 to time t14, as described above, energy accumulated in the inductor Lr by being excited in the period from time t10 to time t11 circulates as currents in the circuits connected to both ends of the inductor Lr, and the current is branched to two loop currents. Consequently, the absolute value of the current I31 flowing in the primary winding 31 in the transformer 1003 decreases ((M) in FIG. 46). The current I51 flowing in the choke coil 51 is branched to the loop current Ixa flowing in the diode 4A and the loop current Ixb flowing in the diode 4B so that the ampere turns in the transformer 1003 become equal to each other and the sum of the currents flowing in the secondary windings 32A and 32B in the transformer 1003 becomes equal to the current I51.

At the time t14, the switching element S2 is turned off ((B) in FIG. 46). The LC series resonance circuit (first resonance circuit) is constructed by cooperation of the capacitors C1 and C2 and the inductor Lr, and first resonance operation is performed. Therefore, four loop currents flow, the capacitor C2 is charged and, on the other hand, the capacitor C1 is discharged. Consequently, the potential VP1 at the connection point P1 gradually increases and becomes equal to Vin at the time t15 ((G) in FIG. 46).

When VP1 becomes Vin at the time t15 ((G) in FIG. 46), since VP3=0V ((I) in FIG. 46) and $V_{P1-P3}$=Vin ((J) in FIG. 46), the diode D1 is made conductive. When VP1 becomes Vin, the diode D1 is made conductive and, after that, the switching element S1 is turned on at the time t16 ((A) in FIG. 46), the ZVS operation is performed. As a result, a short-circuit loss in the switching element S1 is suppressed, and the efficiency of the unit improves.

In the period from time t16 to time t17, the energy accumulated in the inductor Lr is regenerated in the input smoothing capacitor 11 by the two loop currents also after charging/discharging in the capacitors C1 and C2 is completed. As the energy is regenerated to the input smoothing capacitor 11, the energy accumulated in the inductor Lr decreases. In association with the decrease, the absolute value of the current Ir flowing in the inductor Lr and the absolute value of the current I31 flowing in the primary winding 31 of the transformer 1003 also decrease ((L) and (M) in FIG. 46). Therefore, the current I51 flowing in the choke coil 51 is branched to the loop current Ixa flowing in the diode 4A and the loop current Ixb flowing in the diode 4B so that the ampere turns in the transformer 1003 become equal to each other and the sum of currents flowing in the secondary windings 32A and 32B in the transformer 1003 becomes equal to the current I51. In this period, since the diode D6 is nonconductive, the absolute value of the current Ir flowing in the inductor Lr and that of the current I31 flowing in the primary winding 31 in the transformer 1003 become equal to each other ((L) and (M) in FIG. 46).

At time t17, all of the energy accumulated in the inductor Lr is regenerated. Each of the current Ir flowing in the inductor Lr and the current I31 flowing in the primary winding 31 of the transformer 1003 is equal to 0 A ((L) and (M) in FIG. 46). The current I4A flowing in the diode 4A is equal to the current I4B flowing in the diode 4B ((Q) and (S) in FIG. 46). From the time t17, the inductor Lr accumulates energy in the direction opposite to the accumulation direction until then. The loop current in the opposite direction flows in the inductor Lr and the primary winding 31 of the transformer 1003, and the current Ir increases at the rate of Vin/L (L: inductance of the inductor Lr) ((L) and (M) in FIG. 46). Consequently, the current I51 flowing in the choke coil 51 is branched to the loop current Ixa flowing in the diode 4A and the loop current Ixb flowing in the diode 4B so that the ampere turns in the transformer 1003 become equal to each other and the sum of currents flowing in the secondary windings 32A and 32B in the transformer 1003 becomes equal to the current I51 flowing in the choke coil 51. The current I4B flowing in the diode 4B gradually decreases and, on the other hand, the current I4A flowing in the diode 4A gradually increases ((Q) and (S) in FIG. 46). When the current I4B becomes equal to 0 A and the current flowing in the secondary winding 32A in the transformer 1003 becomes equal to the current I51 flowing in the chock coil 51, since the ampere turns in the transformer 1003 do not increase any more, increase in the current I31 is disturbed. However, the capacitors C5 and C6 in the surge voltage suppressing circuit 1002 and the inductor Lr cooperate with one another to construct the LC series resonance circuit (second resonance circuit), and second resonance operation starts. This timing corresponds to time t18.

In the period from time t18 to time t19, the two loop currents flow by the second resonance operation, the capacitor C6 is charged and, on the other had, the capacitor C5 is discharged. In association with the second resonance operation, the potential VP3 at the connection point P3 increases gently ((I) in FIG. 46). Accordingly, the voltage V31 across the primary winding 31 of the transformer 1003 increases, and the voltages V32A and V32B are generated also in the secondary windings 32A and 32B, respectively. The timing when VP3 increasing gently becomes Vin and $V_{P3-P2}$ becomes equal to Vin ((I) and (K) in FIG. 46) corresponds to time t19.

In the switching power supply unit of the embodiment, in the period from time t18 to time t19, resonance time of the second resonance circuit and the recovery time of the diodes 4A and 4B are set so as to satisfy the conditional expression (3), so that generation of the recovery current in the diodes 4A and 4B is suppressed. Therefore, the second resonance operation performed by the capacitors C5 and C6 and the inductor Lr is to be continued. However, since VP3 is equal to Vin ((G) in FIG. 46), the voltage across the capacitor C5 and the diode D5 becomes 0V. The current IC5 flowing in the capacitor C5 becomes 0 A and the diode D5 is made conductive.

In the period from time t19 to time t20, therefore, the diode D5 is conductive and the switching element S4 is in the on state ((D) in FIG. 46). Consequently, the voltage V31 across the primary winding 31 of the transformer 1003 (and the absolute value of $V_{P3-P2}$ ((K) in FIG. 46)) is clamped at Vin so that the voltage V32A across the secondary winding 32A of the transformer 1003 is clamped at Vin/n (n: the turn ratio between the primary winding and the secondary winding of the transformer 1003). Since the rectifier circuit 1004 is of the center tap type, the reverse voltage V4B applied to the diode 4B does not exceed 2×Vin/n ((R) in FIG. 46). In other words, the reverse voltage V4B applied to the diode 4B is 2×Vin/n at the maximum, so that rise in the surge voltage is suppressed.

In the period from time t19 to time t20, the diode D5 is conductive as described above, so that Ir is constant ((L) in FIG. 46). As the choke coil 51 is excited by the voltage V32A across the secondary winding 32A of the transformer 1003, the current I51 flowing in the chock coil 51 increases and I31 also increases ((M) in FIG. 46). Since Ir is equal to I31+ID5 and Ir is constant, as I31 increases, ID5 decreases. The timing when the relation of ID5=I5 =0V is satisfied ((N) in FIG. 46) corresponds to time t20. The operations in the latter half cycle have been described above and a state equivalent to that at the time t0 in FIG. 33 is obtained.

Figure 47:
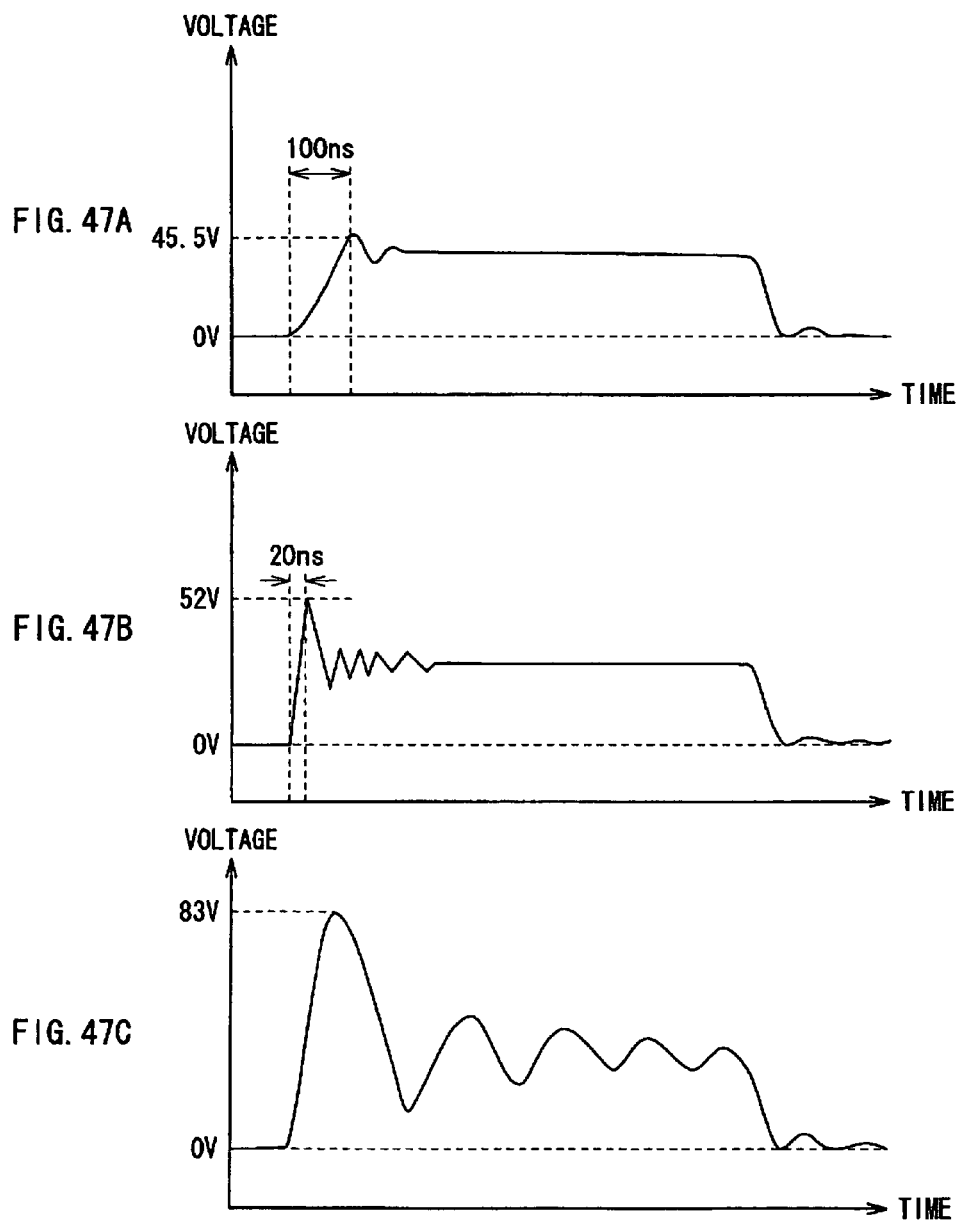
FIGS. 47A, 47B, and 47C are timing waveform charts for comparing operations of switching power supply units of FIG. 29 and comparative examples 3 and 4.
Figure 48:
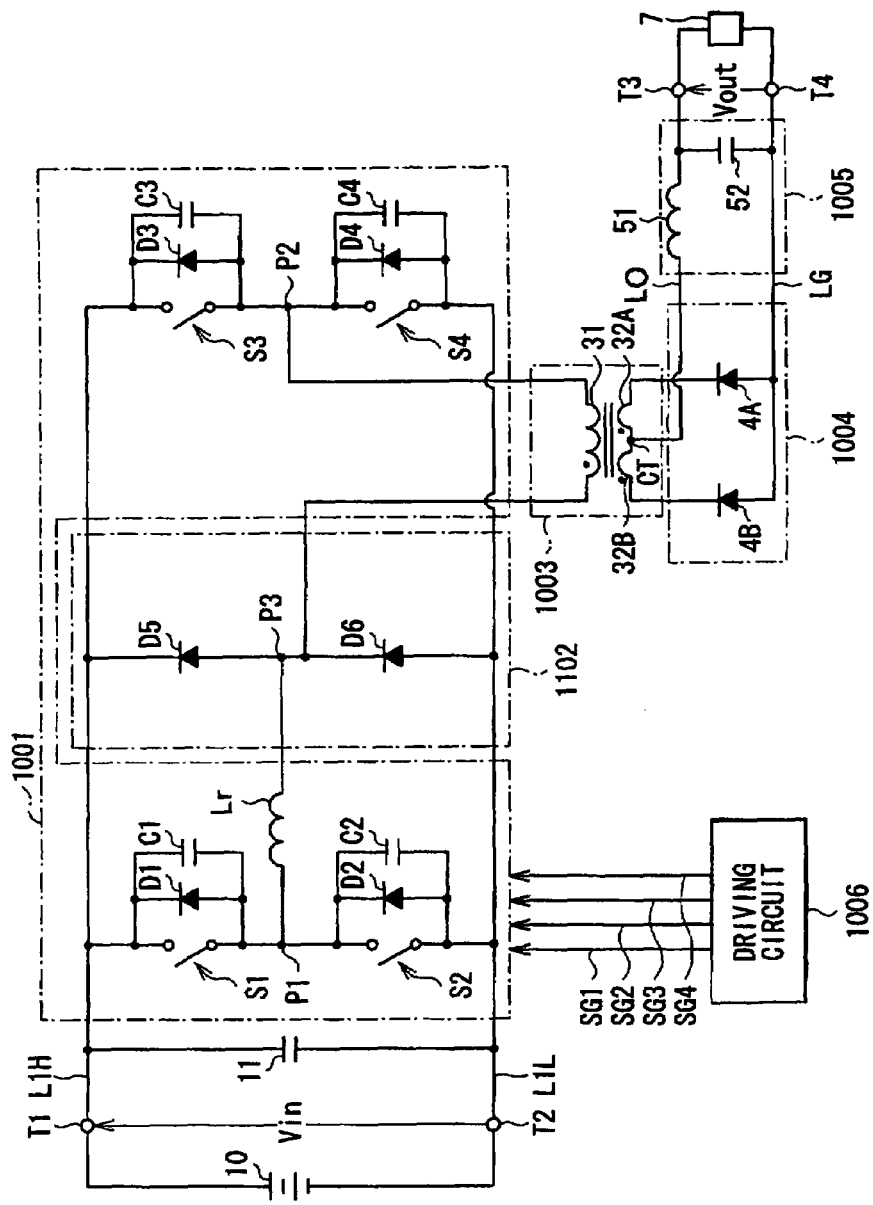
FIG. 48 is a circuit diagram showing the configuration of a switching power supply unit according to the comparative example 3.
Figure 49:
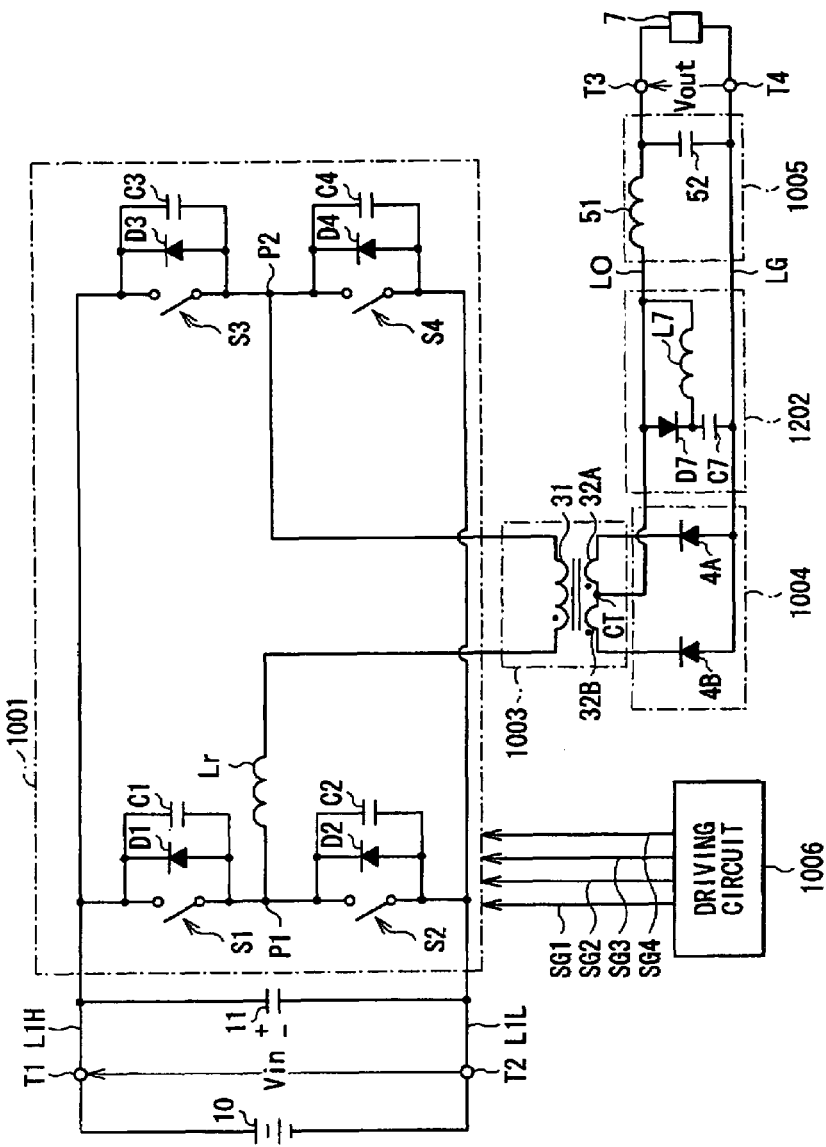
FIG. 49 is a circuit diagram showing the configuration of a switching power supply unit according to the comparative example 4.

Next, by referring to FIGS. 47 to 49, the waveform of a surge voltage applied to the diodes in the switching power supply unit of the second embodiment and the waveform of a surge voltage applied to diodes in conventional switching power supply units (comparative examples 3 and 4) will be described while comparing them.

FIGS. 47A to 47C show timing waveforms of reverse voltages applied to the diodes in the switching power supply units of the second embodiment and the comparative examples 3 and 4. FIGS. 48 and 49 show the configurations of the switching power supply units of the comparative examples 3 and 4, respectively. Concretely, in the comparative example 3, in place of the surge voltage suppressing circuit 1002 of the second embodiment, a surge voltage suppressing circuit 1102 obtained by eliminating the capacitors C5 and C6 from the surge voltage suppressing circuit 1002 is provided. In the comparative example 4, a snubber circuit 1202 for suppressing surge voltage constructed by the inductor L7, the capacitor C7, and the diode D7 is provided on the secondary side of the transformer 1003 in place of the surge voltage suppressing circuit 1002. In the snubber circuit 1202, concretely, one end of the inductor L7 is connected between the choke coil 51 and the center tap CT on the output line LO, and the other end is connected to the cathode of the diode D7 and one end of the capacitor C7. The anode of the diode D7 is connected between the choke coil 51 and the center tap CT on the output line LO, and the other end of the capacitor C5 is connected to the ground line LG. The reverse voltage waveforms shown in FIGS. 47A to 47C are voltage waveforms at the center tap CT on the secondary side of the transformer 1003, and a reverse voltage actually applied to the diodes 4A and 4B is a value which is twice as large as that shown in FIGS. 47A to 47C.

In the reverse voltage waveform in the comparative example 4 shown in FIG. 47C, the maximum value (peak value) of the surge voltage is 83V. This is a result of suppressing the surge voltage to some extent by the snubber circuit 1202 and corresponds to about twice (2.02 times) as large as the DC input voltage Vin/n (n: the turn ratio between the primary winding and the secondary winding of the transformer 1003). On the other hand, in the reverse voltage waveform in the comparative example 3 shown in FIG. 47B, the maximum value of the surge voltage is 52V and corresponds to 1.26 times as large as Vin/n. In the reverse voltage waveform of the comparative example 3, the rise time to the maximum value is about 20 ns. It is understood that the reverse voltage rises abruptly due to the configuration that no capacitor is included in the surge voltage suppressing circuit 1102.

In contrast, in the reverse voltage waveform of the second embodiment shown in FIG. 47A, since the capacitors C5 and C6 are included in the surge voltage suppressing circuit 1002 and the resonance time of the second resonance circuit constructed by the capacitors C5 and C6 and the inductor Lr and the recovery time of the diodes 4A and 4B are set so as to satisfy the conditional expression (3), as described above, it is understood that generation of the recovery currents in the diodes 4A and 4B is suppressed and the reverse voltage rises gently by the resonance operation of the second resonance circuit. Concretely, the maximum value of the surge voltage is 45.5V and corresponds to about the same (1.08 times) as Vin/n, and the rise time to the maximum value is about 100 ns. It is understood that the rise of the reverse voltage is gentler than that in the comparative examples 3 and 4 shown in FIGS. 47B and 47C and, as a result, rise of the surge voltage is suppressed more effectively.

As described above, in the case where the bridge circuit 1001 (first bridge circuit) selectively performs switching operation, the capacitors C1 to C4 in the bridge circuit 1001 and the inductor Lr cooperate with one another to function as an LC series resonance circuit (first resonance circuit), thereby suppressing a short-circuit loss in the switching elements S1 to S4 and improving the efficiency of the unit. The capacitors C5 and C6 in the surge voltage suppressing circuit 1002 and the inductor Ir cooperate and function as an LC series resonance circuit (second resonance circuit). By this function and, in addition, the action of the surge voltage suppressing circuit 1002, rise of a reverse voltage applied to the diodes 4A and 4B in the rectifier circuit 1004 becomes gentle.

Operations by Second Bridge Circuit

Figure 52:
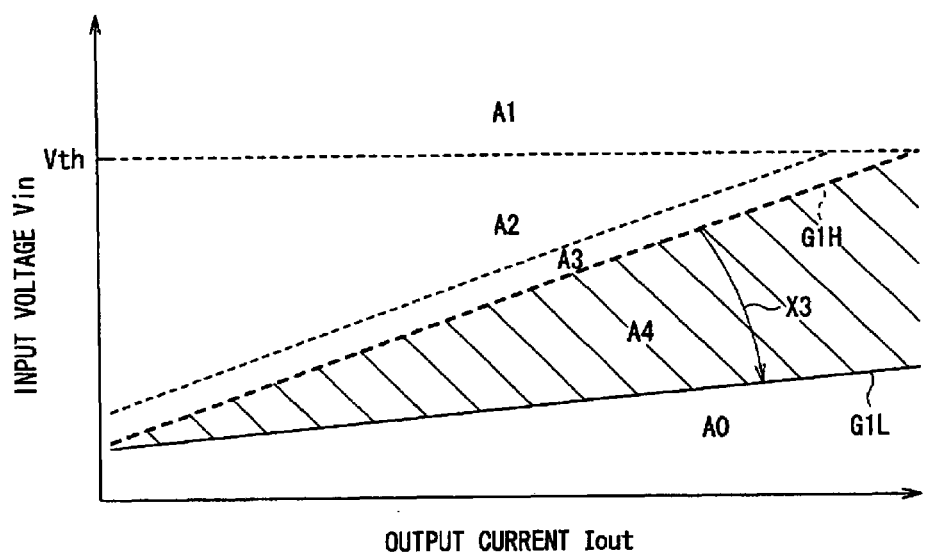
FIG. 52 is a characteristic diagram illustrating changes of an input voltage range in the case of selectively operating the second bridge circuit.

Referring now to FIGS. 50 to 52, circuit operations in the case where the second bridge circuit selectively performs switching operation will be described in detail.

FIGS. 50 and 51 are timing waveform charts (times t0 to t10 and times t10 to t20 (t0)) of voltage waveforms and current waveforms in the case where the second bridge circuit selectively performs switching operation. (A) to (F) in the diagram show voltage waveforms of the drive signals SG1 to SG6, respectively.

First, in the case where the second bridge circuit selectively performs the switching operation, as described above, the switching elements S1 and S2 are set in the off state in the whole period by the controller 1063 ((A) and (B) in FIGS. 50 and 51). Instead, the switching elements S5 and S6 constructing the second bridge circuit perform on/off operations similar to those performed by the switching elements S1 and S2 in the case where the first bridge circuit shown in FIGS. 33 and 46 selectively performs the switching operation ((E) and (F) in FIGS. 50 and 51). The switching elements S3 and S4 perform the on/off operations in a manner similar to the case where the first bridge circuit shown in FIGS. 33 and 46 selectively performs the switching operation.

In the case where the operations of the switching elements S1 to S6 are set as described above, as understood from FIGS. 50 and 51, a switching operation according to a general phase shift method is performed by the switching elements S3 to S6 constructing the second bridge circuit. By the switching operation, an input AC voltage is generated from the DC input voltage Vin. Consequently, a voltage is hardly applied across the inductor Lr for resonance. The inductor Lr is bypassed, and its inductance component is not seen. In other words, in the case where the two bridge circuit is selectively allowed to perform the switching operation, the inductance component in the current loop becomes almost zero.

The maximum duty D(max) of a switching element in the switching power supply unit is calculated by the following expression (6). In the expression (6), parasitic capacitance C, the turn ratio "n", and the DC input voltages Vin, Tr, and Tf are fixed values. The output current Iout is also fixed at the maximum output current value. It is consequently understood that the maximum duty D(max) is a function of the inductance component L in the inductor Lr for resonance. It is also understood that when the inductance component L decreases, the maximum duty D(Max) increases. Therefore, in the case where the second bridge circuit is selectively allowed to perform the switching operation, the inductance component L in the current loop becomes almost zero. Consequently, by the expression (6), the maximum duty D(max) of the switching element increases, and time for transferring power to the DC output voltage Vout increases.

$$D(\max) = 1 - \{(\text{dead time due to the resonance operation}) + (\text{dead time due to the switching element})\}$$
$$= 1 - [\{2\pi \times (L \times C \times 2)^{1/2} + L \times I\text{out}/n/V\text{in}\} + (Tr + Tf)] \quad (6)$$

L denotes an inductance component in the inductor Lr for resonance, C denotes parasitic capacitance of the switching elements S3 to S6 (capacitance of the capacitors C3 to C6), Iout denotes output current, n indicates turn ratio between the primary winding 31 and the secondary windings 32A and 32B in the transformer 1003, Vin indicates a DC input voltage, Tr indicates rise time of the switching elements S3 to S6, and Tf is fall time of the switching elements S3 to S6.

Therefore, for example, as shown by the arrow X3 in FIG. 52, the lower limit value of the input voltage range in which the predetermined output voltage Vout can be maintained decreases from graph G1H to graph G1L. The input voltage range is widened only by the amount of the area A4 in the diagram.

In the case where the second bridge circuit is selectively allowed to perform the switching operation as described above, the input AC voltage is generated from the DC input voltage Vin by the switching operation of the second bridge circuit. Consequently, the inductor Lr for resonance is bypassed, and the inductance component L is not considered. Therefore, the input voltage range in which the predetermined output voltage Vout can be maintained becomes wider than before.

In the case of selectively allowing the second bridge circuit to perform the switching operation as described above, the switching elements S5 and S6 in the surge voltage suppressing circuit 1002 are on/off operated. Therefore, different from the case where the bridge circuit 1001 (first bridge circuit) is selectively allowed to perform the switching operation, the rise of the reverse voltage applied to the diodes 4A and 4B in the rectifier circuit 1004 cannot be made gentle. However, for example, as shown in FIG. 30, in the case where the second bridge circuit is selectively allowed to perform the switching operation (area A3 (A0)), as compared with the case where the first bridge circuit is selectively allowed to perform the switching operation (areas A1 and A2), the DC input voltage Vin is lower. Therefore, the reverse voltage applied to the diodes 4A and 4B is originally low, even if the operation of suppressing the surge voltage is not performed, there is no problem.

In this case, the inductance component L in the current loop is almost zero. Consequently, different from the case where the bridge circuit 1001 (first bridge circuit) is selectively allowed to perform the switching operation, a switching loss in the switching elements S3 to S6 can be hardly suppressed by the resonance operation of the first resonance circuit. However, in this case as well, as compared with the case where the first bridge circuit is selectively allowed to perform the switching operation, the DC input voltage Vin is lower and the output current Iout is larger. The ZVS operation is easily performed, so that no problem arises.

As described above, in the second embodiment, three device sets (a group of the first to third device sets) are disposed in parallel between a pair of input terminals T1 and T2 to which the DC input voltage Vin is supplied. Thus, a plurality of kinds of bridge circuits (the first and second bridge circuits) for generating the input AC voltage from the DC input voltage Vin can be used, and various methods can be used for conversion of a voltage from the input side to the output side.

Either the first or second bridge circuit is selectively allowed to perform the switching operation in accordance with at least one of the DC input voltage Vin and the output current Iout. Therefore, in the case of selectively making the former circuit operate, a short-circuit loss in the switching elements S1 to S3 is suppressed by the resonance operation of the first resonance circuit, the efficiency of the unit is improved, and the rise of the reverse voltage applied to the diodes 4A and 4B by the second resonance circuit and the surge voltage suppressing circuit 1002 can be made gentle. On the other hand, in the case of selectively making the latter circuit operate, by bypassing the inductor Lr for resonance, the input voltage range in which the predetermined output voltage can be maintained can be widened. Consequently, even in a situation such that the DC input voltage Vin or a load (output current Iout) fluctuates, overall performance of the unit can be improved.

By enabling the surge voltage to be suppressed, a loss in the rectifier element is reduced and the efficiency of the unit can be improved. In addition, by reducing a loss in the rectifier element, heat generation in the element can be also suppressed.

By suppressing rise in the surge voltage, a low-withstand-voltage rectifier element (diode) can be used, and the parts cost can be reduced.

Further, since the surge voltage can be suppressed without depending on the unit configuration, the flexibility in the unit designing can be improved.

Further, in the case where the second bridge circuit is selectively allowed to perform the switching operation as described above, the input voltage range in which the predetermined output voltage can be maintained can be widened. For example, in the case where the input side is a high-voltage battery as shown in FIG. 29, by making a setting so that discharge depth increases, a usable energy amount can be increased. For example, also in the case such that a generator is disposed on the input side and the switching power supply unit is mounted on a vehicle such as a hybrid car, a fluctuation range of the output voltage of the generator becomes often wider according to a use situation or the like. Therefore, because of the widened input voltage range of the switching power supply unit, the invention can also address such a case, and a stable output voltage can be maintained.

In the second embodiment, the case of setting the switching elements S1 and S2 to the off state as shown in FIGS. 50 and 51 at the time of selectively allowing the second bridge circuit to operate has been described. For example, as shown in FIGS. 53 and 54, the switching elements S1 and S2 may perform the on/off operations synchronously with the switching elements S5 and S6. With this configuration as well, effects similar to those of the embodiment can be obtained.

Figure 55A:
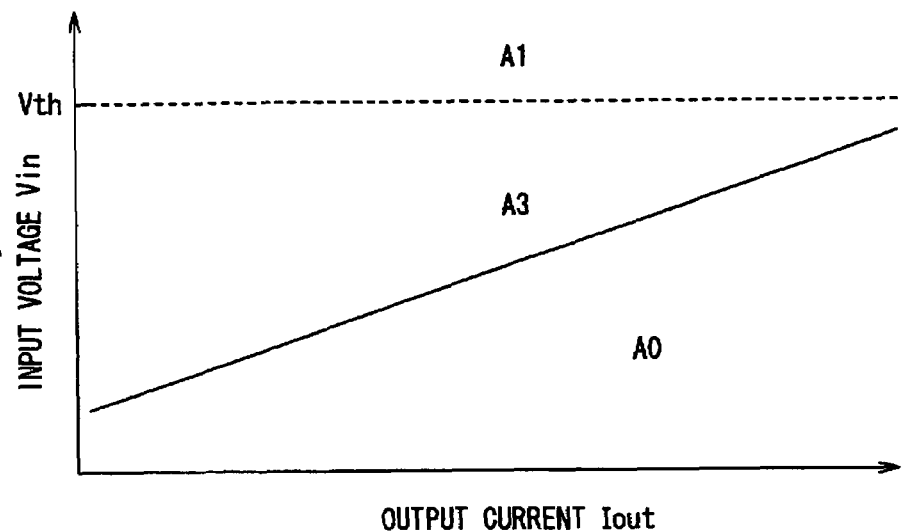
FIGS. 55A and 55B are characteristic diagrams illustrating the switching operation control according to a modification of the second embodiment.
Figure 55B:
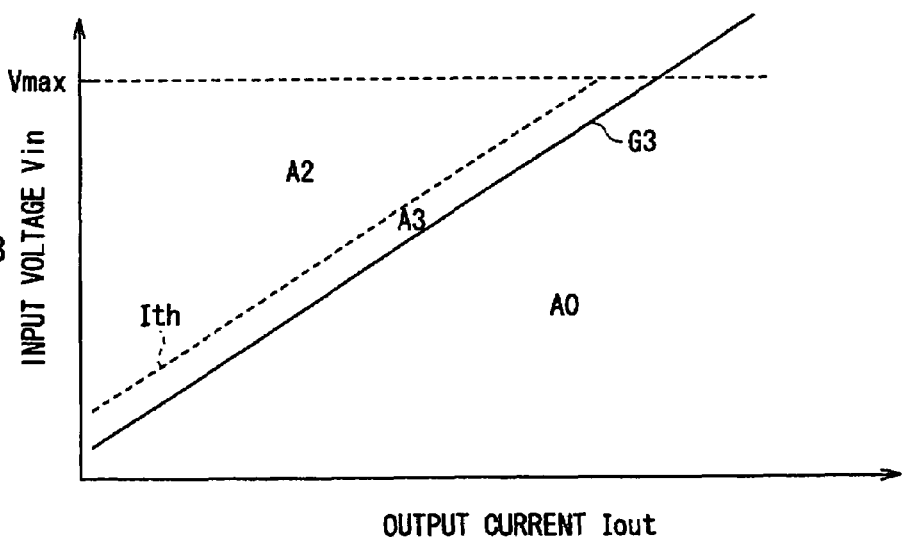

In the second embodiment, the case has been described in which the controller 1063 performs the operation control on the switching elements S1 to S6 in consideration of the detected output current Iout in addition to the detected DC input voltage Vin as shown in FIGS. 30 and 33. Alternatively, for example, the operation control may be performed based on only the detected DC input voltage Vin or only the detected output current Iout. To be concrete, in the case where the lower limit value of the input voltage range in the switching power supply unit is as shown by, for example, the graph G2 in FIG. 55A, the operation control on the switching elements S1 to S6 can be performed on the basis of only the detected DC input voltage Vin. In the case where the upper limit Vmax is set for the input voltage Vin to be used and the upper limit Vmax and the lower limit value as shown by, for example, the graph G3 in FIG. 55B cross each other, the operation control on the switching elements S1 to S6 can be performed on the basis of only the detected output current Iout. In the case of such a configuration, an operation control determination index is one parameter. Thus, in addition to the effects of the second embodiment, the operation control can be performed more easily.

It is preferable to set the resonance time of the second resonance circuit and the recovery time Trr4 of the diodes D5 and D6 in the surge voltage suppressing circuit 1002 so as to satisfy not only the conditional expression (3) described in the second embodiment but also the following conditional expression (4). C denotes a combined capacitance value in parallel connection of the capacitors C5 and C6 (C=(C5+C6)). In the case of such a configuration, the rise of reverse voltages applied not only to the diodes 4A and 4B but also to the diodes D5 and D6 becomes gentle, and rise in the surge voltage in the diodes D5 and D6 is also suppressed. Therefore, occurrence of ringing by the reverse voltage applied to the diodes D5 and D6 can be suppressed so that occurrence of noise can be also suppressed.

$$\frac{1}{4} \times \{2\pi \times (L \times C)^{1/2}\} > Trr4 \quad (4)$$

Alternatively, the conditional expression (3) described in the second embodiment may not be considered. In this configuration, depending on the unit configuration (for example, when parasitic inductance or parasitic capacitance of a wiring is large because the line on the secondary side of the transformer 1003 is long), the effect of making the rise of the reverse voltage applied to the diodes 4A and 4B gentle may be small. Yet, the surge voltage can be suppressed as compared with the conventional technique.

Figure 56:
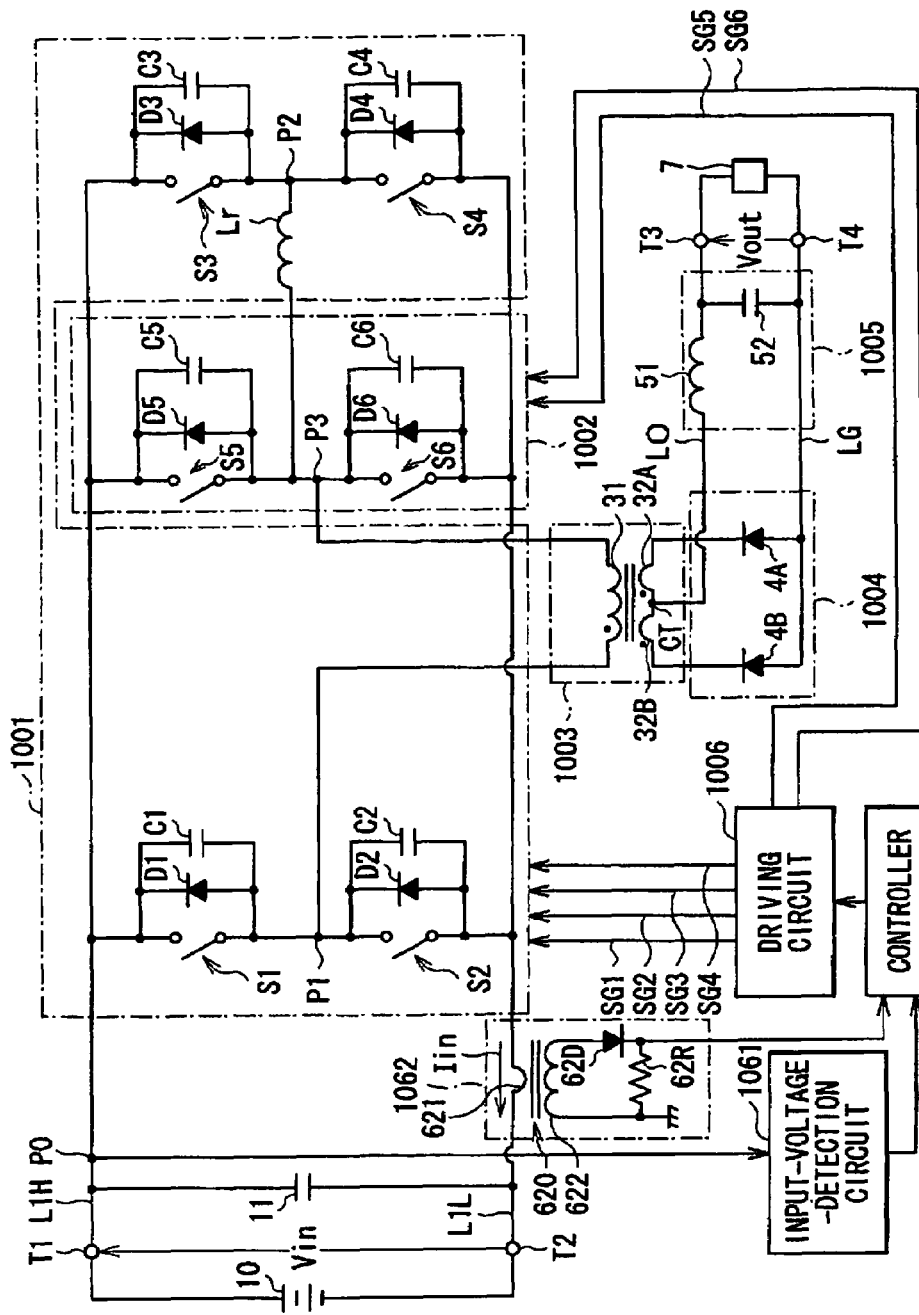
FIG. 56 is a circuit diagram showing the configuration of a switching power supply unit according to a modification of the second embodiment.

For example, as shown in FIG. 56, the inductor Lr, the transformer 1003, and the circuits on the secondary side of the transformer 1003 (the rectifier circuit 1004 and the smoothing circuit 5) in the switching power supply unit (FIG. 30) of the second embodiment can change their sides with respect to the surge voltage suppressing circuit 1002 as a center. To be concrete, the inductor Lr may be disposed between the connection points P2 and P3, and the transformer 1003 may be disposed between the connection points P1 and P3. Also in the case of the configuration, effects similar to those of the second embodiment can be obtained.

Figure 57:
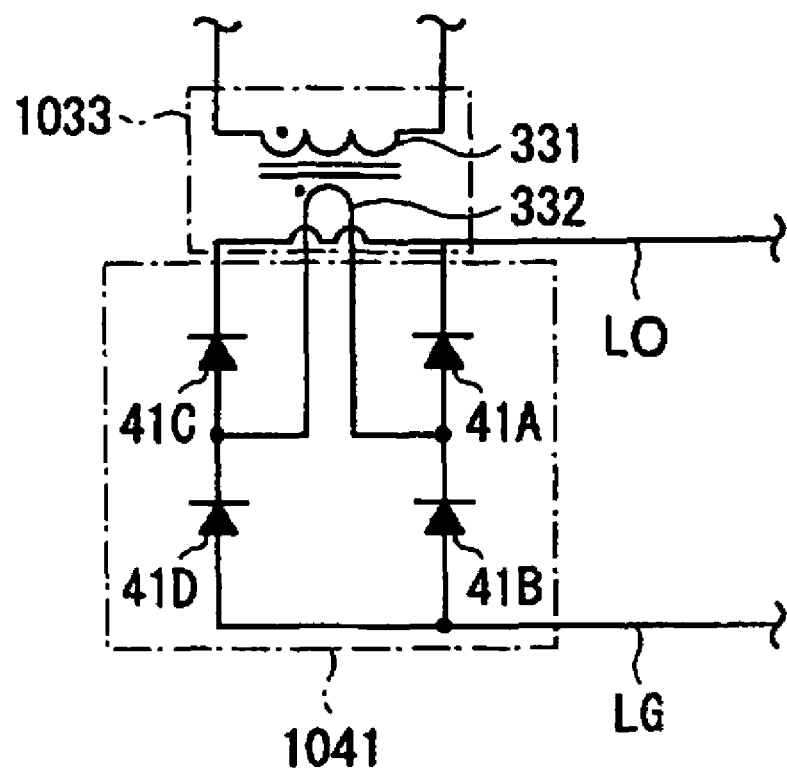
FIG. 57 is a circuit diagram showing the configuration of a switching power supply unit according to another modification of the second embodiment.

For example, as shown in FIG. 57, the rectifier circuit 1004 of the center tap type may be replaced with a rectifier circuit 1041 of the full bridge type. To be concrete, a transformer 1033 having the primary winding 331 and the secondary winding 332 is provided in placed of the transformer 1003 in FIG. 57, and the rectifier circuit 1041 of the full bridge type including four diodes 41A to 41D is provided on the secondary side of the transformer 1033. With the configuration, by the action similar to that of the second embodiment, the maximum value (peak value) of the surge voltage applied to the diodes 41A to 41D can be suppressed to 1×Vin/n (n: turn ratio between the primary winding and the secondary winding of the transformer 1003), which is lower than that in the conventional full-bridge type in which the maximum value is about 2×Vin/n. Like the diodes 4A and 4B, the diodes 41A to 41D can be also constructed by parasitic diodes of MOS-FETs.

Figure 58:
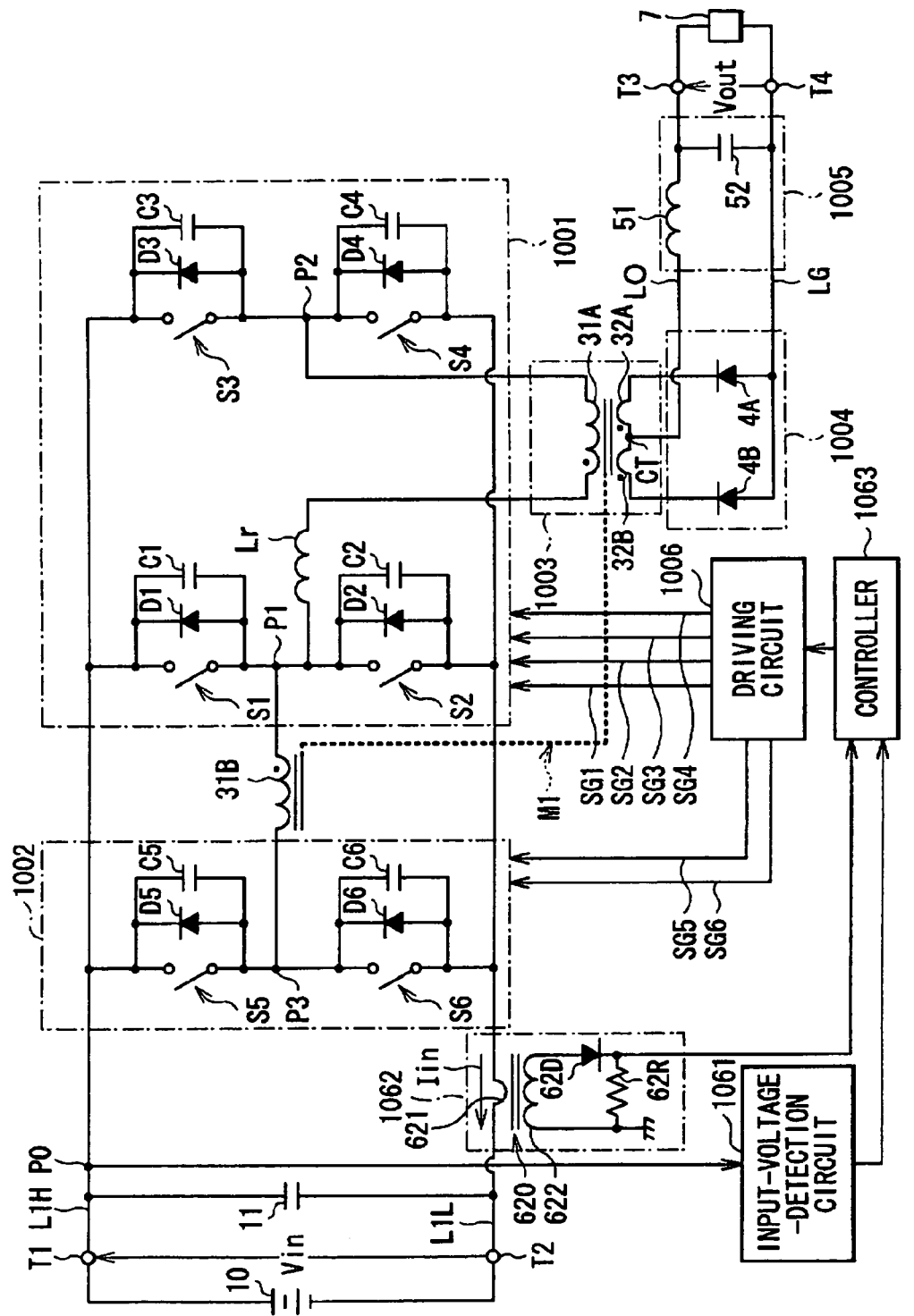
FIG. 58 is a circuit diagram showing the configuration of a switching power supply unit according to another modification of the second embodiment.
Figure 59:
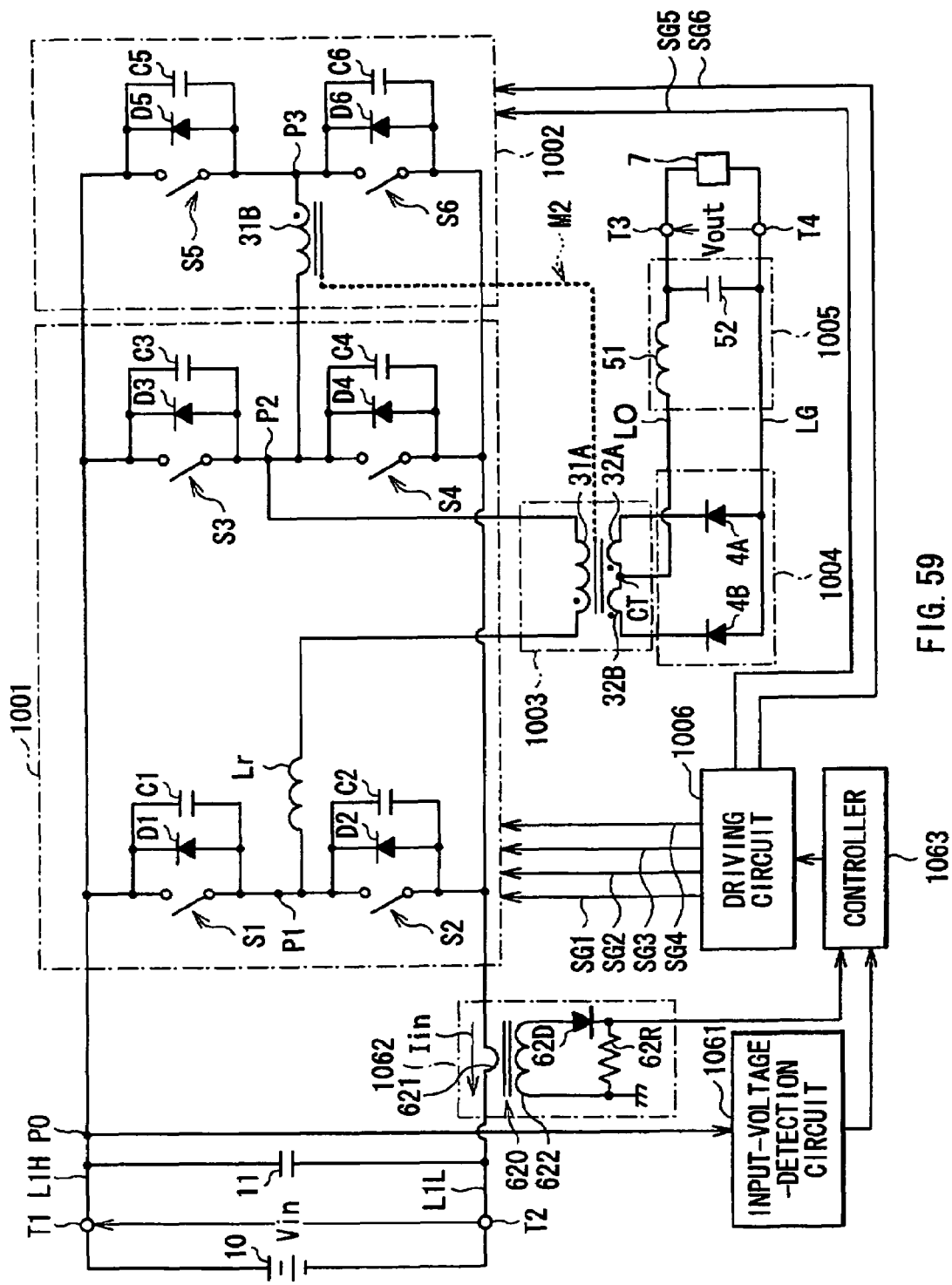
FIG. 59 is a circuit diagram showing the configuration of a switching power supply unit according to another modification of the second embodiment.

In the second embodiment, the case where the transformer 1003 and the inductor Lr are provided magnetically independently of each other has been described. It is also possible to provide, for example, as shown in FIGS. 58 and 59, the transformer 1003 and the inductor Lr are magnetically coupled to each other as shown by the reference numerals M1 and M2 in the diagram. To be concrete, the inductor Lr is disposed between the connection points P1 and P2 (FIG. 58) or between the connection points P1 and P3 (FIG. 59), and an additional winding 31B of the transformer 1003 is connected between the connection points P1 and P2 (FIG. 58) or between the connection points P2 and P3 (FIG. 59). Since each of the above-described configurations shown in FIGS. 58 and 59 is equivalent to the configuration shown in FIG. 29 or 56, effects similar to those of the second embodiment can be obtained. In those cases, in place of or in addition to the inductor Lr, a leakage inductance (not shown) of the primary winding 31A in the transformer 1003 may be used.

Third Embodiment

A third embodiment of the present invention will now be described. The third embodiment corresponds to a concrete example of a third switching power supply unit according to the invention.

Figure 60:
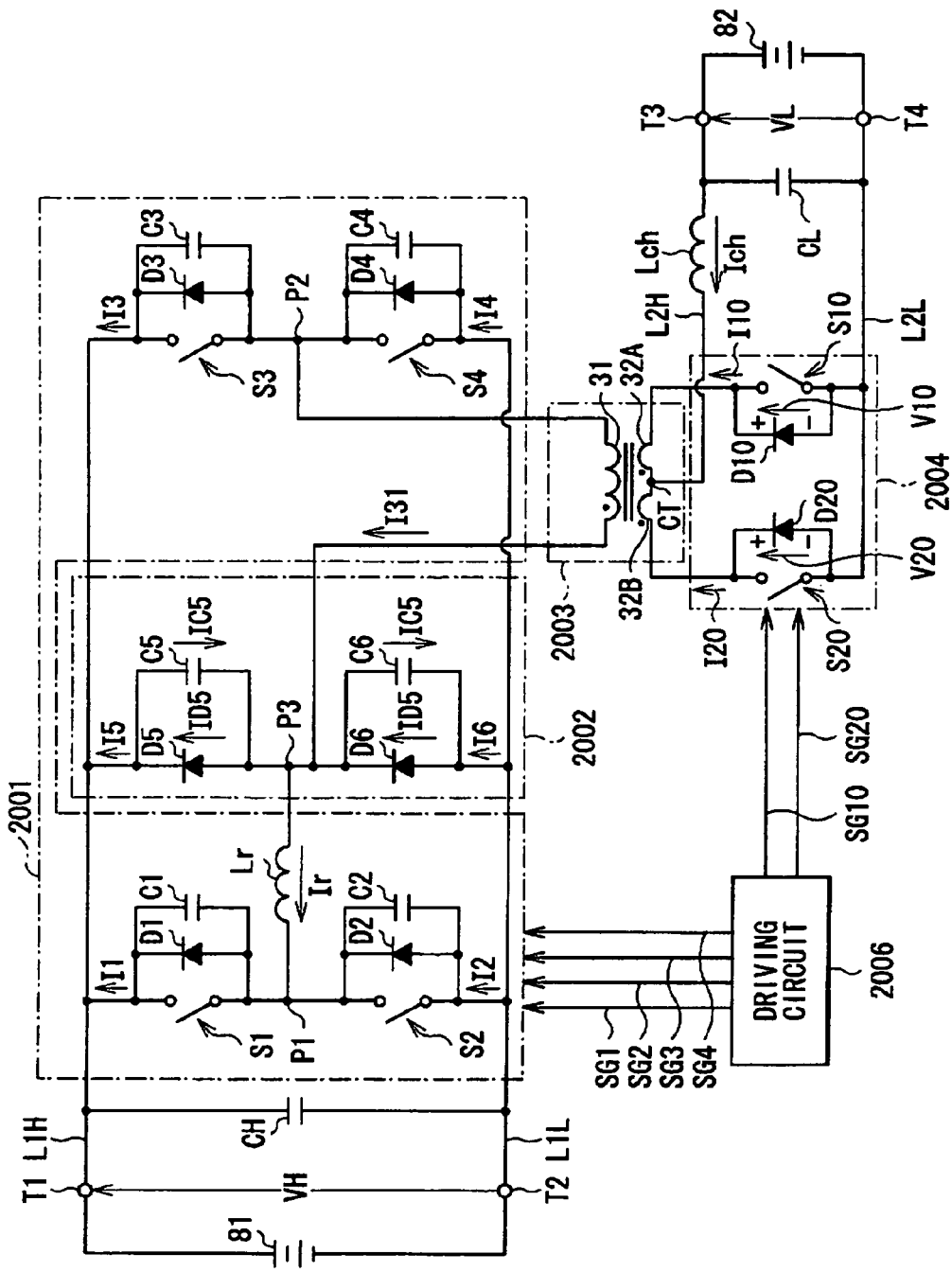
FIG. 60 is a circuit diagram showing the configuration of a switching power supply unit according to a third embodiment of the invention.

FIG. 60 shows the configuration of a switching power supply unit of the third embodiment. The switching power supply unit is a bidirectional switching power supply unit (DC-DC converter). The switching power supply unit can perform: a forward-direction operation of generating a low DC voltage VL on the basis of a high DC voltage VH applied across the input/output terminals T1 and T2 from a high-voltage battery 2051, outputting the low DC voltage VL from the input/output terminals T3 and T4, and supplying it to a low-voltage battery 2052; and an opposite-direction operation for generating the high DC voltage VH on the basis of the low DC voltage VL applied across the input/output terminals T3 and T4 from the low-voltage battery 2052, outputting the high DC voltage VH from the input/output terminals T1 and T2, and supplying it to the high-voltage battery 2051.

The switching power supply unit has: a smoothing capacitor CH, a switching circuit 2001, a surge voltage suppressing circuit 2002, and an inductor Lr which are provided between a high-voltage line L1H on the high-voltage battery 2051 side (high-voltage side) and a low-voltage line L1L, a transformer 2003 having a winding 31 on the high-voltage side and windings 32A and 32B on the low-voltage battery 2052 side (low-voltage side), a switching circuit 2004, an inductor Lch, and a smoothing capacitor CL which are provided on the low-voltage side, and a driving circuit 2006 for driving the switching circuits 2001 and 2004.

The smoothing capacitor CH is provided to smooth the high DC voltage VH.

The switching circuit 2001 has four switching elements S1 to S4, and capacitors C1 to C4 and diodes D1 to D4 connected in parallel with the switching elements S1 to S4, respectively, and has a full-bridge circuit configuration.

Concretely, one end of the switching element S1 and one end of the switching element S2 are connected to each other at the connection point P1, and one end of the switching element S3 and one end of the switching element S4 are connected to each other at the connection point P2. The other ends of the switching elements S1 and S3 are connected to each other and connected to the input terminal T1. The other ends of the switching elements S2 and S4 are connected to each other and connected to the input terminal T2. With such a configuration, the switching circuit 2001 functions as a full-bridge type inverter circuit in the forward-direction operation and as a full-bridge type rectifier circuit in the opposite-direction operation.

As the switching elements S1 to S4, for example, MOS-FETs (Metal Oxide Semiconductor-Field Effect Transistors), IGBTs (Insulated Gate Bipolar Transistors), or the like are used. In the case of using MOS-FETs as the switching elements, as the capacitors C1 to C4 and the diodes D1 to D4, parasitic capacitors or parasitic diodes of the MOS-FETs can be used. As the capacitors C1 to C4, junction capacitance of the diodes D1 to D4 may be used. In the case of using such a configuration, it becomes unnecessary to provide the capacitors C1 to C4 and the diodes D1 to D4 separately from the switching elements, so that the circuit configuration can be simplified.

The surge voltage suppressing circuit 2002 has a pair of diodes D5 and D6 connected in opposite directions, and capacitors C5 and C6 connected in parallel with the diodes D5 and D6, respectively. The anode of the diode D5 is connected to the connection point P3, and the cathode is connected to the high-voltage line L1H. The anode of the diode D6 is connected to the low-voltage line L1L and the cathode is connected to the connection point P3. With such a configuration, in the surge voltage suppressing circuit 2002, the capacitors C5 and C6 and the inductor Lr or Lch which will be described later construct an LC series resonance circuit (first or second resonance circuit). By utilizing the resonance characteristic of the LC series resonance circuit, a surge voltage applied to diodes D10 and D20 in the rectifier circuit 2004 which will be described later is suppressed.

Concretely, when the switching power supply unit of the third embodiment performs the forward-direction operation, resonance time of the first resonance circuit and recovery time of the diodes D10 and D20 are set so as to satisfy the following conditional expression (7). The reverse voltages of the diodes D10 and D20 are subjected to resonance in a quarter of the resonance time and gently reach a voltage according to the turn ratio of the input voltage. During the period, recovery gently finishes. As a result, as will be described later, the surge voltage applied to the diodes D10 and D20 is suppressed. In the time of the reverse-direction operation, resonance time of the second resonance circuit and recovery time of the diodes D10 and D20 are set so as to satisfy the following conditional expression (8). Thereby, as will be described later, like the case of the forward-direction operation, the surge voltage applied to the diodes D10 and D20 is suppressed.

$$\frac{1}{4} \times \{2\pi \times (L1 \times C)^{1/2}\} > Trr5 \quad (7)$$

$$\frac{1}{4} \times \{2\pi \times (L2 \times C)^{1/2}\} > Trr5 \quad (8)$$

where $\{2\pi \times (L1 \times C)^{1/2}\}$ denotes resonance time of one cycle in the first resonance circuit, L1 indicates inductance of the inductor Lr, $\{2\pi \times (L2 \times C)^{1/2}\}$ denotes resonance time of one cycle in the second resonance circuit, L2 indicates inductance of the inductor Lch, C indicates a combined capacitance value in parallel connection of the capacitors C5 and C6 (C=(C5+C6)), and Trr5 indicates recovery time of the diodes D10 and D20. In the embodiment, the recover time denotes as follows. In the case where the diodes D10 and D20 are PN junction diodes, the diodes are in a conductive state because of holes injected from a P layer to an N layer. However, in a process that the forward current decreases and the reverse voltage is applied, the holes accumulated in the N layer return to the P layer or recombine and disappear. As a result, current flows in the opposite direction in the diodes D10 and D20 until a depletion layer extends. The current is called recovery current. The time in which the recovery current flows is called recovery time. In the case where the diodes D10 and D20 are metal-semiconductor-junction schottky-barrier diodes, the recovery current is not generated in principle. However, the junction capacitance exists also in this case. In the process in which the reverse voltage is applied, while charging the junction capacitance, the current flows in the opposite direction. Therefore, in the case of the schottky-barrier diodes, it can be considered that the time in which the current in the opposite direction flows corresponds to the recovery time.

One end of the inductor Lr is connected to the connection point P1, and the other end is connected to the connection point P3. That is, the inductor Lr is connected so as to form an H bridge to the bridge circuit constructed by the switching elements S1, S2, the diodes D5 and D6, and the capacitors C5 and C6. With such a configuration, the inductor Lr and the capacitors C1 to C4 in the bridge circuit 2001 construct an LC series resonance circuit. By utilizing the resonance characteristic of the LC series resonance circuit, as will be described later, a short-circuit loss in the switching elements S1 to S4 is suppressed. In addition, as described above, the inductor Lr and the capacitors C5 and C6 in the surge voltage suppressing circuit 2002 construct the LC series resonance circuit (first resonance circuit), and a surge voltage applied to the diodes D10 and D20 in the switching circuit 2004 is suppressed.

The transformer 2003 has the high-voltage-side winding 31 and the pair of low-voltage-side windings 32A and 32B. One end of the winding 31 is connected to the connection point P3, and the other end is connected to the connection point P2. The winding 31 is connected so as to form an H bridge to the bridge circuit constructed by the switching elements S3 and S4, the diodes D5 and D6, and the capacitors C5 and C6. On the other hand, one ends of the windings 32A and 32B are connected to each other at the center tap CT. The center tap CT is led along a low-voltage-side high-voltage line L2H to the input/output terminal T3 via the inductor Lch. With such a configuration, the transformer 2003 drops the input AC voltage generated by the switching circuit 2001 or the switching circuit 2004 which will be described later, and outputs output AC voltages whose phases are different from each other by 180 degrees from the ends of the windings 32A and 32B or an end of the winding 31. The degree of voltage drop or voltage boost in this case is determined by the turn ratio between the winding 31 and the windings 32A and 32B.

The switching circuit 2004 has two switching elements S10 and S20 and diodes D10 and D20 connected in parallel with the switching elements S10 and S20, respectively, and has a push-pull circuit configuration. With respect to the diodes D10 and D20, concretely, the cathode of the diode D10 is connected to the other end of the winding 32A of the transformer 2003, and the cathode of the diode D20 is connected to the other end of the winding 32B of the transformer 2003. The anodes of the diodes D10 and D20 are connected to each other and connected to a low-voltage-side low-voltage line L2L. That is, the diodes D10 and D20 of the switching circuit 2004 have a center-tap-type anode-common-connection configuration. With such a configuration, as will be described later, the switching circuit 2004 functions as a center-tap-type rectifier circuit at the time of forward-direction operation and functions as a push-pull-type inverter circuit at the time of reverse-direction operation.

Each of the switching elements S10 and S20 may be also a switching element such as a MOS-FET or IGBT. In the case of using MOS-FETs as the switching elements, each of the diodes D10 and D20 can be constructed by a parasitic diode of a MOS-FET. Also in the case of using such a configuration, it becomes unnecessary to provide the diodes D10 and D20 aside from the switching elements, so that the circuit configuration can be simplified.

The inductor Lch is inserted in the high-voltage line L2H. One end of the inductor Lch is connected to the center tap CT and the other end of the inductor Lch is connected to the input/output terminal T3. The smoothing capacitor CL is connected between the high-voltage line L2H (concretely, the other end of the inductor Lch) and the low-voltage line L2L. An input/output terminal T4 is provided at an end of the low-voltage line L2L. With such a configuration, the inductor Lch functions as a choke coil in the forward-direction operation as will be described later. The inductor Lch and the smoothing capacitor CL construct a smoothing circuit, thereby smoothing the DC voltage rectified by the switching circuit 2004, thereby generating the low DC voltage VL. The low DC voltage VL is supplied from the input/output terminals T3 and T4 to the low-voltage battery 2052. In the reverse-direction operation, the inductor Lch functions as an inductor for boosting. The inductor Lch and the capacitors C5 and C6 in the surge voltage suppressing circuit 2002 construct an LC series resonance circuit (second resonance circuit) to suppress a surge voltage applied to the diodes D10 and D20 in the switching circuit 2004.

The driving circuit 2006 is provided to drive the switching elements S1 to S4 in the switching circuit 2001 and the switching elements S10 and S20 in the switching circuit 2004. Concretely, the driving circuit 2006 supplies the drive signals SG1 to SG4 to the switching elements S1 to S4 to turn on/off the switching elements S1 to S4. The driving circuit 2006 supplies the drive signals SG10 and SG20 to the switching elements S10 and S20, respectively to turn on/off the switching elements S10 and S20. The driving circuit 2006 performs phase control (phase shift control) on the switching elements S1 to S4 in the switching circuit 2001 at the time of the forward-direction operation to properly set the phase differences, thereby stabilizing the DC output voltage (low DC voltage VL) at the time of the forward-direction operation. In the case where the driving circuit 2006 performs a control (sync rectification) so that the switching elements S1 to S4 and the switching elements S10 and S20 are turned on synchronously with the conduction period of the diodes D1 to D4 in the switching circuit 2001 and the diodes D10 and D20 in the switching circuit 2004, a power loss in the diodes D1 to D4, D10, and D20 can be reduced.

The input/output terminals T1 and T2 and the input/output terminals T3 and T4 correspond to one concrete example of "first and second input/output terminal pairs" in the invention. The input/output terminals T1 and T2 at the time of the forward-direction operation and the input/output terminals T3 and T4 at the time of the reverse-direction operation corresponds to a concrete example of "one of input/output terminal pairs" in the invention. The input/output terminals T3 and T4 at the time of the forward-direction operation and the input/output terminals T1 and T2 at the time of the reverse-direction operation correspond to a concrete example of "the other input/output terminal pair" in the invention. The winding 31 corresponds to a concrete example of "first winding" in the invention, and the windings 32A and 32B correspond to a concrete example of "second winding" in the invention. The switching circuit 2001 corresponds to a concrete example of "first circuit" in the invention, and the switching circuit 2004 corresponds to a concrete example of "second circuit" in the invention. The switching elements S1 to S4 correspond to a concrete example of "a plurality of first switching elements" in the invention. The switching elements S10 and S20 correspond to a concrete example of "a plurality of second switching elements" in the invention. The diodes D1 to D4 correspond to a concrete example of "first rectifier elements" in the invention. The diodes D10 and D20 correspond to a concrete example of "second rectifier elements". The diodes D5 and D6 correspond to a concrete example of "third rectifier elements". The capacitors C5 and C6 correspond to a concrete example of "first capacitative elements". The device set of the diode D5 and the capacitor C5 and the device set of the diode D6 and the capacitor C6 correspond to a concrete example of "device set" in the invention.

Next, the operation of the switching power supply unit having such a configuration will be described. First, the basic operation of the switching power supply unit will be described with respect to the forward-direction operation and the reverse-direction operation.

FIG. 61 shows the difference between the roles of circuits in the forward-direction and reverse-direction operations in the switching power supply unit.

At the time of the forward-direction operation (voltage decreasing operation from the high DC voltage VH to the low DC voltage VL), the switching elements S1 to S4 in the switching circuit 2001 are turned on/off by the drive signals SG1 to SG4 from the driving circuit 2006 and function as an inverter circuit. The switching elements S10 and S20 in the switching circuit 2004 are turned off by the drive signals SG10 and SG20 and function as a rectifier circuit (FIG. 61). In the case of the above-described sync rectification, the switching elements S10 and S20 are also turned on/off. The inductor Lr functions as a resonance inductor of the LC series resonance circuit (the resonance circuit formed with the capacitors C1 to C4 and the first resonance circuit formed with the capacitors C5 and C6), and the inductor Lch functions as a choke coil (FIG. 61). As the details will be described later, the function of suppressing a surge voltage in the diodes D10 and D20 by the surge voltage suppressing circuit 2002 is also valid (FIG. 61).

Therefore, the basic operation at the time of the forward-direction operation is as follows. First, the high DC voltage VH is applied across the input/output terminals T1 and T2 from the high-voltage battery 2051, and an input AC voltage is generated by the switching circuit 2001 functioning as an inverter circuit.

The input AC voltage is supplied to the winding 31 in the transformer 2003 and transformed (in this case, dropped), and an output AC voltage is output from the windings 32A and 32B. The output AC voltage is rectified by the diodes D10 and D20 in the switching circuit 2004 functioning as a rectifier circuit and is smoothed by the inductor Lch functioning as a choke coil and the smoothing capacitor CL. The resultant voltage is output as the low DC voltage VL from the input/output terminals T3 and T4 and is supplied to the low-voltage battery 2052.

On the other hand, at the time of the reverse-direction operation (voltage increasing operation from the low DC voltage VL to the high DC voltage VH), the switching elements S1 to S4 in the switching circuit 2001 are turned off by the drive signals SG1 to SG4 and function as a rectifier circuit. The switching elements S10 and S20 in the switching circuit 2004 are turned on/off by the drive signals SG10 and SG20 and function as an inverter circuit (FIG. 61). In the case of the above-described sync rectification, the switching elements S1 to S4 are also turned on/off. The inductor Lr functions as a resonance inductor of the LC series resonance circuit (the resonance circuit formed with the capacitors C1 to C4), and the inductor Lch also function as a resonance inductor of the LC series resonance circuit (the second resonance circuit formed with the capacitors C5 and C6) and also functions as a booster inductor (FIG. 61). As the details will be described later, also at the time of the reverse-direction operation, the function of suppressing a surge voltage in the diodes D10 and D20 by the surge voltage suppressing circuit 2002 is also valid (FIG. 61).

Therefore, the basic operation at the time of the reverse-direction operation is as follows. First, the low DC voltage VL is applied across the input/output terminals T3 and T4 from the low-voltage battery 2052, and an input AC voltage is generated by the inductor Lch functioning as the booster inductor and the switching circuit 2004 functioning as an inverter circuit.

The input AC voltage is supplied to the windings 32A and 32B in the transformer 2003 and transformed (in this case, boosted), and an output AC voltage is output from the winding 31. The output AC voltage is rectified by the diodes D1 to D4 in the switching circuit 2001 functioning as a rectifier circuit. The resultant voltage is output as the high DC voltage VH from the input/output terminals T1 and T2 and is supplied to the high-voltage battery 2051.

As described above, the forward-direction operation and the reverse-direction operation are performed in the switching power supply unit of the embodiment.

Referring now to FIGS. 62 to 89, the operation of suppressing the surge voltage applied to the diodes D10 and D20 in the switching circuit 2004 as main characteristics of the invention will be described in detail with respect to the forward-direction operation and the reverse-direction operation. Surge voltage suppressing operation at the time of forward-direction operation First, referring to FIGS. 62 to 75, the operation of suppressing the surge voltage applied to the diodes D10 and D20 at the time of the forward-direction operation will be described.

FIG. 62 is a timing waveform chart (times t0 to t10) of voltage waveforms and current waveforms of parts at the time of the forward-direction operation in the switching power supply unit of FIG. 60. (A) to (D) in the diagram show voltage waveforms of the drive signals SG1 to SG4. (E) and (F) show voltage waveforms of the drive signals SG10 and SG20. (G) to (I) show potentials VP1 to VP3 at the connection points P1 to P3. (J) shows the potential difference $V_{P1-P3}$ between the connection points P1 and P3 when the potential VP3 at the connection point P3 is used as a reference. (K) shows the potential difference $V_{P3-P2}$ between the connection points P3 and P2 when the potential VP2 at the connection point P2 is used as a reference. (L) indicates current Ir flowing in the inductor Lr. (M) indicates current I31 flowing in the winding 31 of the transformer 2003. (N) and (O) indicate currents I5 and I6 flowing in parallel connection parts between the diodes D5 and D6 and the capacitors C5 and C6, respectively, in the surge voltage suppressing circuit 2002. (P) and (Q) indicate reverse voltages V10 and V20 applied across the anodes and cathodes of the diodes D10 and D20, respectively. (R) and (S) denote currents I10 and I20 flowing in the switching elements S10 and S20 or the diodes D10 and D20, respectively. (T) denotes current Ich flowing in the inductor Lch. The directions of the voltages are as shown by the arrows in FIG. 60. The direction from "−" to "+" is a positive direction. The positive directions of the currents are also as shown by the arrows in FIG. 60.

Figure 75:
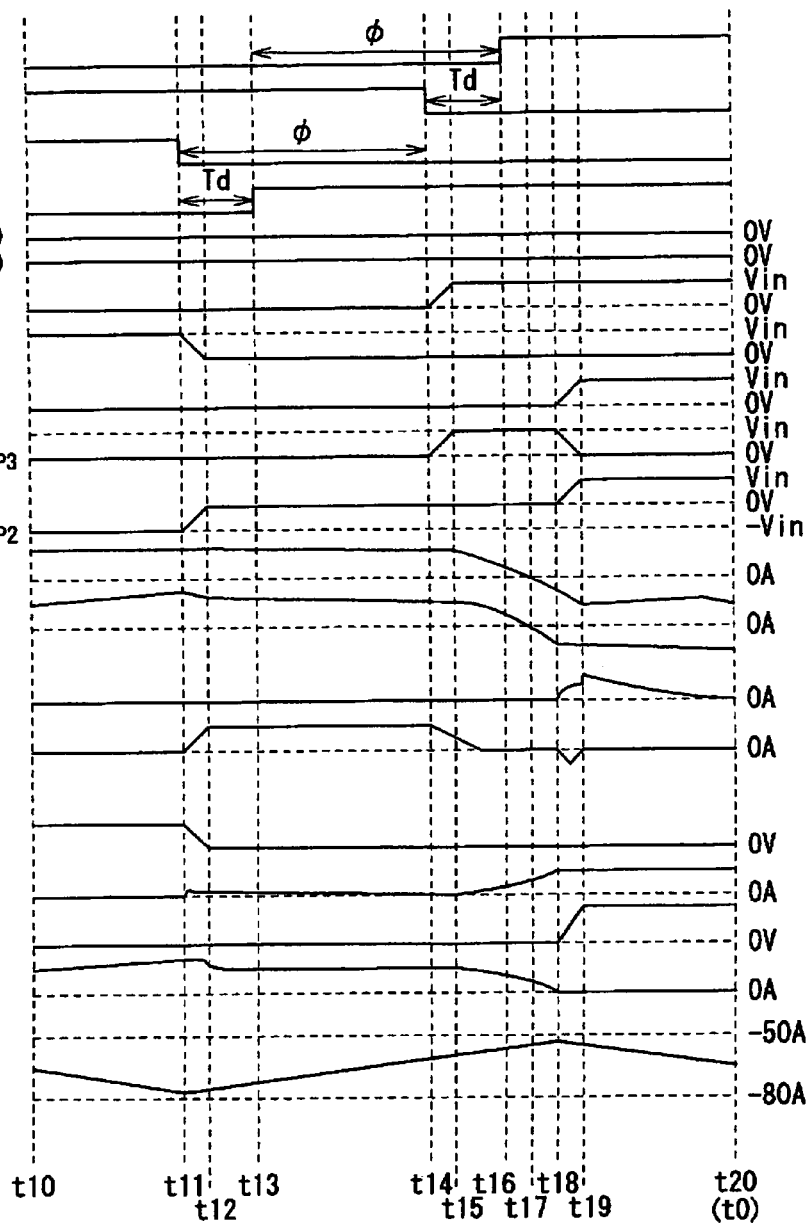
FIG. 75 is a timing waveform chart illustrating the forward-direction operation subsequent to FIG. 74.

FIGS. 63 to 74 show operation states of the switching power supply unit at the timings (times t0 to t10) in FIG. 62. FIG. 75 shows voltage waveforms and current waveforms in parts after the timings illustrated in FIG. 62 (times t10 to t20 (t0)). The timings shown in FIGS. 62 and 75 correspond to half cycles of the operation in the switching power supply unit. Combination of the operations corresponds to operations in one cycle.

First, referring to FIGS. 62 to 74, the operations in the first half cycle will be described.

With respect to the drive signals SG1 to SG4 ((A) to (D) in FIG. 62) of the switching elements S1 to S4, it is understood that the switching elements S1 to S4 are paired. Concretely, the switching elements S1 and S2 are controlled to be turned on at fixed timings on the time base and are therefore called "fixed-side switching elements". The switching elements S3 and S4 are controlled to be turned on at variable timings on the time base and are therefore called "shift-side switching elements".

The switching elements S1 to S4 are driven at timings and in combinations that the input/output terminals T1 and T2 to which the high DC voltage VH is applied are not electrically short-circuited in any state of the switching operation. Concretely, the switching elements S3 and S4 (fixed-side switching elements) are not turned on simultaneously, and the switching elements S1 and S2 (shift-side switching elements) are not also turned on simultaneously. A time interval required to avoid simultaneous turn-on of the switching elements is called dead time "Td" ((A) and (D) in FIG. 62).

The switching elements S1 and S4 have a period in which they are simultaneously on. In the period in which the switching elements S1 and S4 are simultaneously on, the winding 31 of the transformer 2003 is excited. The switching elements S1 and S4 operate so as to have a switching phase difference φ by using the switching element S1 (fixed-side switching element) as a reference ((A) and (D) in FIG. 62). Similarly, the switching elements S2 and S3 have a period in which they are simultaneously on. In the period in which they are simultaneously on, the winding 31 of the transformer 2003 is excited in the direction opposite to that in the above case. The switching elements S2 and S3 operate so as to have a switching phase difference φ by using the switching element S2 (fixed-side switching element) as a reference ((B) and (C) in FIG. 62). Further, when the switching phase difference φ between the switching elements S1 and S4 and the switching phase difference φ between the switching elements S2 and S3 are controlled, the time in which the switching elements S1 and S4 are simultaneously on and the time in which the switching elements S2 and S3 are simultaneously on change, respectively. Accordingly, the duty ratio of the input AC voltage applied to the winding 31 of the transformer 2003 changes, and the DC output voltage in the forward-direction operation (low DC voltage VL) is stabilized.

At the time of the forward-direction operation, the drive signals SG10 and SG20 of the switching elements S10 and S20 are always 0V ((E) and (F) in FIG. 62), and the switching elements S10 and S20 are always in the off state. In the case of the above-described sync rectification, however, the switching elements S10 and S20 also perform the on/off operation.

Figure 63:
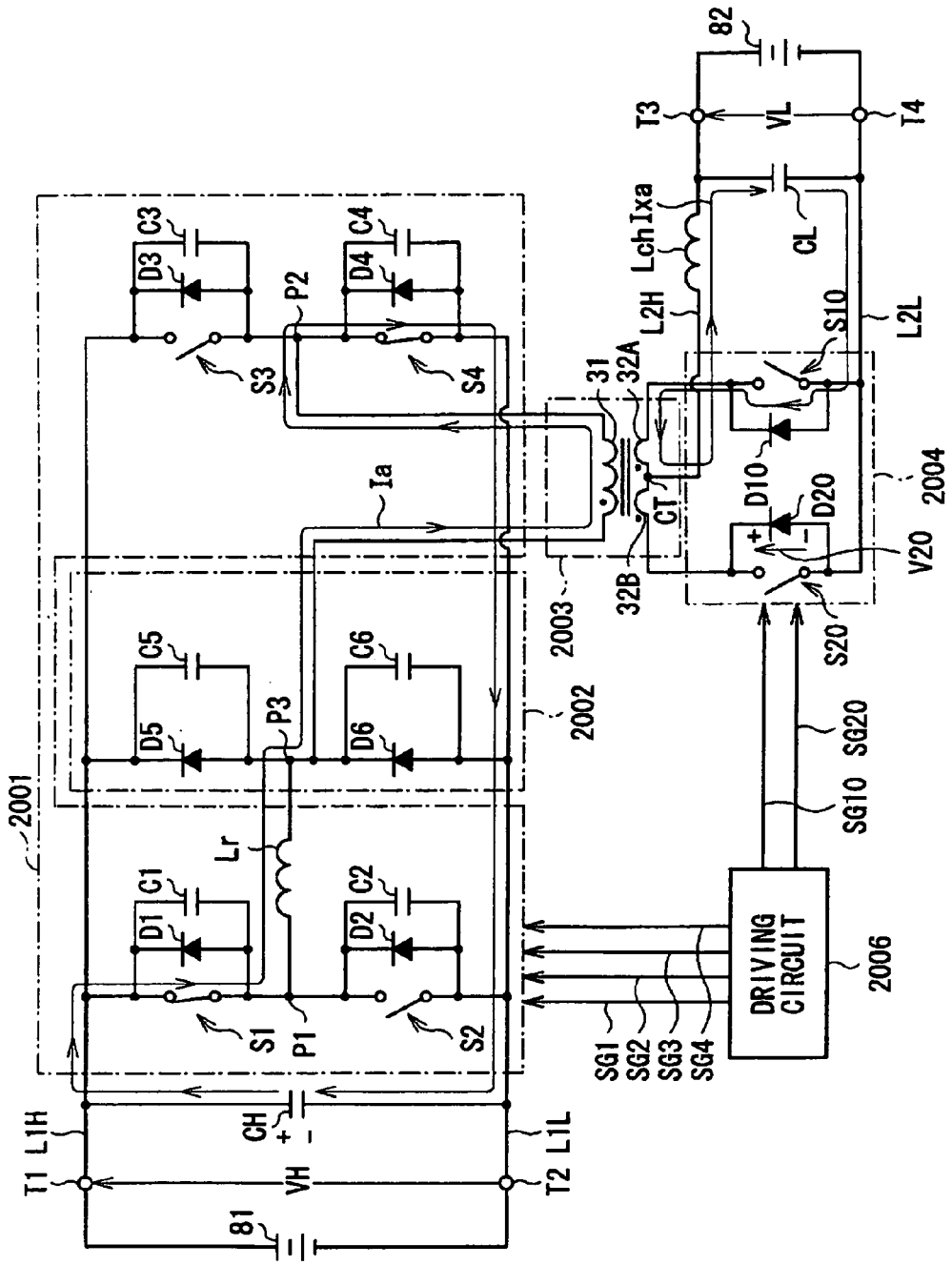
FIG. 63 is a circuit diagram illustrating the forward-direction operation in the switching power supply unit of FIG. 60.

First, in the period between time t0 and time t1 shown in FIG. 63, the switching elements S1 and S4 are in the on state ((A) and (D) in FIG. 62), and the switching elements S2 and S3 are in the off state ((B) and (C) in FIG. 62). The potential VP1 at the connection point P1 is equal to VH (VP1=VH) ((G) in FIG. 62), and the potential VP2 at the connection point P2 is equal to 0V (VP2=0V) ((H) in FIG. 62). As described above, the inductance of the inductor Lr is much smaller than that of the winding 31 of the transformer 2003, so that the potential VP3 at the connection point P3 is almost equal to VH ((I) in FIG. 62), and the potential difference $V_{P3-P2}$ between the connection points P3 and P2 using VP2 as a reference is also almost equal to VH ((K) in FIG. 62). Therefore, a loop current Ia as shown in FIG. 63 flows in the switching circuit 2001, so that the inductor Lr is exited and power is transmitted from the high voltage side to the low voltage side. Consequently, a loop current Ixa flows on the low voltage side via the diode D10 and the inductor Lch, and charges are supplied to the low-voltage battery 2052. In the period, forward voltage is applied to the diode D10 and the reverse voltage V10 becomes 0V ((P) in FIG. 62). To the other diode D20, the reverse voltage V20 is applied ((R) in FIG. 62).

Figure 64:
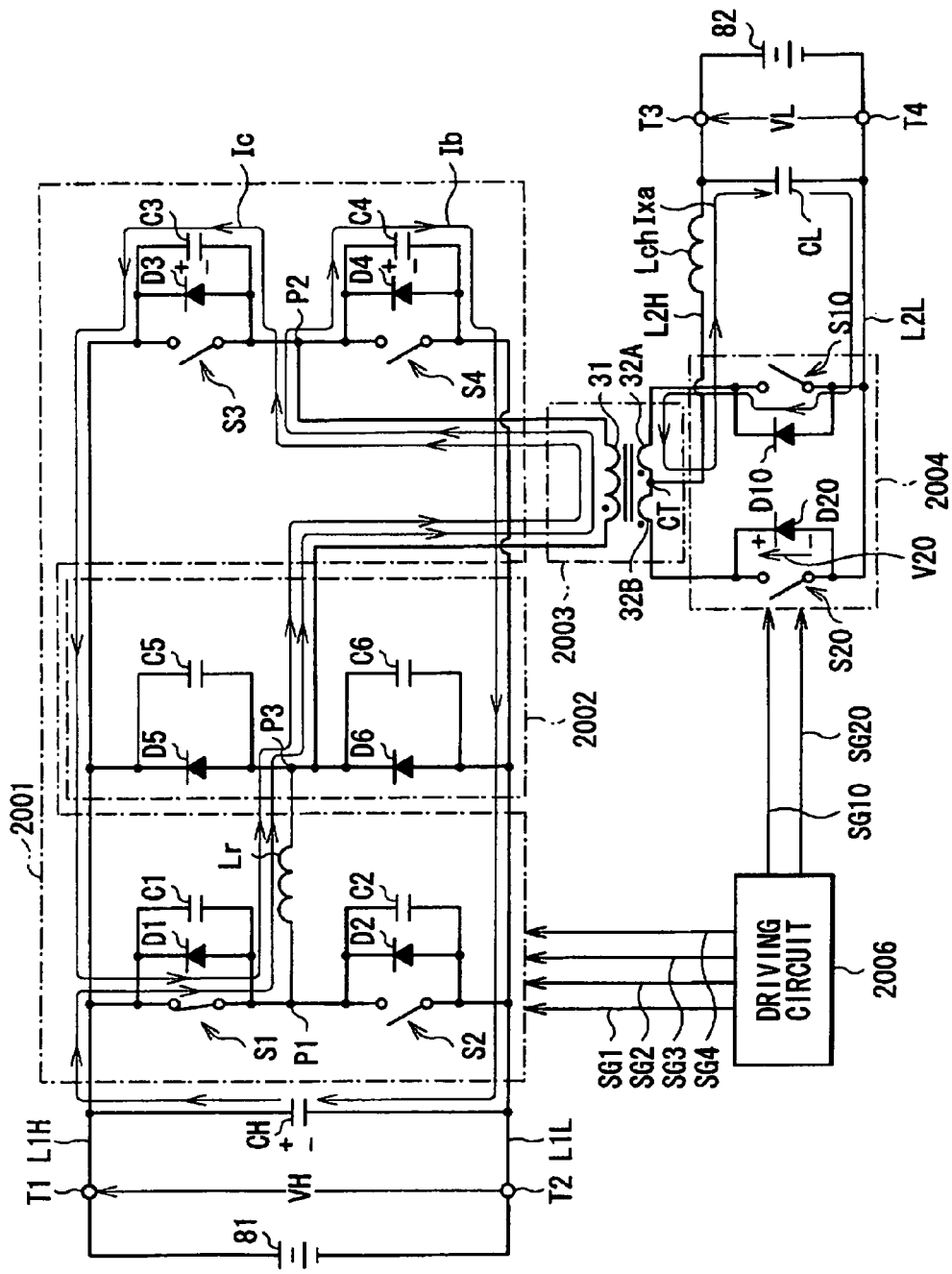
FIG. 64 is a circuit diagram illustrating the forward-direction operation subsequent to FIG. 63.

Next, in the period between time t1 and time t2 shown in FIG. 64, the switching element S4 is turned off at the time t1 ((D) in FIG. 62). Then, an LC series resonance circuit is constructed by cooperation of the capacitors C3 and C4 and the inductor Lr, and resonance operation is performed. Therefore, the loop currents Ib and Ic as shown in FIG. 64 flow, the capacitor C3 is discharged and, on the other hand, the capacitor C4 is charged. Consequently, the potential VP2 at the connection point P2 gradually increases and becomes equal to VH at the time t2 ((H) in FIG. 62). At this time, the reverse voltage V20 of the diode D20 drops gradually and becomes 0V at the time t2 ((R) in FIG. 62).

Figure 65:
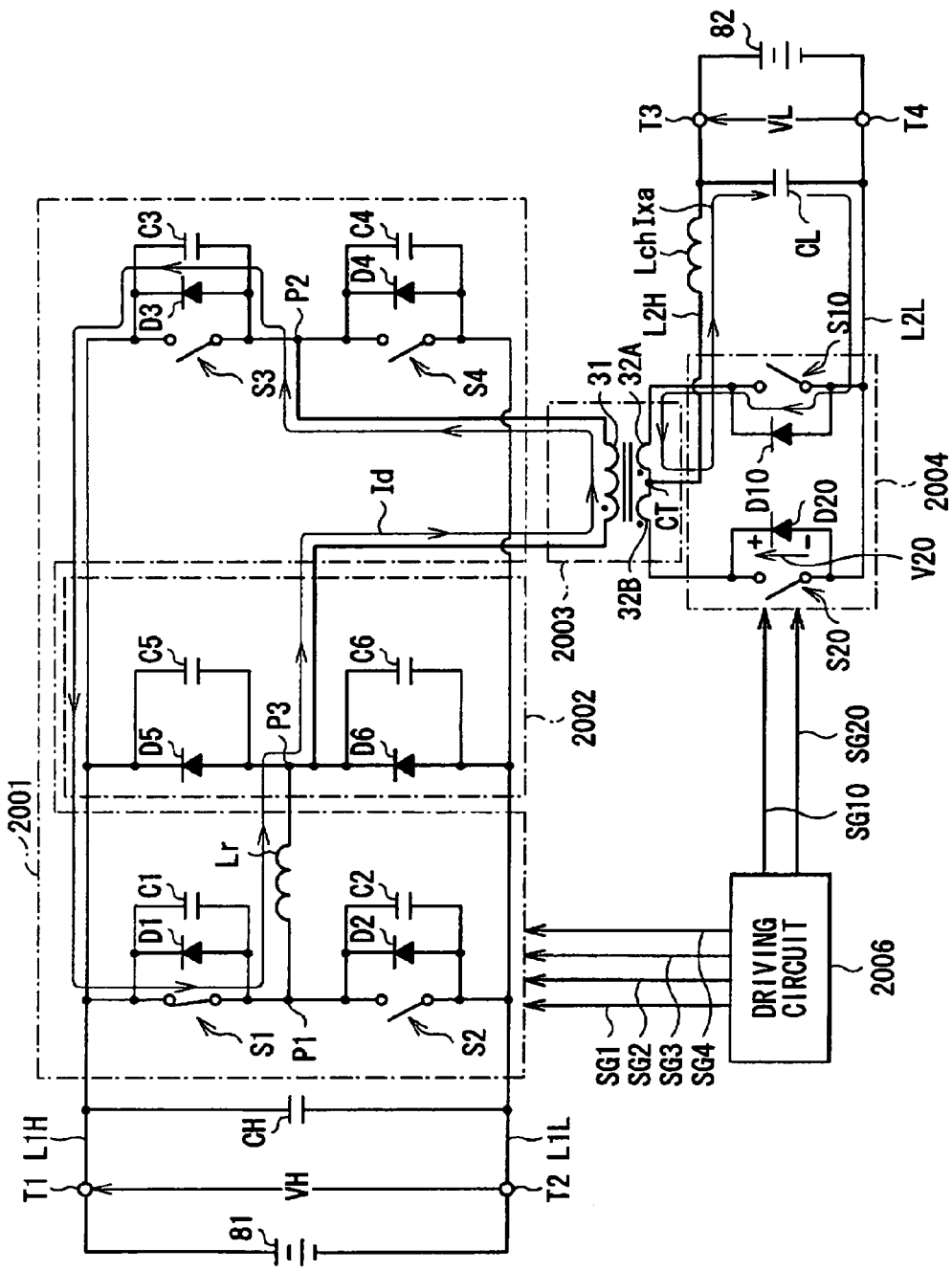
FIG. 65 is a circuit diagram illustrating the forward-direction operation subsequent to FIG. 64.
Figure 66:
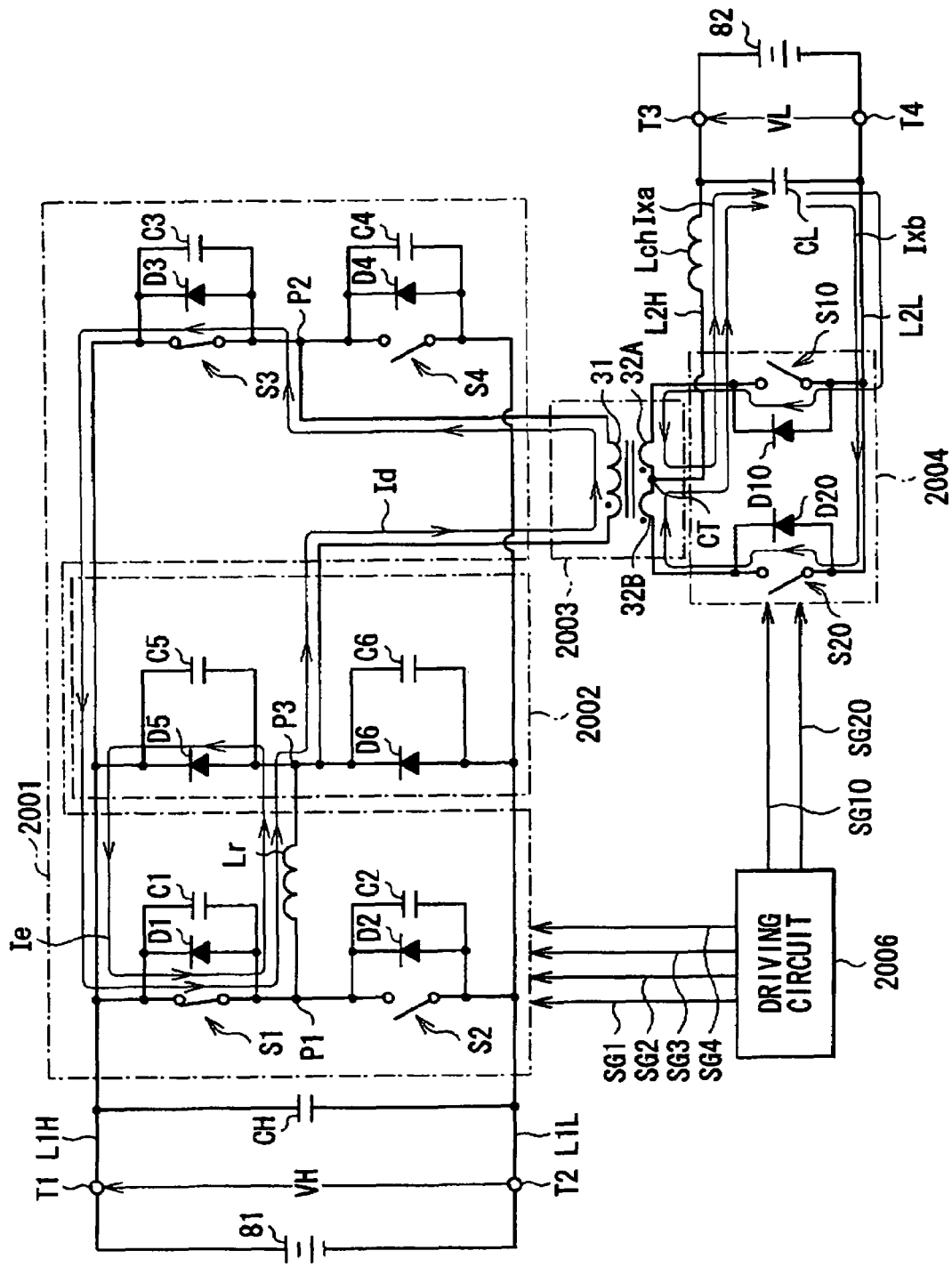
FIG. 66 is a circuit diagram illustrating the forward-direction operation subsequent to FIG. 65.

When VP2 becomes equal to VH at the time t2 as shown in FIG. 65 ((H) in FIG. 62), the diode D3 becomes conductive. After VP2 becomes VH and the diode D3 becomes conductive, as shown in FIG. 66, the switching element S3 is turned on at the time t3 ((C) in FIG. 62), thereby performing ZVS operation. As a result, a short-circuit loss in the switching element S3 is suppressed.

In the period from time t2 to time t4, energy accumulated in the inductor Lr by being excited in the period from time t0 to time t1 circulates as currents in circuits connected to both ends of the inductor Lr. Concretely, as shown in FIG. 66, loop currents Id and Ie flow so that the potential differences between one end (the connection point P3) of the inductor Lr and the other end (the high-voltage line L1H side) of the switching element S1 become equal to each other. In the path of the loop current Id, the potential difference is equal to the sum of the voltage V31 across the winding 31 of the transformer 2003 and the voltage VS3 across the switching element S3. When the turn ratio between the windings 32A and 32B of the transformer 2003 is "n", V31 is equal to a value obtained by dividing a forward voltage drop in the diode D10 by the turn ratio "n". V31 is a forward voltage drop in the diode D3 when the switching element S3 is off (the period from time t2 to time t3). V31 is equal to the product between the on resistance of the switching element S3 and flowing current when the switching element S3 is in the on state (the period from time t3 to time t4). On the other hand, in the path of the loop current Ie, the potential difference is a forward voltage drop in the diode D5.

Although the values of the forward voltage drops in the diodes D10, D3, and D5 change according to the value of the flowing forward current and the ambient temperature, the loop currents Id and Ie flow so that the potential differences become equal to each other. By the branch of the current to the two loop currents Id and Ie, the absolute value of the current I31 flowing in the winding 31 of the transformer 2003 decreases ((M) in FIG. 62). The current Ich is branched to the loop current Ixa flowing in the diode D10 and the loop current Ixb flowing in the diode D20 so that the sum of the currents flowing in the windings 32A and 32B of the transformer 2003 becomes equal to the current Ich flowing in the inductor Lch.

Figure 67:
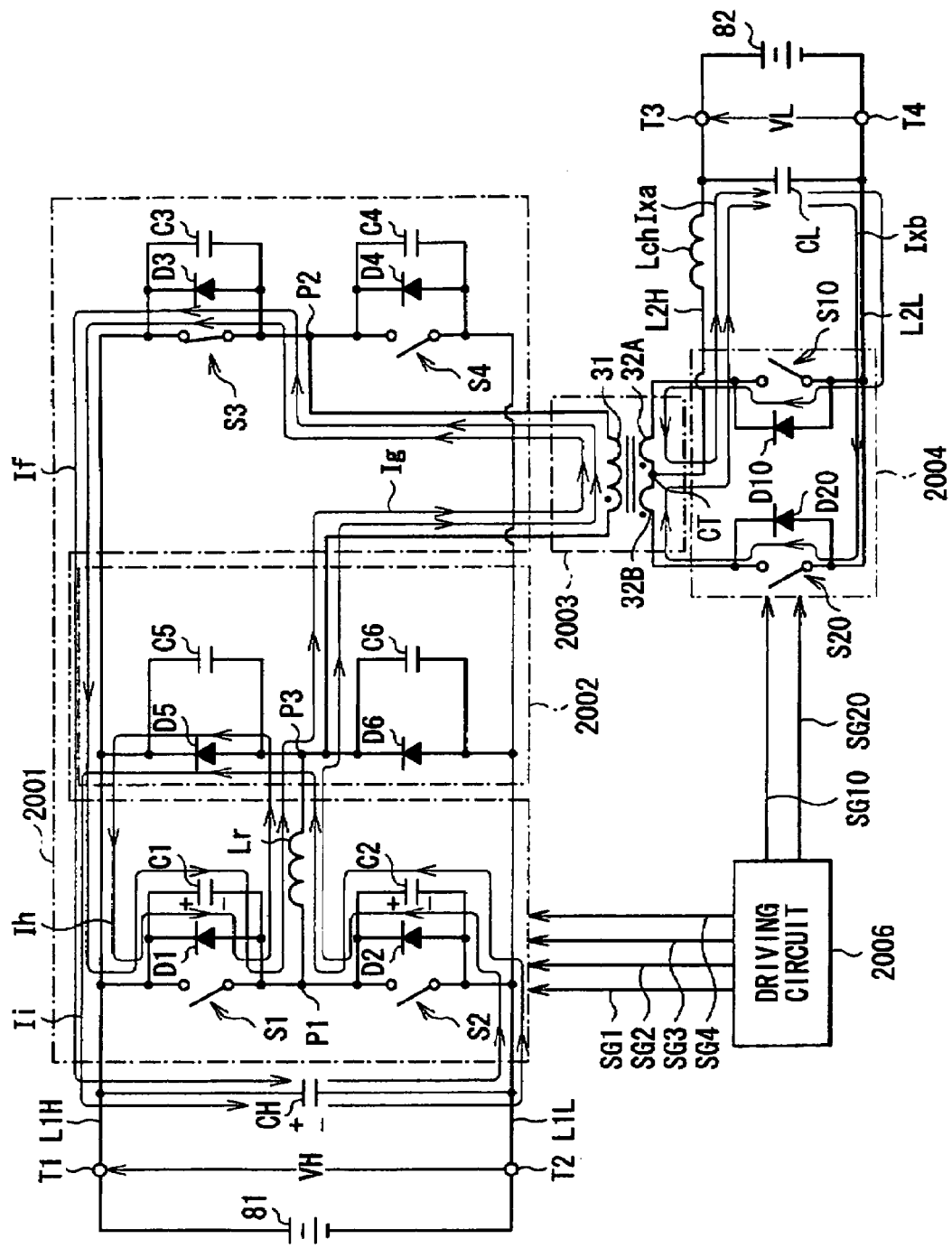
FIG. 67 is a circuit diagram illustrating the forward-direction operation subsequent to FIG. 66.

Next, as shown in FIG. 67, at time t4, the switching element S1 is turned off ((A) in FIG. 62). It makes the capacitors C1 and C2 and the inductor Lr cooperate with one another to construct the LC series resonance circuit, and the resonance operation is performed. Therefore, the loop currents If, Ig, Ih, and Ii as shown in FIG. 67 flow. The capacitor C2 is discharged and, on the other hand, the capacitor C1 is charged. Consequently, the potential VP1 at the connection point P1 gradually descends and becomes 0V (VP1=0V) at time t5 ((G) in FIG. 62).

Figure 68:
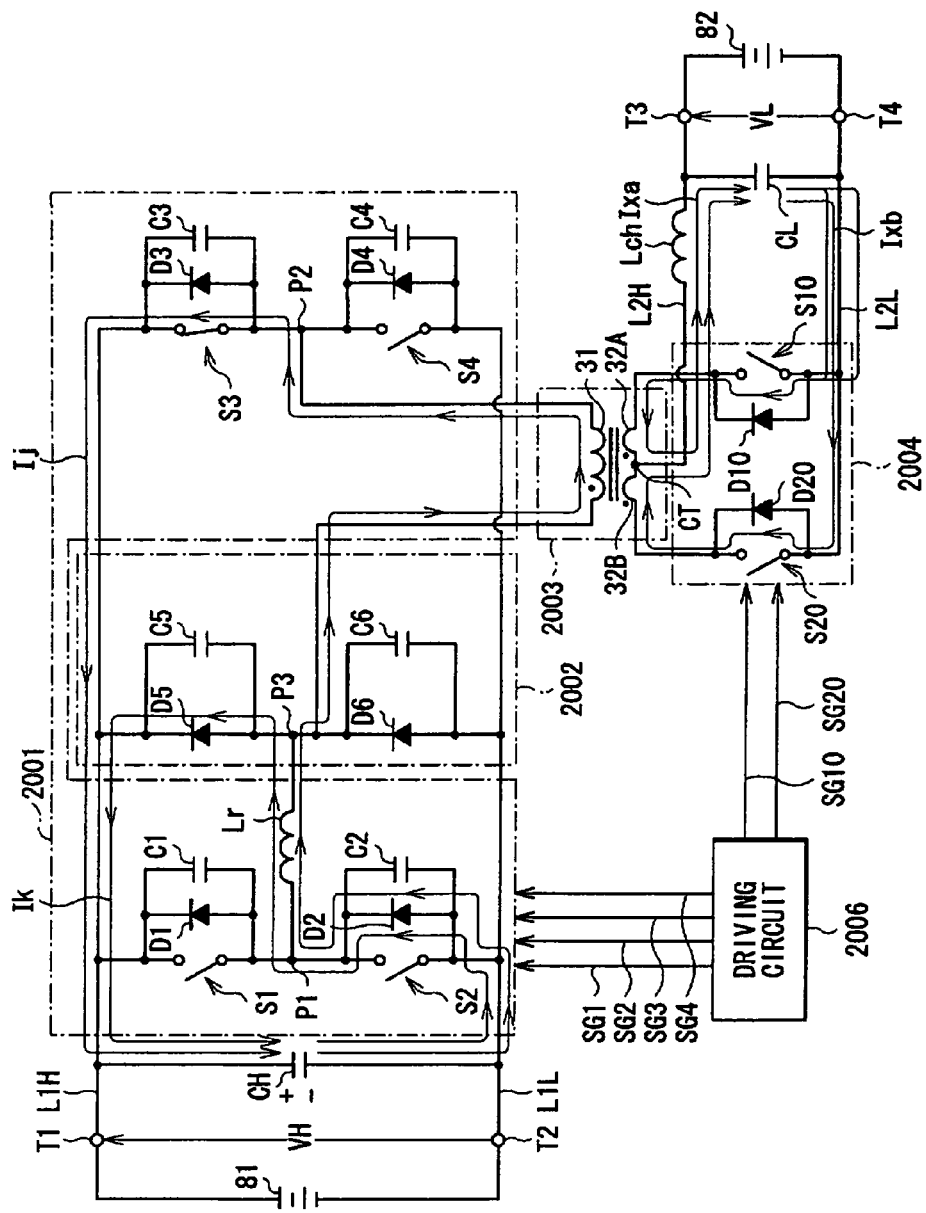
FIG. 68 is a circuit diagram illustrating the forward-direction operation subsequent to FIG. 67.
Figure 69:
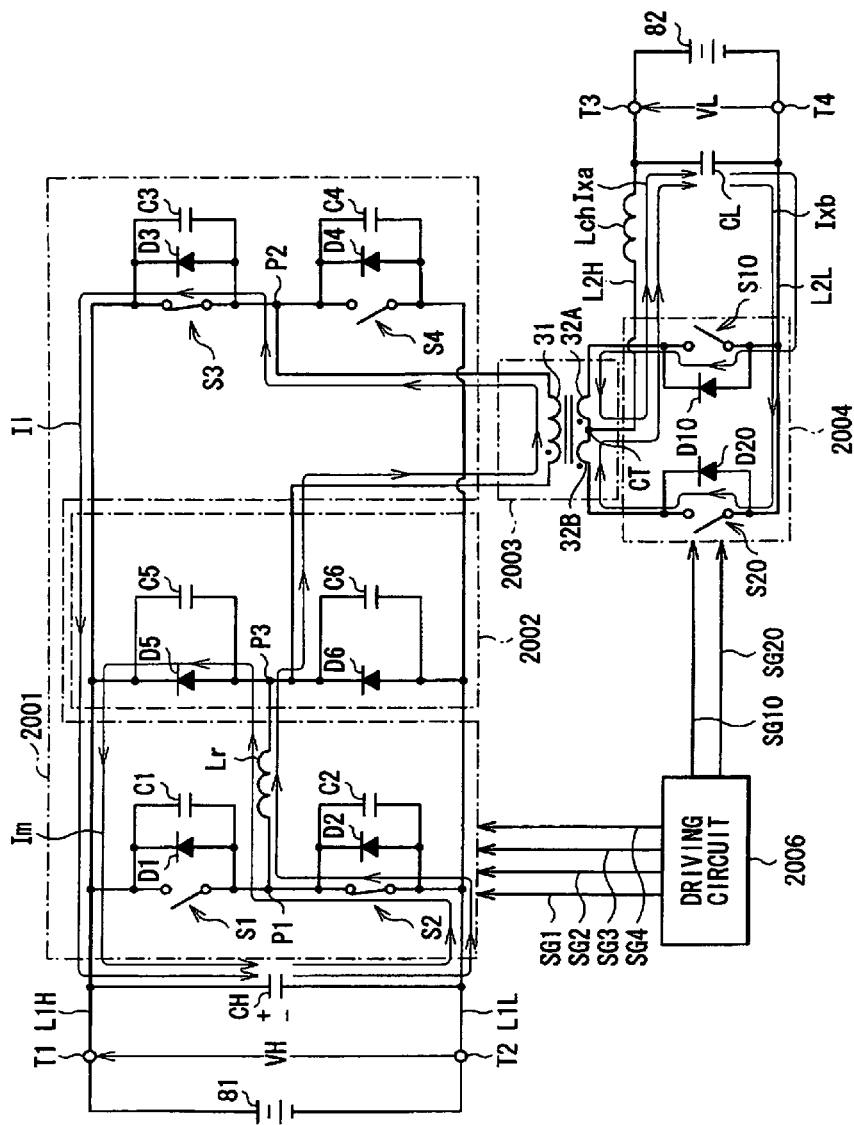
FIG. 69 is a circuit diagram illustrating the forward-direction operation subsequent to FIG. 68.

As shown in FIG. 68, when VP1 becomes 0V at time t5 ((G) in FIG. 62), since VP3=VH ((I) in FIG. 62) and $V_{P1-P3}$=−VH ((J) in FIG. 62) at this time, the diode D2 becomes conductive. After VP1 becomes equal to 0V and the diode D2 becomes conductive, as shown in FIG. 69, the switching element S2 is turned on at time t6 ((B) in FIG. 62) and the ZVS operation is performed. As a result, a short-circuit loss in the switching element S2 is suppressed.

In the period from time t6 to time t7 shown in FIG. 69, the energy accumulated in the inductor Lr is regenerated in the smoothing capacitor CH by the loop currents Im and I1 as shown in FIG. 69 after charging/discharging in the capacitors C1 and C2 is completed. By the loop currents Im and I1 as shown in FIG. 69, the energy is regenerated in the smoothing capacitor CH. As the energy is regenerated to the smoothing capacitor CH, the energy accumulated in the inductor Lr decreases. In association with the decrease, the absolute value of the current Ir flowing in the inductor Lr and the absolute value of the current I31 flowing in the winding 31 of the transformer 2003 also decrease ((L) and (M) in FIG. 62). Therefore, the current Ich is branched to the loop current Ixa flowing in the diode D10 and the loop current Ixb flowing in the diode D20 so that the ampere turns in the transformer 2003 become equal to each other and the sum of currents flowing in the windings 32A and 32B in the transformer 2003 becomes equal to the current Ich flowing in the inductor Lch.

In the period, the loop currents Im and I1 flow so that the potential differences from one end (the connection point P3) of the inductor Lr to the cathode of the diode D5 become equal to each other. However, the potential difference in the path of the loop current Im gradually becomes larger than the potential difference in the path of the loop current I1, and the diode D5 becomes nonconductive. It makes the absolute value of the current Ir flowing in the inductor Lr and that of the current I31 flowing in the winding 31 of the transformer 2003 equal to each other ((L) and (M) in FIG. 62). As described above, the potential difference in the path of the loop current I1 is equal to the sum of the voltage V31 across the winding 31 of the transformer 2003 and the voltage VS3 across the switching element S3. The voltage V31 is a voltage obtained by dividing the forward voltage drop in the diode D10 by the turn ratio "n" between the winding 31 and the windings 32A and 32B of the transformer 2003. The voltage VS3 is equal to the product between the on resistance of the switching element S3 and the flowing current since the switching element S3 is in the on state in this period. The potential difference in the path of the loop current Im is the forward voltage drop in the diode D5.

Figure 70:
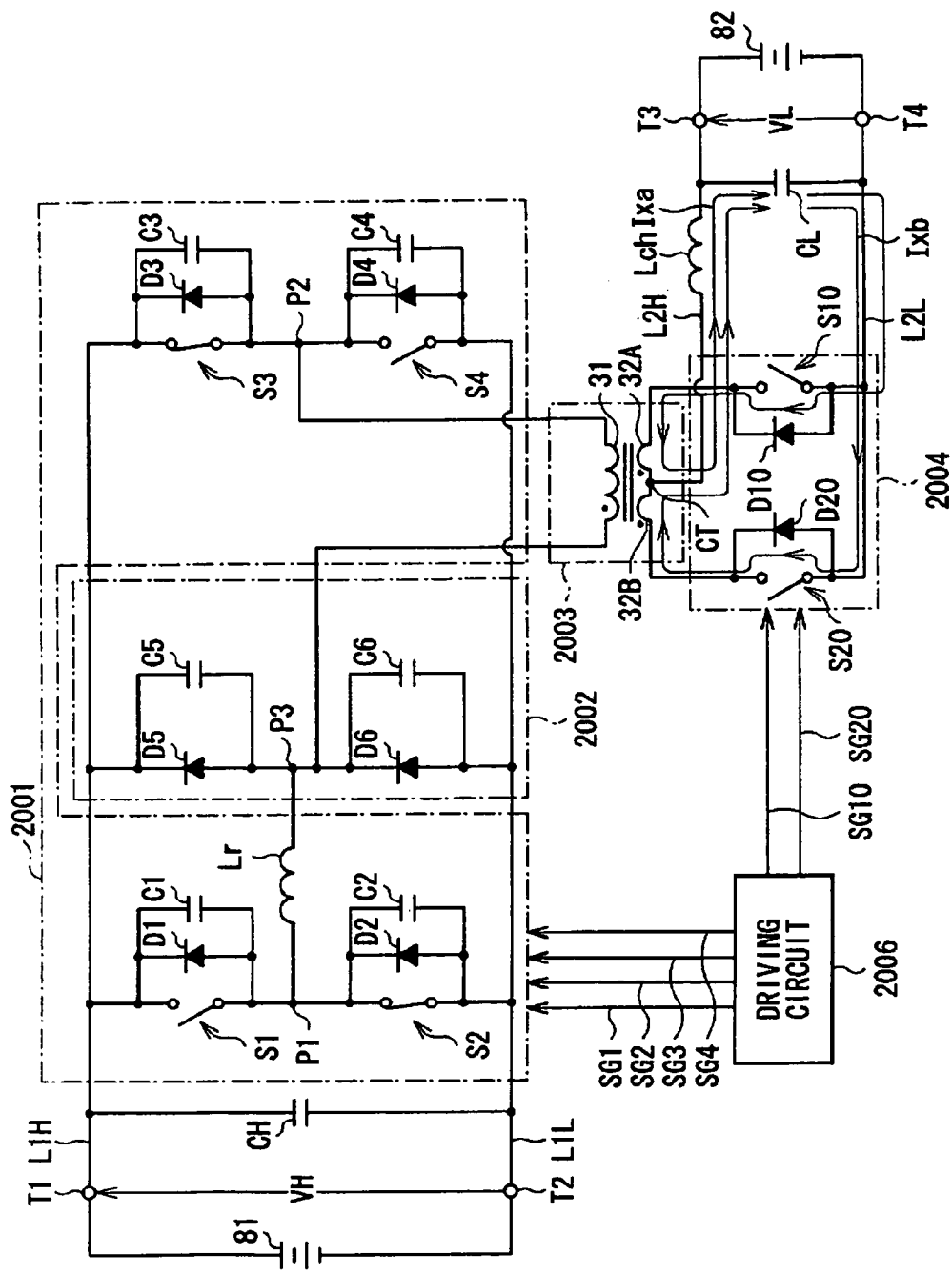
FIG. 70 is a circuit diagram illustrating the forward-direction operation subsequent to FIG. 69.
Figure 71:
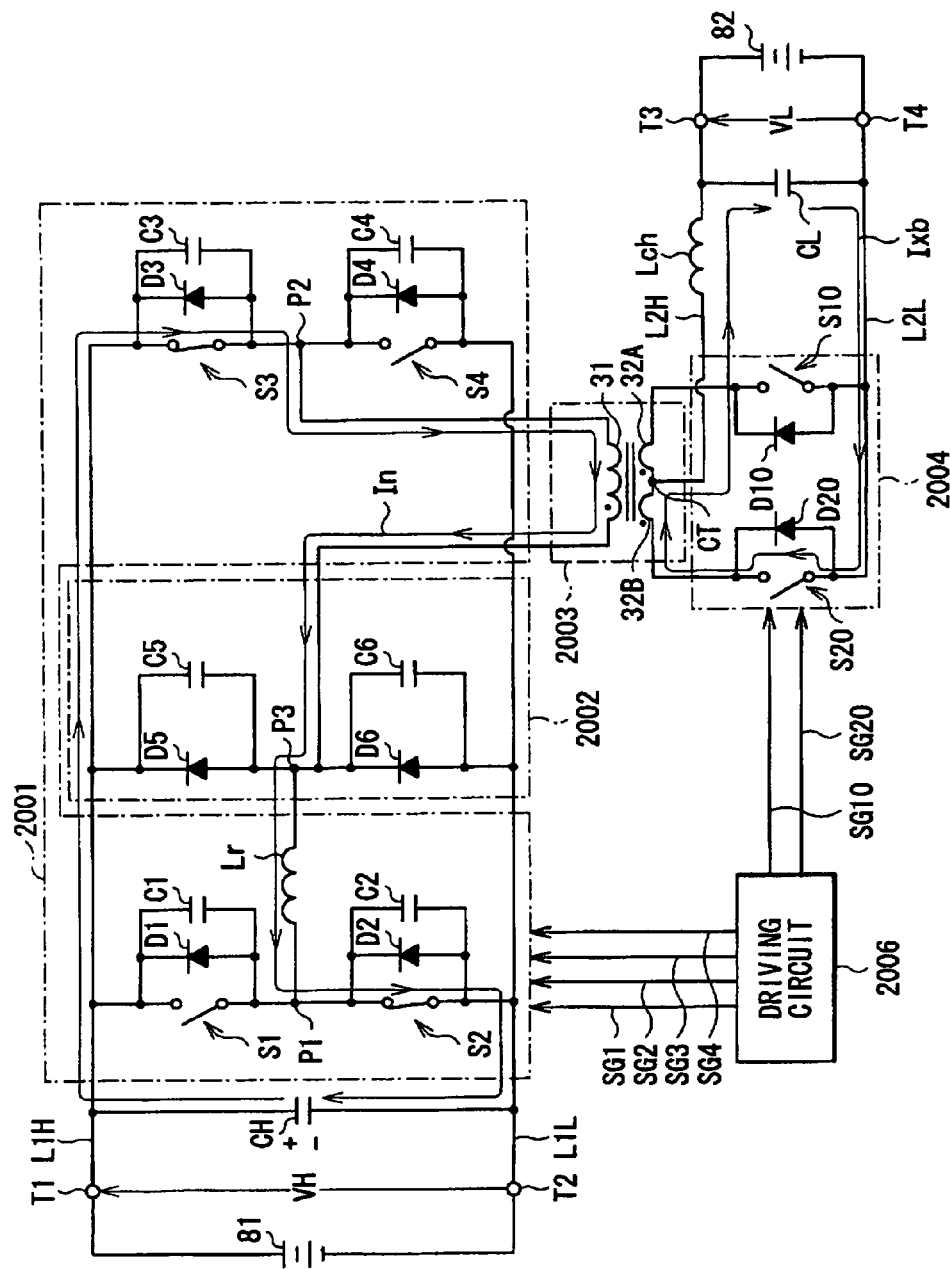
FIG. 71 is a circuit diagram illustrating the forward-direction operation subsequent to FIG. 70.

As shown in FIG. 70, at time t7, all of the energy accumulated in the inductor Lr is regenerated. Each of the current Ir flowing in the inductor Lr and the current I31 flowing in the winding 31 of the transformer 2003 is equal to 0 A ((L) and (M) in FIG. 62). The current I10 flowing in the diode D10 is equal to the current I20 flowing in the diode D20 ((Q) and (S) in FIG. 62). From the time t7, the inductor Lr accumulates energy in the direction opposite to the accumulation direction until then. The loop current In in the opposite direction flows in the inductor Lr and the winding 31 of the transformer 2003 as shown in FIG. 71, and the current Ir increases at the rate of VH/L (L: inductance of the inductor Lr) ((L) and (M) in FIG. 62). Consequently, the current Ich is branched to the loop current Ixa flowing in the diode D10 and the loop current Ixb flowing in the diode D20 so that the ampere turns in the transformer 2003 become equal to each other and the sum of currents flowing in the windings 32A and 32B in the transformer 2003 becomes equal to the current Ich flowing in the inductor Lch. The current I10 flowing in the diode D10 gradually decreases and, on the other hand, the current I20 flowing in the diode D20 gradually increases ((Q) and (S) in FIG. 62). When the current I10 becomes equal to 0 A and the current flowing in the winding 32B in the transformer 2003 becomes equal to the current Ich flowing in the inductor Lch, since the ampere turns in the transformer 2003 do not increase any more, increase in the current I31 is disturbed. However, the capacitors C5 and C6 in the surge voltage suppressing circuit 2002 and the inductor Lr cooperate one another to construct the LC series resonance circuit (first resonance circuit), and first resonance operation starts. This timing corresponds to time t8.

Figure 72:
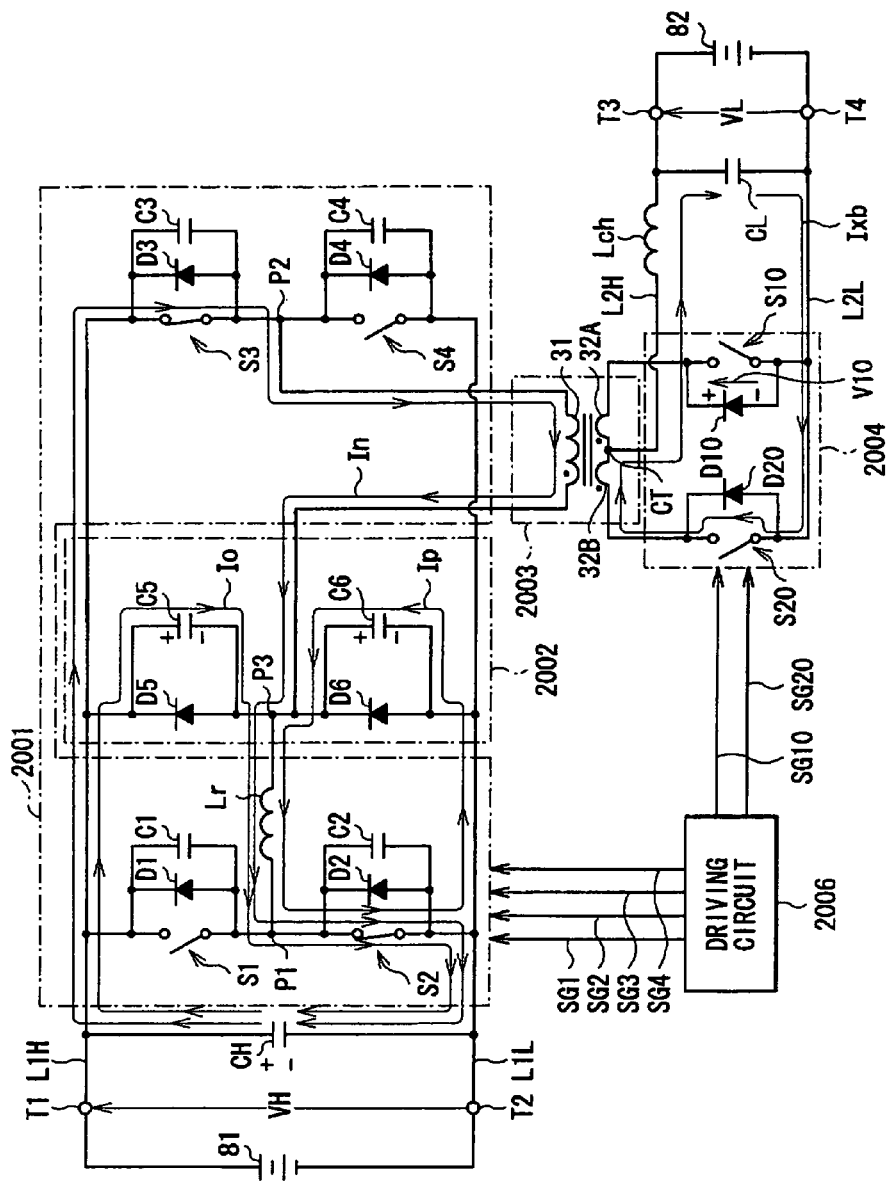
FIG. 72 is a circuit diagram illustrating the forward-direction operation subsequent to FIG. 71.

In the period from time t8 to time t9 shown in FIG. 72, the loop currents Io and Ip flow by the first resonance operation. Therefore, the capacitor C6 is discharged and, on the other had, the capacitor C5 is charged. In association with the first resonance operation, the potential VP3 at the connection point P3 decreases gently ((I) in FIG. 62). Accordingly, the absolute value of the voltage V31 across the winding 31 of the transformer 2003 increases, and the voltages V32A and V32B are generated in the windings 32A and 32B, respectively. The relations are satisfied such that V32A=V32B=V31/n (n: turn ratio between the winding 31 and the windings 32A and 32B of the transformer 2003), "the potential of the cathode in the diode D20"<"the potential at the center tap CT"<"the potential of the cathode in the diode D10", "the current Ir flowing in the inductor Lr"="the current I31 flowing in the winding 31 in the transformer 2003"+"the current I5 flowing in the parallel connection part between the diode D5 and the capacitor C5"+"the current I6 flowing in the parallel connection part between the diode D6 and the capacitor C6". The timing when VP3 decreases gently and becomes 0V and $V_{P3-P2}$=-VH ((I) and (K) in FIG. 62) corresponds to time t9.

In the switching power supply unit of the third embodiment, in the period from time t8 to time t9, resonance time of the first resonance circuit and the recovery time of the diodes D10 and D20 are set so as to satisfy the conditional expression (7), so that generation of the recovery current in the diodes D10 and D20 is suppressed. Therefore, the first resonance operation performed by the capacitors C5 and C6 and the inductor Lr is to be continued. However, since VP3 is equal to 0V ((I) in FIG. 62), the voltage across the capacitor C6 and the diode D6 becomes 0V. The current IC6 flowing in the capacitor C6 becomes 0V and the diode D6 is made conductive.

Figure 73:
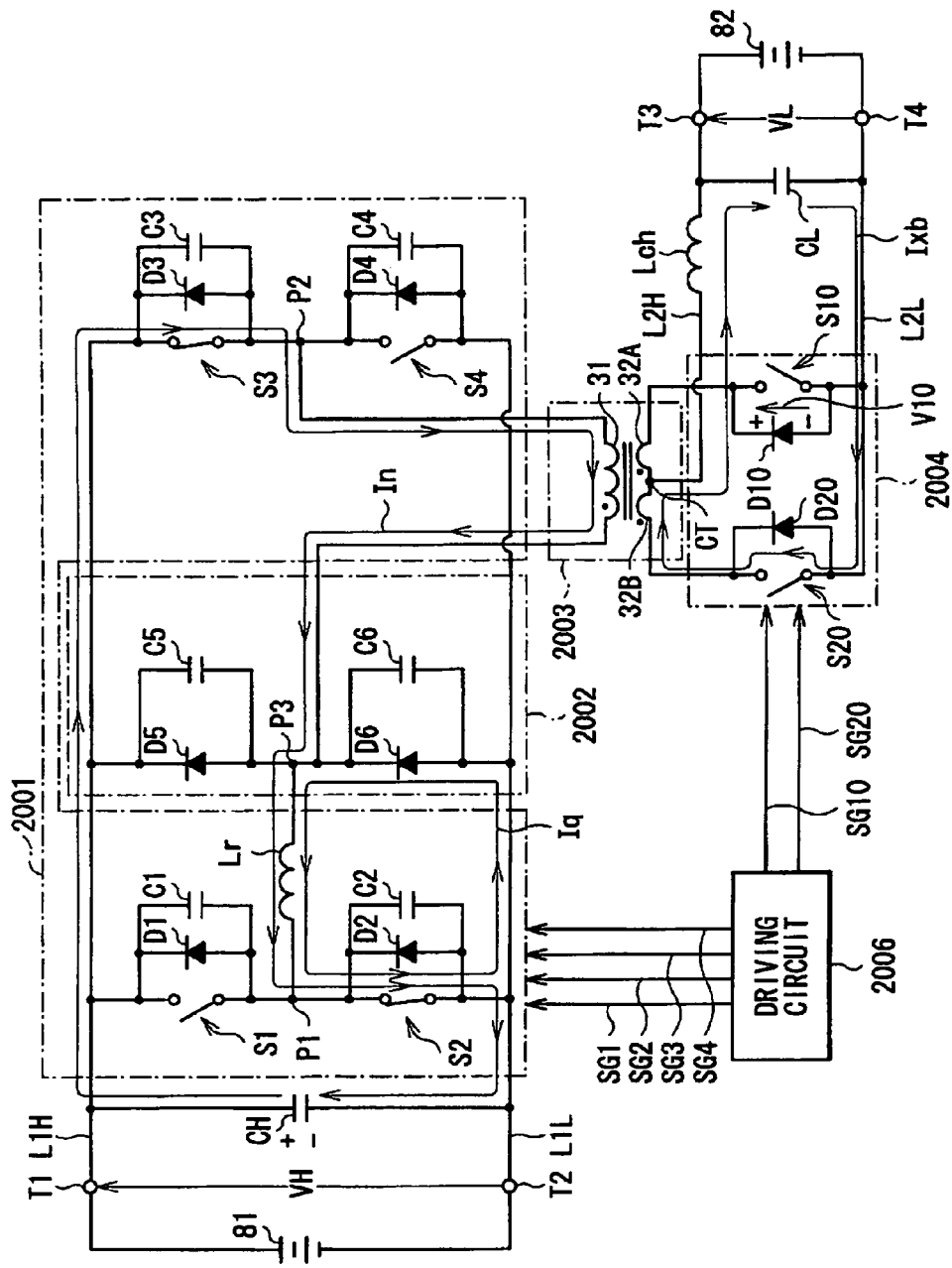
FIG. 73 is a circuit diagram illustrating the forward-direction operation subsequent to FIG. 72.
Figure 74:
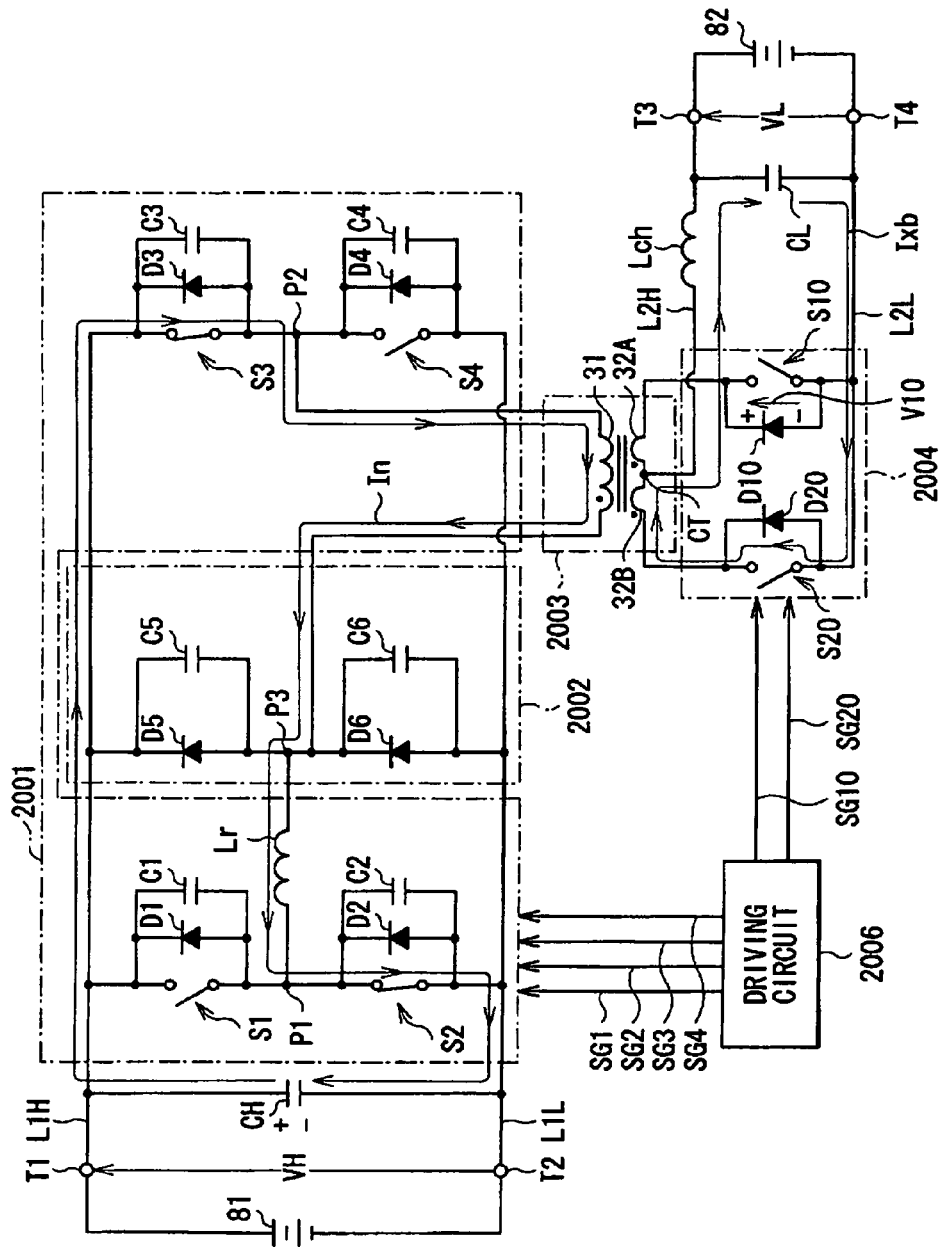
FIG. 74 is a circuit diagram illustrating the forward-direction operation subsequent to FIG. 73.

In the period from time t9 to time t10 shown in FIG. 73, the diode D6 is conductive and the switching element S3 is in the on state ((C) in FIG. 62). Consequently, the voltage V31 across the winding 31 of the transformer 2003 (and the absolute value of $V_{P3-P2}$ ((K) in FIG. 62) is clamped at the high DC voltage VH so that the voltage V32B across the winding 32B of the transformer 2003 is clamped at VH/n (n: the turn ratio between the winding 31 and the windings 32A and 32B of the transformer 2003). Since the switching circuit 2004 functioning as a rectifier circuit is of the center tap type, the reverse voltage V10 applied to the diode D10 does not exceed 2×VH/n ((P) in FIG. 62). In other words, the reverse voltage V10 applied to the diode D10 is 2×(VH/n) at the maximum, so that rise in the surge voltage is suppressed.

In the period from time t9 to time t10, the diode D6 is conductive as described above, so that "the current Ir flowing in the inductor Lr"="the current I31 flowing in the winding 31 of the transformer 2003"+"the current ID6 flowing in the diode D6". The resonance current generated by the first resonance operation is expressed by the loop current Iq as shown in FIG. 73 while Ir becomes constant ((L) in FIG. 62). As the inductor Lch is excited by the voltage V32B across the winding 32B of the transformer 2003, the current Ich flowing in the inductor Lch increases. Since I31="the current I32A flowing in the winding 32A"+"the current I32B flowing in the winding 32B"=I32B=Ich, I31 also increases ((M) in FIG. 62). Further, since Ir is equal to I31+ID6 and Ir is constant, as I31 increases, ID6 decreases. The timing when the relation of ID6=I6=0V is satisfied ((P) in FIG. 62) corresponds to time t10 shown in FIG. 74. The operations in the first half cycle have been described above.

Referring now to FIG. 75, operations in a half cycle (times t10 to t20 (t0)) after the times t0 to t10 shown in FIG. 62 will be described.

The operations in the half cycle are basically similar to those in the half cycle described with reference to FIGS. 62 to 74. The drive signals SG10 and SG20 of the switching elements S10 and S20 are always equal to 0V ((E) and (F) in FIG. 75). Specifically, in the period from time t10 to time t11, the switching elements S2 and S3 are in the on state ((B) and (C) in FIG. 75), and the switching elements S1 and S4 are in the off state ((A) and (D) in FIG. 75). The potential VP1 at the connection point P1 is equal to 0V ((G) in FIG. 75), the potential VP2 at the connection point P2 is equal to VH ((H) in FIG. 75), and the inductance of the inductor Lr is much smaller than the inductance of the winding 31 of the transformer 2003. Thus, the potential VP3 at the connection point P3 becomes almost 0V ((I) in FIG. 75), and the potential difference $V_{P3-P2}$ between the connection points P3 and P2 when VP2 is a reference is almost equal to 0V ((K) in FIG. 75). Therefore, the loop current flows in the switching circuit 2001, the inductor Lr is excited, and power is transmitted from the high-voltage side to the low-voltage side. Thus, the loop current flows to the low voltage side via the diode D20 and the inductor Lch, and charges are supplied to the low-voltage battery 2052. In the period, the forward voltage is applied to the diode D20, and the reverse voltage V20 is equal to 0V ((R) in FIG. 75). On the other hand, the reverse voltage V10 is applied to the diode D10 ((P) in FIG. 75).

In the period from time t11 to time t12, the switching element S3 is turned off at the time t11 ((C) in FIG. 75). The capacitors C3 and C4 and the inductor Lr cooperate one another to construct an LC series resonance circuit, and the resonance operation is performed. Therefore, by the two loop currents, the capacitor C3 is charged and, on the other hand, the capacitor C4 is discharged. Thus, the potential VP2 at the connection point P2 gradually decreases and becomes equal to 0V (VP2=0V) at the time t12 ((H) in FIG. 15). At this time, the reverse voltage V10 of the diode D10 decreases gradually and becomes 0V at the time t12 ((P) in FIG. 75).

When VP2 becomes 0V at the time t12 ((H) in FIG. 75), the diode D4 is made conductive. When VP2 becomes equal to 0V, the diode D4 is made conductive and, after that, the switching element S4 is turned on at the time t13 ((D) in FIG. 75), the ZVS operation is performed. As a result, a short-circuit loss in the switching element S4 is suppressed.

In the period from time t12 to time t14, as described above, energy accumulated in the inductor Lr by being excited in the period from time t10 to time t11 circulates as currents in the circuits connected to both ends of the inductor Lr, and the current is branched to two loop currents. Consequently, the absolute value of the current I31 flowing in the winding 31 in the transformer 2003 decreases ((M) in FIG. 75). The current Ich flowing in the diode D10 is branched to the loop current Ixa flowing in the diode D10 and the loop current Ixb flowing in the diode D20 so that the ampere turns in the transformer 2003 become equal to each other and the sum of the currents flowing in the windings 32A and 32B in the transformer 2003 becomes equal to the current Ich flowing in the inductor Lch.

At the time t14, the switching element S2 is turned off ((B) in FIG. 75). The LC series resonance circuit is constructed by cooperation of the capacitors C1 and C2 and the inductor Lr, and resonance operation is performed. Therefore, four loop currents flow, the capacitor C2 is charged and, on the other hand, the capacitor C1 is discharged. Consequently, the potential VP1 at the connection point P1 gradually increases and becomes equal to VH (VP1=VH) at the time t15 ((G) in FIG. 75).

When VP1 becomes equal to VH at the time t15 ((G) in FIG. 75), since VP3=0V ((I) in FIG. 75) and $V_{P1\_P3}$=VH ((J) in FIG. 75), the diode D1 is made conductive. When VP1 becomes equal to VH, the diode D1 is made conductive and, after that, the switching element S1 is turned on at the time t16 ((A) in FIG. 75), the ZVS operation is performed. As a result, a short-circuit loss in the switching element S1 is suppressed.

In the period from time t16 to time t17, the energy accumulated in the inductor Lr is regenerated in the smoothing capacitor CH by the two loop currents also after charging/discharging in the capacitors C1 and C2 is completed. As the energy is regenerated to the smoothing capacitor CH, the energy accumulated in the inductor Lr decreases. In association with the decrease, the absolute value of the current Ir flowing in the inductor Lr and the absolute value of the current I31 flowing in the winding 31 of the transformer 2003 also decrease ((L) and (M) in FIG. 75). Therefore, the current Ich is branched to the loop current Ixa flowing in the diode D10 and the loop current Ixb flowing in the diode D20 so that the ampere turns in the transformer 2003 become equal to each other and the sum of currents flowing in the windings 32A and 32B in the transformer 2003 becomes equal to the current Ich flowing in the inductor Lch. In this period, since the diode D6 is nonconductive, the absolute value of the current Ir flowing in the inductor Lr and that of the current I31 flowing in the winding 31 in the transformer 2003 become equal to each other ((L) and (M) in FIG. 75).

At time t17, all of the energy accumulated in the inductor Lr is regenerated. Each of the current Ir flowing in the inductor Lr and the current I31 flowing in the winding 31 of the transformer 2003 is equal to 0 A ((L) and (M) in FIG. 75). The current I10 flowing in the diode D10 is equal to the current I20 flowing in the diode D20 ((Q) and (S) in FIG. 75). From the time t17, the inductor Lr accumulates energy in the direction opposite to the accumulation direction until then. The loop current In in the opposite direction flows in the inductor Lr and the winding 31 of the transformer 2003, and the current Ir increases at the rate of VH/L (L: inductance of the inductor Lr) ((L) and (M) in FIG. 75). Consequently, the current Ich flowing in the inductor Ich is branched to the loop current Ixa flowing in the diode D10 and the loop current Ixb flowing in the diode D20 so that the ampere turns in the transformer 2003 become equal to each other and the sum of currents flowing in the windings 32A and 32B in the transformer 2003 becomes equal to the current Ich flowing in the inductor Lch. The current I20 flowing in the diode D20 gradually decreases and, on the other hand, the current I10 flowing in the diode D10 gradually increases ((Q) and (S) in FIG. 75). When the current I20 becomes equal to 0 A and the current flowing in the winding 32A in the transformer 2003 becomes equal to the current Ich flowing in the inductor Lch, since the ampere turns in the transformer 2003 do not increase any more, increase in the current I31 is disturbed. However, the capacitors C5 and C6 in the surge voltage suppressing circuit 2002 and the inductor Lch on the low voltage side cooperate one another to construct the LC series resonance circuit (second resonance circuit), and second resonance operation starts. This timing corresponds to time t18.

In the period from time t18 to time t19, the two loop currents flow by the second resonance operation, the capacitor C6 is charged and, on the other had, the capacitor C5 is discharged. In association with the second resonance operation, the potential VP3 at the connection point P3 increases gently ((I) in FIG. 75). Accordingly, the voltage V31 across the winding 31 of the transformer 2003 increases, and the voltages V32A and V32B are generated in the windings 32A and 32B, respectively. The timing when VP3 increasing gently becomes VH and $V_{P3\_P2}$ becomes equal to VH ((I) and (K) in FIG. 75) corresponds to time t19.

In the switching power supply unit of the third embodiment, in the period from time t18 to time t19, resonance time of the first resonance circuit and the recovery time of the diodes D10 and D20 are set so as to satisfy the conditional expression (7), so that generation of the recovery current in the diodes D10 and D20 is suppressed. Therefore, the first resonance operation performed by the capacitors C5 and C6 and the inductor Lr is to be continued. However, since VP3 is equal to VH, the voltage across the capacitor C5 and the diode D5 becomes 0V. The current IC5 flowing in the capacitor C5 becomes equal to 0 A and the diode D5 is made conductive.

In the period from time t19 to time t20, therefore, the diode D5 is conductive and the switching element S4 is in the on state ((D) in FIG. 75). Consequently, the voltage V31 across the winding 31 of the transformer 2003 (and the absolute value of $V_{P3\_P2}$ ((K) in FIG. 75)) is clamped at VH so that the voltage V32A across the winding 32A of the transformer 3 is clamped at VH/n (n: the turn ratio between the winding 31 and the windings 32A and 32B of the transformer 2003). Since the switching circuit 2004 functioning as a rectifier circuit is of the center tap type, the reverse voltage V20 applied to the diode D20 does not exceed 2×(VH/n) ((R) in FIG. 75). In other words, the reverse voltage V20 applied to the diode D20 is 2×(VH/n) at the maximum, so that rise in the surge voltage is suppressed.

In the period from time t19 to time t20, the diode D5 is conductive as described above, so that Ir is constant ((L) in FIG. 75). As the inductor Lch is excited by the voltage V32A across the winding 32A of the transformer 2003, the current Ich flowing in the inductor Lch increases and I31 also increases ((M) in FIG. 75). Since Ir is equal to I31+ID5 and Ir is constant, as I31 increases, ID5 decreases. The timing when the relation of ID5=I5=0V is satisfied ((N) in FIG. 75) corresponds to time t20. The operations in the latter half cycle have been described above and a state equivalent to that at the time t0 in FIG. 62 is obtained.

In such a manner, the surge voltage applied to the diodes D10 and D20 in the switching circuit 2004 functioning as a rectifier circuit at the time of the forward-direction operation is suppressed. Surge voltage suppressing operation at the time of reverse-direction operation Next, referring to FIGS. 76 to 85, the operation of suppressing the surge voltage applied to the diodes D10 and D20 at the time of the reverse-direction operation will be described.

Figure 76:
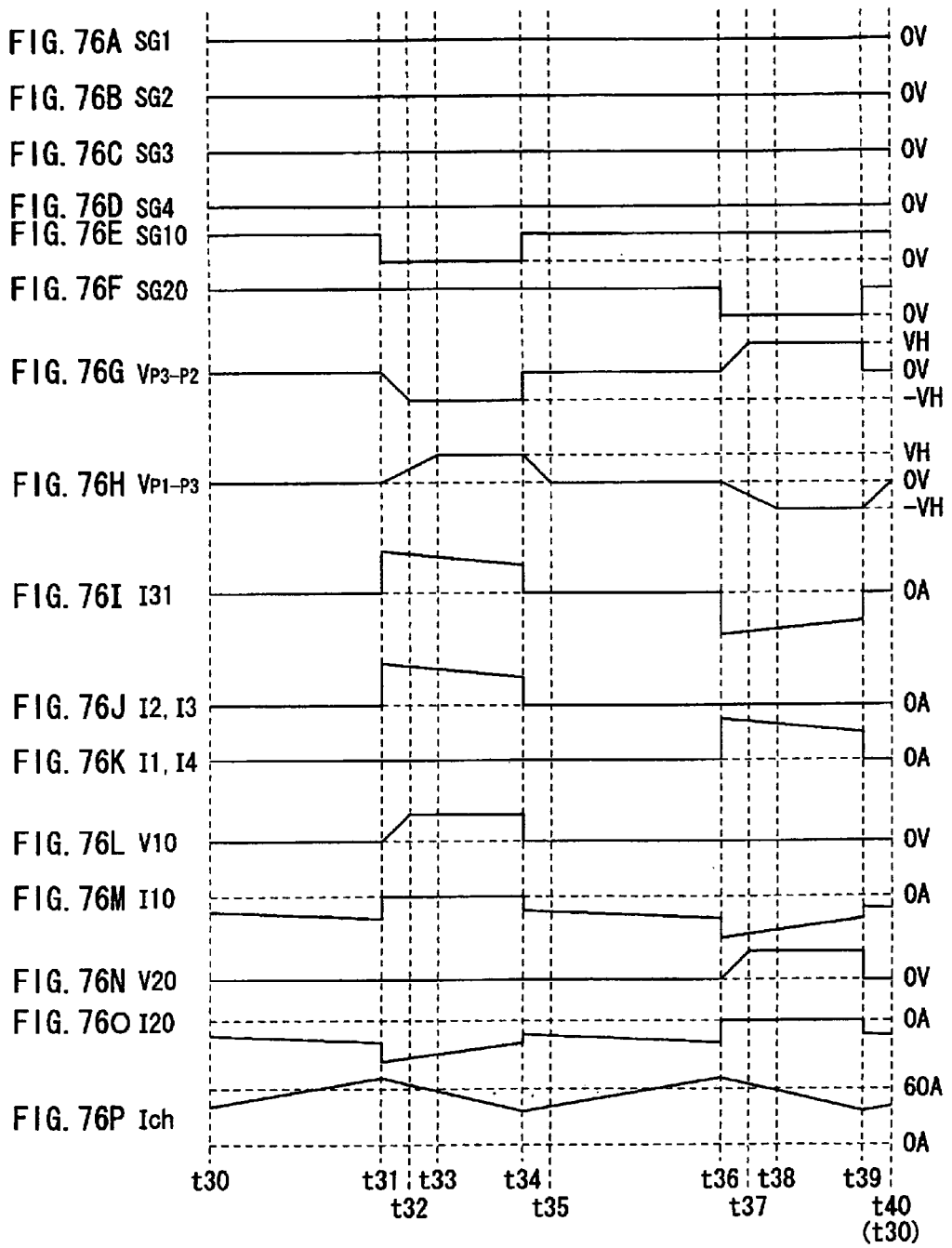
FIG. 76 is a timing waveform chart illustrating the reverse-direction operation in the switching power supply unit of FIG. 60.

FIG. 76 is a timing waveform chart (times t0 to t10) of voltage waveforms and current waveforms of parts at the time of the reverse-direction operation in the switching power supply unit of FIG. 60. (A) to (D) in the diagram show voltage waveforms of the drive signals SG1 to SG4. (E) and (F) show voltage waveforms of the drive signals SG10 and SG20. (G) shows the potential difference $V_{P3-P2}$ between the connection points P3 and P2 when the potential VP2 at the connection point P2 is used as a reference. (H) shows the potential difference $V_{P1-P3}$ between the connection points P1 and P3 when the potential VP3 at the connection point P3 is used as a reference. (I) indicates current I31 flowing in the winding 31 of the transformer 2003. (J) indicates currents I2 and I3 flowing in the switching elements S2 and S3 in the switching circuit 2001. (K) indicates currents I1 and I4 flowing in the switching elements S1 and S4 in the switching circuit 2001. (L) and (N) indicate reverse voltages V10 and V20 applied across the anodes and cathodes of the diodes D10 and D20, respectively. (M) and (O) denote currents I10 and I20 flowing in the switching elements S10 and S20 or the diodes D10 and D20, respectively. (P) denotes current Ich flowing in the inductor Lch. The directions of the voltages are as shown by the arrows in FIG. 60. The direction from "−" to "+" is a positive direction. The positive directions of the currents are also as shown by the arrows in FIG. 60.

FIGS. 77 to 85 show operation states of the switching power supply unit at the timings (times t30 to t40) in FIG. 76. The timings shown in FIG. 76 correspond to one cycle of the operation in the switching power supply unit. The operation states shown in FIGS. 77 to 81 correspond to a half cycle of the one cycle, and those shown in FIGS. 82 to 85 correspond to the other half cycle.

First, referring to FIGS. 77 to 81, the operations in the first half cycle (times t30 to 35) will be described.

At the time of the reverse-direction operation, the drive signals SG1 to SG4 of the switching elements S1 to S4 are always 0V ((A) to (D) in FIG. 76), and the switching elements S1 to S4 are always in the off state. In the case of the above-described sync rectification, however, the switching elements S1 to S4 also perform the on/off operation.

Figure 77:
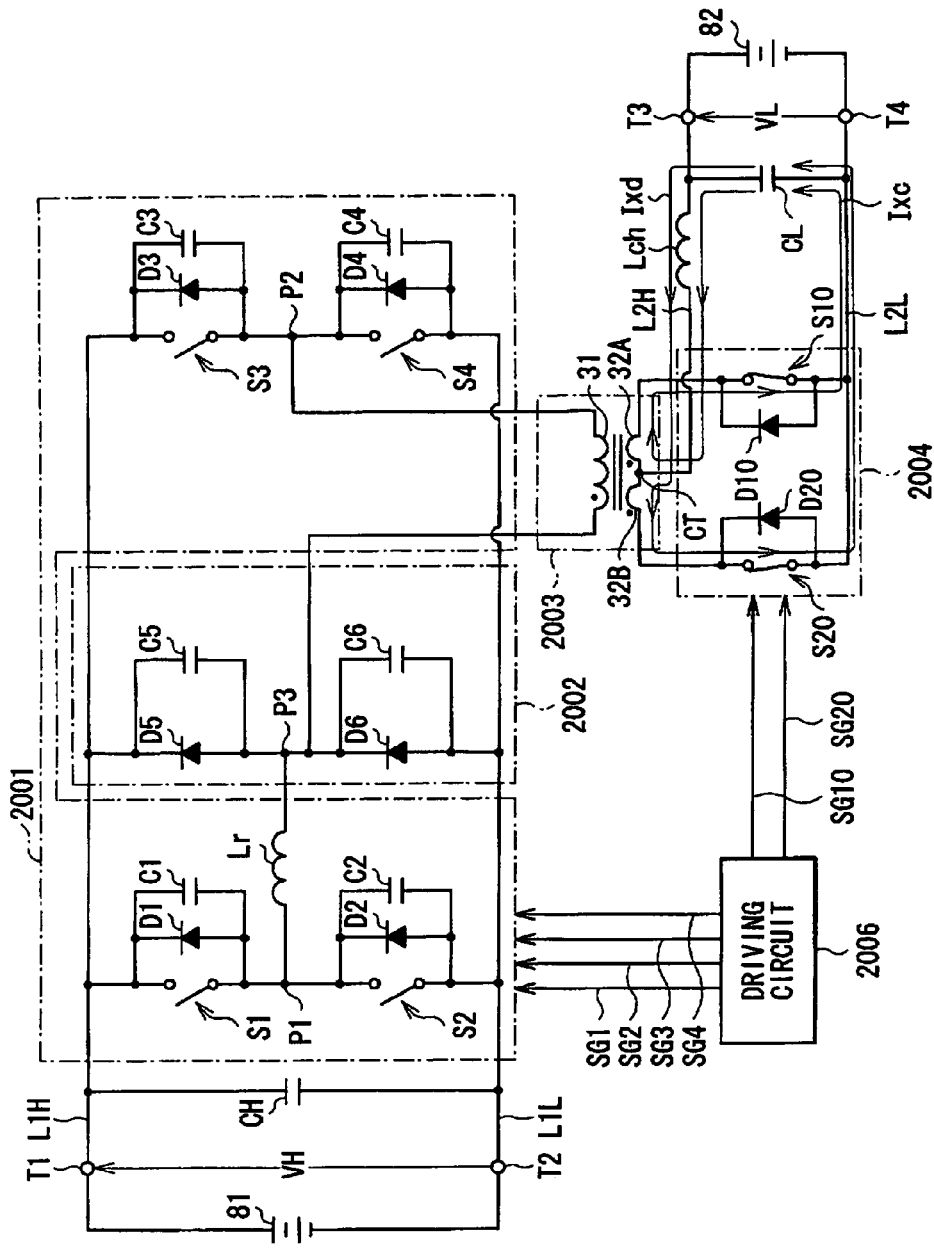
FIG. 77 is a circuit diagram illustrating the reverse-direction operation in the switching power supply unit of FIG. 60.

In the period between time t30 and time t31 shown in FIG. 77, both of the switching elements S10 and S20 are in the on state ((E) and (F) in FIG. 76). Therefore, the loop currents Ixc and Ixd as shown in FIG. 77 flow to the low voltage side including the switching circuit 2004, and the inductor Lch is excited. The windings 32A and 32B of the transformer 2003 wind in opposite directions and the number of turns of the winding 32A and that of the winding 32B are equal to each other. Thus, magnetic fluxes generated by the currents flowing in the windings 32A and 32B cancel out each other, and the voltages across the windings 32A and 32B are equal to 0V. Therefore, no power is transmitted from the low voltage side to the high voltage side. As shown in FIG. 77, no current flows to the switching circuit 2001 and the surge voltage suppressing circuit 2002 on the high voltage side. In the period, no reverse voltages V10 and V20 are applied to the diodes D10 and D20 ((L) and (N) in FIG. 76).

Figure 78:
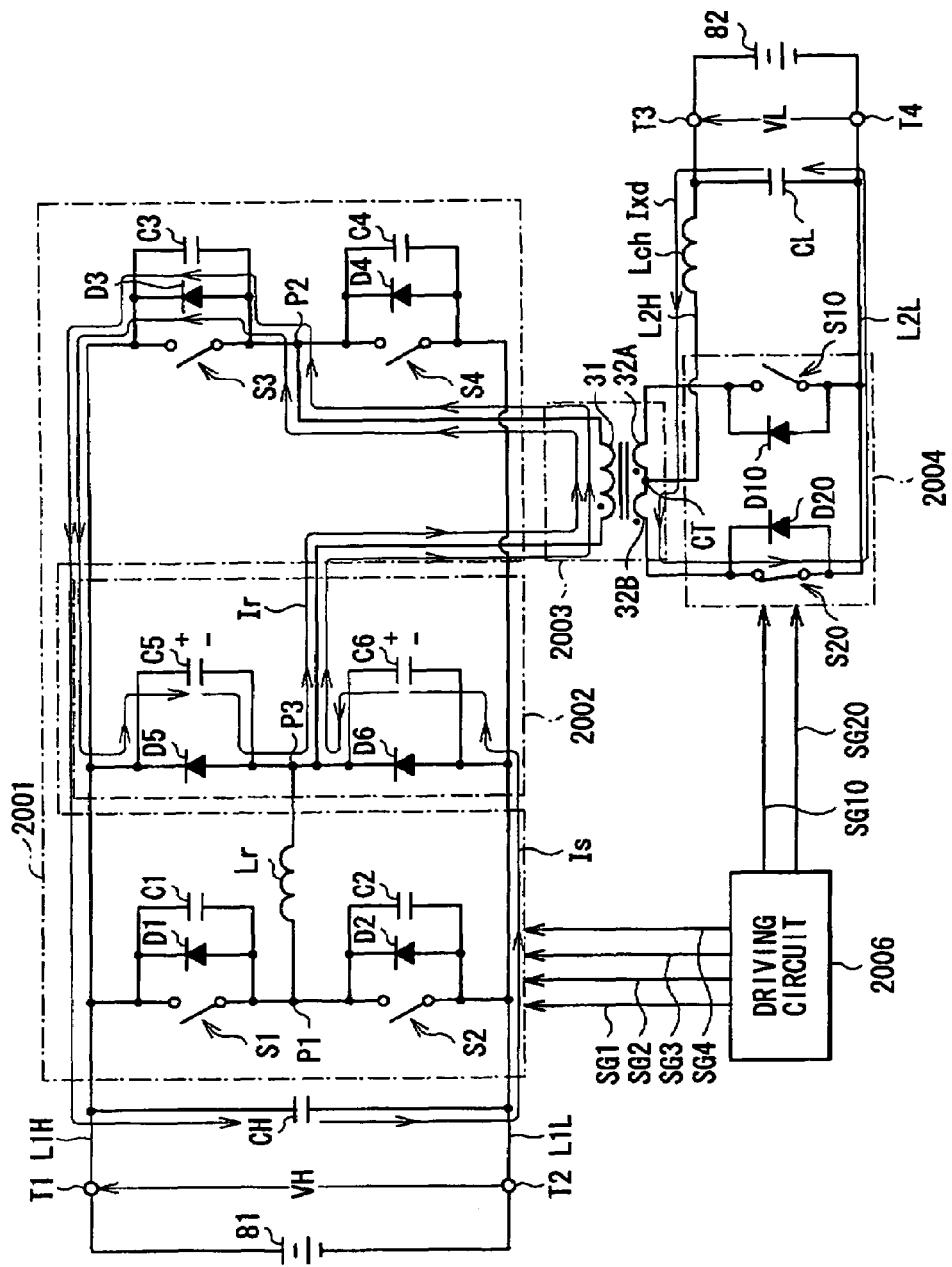
FIG. 78 is a circuit diagram illustrating the reverse-direction operation subsequent to FIG. 77.

Next, in the period between time t31 and time t32 shown in FIG. 78, the switching element S10 is turned off at the time t31 ((E) in FIG. 76). Therefore, only the loop current Ixd as shown in FIG. 78 flows on the low voltage side. In the period from time t31 to time t34 which will be described later, power is transmitted from the low voltage side to the high voltage side on the basis of the energy accumulated in the inductor Lch.

In the period from time t31 to time t32, an LC series resonance circuit (second resonance circuit) is constructed by cooperation of the capacitors C5 and C6 in the surge voltage suppressing circuit 2002 and the inductor Lch on the low voltage side, and second resonance operation is performed. Therefore, the loop currents Ir and Is flow, the capacitor C6 is discharged and, on the other hand, the capacitor C5 is charged. Consequently, the potential VP3 at the connection point P3 gradually decreases. With the decrease, the absolute value of the voltage V31 across the winding 31 of the transformer 2003 increases, and the voltages V32A and V32B are generated in the windings 32A and 32B, respectively. The relation V32A=V32B=V31/n (n: turn ratio between the winding 31 and the windings 32A and 32B of the transformer 2003) is satisfied. As described above, the timing when VP3 decreases gently and becomes equal to 0V and $V_{P3-P2}$ becomes equal to −VH ((G) in FIG. 76) corresponds to time t32.

In the switching power supply unit of the third embodiment, resonance time of the second resonance circuit and recovery time of the diodes D10 and D20 are set so as to satisfy the conditional expression (8). Therefore, like the case of the forward-direction operation, generation of the recovery current in the diodes D10 and D20 is suppressed. Although the second resonance operation is to be continued by the action of the inductor Lch, since VP3 is equal to 0V, the voltage across the capacitor C6 and the diode D6 becomes 0V. The current IC6 flowing in the capacitor C6 becomes equal to 0V and the diode D6 is made conductive.

Figure 79:
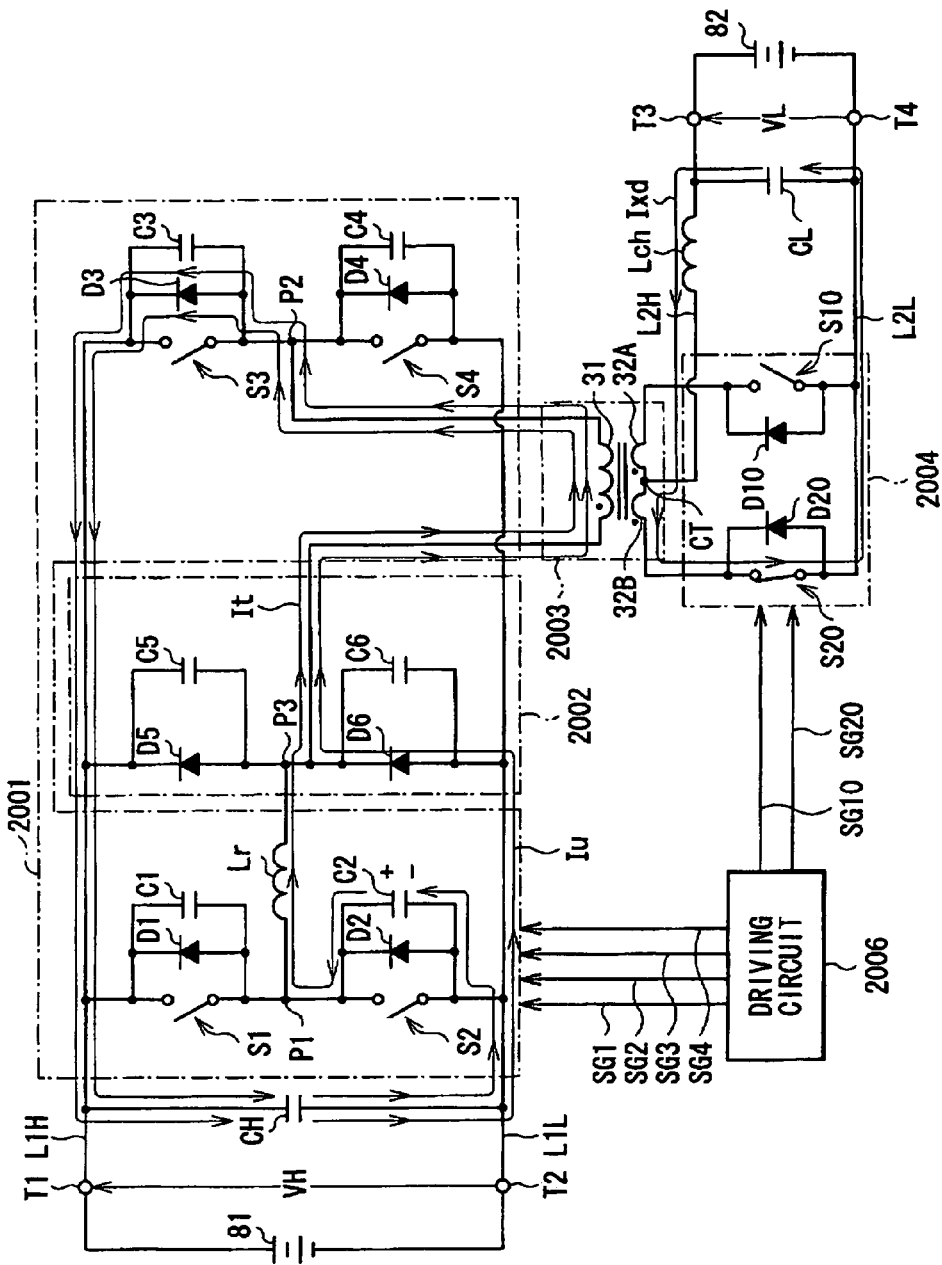
FIG. 79 is a circuit diagram illustrating the reverse-direction operation subsequent to FIG. 78.

In the period from time t32 to time t33 shown in FIG. 79, an LC series resonance circuit is constructed by cooperation of the capacitor C2 in the switching circuit 2001 and the inductor Lr on the high voltage side, and the resonance operation is performed. Therefore, the loop currents It and Iu flow and the capacitor C2 is discharged. With the resonance operation, the voltage VP1 at the connection point P1 gently decreases. The timing at which the potential VP1 at the connection point P1 becomes equal to 0V and the diode D2 is made conductive corresponds to time t33.

Figure 80:
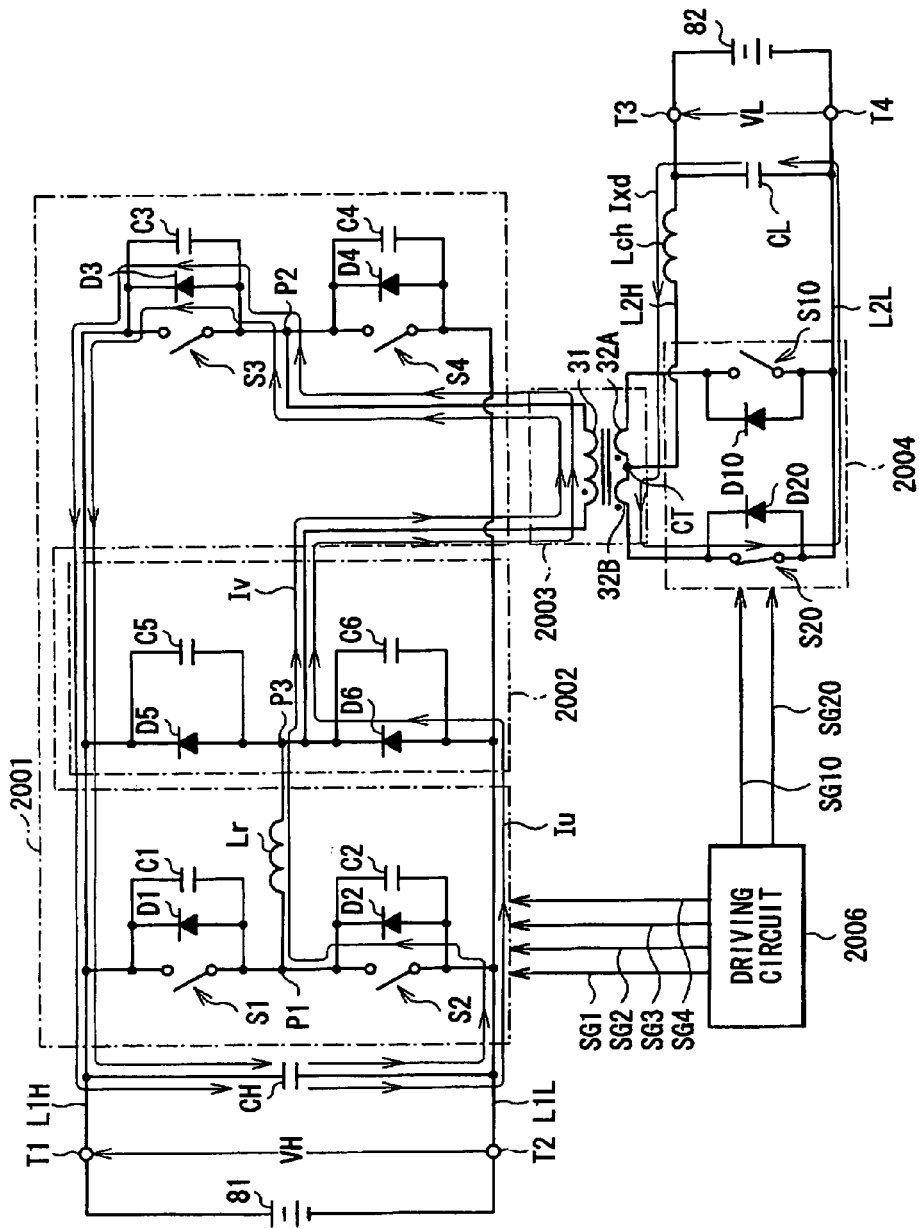
FIG. 80 is a circuit diagram illustrating the reverse-direction operation subsequent to FIG. 79.

In the period from time t33 to time t34 shown in FIG. 80, the diodes D2, D3, and D6 are conductive, so that the voltage V31 across the winding 31 of the transformer 2003 (and the absolute value of $V_{P3-P2}$ ((G) in FIG. 76)) is (are) clamped at the high DC voltage VH. Accordingly, the voltage V32A across the winding 32A of the transformer 2003 is clamped at VH/n (n: the turn ratio between the winding 31 and the windings 32A and 32B of the transformer 2003). Since the switching circuit 2004 functioning as an inverter circuit has a configuration of the push pull type, the reverse voltage V10 applied to the diode D10 does not exceed 2×(VH/n) ((L) in FIG. 76). In other words, the reverse voltage V10 applied to the diode D10 is 2×(VH/n) at the maximum, so that rise in the surge voltage is suppressed.

Figure 81:
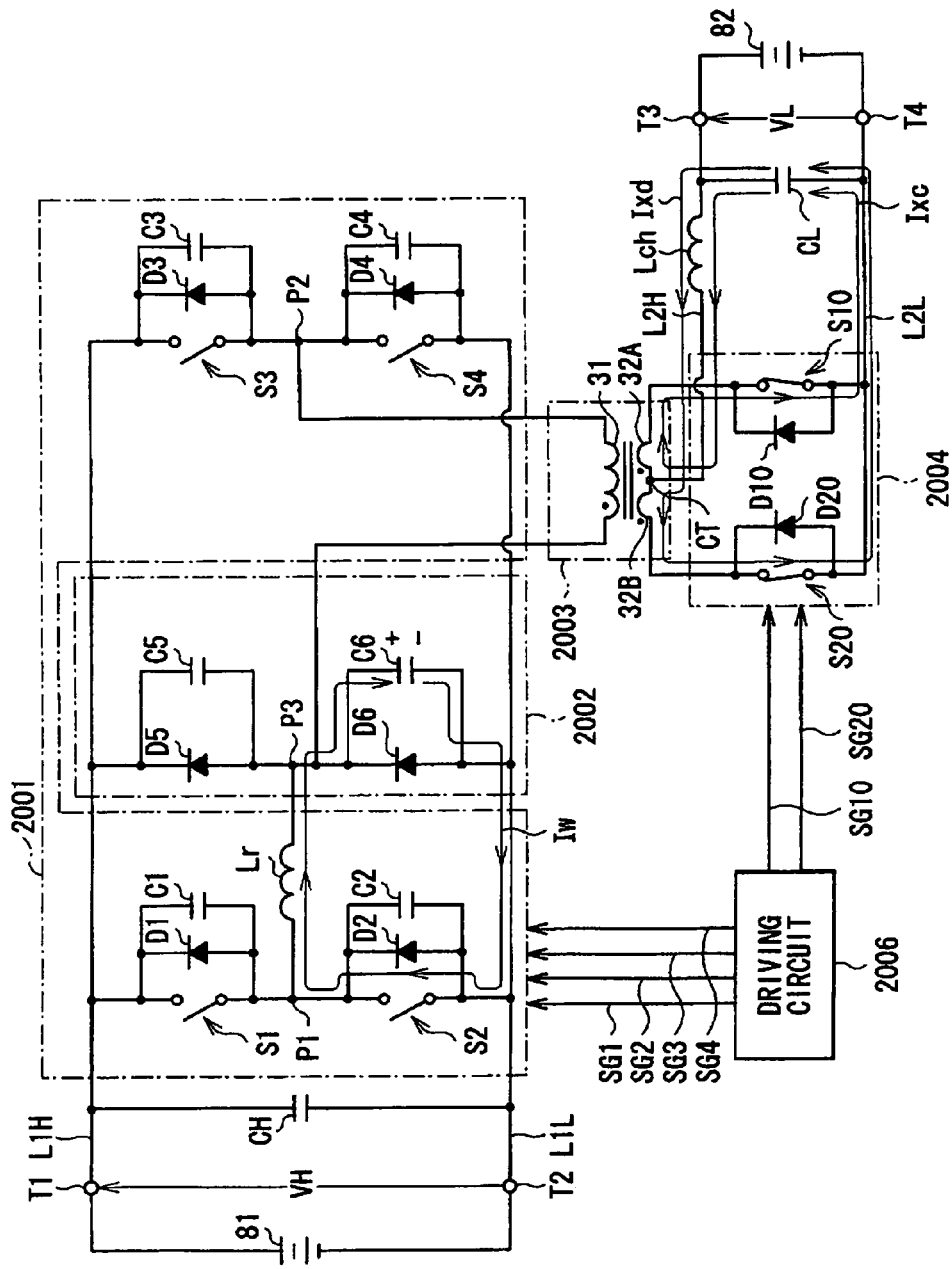
FIG. 81 is a circuit diagram illustrating the reverse-direction operation subsequent to FIG. 80.

In the period from time t34 to time t35 shown in FIG. 81, the switching element S10 is turned on again at time t34 ((E) in FIG. 76), and loop currents Ixc and Ixd as shown in FIG. 81 flow, so that the inductor Lch is excited again. On the high voltage side, the energy accumulated in the inductor Lr is discharged to the capacitor C6 by loop current Iw as shown in FIG. 81. The timing at which all of the accumulated energy is discharged and the loop current Iw becomes equal to 0 A corresponds to time t35. In such a manner, the operations in the first half cycle are performed. [0281]

Referring now to FIGS. 82 to 85, operations in the latter half cycle (times t30 to t35) will be described.

In the period from time t35 to time t36, in a manner similar to the period from time t30 to time t31 shown in FIG. 76, the loop currents Ixc and Ixd flow on the low voltage side, and the inductor Lch is excited. No power is transmitted from the low voltage side to the high voltage side, and no current flows in the switching circuit 2001 and the surge voltage suppressing circuit 2002 on the high voltage side. In the period, the reverse voltages V10 and V20 are not applied to the diodes D10 and D20 ((L) and (N) in FIG. 76).

Figure 82:
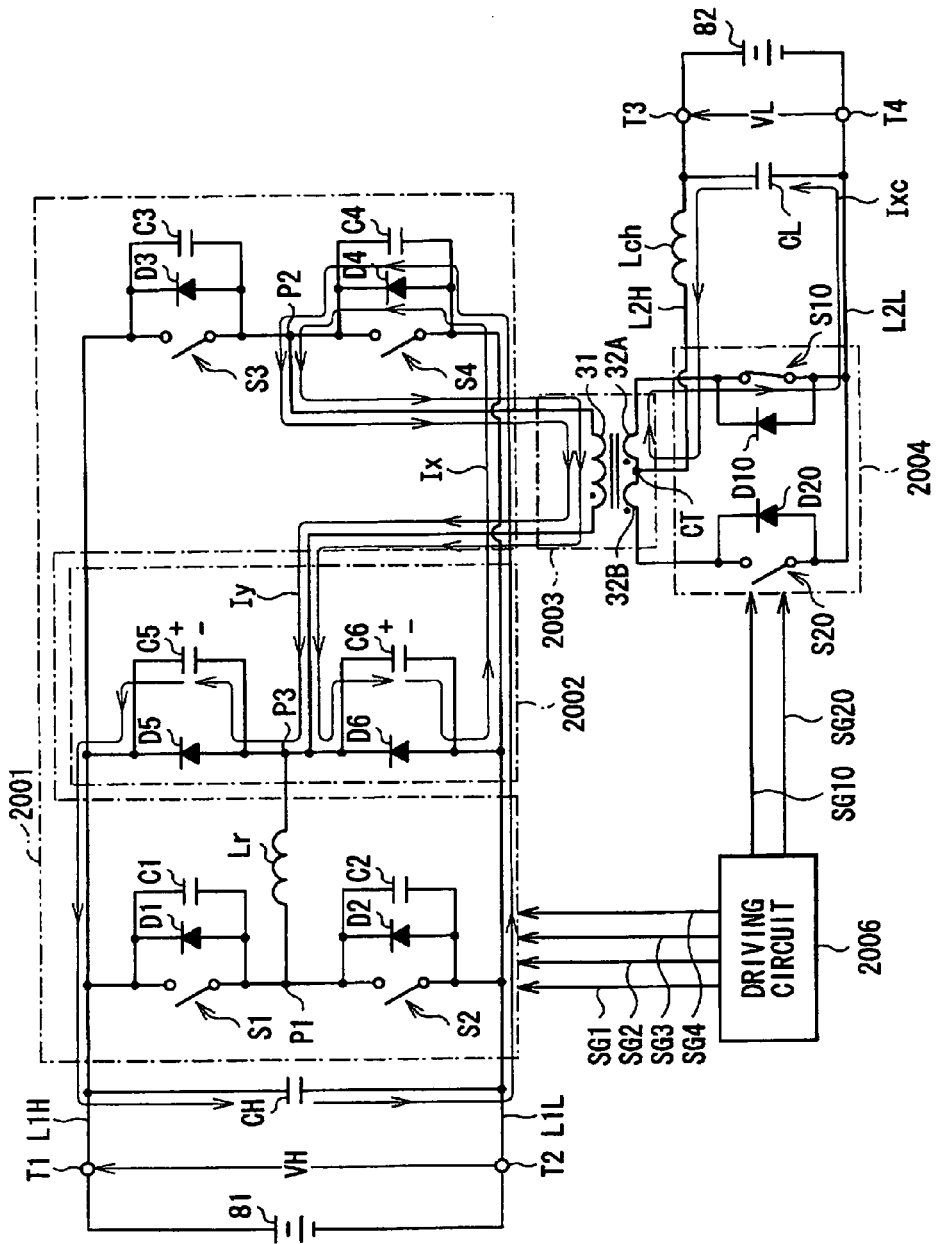
FIG. 82 is a circuit diagram illustrating the reverse-direction operation subsequent to FIG. 81.

In the period from time t36 to time t37 shown in FIG. 82, the switching element S20 is turned off at the time t36 ((F) in FIG. 76). Therefore, only the loop current Ixc as shown in FIG. 82 flows on the low voltage side. In the period from time t36 to time t39 which will be described later, power is transmitted from the low voltage side to the high voltage side on the basis of the energy accumulated in the inductor Lch.

In the period from time t36 to time t37, an LC series resonance circuit (second resonance circuit) is constructed by cooperation of the capacitors C5 and C6 in the surge voltage suppressing circuit 2002 and the inductor Lch, and second resonance operation is performed. Therefore, the loop currents Ix and Iy flow, the capacitor C5 is discharged and, on the other hand, the capacitor C6 is charged. Consequently, with the second resonance operation, the potential VP3 at the connection point P3 gradually increases. With the increase, the absolute value of the voltage V31 across the winding 31 of the transformer 2003 increases, and the voltages V32A and V32B are generated in the windings 32A and 32B, respectively. The relation V32A=V32B=V31/n (n: turn ratio between the winding 31 and the windings 32A and 32B of the transformer 2003) is satisfied. As described above, the timing when VP3 increases gently and becomes equal to VH and $V_{P3-P2}$ becomes equal to VH ((G) in FIG. 76) corresponds to time t37.

In the switching power supply unit of the third embodiment, resonance time of the second resonance circuit and recovery time of the diodes D10 and D20 are set so as to satisfy the conditional expression (8). Therefore, like the case of the forward-direction operation, generation of the recovery current in the diodes D10 and D20 is suppressed. Although the second resonance operation is to be continued by the action of the inductor Lch, since VP3 is equal to VH, the voltage across the capacitor C5 and the diode D5 becomes equal to 0V. The current IC5 flowing in the capacitor C5 becomes equal to 0V and the diode D5 is made conductive.

Figure 83:
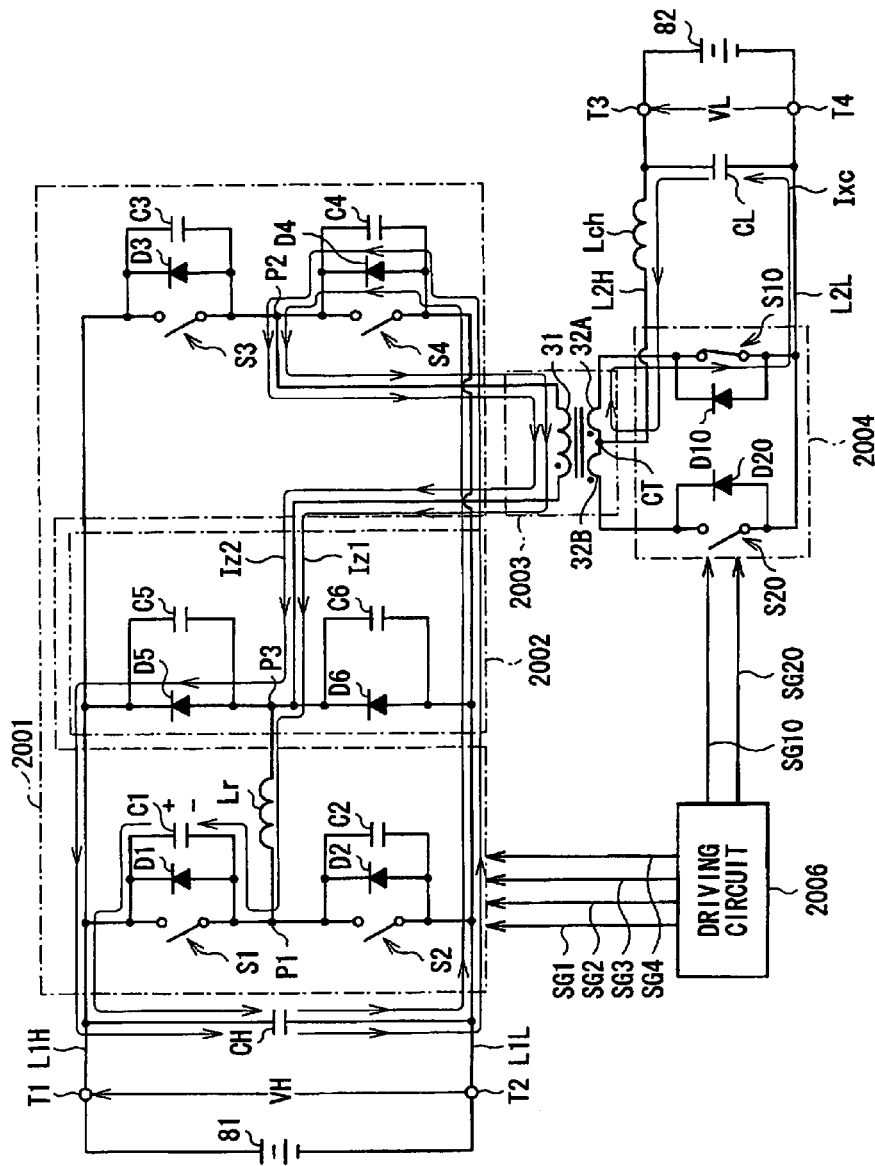
FIG. 83 is a circuit diagram illustrating the reverse-direction operation subsequent to FIG. 82.

In the period from time t37 to time t38 shown in FIG. 83, an LC series resonance circuit is constructed by cooperation of the capacitor C1 in the switching circuit 2001 and the inductor Lr on the high voltage side, and the resonance operation is performed. Therefore, the loop currents Iz1 and Iz2 flow and the capacitor C1 is discharged. With the resonance operation, the voltage VP1 at the connection point P1 gently increases. The timing at which the potential VP1 at the connection point P1 becomes equal to VH and the diode D1 is made conductive corresponds to time t34.

Figure 84:
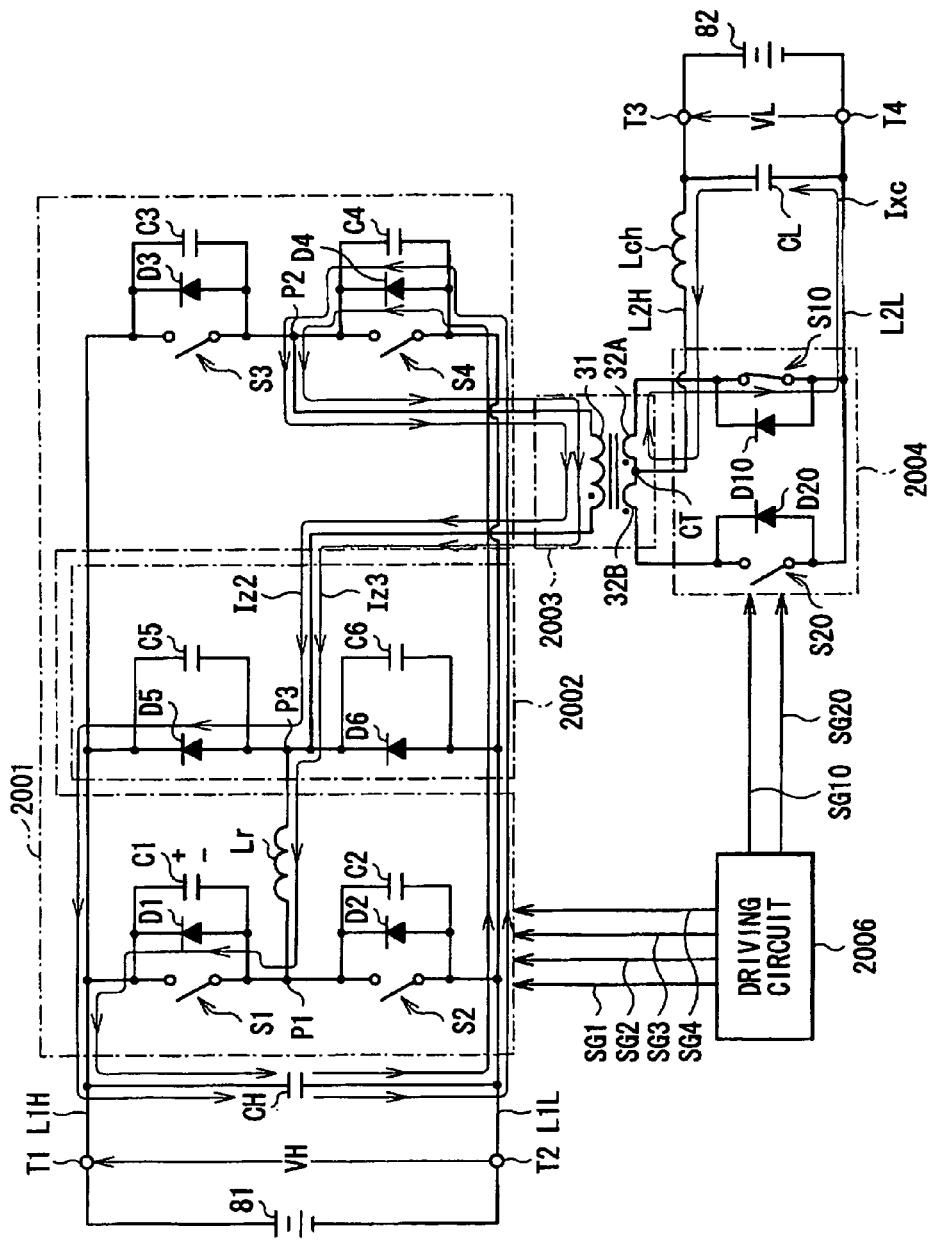
FIG. 84 is a circuit diagram illustrating the reverse-direction operation subsequent to FIG. 83.

In the period from time t38 to time t39 shown in FIG. 84, the diodes D1, D4, and D5 are conductive, so that the voltage V31 across the winding 31 of the transformer 2003 (and the absolute value of $V_{P3-P2}$ ((G) in FIG. 76)) is (are) clamped at the high DC voltage VH. Accordingly, the voltage V32B across the winding 32B of the transformer 2003 is clamped at VH/n (n: the turn ratio between the winding 31 and the windings 32A and 32B of the transformer 2003). Since the switching circuit 2004 functioning as an inverter circuit has a configuration of the push pull type, the reverse voltage V20 applied to the diode D20 does not exceed 2×(VH/n) ((N) in FIG. 76). In other words, the reverse voltage V20 applied to the diode D20 is 2×(VH/n) at the maximum, so that rise in the surge voltage is suppressed.

Figure 85:
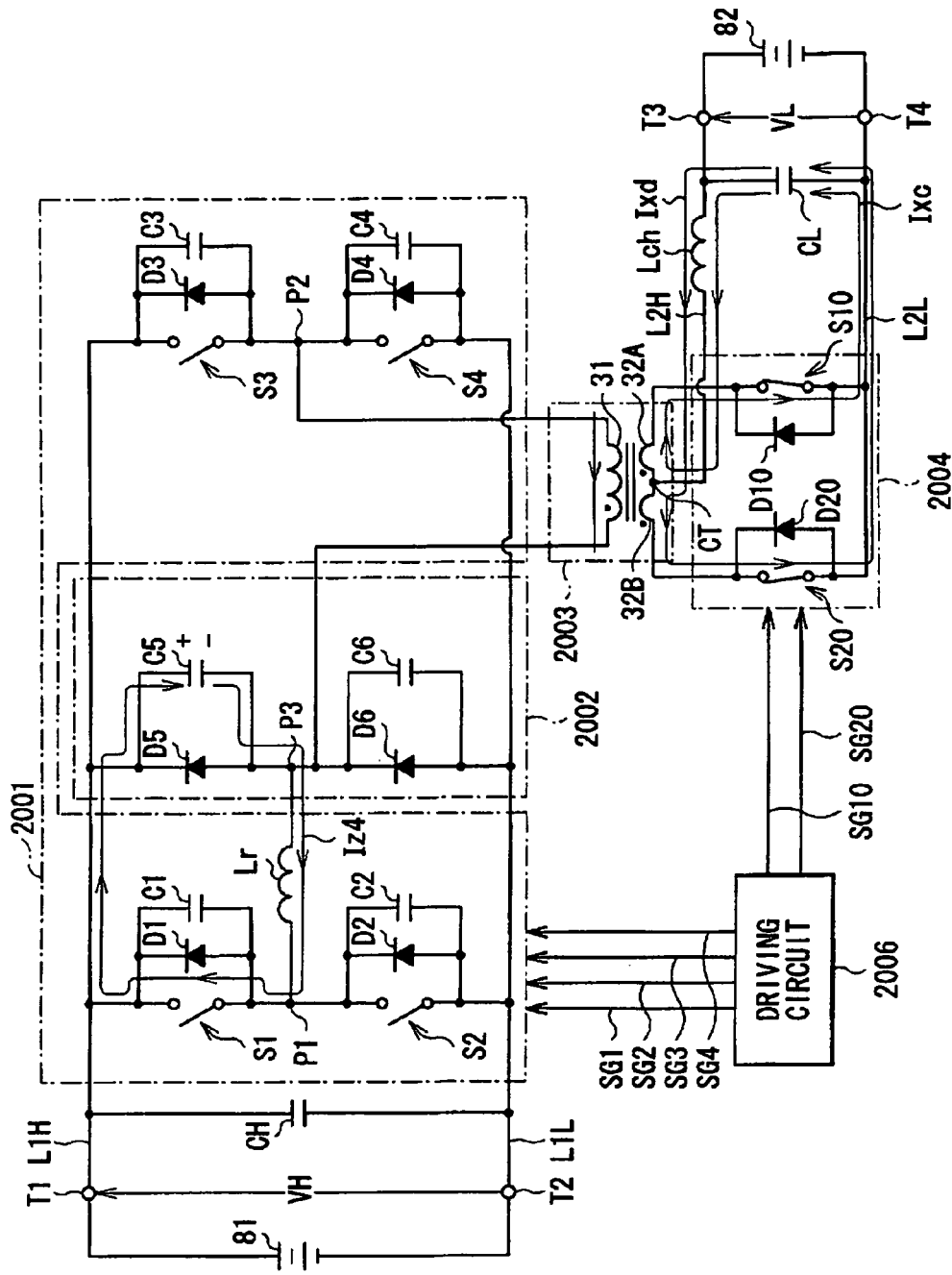
FIG. 85 is a circuit diagram illustrating the reverse-direction operation subsequent to FIG. 84.

Finally, in the period from time t39 to time t40 (t30) shown in FIG. 85, the switching element S20 is turned on again at time t39 ((F) in FIG. 76), and loop currents Ixc and Ixd as shown in FIG. 26 flow, so that the inductor Lch is excited again. On the high voltage side, the energy accumulated in the inductor Lr is discharged to the capacitor C5 by loop current Iz4 as shown in FIG. 85. The timing at which all of the accumulated energy is discharged and the loop current Iz4 becomes equal to 0 A corresponds to time t40. In such a manner, the operations in the latter half cycle are performed. The resultant state is equivalent to that at time t30 in FIG. 76.

Also in the case of the reverse-direction operation, the surge voltage applied to the diodes D10 and D20 in the switching circuit 2004 functioning as an inverter circuit is suppressed.

Next, by referring to FIGS. 86 to 89, the waveform of a surge voltage applied to the diodes in the switching power supply unit of the embodiment and the waveform of a surge voltage applied to diodes in conventional switching power supply units (comparative example 5) will be described while comparing them.

Figure 86:
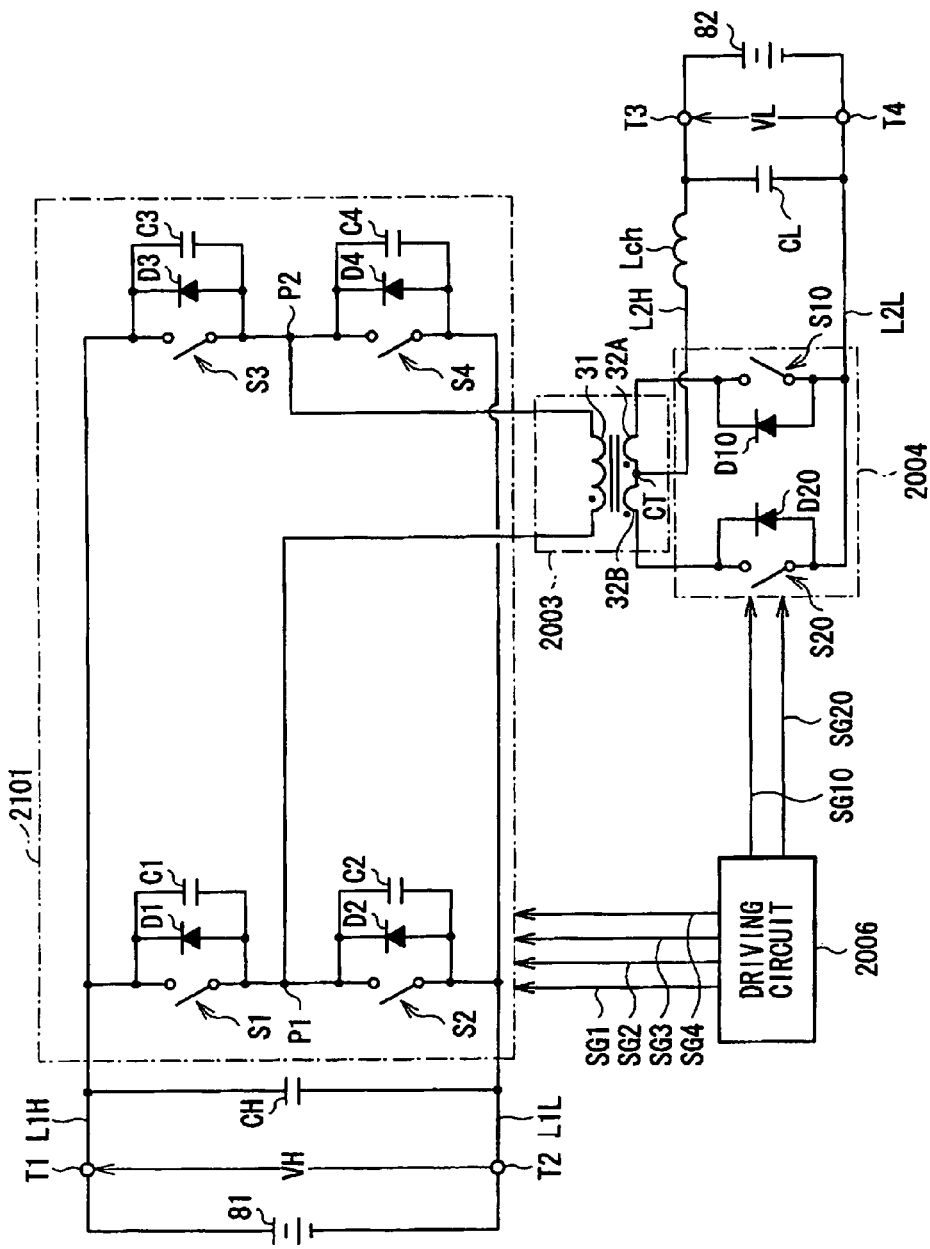
FIG. 86 is a circuit diagram showing the configuration of a conventional bidirectional switching power supply unit.
Figure 87:
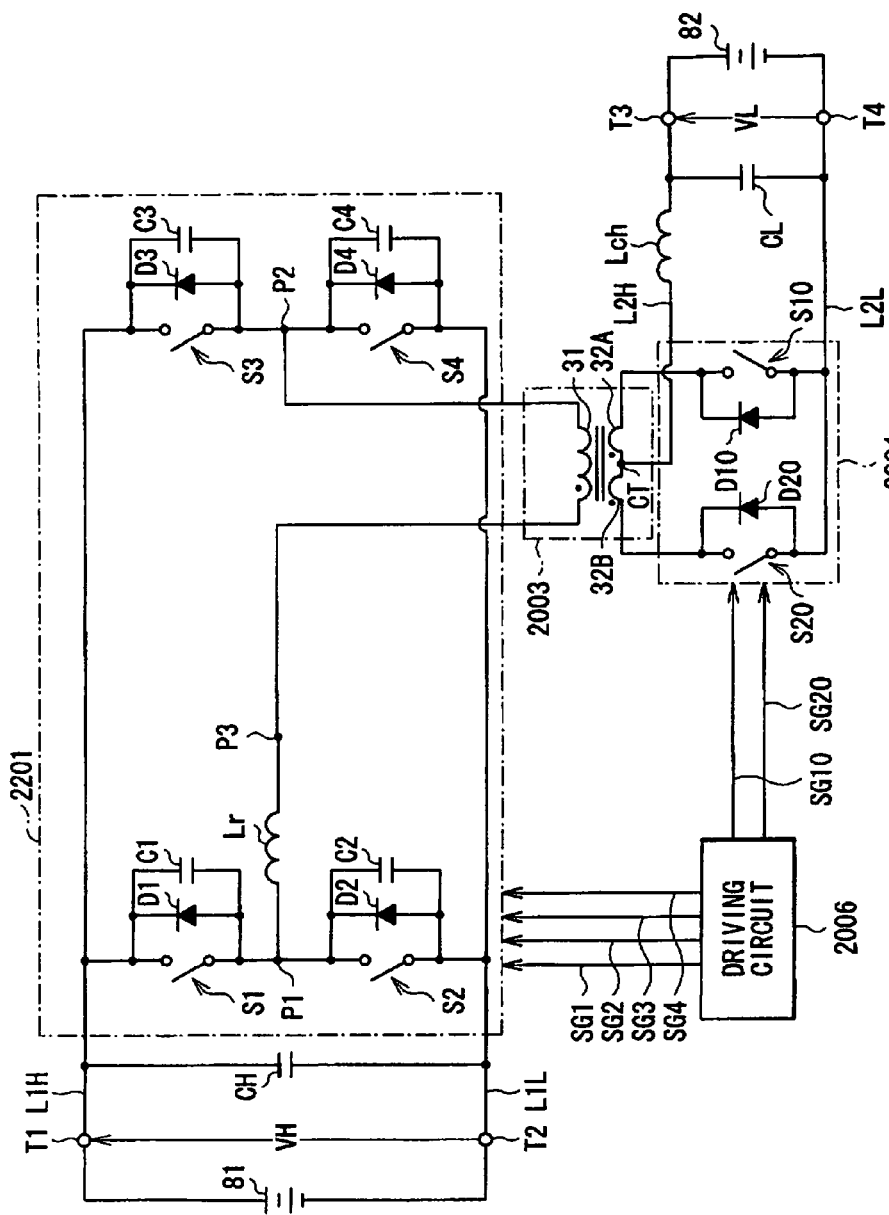
FIG. 87 is a circuit diagram showing the configuration of a switching power supply unit according to comparative example 5.
Figure 89A:
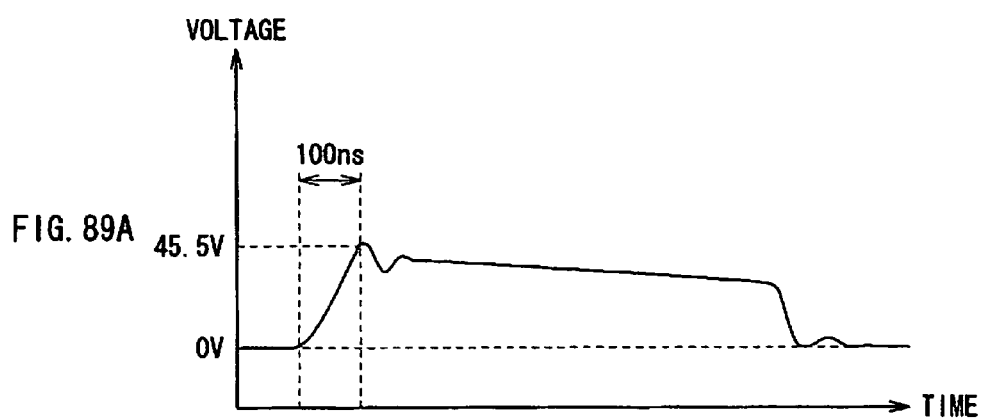
FIGS. 89A and 89B are enlarged timing waveform charts for comparing reverse-direction operations in the switching power supply units in FIG. 60 and the comparative example 5.
Figure 89B:
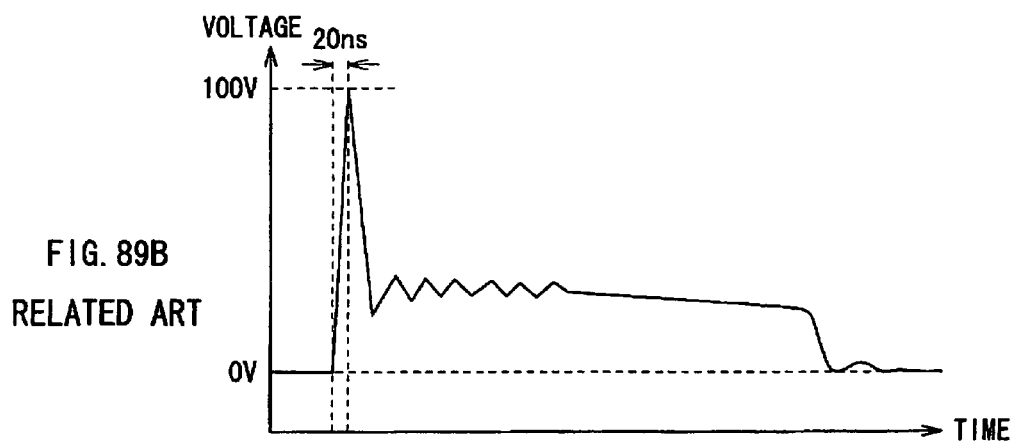

FIG. 87 shows the configuration of the switching power supply unit of the comparative example 5, and FIG. 88 shows the timing waveforms at the time of the reverse-direction operation. Concretely, the configuration is obtained by providing the conventional bidirectional switching power supply unit as shown in FIG. 86 with a switching circuit 201 having the inductor Lr in a switching circuit 2101. The configuration corresponds to a configuration obtained by eliminating the surge voltage suppressing circuit 2002 from the switching power supply unit of the third embodiment. FIGS. 89A and 89B show timing waveforms of reverse voltages applied to the diodes D10 and D20 in the switching power supply units of the third embodiment and the comparative example 5, respectively. The reverse voltage waveforms shown in FIGS. 89A and 89B are voltage waveforms at the center tap CT. The reverse voltages actually applied to the diodes D10 and D20 have a value twice as large as the value shown in the diagrams.

The conventional bidirectional switching power supply unit shown in FIG. 86 includes: the smoothing capacitors CH and CL, the switching circuits 2101 and 2004, the transformer 2003 having the windings 31, 32A ad 32B, the inductor Lch, and the driving circuit 2006 for controlling the switching circuits 2101 and 2004 by the switching signals SG1 to SG4, SG10, and SG20. The switching circuit 2101 is of the full bridge type and includes the switching elements S1 to S4, the diodes D1 to D4, and the capacitors C1 to C4. On the other hand, the switching circuit 2004 is of the push pull type, and is constructed by the switching elements S10 and S20 and the diodes D10 and D20. The high-voltage battery 2051 is disposed between the input/output terminals T1 and T2, and the low-voltage battery 2052 is disposed between the input/output terminals T3 and T4.

In the conventional bidirectional switching power supply unit, at the time of the forward-direction operation (voltage decreasing operation), the switching circuit 2101 functions as an inverter circuit and, on the other hand, the switching circuit 2004 functions as a rectifier circuit. The high DC voltage VH is converted to an AC voltage by the switching circuit 2101, the AC voltage is transformed (dropped) by the transformer 2003, and the transformed AC voltage is rectified by the switching circuit 2004, thereby obtaining the low DC voltage VL.

On the other had, at the time of the reverse-direction operation (voltage increasing operation), the switching circuit 2101 functions as a rectifier circuit and, on the other hand, the switching circuit 2004 functions as an inverter circuit. The low DC voltage VL is converted to an AC voltage by the switching circuit 2004, the AC voltage is transformed (increased) by the transformer 2003, and the transformed AC voltage is rectified by the switching circuit 2101, thereby obtaining the high DC voltage VH.

In the reverse voltage waveform in the comparative example 5 shown in FIG. 89B, the maximum value of the surge voltage is 100V which is about twice as large as VH/n. In addition, since the surge voltage suppressing circuit 2002 is not provided, in the reverse voltage waveform of the comparative example 5, the rise time to the maximum value is about 20 ns and it is understood that the reverse voltage rises abruptly.

In contrast, in the reverse voltage waveform of the third embodiment shown in FIG. 89A, since the surge voltage suppressing circuit 2002 is provided and, at the time of the forward-direction operation, the resonance time of the first resonance circuit constructed by the capacitors C5 and C6 in the surge voltage suppressing circuit 2002 and the inductor Lr and the recovery time of the diodes D10 and D20 are set so as to satisfy the conditional expression (7), as described above, it is understood that generation of the recovery currents in the diodes D10 and D20 is suppressed and the reverse voltage rises gently by the resonance operation of the first resonance circuit. Concretely, the maximum value of the surge voltage is 45.5V and corresponds to about the same (1.08 times) as Vin/n, and the rise time to the maximum value is about 100 ns. It is understood that the rise of the reverse voltage is gentler than that in the comparative example 5 shown in FIG. 89B and, as a result, rise of the surge voltage is suppressed more effectively. At the time of the reverse-direction operation, the resonance time of the second resonance circuit constructed by the capacitors C5 and C6 and the inductor Lch and the recovery time of the diodes D10 and D20 are set so as to satisfy the conditional expression (8). Therefore, like the case of the forward-direction operation, generation of the recovery currents in the diodes D10 and D20 is suppressed and the reverse voltage rises gently by the resonance operation of the second resonance circuit.

As described above, in the third embodiment, the first resonance circuit is constructed by the capacitors C5 and C6 in the surge voltage suppressing circuit 2002 and the inductor Lr on the high voltage side at the time of the forward-direction operation. The second resonance circuit is constructed by the capacitors C5 and C6 and the inductor Lch on the low voltage side at the time of the reverse-direction operation. Moreover, the resonance time of the first and second resonance circuits and the recovery time of the diodes D10 and D20 are set so as to satisfy the conditional expressions (7) and (8). Consequently, at the time of both of the forward-direction and reverse-direction operations, rise of the reverse voltage applied to the diodes D10 and D20 can be made gentler than that in the conventional technique and the maximum value of the reverse voltage can be lowered. Therefore, irrespective of the operation direction, the surge voltage generated in the diodes D10 and D20 can be suppressed.

By enabling the surge voltage to be suppressed, a loss in the rectifier element is reduced and the efficiency of the unit can be improved. In addition, by reducing a loss in the rectifier element, heat generation in the element can be also suppressed.

By suppressing rise in the surge voltage, a low-withstand-voltage rectifier element (diode) can be used, and the parts cost can be reduced.

Figure 90:
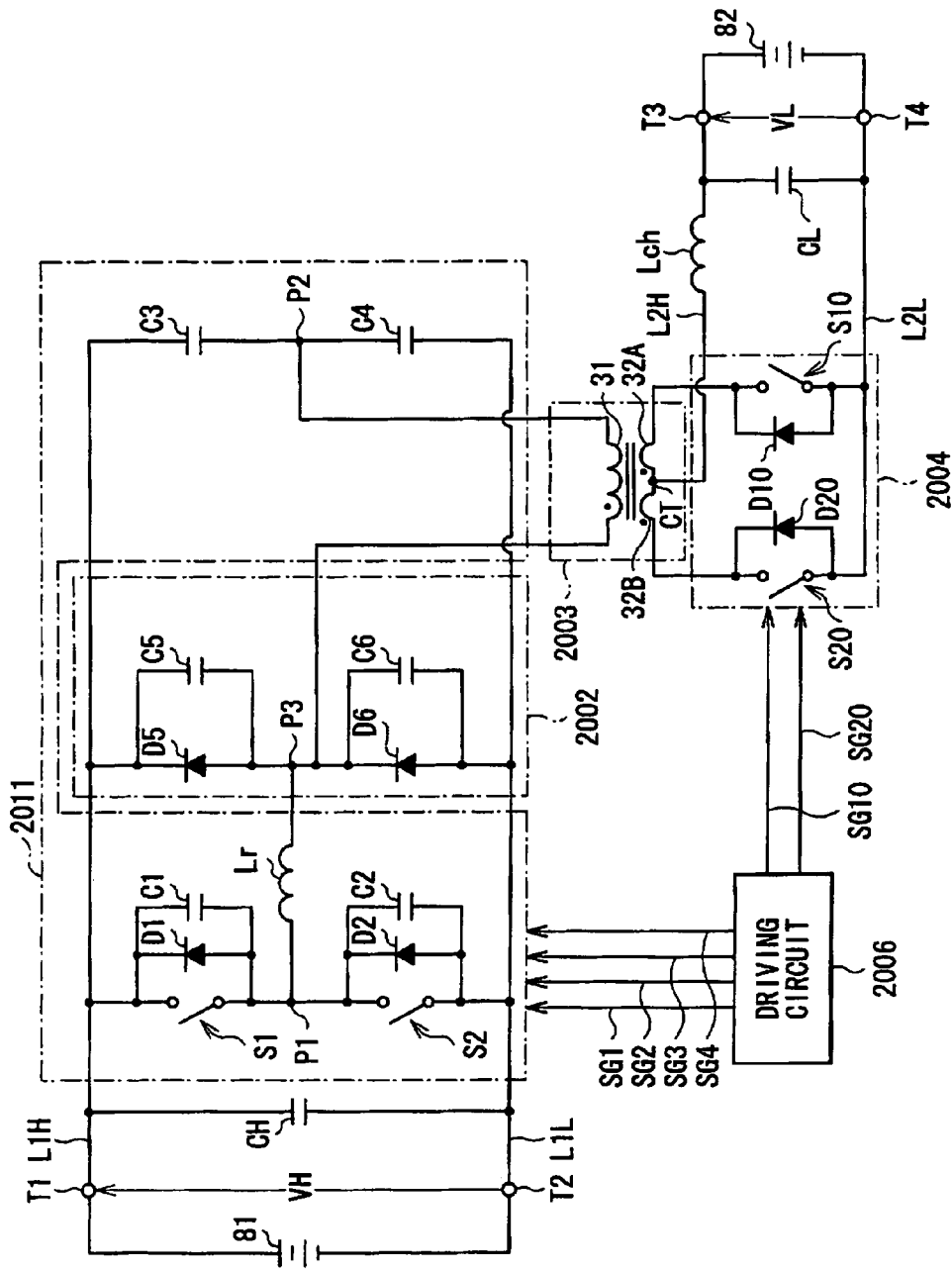
FIG. 90 is a circuit diagram showing the configuration of a switching power supply unit according to a modification of the third embodiment.
Figure 91:
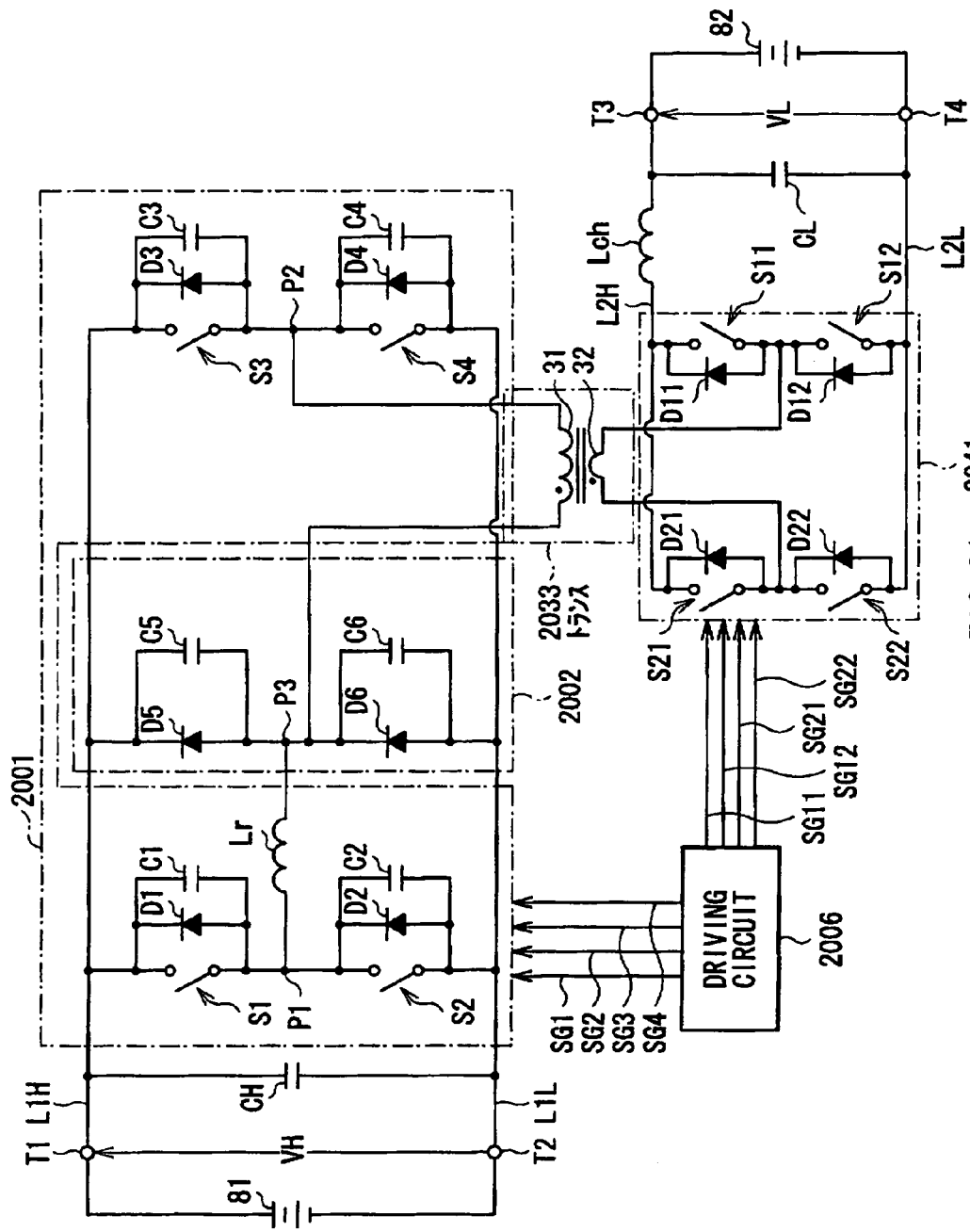
FIG. 91 is a circuit diagram showing the configuration of a switching power supply unit according to another modification of the third embodiment.
Figure 92:
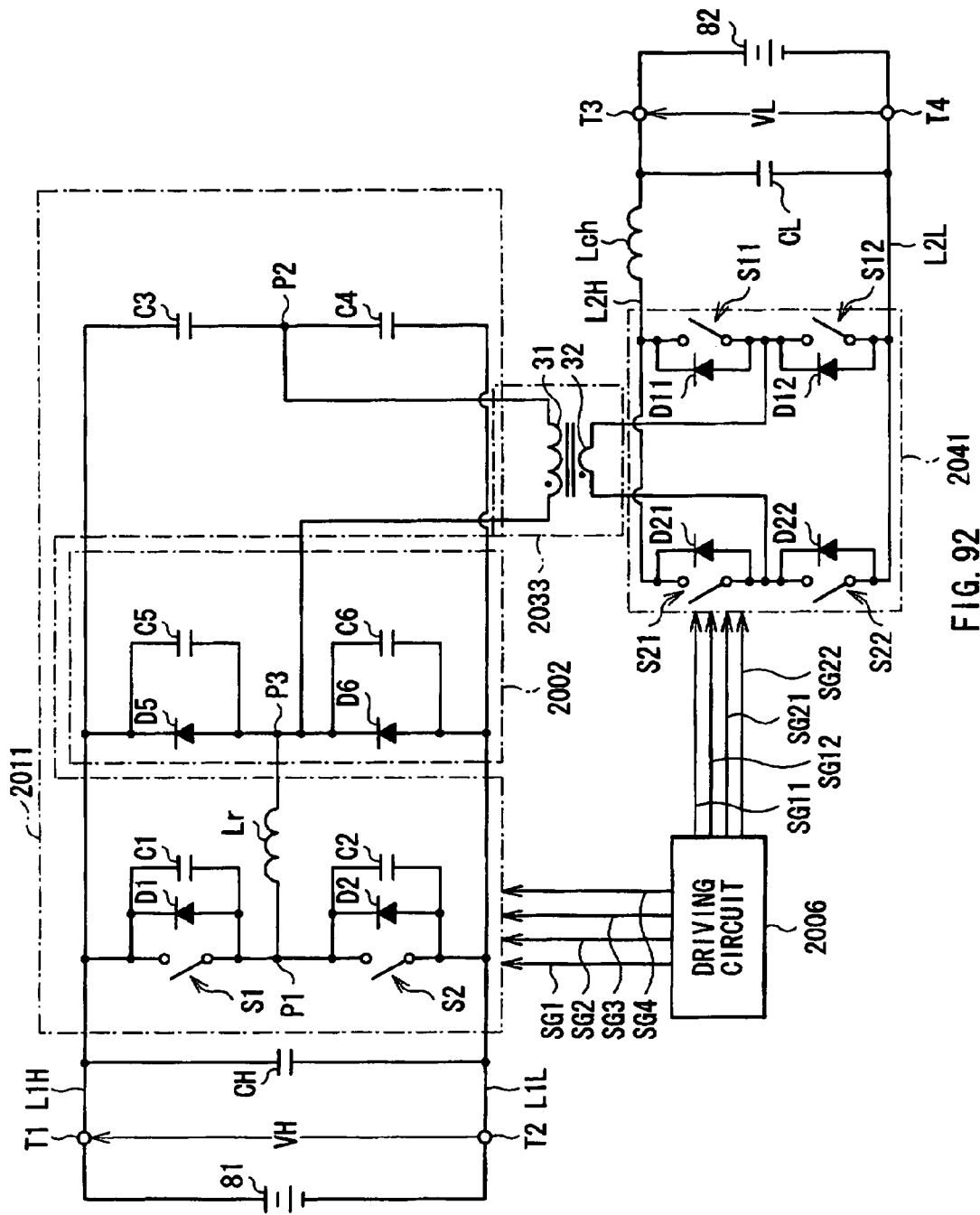
FIG. 92 is a circuit diagram showing the configuration of a switching power supply unit according to another modification of the third embodiment.

In the third embodiment, the case where the switching circuit 2001 is a full-bridge type switching circuit or a rectifier circuit and the switching circuit 2004 is a push-pull type switching circuit or a rectifier circuit has been described. For example, as shown in FIG. 90, a half-bridge type switching circuit 2011 including two switching elements S1 and S2 may be provided in place of the switching circuit 2001. For example, as shown in FIG. 91, a full-bridge type switching circuit 2041 including four switching elements S11, S12, S21 and S22 and four diodes D11, D12, D21, and D22 may be provided in place of the switching circuit 2004. For example, as shown in FIG. 92, a configuration obtained by combining the configurations in FIGS. 90 and 91 may be used. In the case of providing the switching circuit 2041, by an action similar to that of the third embodiment, the maximum value of the surge voltage applied to the diodes D11, D12, D21, and D22 can be suppressed to 1×(VH/n) (n: turn ratio between the winding 31 and the windings 32A and 32B of the transformer 2003) which is lower than the maximum value of about 2×(VH/n) of the conventional full-bridge type. Like the diodes D10 and D20, each of the diodes D11, D12, D21, and D22 can be constructed by a parasitic diode of a MOS-FET.

Figure 93:
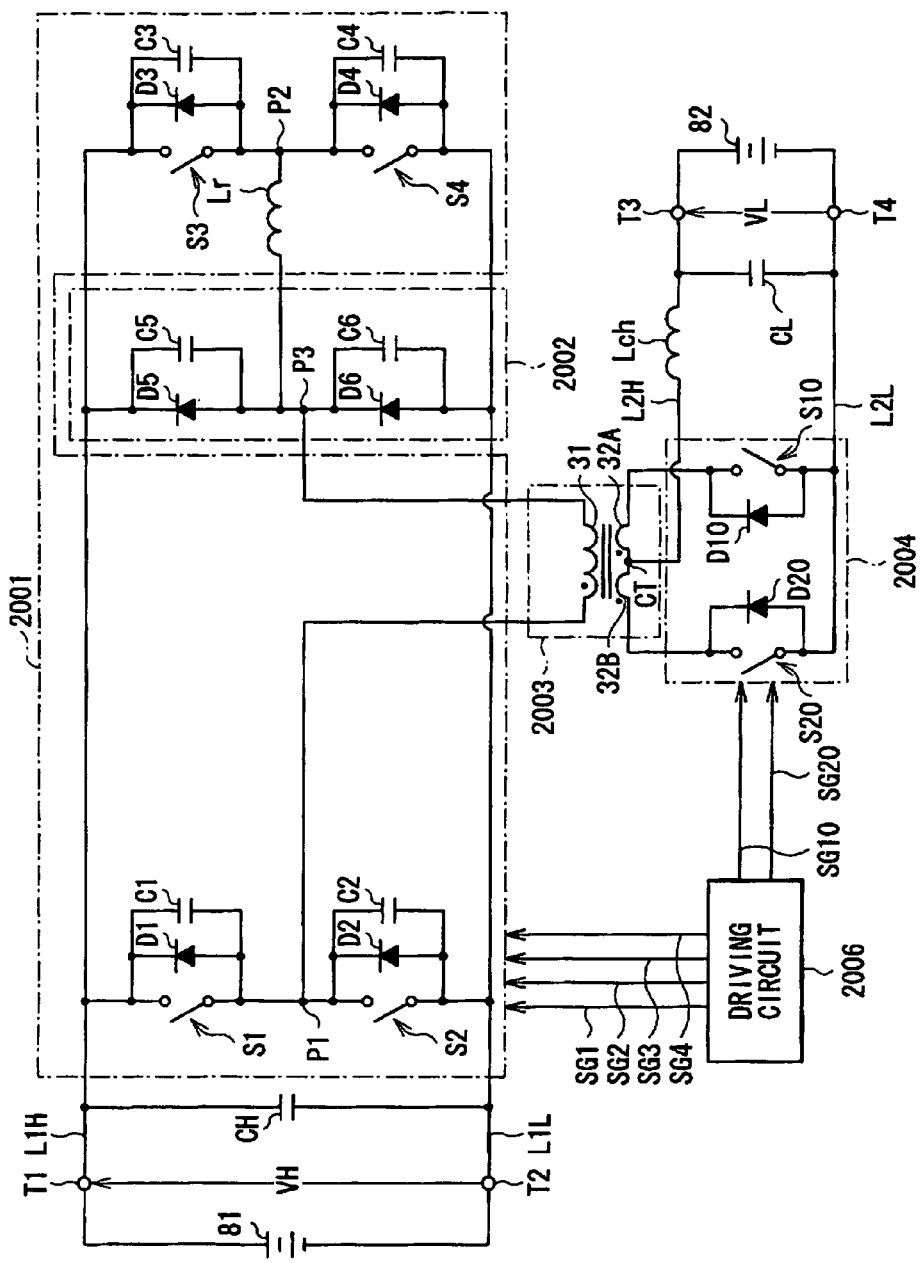
FIG. 93 is a circuit diagram showing the configuration of a switching power supply unit according to another modification of the third embodiment.

For example, as shown in FIG. 93, in the switching power supply unit of the embodiment (FIG. 60), the inductor Lr, the transformer 2003, and the circuits on the low voltage side (the switching circuit 2004, the inductor Lch, and the smoothing capacitor CL) can change their sides with respect to the surge voltage suppressing circuit 2002 as a center. To be concrete, the inductor Lr may be disposed between the connection points P2 and P3, and the transformer 2003 may be disposed between the connection points P1 and P3. Also in the case of the configuration, effects similar to those of the third embodiment can be obtained.

Figure 94:
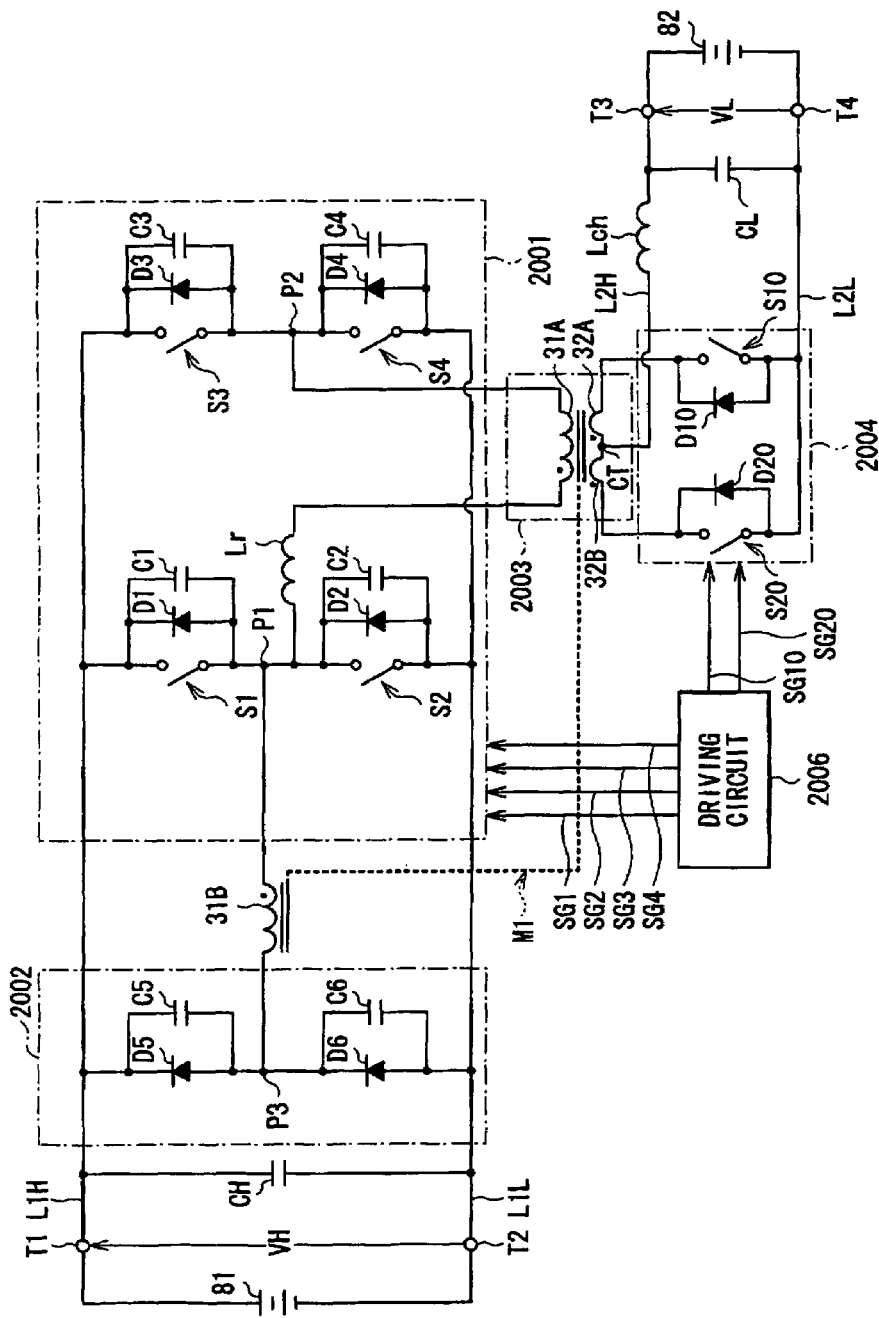
FIG. 94 is a circuit diagram showing the configuration of a switching power supply unit according to another modification of the third embodiment.
Figure 95:
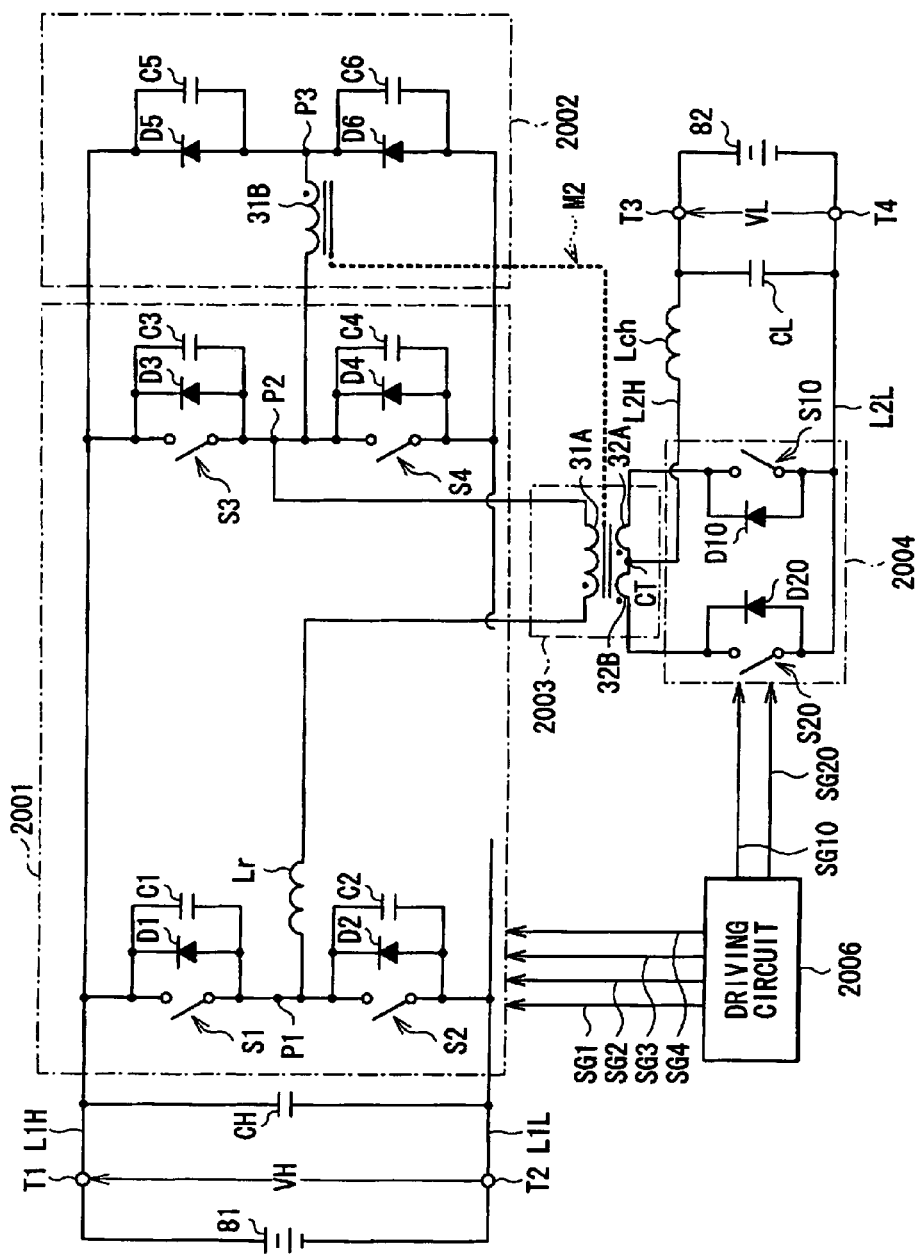
FIG. 95 is a circuit diagram showing the configuration of a switching power supply unit according to another modification of the third embodiment.

In the third embodiment, the case where the transformer 2003 and the inductor Lr are provided magnetically independently of each other has been described. It is also possible to provide, for example, as shown in FIGS. 94 and 95, the transformer 2003 and the inductor Lr are magnetically coupled to each other as shown by reference numerals M1 and M2 in the diagram. To be concrete, the inductor Lr is disposed between the connection points P2 and P3 or between the connection points P1 and P3, and a leakage inductance 31B of the transformer 2003 is connected between the connection points P1 and P3 or between the connection points P2 and P3. Since each of the above-described configurations shown in FIGS. 94 and 95 is equivalent to the configuration shown in FIG. 60 or 93, effects similar to those of the third embodiment can be obtained.

Figure 96:
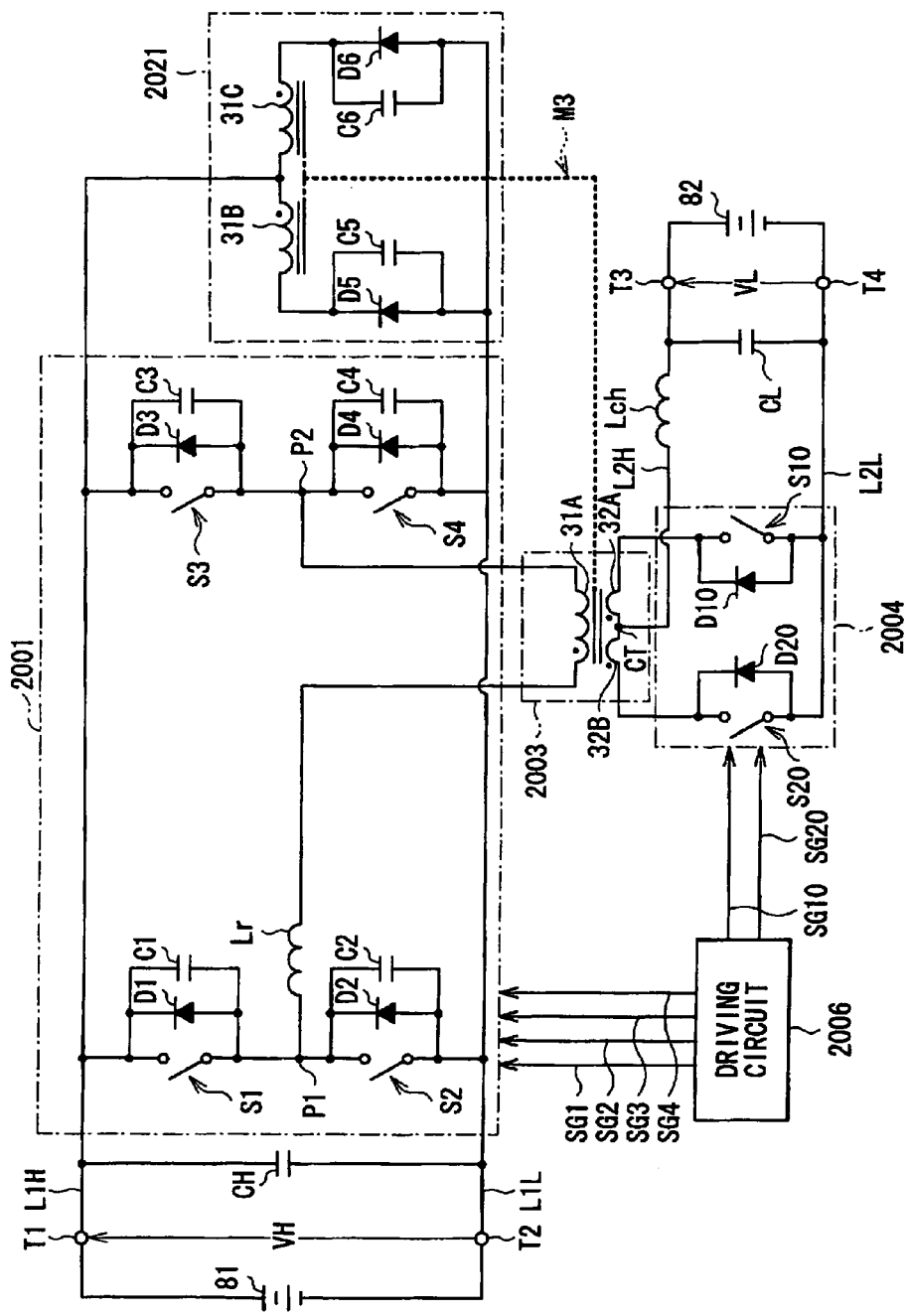
FIG. 96 is a circuit diagram showing the configuration of a switching power supply unit according to another modification of the third embodiment.
Figure 97:
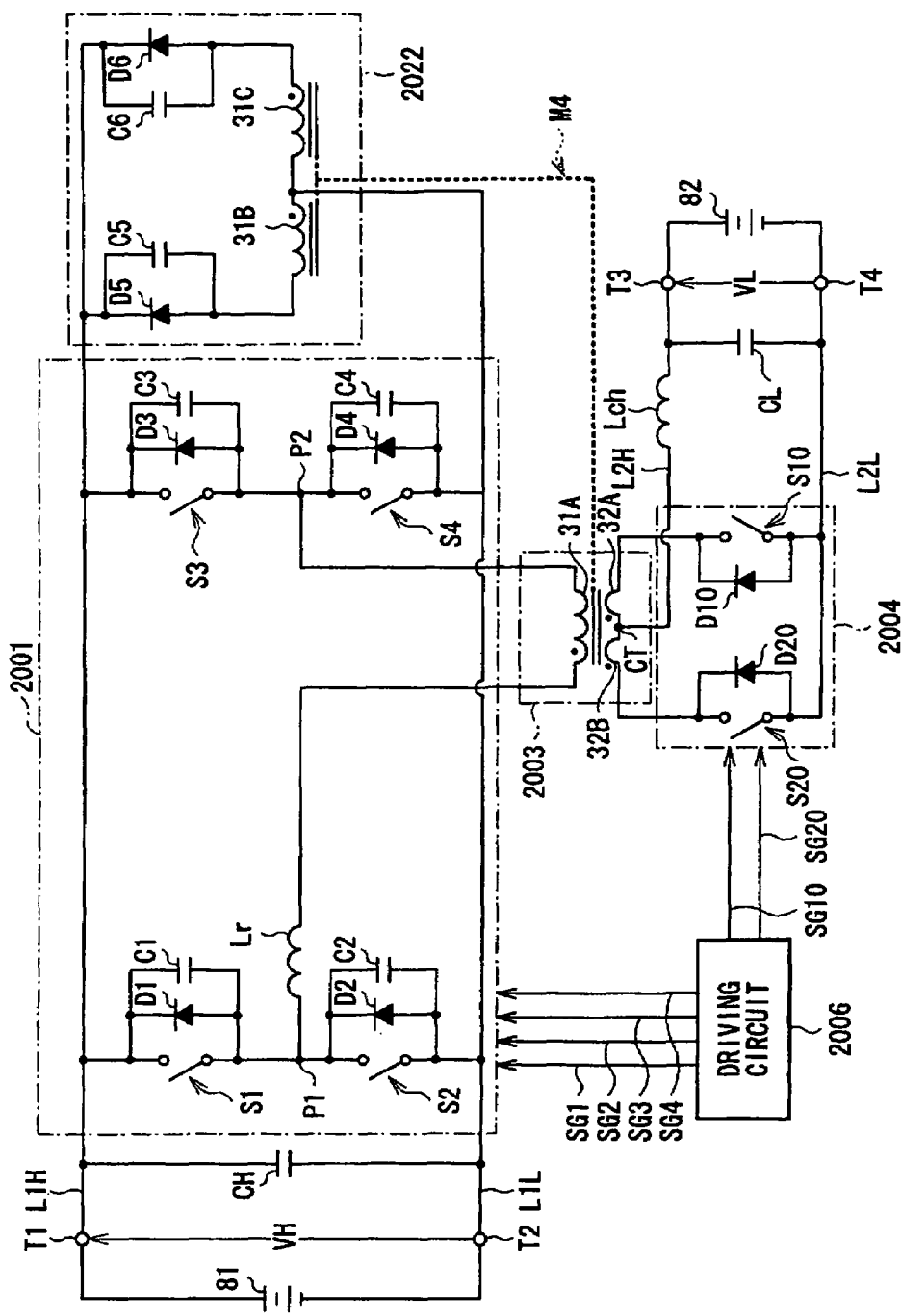
FIG. 97 is a circuit diagram showing the configuration of a switching power supply unit according to another modification of the third embodiment.

In the case where the transformer 2003 and the inductor Lr are magnetically coupled to each other as described above, for example, as shown in FIGS. 96 and 97, surge voltage suppressing circuits 2021 and 2022 may be provided in place of the surge voltage suppressing circuit 2002. To be concrete, a device set of the diode D5 and the capacitor C5 and a device set of the diode D6 and the capacitor C6 may be connected in parallel with each other between the high-voltage line L1H and the low-voltage line L1L, and leakage inductances 31B and 31C of the transformer 2003 may have a configuration of the center tap type (magnetic coupling shown by the reference numerals M3 and M4 in the diagrams). Also in the case of the configuration, effects similar to those of the third embodiment can be obtained.

It is preferable to set the resonance time of the first resonance circuit and the recovery time Trr6 of the diodes D5 and D6 in the surge voltage suppressing circuit 2002 so as to satisfy not only the conditional expressions (7) and (8) described in the embodiment but also the following conditional expression (9). With the configuration, the reverse voltage applied to the diodes D5 and D6 in addition to the diodes D10 and D20 reaches the input voltage gently in accordance with resonance in a quarter of the resonance time. During the period, recovery is finished gently, so that rise in the surge voltage in the diodes D5 and D6 is also suppressed. Therefore, occurrence of ringing by the reverse voltage applied to the diodes D5 and D6 can be suppressed so that occurrence of noise can be also suppressed.

$$\tfrac{1}{4} \times \{2\pi \times (L \times C)^{1/2}\} > \text{Trr6} \tag{9}$$

In the foregoing embodiment, the switching power supply unit which performs the voltage decreasing operation at the time of the forward-direction operation and performs the voltage increasing operation at the time of the reverse-direction operation has been described. The present invention can be also supplied to a switching power supplying unit that performs the voltage increasing operation at the time of the forward-direction operation and performs the voltage decreasing operation at the time of the reverse-direction operation.

Obviously many modifications and variations of the present invention are possible in the light of the above teachings. It is therefore to be understood that within the scope of the appended claims the invention may be practiced otherwise than as specifically described.

What is claimed is:

1. A switching power supply unit comprising:
    a full-bridge-type bridge circuit including four switching elements and generating an input AC voltage on the basis of a DC input voltage;
    a transformer having a primary winding and a secondary winding, and transforming the input AC voltage into an output AC voltage;
    a rectifier circuit provided on the secondary side of the transformer, including a plurality of first rectifier elements, and rectifying the output AC voltage by the plurality of first rectifier elements, thereby generating a DC output voltage;
    a surge voltage suppressing circuit connected in parallel with the bridge circuit, and including two device sets each configured of a second rectifier element connected in a manner of reversed polarity and a first capacitative element, the second rectifier element and the first capacitative element being connected in parallel with each other;
    a resonance inductor configuring a first resonance circuit in cooperation with the first capacitative elements; and
    a driving circuit for driving the bridge circuit,
    wherein resonance time of the first resonance circuit and recovery time of the first rectifier elements are set so as to satisfy the following conditional expression (1)

$$\tfrac{1}{4} \times \{2\pi \times (L \times C)^{1/2}\} > \text{Trr1} \tag{1}$$

where $\{2\pi \times (L \times C)^{1/2}\}$ is resonance time of one cycle in the first resonance circuit;
L is inductance of the resonance inductor;
C is capacitance value of the first capacitative element; and
Trr1 is recovery time of the first rectifier elements.

2. The switching power supply unit according to claim 1, wherein resonance time of the first resonance circuit and recovery time of the second rectifier element are set so as to satisfy the following conditional expression (2)

$$\tfrac{1}{4} \times \{2\pi \times (L \times C)^{1/2}\} > \text{Trr2} \tag{2}$$

where Trr2 is recovery time of the second rectifier element.

3. The switching power supply unit according to claim 1, wherein the two device sets in the surge voltage suppressing circuit are connected in series to each other.

4. The switching power supply unit according to claim 3, wherein the primary winding of the transformer is connected, so as to configure an H bridge, to one bridge circuit configured of two switching elements and the two device sets, the two switching element being selected from the four switching elements and connected in series to each other, and
    the resonance inductor is connected, so as to configure an H bridge, to the other bridge circuit configured of the other two switching elements and the two device sets, the other two switching elements being the remainder of the four switching elements and connected in series to each other.

5. The switching power supply unit according to claim 1, wherein the resonance inductor is disposed on the secondary side of the transformer.

6. The switching power supply unit according to claim 1, wherein the transformer and the resonance inductor are magnetically independent of each other.

7. The switching power supply unit according to claim 1, further comprising an auxiliary winding provided on the primary side of the transformer, and
    the auxiliary winding and the resonance inductor are magnetically coupled to each other.

8. The switching power supply unit according to claim 1, further comprising second capacitative elements each of which is connected in parallel with each of the four switching elements, wherein the resonance inductor and the second capacitative elements configure a second resonance circuit.

9. The switching power supply unit according to claim 8, wherein the switching element is a field effect transistor, and the second capacitative element is configured of parasitic capacitance of the field effect transistor.

10. The switching power supply unit according to claim 1, wherein the first rectifier element is configured of a parasitic diode of a field effect transistor.

11. The switching power supply unit according to claim 1, wherein the rectifier circuit is a center-tap-type rectifier circuit including the two first rectifier elements.

12. The switching power supply unit according to claim 1, wherein the rectifier circuit is a full-bridge-type rectifier circuit including the four first rectifier elements.

13. A switching power supply unit generating a DC output voltage on the basis of a DC input voltage, comprising:
  a first group of two device sets disposed between a pair of terminals to which the DC input voltage is applied, the two device sets connected in series, each device set including a switching element and a capacitative element connected in parallel with each other;
  a second group of two device sets disposed in parallel with the first group of device sets, the two device sets connected in series, each device set including a switching element and a capacitative element connected in parallel with each other;
  a third group of two device sets disposed in parallel with the first group and the second group, the two device sets connected in series, each device set including a switching element, a capacitative element, and a rectifier element which are connected in parallel with each other;
  a transformer including a primary winding and a secondary winding, the primary winding connected between a connection point of the two device sets in the second group and a connection point of the two device sets in the third group, the transformer transforming an input AC voltage generated from the DC input voltage into an output AC voltage;
  an output circuit provided on the secondary side of the transformer, including a plurality of rectifier elements, and generating the DC output voltage by rectifying the output AC voltage by the plurality of rectifier elements; and
  an inductor connected between a connection point of the two device sets in the first group and a connection point of the two device sets in the third group, configuring a first resonance circuit in cooperation with capacitative elements included in the first group and the second group, and configuring a second resonance circuit in cooperation with a capacitative element included in the third group.

14. The switching power supply unit according to claim 13, further comprising a controller for performing a control so that either a first bridge circuit configured of the first group and the second group or a second bridge circuit configured of the second group and the third group selectively performs switching operation based on at least one of the DC input voltage and output current from the output circuit.

15. The switching power supply unit according to claim 14, wherein when the DC input voltage is higher than a threshold voltage, the controller turns off each of the switching elements in the third group and selects the first bridge circuit to operate and, when the DC input voltage is equal to or lower than the threshold voltage, the controller selects the second bridge circuit to operate.

16. The switching power supply unit according to claim 14, wherein when the DC input voltage is higher than a threshold voltage, the controller turns off each of the switching elements in the third group and selects the first bridge circuit to operate and, when the DC input voltage is equal to or lower than the threshold voltage, the controller selects either the first or second bridge circuit in consideration of magnitude of the output current.

17. The switching power supply unit according to claim 16, wherein in a case where the DC input voltage is equal to or lower than the threshold voltage, when the output current is smaller than a threshold current, the controller turns off each of the switching elements in the third group and selects the first bridge circuit to operate and, when the output current is equal to or larger than the threshold current, the controller selects the second bridge circuit to operate.

18. The switching power supply unit according to claim 14, wherein in the case of selecting the second bridge circuit to perform switching operation, the controller performs control so that two switching elements in the first group turns on/off in synchronization with on/off operation of two switching elements in the third group.

19. The switching power supply unit according to claim 14, wherein in the case of selecting the second bridge circuit to perform switching operation, the controller turns off two switching elements in the first group.

20. The switching power supply unit according to claim 13, wherein resonance time of the second resonance circuit and recovery time of rectifier elements in the output circuit are set so as to satisfy the following conditional expression (3)

$$\frac{1}{4} \times \{2\pi \times (L \times C)^{1/2}\} > \text{Trr3} \qquad (3)$$

where $\{2\pi \times (L \times C)^{1/2}\}$ is resonance time of one cycle in the second resonance circuit;
is inductance of the resonance inductor;
C is capacitance value of the capacitative element in the third group; and
Trr3 is recovery time of the rectifier elements in the output circuit.

21. The switching power supply unit according to claim 20, wherein resonance time of the second resonance circuit and recovery time of the rectifier elements in the third group are set so as to satisfy the following conditional expression (4)

$$\frac{1}{4} \times \{2\pi \times (L \times C)^{1/2}\} > \text{Trr4} \qquad (4)$$

where Trr4 is recovery time of the rectifier elements in the third group.

22. The switching power supply unit according to claim 13, wherein the transformer and the resonance inductor are magnetically independent of each other.

23. The switching power supply unit according to claim 13, wherein the transformer and the resonance inductor are magnetically coupled to each other.

24. The switching power supply unit according to claim 13, wherein at least one of the switching elements is a field effect transistor, and
  at least one of the capacitative elements is configured of parasitic capacitance of the field effect transistor.

25. The switching power supply unit according to claim 13, wherein the switching element in the third group is a field effect transistor, and
  a rectifier element in the third group is configured of parasitic diode of the field effect transistor.

26. The switching power supply unit according to claim 13, wherein a rectifier element in the output circuit is configured of a parasitic diode of a field effect transistor.

27. A switching power supply unit receiving a DC input voltage from one of first and second input/output terminal pairs and outputting a DC output voltage from the other input/output terminal pair, comprising:
- a transformer including a first winding disposed on the first input/output terminal pair side and a second winding disposed on the second input/output terminal pair side;
- a first circuit disposed between the first input/output terminal pair and the transformer, and including a plurality of first switching elements and first rectifier elements each of which is connected in parallel with each of the plurality of first switching elements;
- a second circuit disposed between the second input/output terminal pair and the transformer, and including a plurality of second switching elements and second rectifier elements each of which is connected in parallel with each of the plurality of second switching elements;
- a surge voltage suppressing circuit connected in parallel with the first circuit, and including two device sets each having a third rectifier element connected in a manner of reversed polarity and a first capacitative element, the third rectifier element and the first capacitative elements being connected in parallel with each other;
- a first inductor disposed between the first input/output terminal pair and the transformer;
- a second inductor disposed between the second input/output terminal pair and the transformer; and
- a driving circuit for driving each of the first and second circuits.

28. The switching power supply unit according to claim 27, wherein the two device sets in the surge voltage suppressing circuit are connected in series with each other.

29. The switching power supply unit according to claim 27, wherein the transformer and the first inductor are magnetically independent of each other.

30. The switching power supply unit according to claim 27, wherein the transformer and the first inductor are magnetically coupled to each other.

31. The switching power supply unit according to claim 27, wherein the first circuit is a full-bridge-type circuit performing as a switching circuit or rectifier circuit including four first switching elements and four first rectifier elements.

32. The switching power supply unit according to claim 31, wherein the first or second winding of the transformer is connected, so as to configure one H bridge, to a bridge circuit configured of two first switching elements and the two device sets, the two first switching element being selected from the four first switching elements and connected in series to each other, and
the first inductor is connected, so as to configure an H bridge, to the other bridge circuit configured of the other two first switching elements and the two device sets, the other two first switching elements being the remainder of the four switching elements and connected in series to each other.

33. The switching power supply unit according to claim 27, wherein the first circuit is a half-bridge type circuit performing as a switching circuit or rectifier circuit including the two first switching elements, the two first rectifier elements, and the two second capacitative elements.

34. The switching power supply unit according to claim 33, wherein the first or second winding of the transformer is connected, so as to configure an H bridge, to one bridge circuit configured of the two second capacitative elements and the two device sets, and
the first inductor is connected, so as to configure an H bridge, to the other bridge circuit configured of the two first switching elements and the two device sets.

35. The switching power supply unit according to claim 27, wherein the second circuit is a push-pull-type circuit performing as a switching circuit or rectifier circuit including the two second switching elements and the two second rectifier elements.

36. The switching power supply unit according to claim 27, wherein the second circuit is a full-bridge-type circuit performing as a switching circuit or rectifier circuit including the four second switching elements and the four second rectifier elements.

* * * * *